US007669629B2

(12) United States Patent
Ishibuchi et al.

(10) Patent No.: US 7,669,629 B2
(45) Date of Patent: Mar. 2, 2010

(54) SYSTEM FOR FABRICATING CORRUGATED BOARD

(75) Inventors: Hiroshi Ishibuchi, Hiroshima-ken (JP); Junichi Kawase, Hiroshima-ken (JP); Yukuharu Seki, Hiroshima-ken (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 0 days.

(21) Appl. No.: 12/153,694

(22) Filed: May 22, 2008

(65) Prior Publication Data

US 2008/0289769 A1 Nov. 27, 2008

Related U.S. Application Data

(63) Continuation of application No. 10/502,643, filed as application No. PCT/JP03/01111 on Feb. 4, 2003, now Pat. No. 7,424,901.

(30) Foreign Application Priority Data

| | | |
|---|---|---|
| Feb. 5, 2002 | (JP) | 2002-028699 |
| Feb. 6, 2002 | (JP) | 2002-030062 |
| Feb. 7, 2002 | (JP) | 2002-031103 |
| Mar. 11, 2002 | (JP) | 2002-065937 |
| Mar. 13, 2002 | (JP) | 2002-068473 |
| Mar. 14, 2002 | (JP) | 2002-070678 |
| Mar. 18, 2002 | (JP) | 2002-074620 |
| Mar. 19, 2002 | (JP) | 2002-076332 |
| Apr. 5, 2002 | (JP) | 2002-014356 |

(51) Int. Cl.
*B29C 65/02* (2006.01)
*B32B 41/00* (2006.01)

(52) U.S. Cl. ........................ 156/351; 156/358; 156/359; 156/360; 156/361; 156/367; 156/378; 156/379

(58) Field of Classification Search .................. 156/64, 156/350, 351, 358, 359, 360, 361, 366, 367, 156/378, 379, 462, 470, 494, 495, 496
See application file for complete search history.

(56) References Cited

U.S. PATENT DOCUMENTS 3,981,758 A 9/1976 Thayer et al.

(Continued)

FOREIGN PATENT DOCUMENTS

EP 0536518 4/1993

(Continued)

OTHER PUBLICATIONS

Igarashi, Seiichi, "Danbouru Housou Gijutsu," first edition, issued by Nippo Co., Ltd., Sep. 2000, pp. 367-368.

(Continued)

*Primary Examiner*—George R Koch, III
(74) *Attorney, Agent, or Firm*—Edwards Angell Palmer & Dodge LLP

(57) ABSTRACT

A system for fabricating a corrugated board sheet fabricated includes warp status information obtaining means (6, 6A-6H, 7, 7A, 7B, 8, 8A-8H, 240*a*, 240*b*, 241*a*, 241*b*) for obtaining warp status information concerning status of the warp of the corrugated board sheet fabricated by a corrugated-board fabrication machine (1); running-state information obtaining means (5, 5A-5H) for obtaining running state information concerning a running state of the corrugated-board fabrication machine (1); control variable calculating means (4, 4A-4H) for calculating a control variable of a particular control factor that affects the warp of the corrugated board sheet and that is one among control factors used to control the corrugated-board fabrication machine (1) based on the warp status information of the corrugated board sheet and the running state information of the corrugated-board fabrication machine (1); and control means (5, 5A-5H) for controlling the particular control factor using the control variable calculated by the control variable calculating means (4, 4A-4H).

4 Claims, 86 Drawing Sheets

U.S. PATENT DOCUMENTS

| | | | | | |
|---|---|---|---|---|---|
| 4,134,781 | A | | 1/1979 | Carstens et al. | |
| 4,314,868 | A | | 2/1982 | Hirakawa et al. | |
| 4,497,027 | A | * | 1/1985 | McGuire et al. | 700/127 |
| 4,556,444 | A | | 12/1985 | Schommler et al. | |
| 5,298,121 | A | | 3/1994 | Kilmister | |
| 5,788,803 | A | | 8/1998 | Sissons et al. | |
| 5,837,974 | A | * | 11/1998 | Sissons et al. | 219/388 |
| 5,915,295 | A | | 6/1999 | Lauderbaugh | |
| 6,136,417 | A | | 10/2000 | Ishibuchi et al. | |

FOREIGN PATENT DOCUMENTS

| | | |
|---|---|---|
| JP | 49-35239 | 9/1974 |
| JP | 54-1189 | 1/1979 |
| JP | 60-5171 | 2/1985 |
| JP | 1-86523 | 6/1989 |
| JP | 1-86524 | 6/1989 |
| JP | 1-274009 | 11/1989 |
| JP | 1-316257 | 12/1989 |
| JP | 4-59234 | 2/1992 |
| JP | 4-243769 | 8/1992 |
| JP | 5-500089 | 1/1993 |
| JP | 5-96668 | 4/1993 |
| JP | 5-116802 | 5/1993 |
| JP | 51-53995 | 6/1993 |
| JP | 6-55675 | 3/1994 |
| JP | 6-82237 | 3/1994 |
| JP | 60-61246 | 3/1994 |
| JP | 6-114977 | 4/1994 |
| JP | 9-131814 | 5/1997 |
| JP | 10-128881 | 5/1998 |
| JP | 11-216786 | 8/1999 |
| JP | 11-221870 | 8/1999 |
| JP | 2000-20673 | 1/2000 |
| JP | 2000-225658 | 8/2000 |
| JP | 2000-280379 | 10/2000 |

OTHER PUBLICATIONS

English Translation of Notice of Rejection of Mar. 26, 2007 corresponding to JP Appln. No. 2002-065937).

English Translation of Notice of Rejection of Jul. 6, 2006 corresponding to JP Appln. No. 2002-028699.

English Translation of Decision of Rejection of Oct. 4, 2006 corresponding to JP Appln. No. 2002-076332.

English Transaltiono f Notice of Rejection of Jul. 6, 2006 corresponding to JP Appln. No. 2002-070678.

English Translation f Notice of Rejection of Jul. 6, 2006 corresponding to JP Appln. No. 2002-074620.

English Translation of Notice of Rejection of Jul. 4, 2006 corresponding to JP Appln. No. 2002-065937.

English Translation of Notice of Rejection of Jul. 4, 2006 corresponding to JP Appln. No. 2002-068473.

English Translation of Notice of Rejection of Jul. 7, 2006 corresponds to JP Appln. No. 2002-076332.

Decisition of Rejection for JP2002-065937 of Apr. 8, 2008.

Notification dated Jul. 21, 2005.

Notice of Reasons for Rejection dated Jan. 18, 2005 with translation for JP 2002-030062.

Notification of Reasons for Refusal of six basic applications: 2002-028699, 2002-070678, 2002-074620, 2002-065937, 2002-068473, and 2002-076332.

Decision of Refusal for Appln. No. 2002-076332 dated Oct. 4, 2006, along with English Abstract and reference cited therein.

* cited by examiner

FIG. 5

3

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ○ | | | | ○ | | |

FIG. 7

3

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | | | ◎ | ○ | |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | | | | ○ | | |

FIG. 8

3

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | ○ | | ◎ | ○ | ○ |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | ○ | | | ○ | ○ | |
| 6 | PRESSURE OF DOUBLE FACER | ○ | | | | ○ | | |
| 7 | RATE OF DOUBLE FACER | ○ | | | | ○ | | |

FIG. 9

3

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | ○ | | ◎ | ○ | ○ |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | ○ | | | ○ | ○ | |
| 6 | PRESSURE OF DOUBLE FACER | ○ | | | | ○ | | |
| 7 | VAPOR PRESSURE IN DOUBLE FACER | ○ | | | | ○ | | |
| 8 | RATE OF DOUBLE FACER | ○ | | | | ○ | | |

FIG. 10

3

| PRIORITY ORDER | CONTROL FACTOR | | WARP STATUS (PUSH BUTTON) TYPE | | | | | | |
|---|---|---|---|---|---|---|---|---|---|
| | | | UPWARD WARP | | | RESET | DOWNWARD WARP | | |
| | | | LARGE | MEDIUM | SMALL | | LARGE | MEDIUM | SMALL |
| 1 | SPRAY AMOUNT | BOTTOM LINER SIDE | ◎ | ◎ | ○ | RETURNING ALL THE OUTPUT TO ORIGINAL | ◎ | ◎ | ○ |
| | | TOP LINER SIDE | ◎ | ◎ | ○ | | ◎ | ◎ | ○ |
| 2 | WRAP AMOUNT AROUND SINGLE-FACE WEB PREHEATER | | ◎ | ○ | ○ | | ◎ | ○ | ○ |
| 2 | WRAP AMOUNT AROUND TOP LINER PREHEATER | | ◎ | ○ | ○ | | ◎ | ○ | ○ |
| 4 | WRAP AMOUNT AROUND BOTTOM LINER PREHEATER | | ◎ | ○ | | | ◎ | ○ | |
| 5 | ADHESIVE-GAP AMOUNT OF SINGLE FACER | | ○ | ○ | | | ○ | ○ | |
| 6 | ADHESIVE-GAP AMOUNT OF GLUE MACHINE | | ○ | ○ | | | ○ | ○ | |
| 7 | PRESSURE OF DOUBLE FACER | | ○ | | | | ○ | | |
| 8 | VAPOR PRESSURE IN DOUBLE FACER | | ○ | | | | ○ | | |
| 9 | RATE OF DOUBLE FACER | | ○ | | | | ○ | | |

FIG. 20

3A

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | POWDER BRAKE FOR SINGLE-FACE WEB | - | - | - | RETURNING ALL THE OUTPUT TO ORIGINAL | ◎ | ○ | △ |
| 1 | POWDER BRAKE FOR TOP LINER | ◎ | ○ | △ | | - | - | - |
| 2 | SUCTION BRAKE FOR SINGLE-FACE WEB | - | - | - | | ◎ | ○ | - |
| 2 | BRAKE FOR TOP LINER MILL STAND | ◎ | ○ | - | | - | - | - |

FIG. 23

3A

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | POWDER BRAKE FOR SINGLE-FACE WEB | – | – | – | RETURNING ALL THE OUTPUT TO ORIGINAL | ◎ | ○ | △ |
| 1 | POWDER BRAKE FOR TOP LINER | ◎ | ○ | △ | | – | – | – |
| 2 | SUCTION BRAKE FOR SINGLE-FACE WEB | – | – | – | | ◎ | ○ | – |
| 2 | BRAKE FOR TOP LINER MILL STAND | ◎ | ○ | – | | – | – | – |
| 3 | WRAP AMOUNT AROUND ROLL FOR SINGLE-FACE WEB | – | – | – | | ○ | ○ | – |
| 3 | WRAP AMOUNT AROUND ROLL FOR TOP LINER | ○ | ○ | – | | – | – | – |

FIG. 34

3B

| PRIORITY ORDER | CONTROL FACTOR | WARP STATUS (PUSH BUTTON) TYPE | | | | | | |
|---|---|---|---|---|---|---|---|---|
| | | TWIST WARP A | | | RESET | TWIST WARP B | | |
| | | LARGE | MEDIUM | SMALL | | LARGE | MEDIUM | SMALL |
| 1 | VARY TILT ANGLE OF PRESS ROLL (OPERATING SIDE DOWNSTREAM) | ◎ | ○ | △ | RETURNING ALL THE OUTPUT TO ORIGINAL | – | – | – |
| 1 | VARY TILT ANGLE OF PRESS ROLL (OPERATING SIDE UPSTREAM) | – | – | – | | ◎ | ○ | △ |

FIG. 37

3B

| PRIORITY ORDER | CONTROL FACTOR | WARP STATUS (PUSH BUTTON) TYPE | | | | | | |
|---|---|---|---|---|---|---|---|---|
| | | TWIST WARP A | | | RESET | TWIST WARP B | | |
| | | LARGE | MEDIUM | SMALL | | LARGE | MEDIUM | SMALL |
| 1 | VARY TILT ANGLE OF PRESS ROLL (OPERATING SIDE DOWNSTREAM) | ◎ | ○ | △ | RETURNING ALL THE OUTPUT TO ORIGINAL | – | – | – |
| 1 | VARY TILT ANGLE OF PRESS ROLL (OPERATING SIDE UPSTREAM) | – | – | – | | ◎ | ○ | △ |
| 2 | INCREASE PRESSURE APPLIED BY PRESS ROLL AT DRIVING SIDE | ○ | △ | – | | – | – | – |
| 2 | INCREASE PRESSURE APPLIED BY PRESS ROLL AT OPERATING SIDE | – | – | – | | ○ | △ | – |

FIG. 38

3B

| PRIORITY ORDER | CONTROL FACTOR | WARP STATUS (PUSH BUTTON) TYPE | | | | | | |
|---|---|---|---|---|---|---|---|---|
| | | TWIST WARP A | | | RESET | TWIST WARP B | | |
| | | LARGE | MEDIUM | SMALL | | LARGE | MEDIUM | SMALL |
| 1 | VARY TILT ANGLE OF PRESS ROLL (OPERATING SIDE DOWNSTREAM) | ◎ | ○ | △ | RETURNING ALL THE OUTPUT TO ORIGINAL | – | – | – |
| 1 | VARY TILT ANGLE OF PRESS ROLL (OPERATING SIDE UPSTREAM) | – | – | – | | ◎ | ○ | △ |
| 2 | INCREASE PRESSURE APPLIED BY PRESS ROLL AT DRIVING SIDE | ○ | △ | – | | – | – | – |
| 2 | INCREASE PRESSURE APPLIED BY PRESS ROLL AT OPERATING SIDE | – | – | – | | ○ | △ | – |
| 3 | INCREASE VERTICAL VARIATION OF WRAP ROLL FOR SINGLE-FACE WEB AT DRIVING SIDE | △ | △ | – | | – | – | – |
| 3 | INCREASE VERTICAL VARIATION OF WRAP ROLL FOR SINGLE-FACE WEB AT OPERATING SIDE | – | – | – | | △ | △ | – |

FIG. 40

3B

| PRIORITY ORDER | CONTROL FACTOR | WARP STATUS (PUSH BUTTON) TYPE | | | | | | |
|---|---|---|---|---|---|---|---|---|
| | | TWIST WARP A | | | RESET | TWIST WARP B | | |
| | | LARGE | MEDIUM | SMALL | | LARGE | MEDIUM | SMALL |
| 1 | VARY TILT ANGLE OF PRESS ROLL (OPERATING SIDE DOWNSTREAM) | ◎ | ○ | △ | RETURNING ALL THE OUTPUT TO ORIGINAL | – | – | – |
| 1 | VARY TILT ANGLE OF PRESS ROLL (OPERATING SIDE UPSTREAM) | – | – | – | | ◎ | ○ | △ |
| 2 | INCREASE PRESSURE APPLIED BY PRESS ROLL AT DRIVING SIDE | ○ | △ | – | | – | – | – |
| 2 | INCREASE PRESSURE APPLIED BY PRESS ROLL AT OPERATING SIDE | – | – | – | | ○ | △ | – |
| 3 | INCREASE VERTICAL VARIATION OF WRAP ROLL FOR SINGLE-FACE WEB AT DRIVING SIDE | △ | △ | – | | – | – | – |
| 3 | INCREASE VERTICAL VARIATION OF WRAP ROLL FOR SINGLE-FACE WEB AT OPERATING SIDE | – | – | – | | △ | △ | – |
| 4 | INCREASE SUCTION BRAKE FOR SINGLE-FACE WEB AT DRIVING SIDE | △ | – | – | | – | – | – |
| 4 | INCREASE SUCTION BRAKE FOR SINGLE-FACE WEB AT OPERATING SIDE | – | – | – | | △ | – | – |

FIG. 48

3C

| PRIORITY ORDER | CONTROL FACTOR | WARP STATUS (JUDGMENT RESULT) | | | | | | |
|---|---|---|---|---|---|---|---|---|
| | | UPWARD WARP | | | NO WARP | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ○ | | | | ○ | | |

FIG. 49

8C

| | | UPPER WEB (BOTTOM LINER) TEMPERATURE Te1 | | |
|---|---|---|---|---|
| | | HIGH | NORMAL | LOW |
| LOWER WEB (TOP LINER) TEMPERATURE Te2 | HIGH | NO WARP IN WIDTH DIRECTION (SURPLUS HEAT) | UPWARD WARP (MEDIUM) IN WIDTH DIRECTION | UPWARD WARP (LARGE) IN WIDTH DIRECTION |
| | NORMAL | DOWNWARD WARP (MEDIUM) IN WIDTH DIRECTION | NO WARP IN WIDTH DIRECTION (OPTIMUM HEAT) | UPWARD WARP (SMALL) IN WIDTH DIRECTION |
| | LOW | DOWNWARD WARP (LARGE) IN WIDTH DIRECTION | DOWNWARD WARP (SMALL) IN WIDTH DIRECTION | NO WARP IN WIDTH DIRECTION (LACKING HEAT) |

FIG. 51

3C

| PRIORITY ORDER | CONTROL FACTOR | WARP STATUS (JUDGMENT RESULT) | | | | | | |
|---|---|---|---|---|---|---|---|---|
| | | UPWARD WARP | | | NO WARP | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | | | ◎ | ○ | |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | | | | ○ | | |

FIG. 52

3C

| PRIORITY ORDER | CONTROL FACTOR | WARP STATUS (JUDGMENT RESULT) | | | | | | |
|---|---|---|---|---|---|---|---|---|
| | | UPWARD WARP | | | NO WARP | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | ○ | | ◎ | ○ | ○ |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | ○ | | | ○ | ○ | |
| 6 | PRESSURE OF DOUBLE FACER | ○ | | | | ○ | | |
| 7 | RATE OF DOUBLE FACER | ○ | | | | ○ | | |

FIG. 53

3C

| PRIORITY ORDER | CONTROL FACTOR | WARP STATUS (JUDGMENT RESULT) | | | | | | |
|---|---|---|---|---|---|---|---|---|
| | | UPWARD WARP | | | NO WARP | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ◎ | ○ | ○ | | ◎ | ○ | ○ |
| 4 | ADHESIVE-GAP AMOUNT OF SINGLE FACER | ○ | ○ | | | ○ | ○ | |
| 5 | ADHESIVE-GAP AMOUNT OF GLUE MACHINE | ○ | ○ | | | ○ | ○ | |
| 6 | PRESSURE OF DOUBLE FACER | ○ | | | | ○ | | |
| 7 | VAPOR PRESSURE IN DOUBLE FACER | ○ | | | | ○ | | |
| 8 | RATE OF DOUBLE FACER | ○ | | | | ○ | | |

FIG. 54

3C

| PRIORITY ORDER | CONTROL FACTOR | | WARP STATUS (JUDGMENT RESULT) | | | | | | |
|---|---|---|---|---|---|---|---|---|---|
| | | | UPWARD WARP | | | NO WARP | DOWNWARD WARP | | |
| | | | LARGE | MEDIUM | SMALL | | LARGE | MEDIUM | SMALL |
| 1 | SPRAY AMOUNT | BOTTOM LINER SIDE | ◎ | ◎ | ○ | RETURNING ALL THE OUTPUT TO ORIGINAL | ◎ | ◎ | ○ |
| | | TOP LINER SIDE | ◎ | ◎ | ○ | | ◎ | ◎ | ○ |
| 2 | WRAP AMOUNT AROUND SINGLE-FACE WEB PREHEATER | | ◎ | ◎ | ○ | | ◎ | ◎ | ○ |
| 2 | WRAP AMOUNT AROUND TOP LINER PREHEATER | | ◎ | ◎ | ○ | | ◎ | ◎ | ○ |
| 4 | WRAP AMOUNT AROUND BOTTOM LINER PREHEATER | | ◎ | ○ | ○ | | ◎ | ○ | ○ |
| 5 | ADHESIVE-GAP AMOUNT OF SINGLE FACER | | ○ | ○ | | | ○ | ○ | |
| 6 | ADHESIVE-GAP AMOUNT OF GLUE MACHINE | | ○ | ○ | | | ○ | ○ | |
| 7 | PRESSURE OF DOUBLE FACER | | ○ | | | | ○ | | |
| 8 | VAPOR PRESSURE IN DOUBLE FACER | | ○ | | | | ○ | | |
| 9 | RATE OF DOUBLE FACER | | ○ | | | | ○ | | |

FIG. 56

| | | UPPER WEB (BOTTOM LINER) WATER CONTENT Mo1 | | |
|---|---|---|---|---|
| | | LOW | NORMAL | HIGH |
| LOWER WEB (TOP LINER) WATER CONTENT Mo2 | LOW | NO WARP IN WIDTH DIRECTION (SURPLUS HEAT) | UPWARD WARP (MEDIUM) IN WIDTH DIRECTION | UPWARD WARP (LARGE) IN WIDTH DIRECTION |
| | NORMAL | DOWNWARD WARP (MEDIUM) IN WIDTH DIRECTION | NO WARP IN WIDTH DIRECTION (OPTIMUM HEAT) | UPWARD WARP (SMALL) IN WIDTH DIRECTION) |
| | HIGH | DOWNWARD WARP (LARGE) IN WIDTH DIRECTION | DOWNWARD WARP (SMALL) IN WIDTH DIRECTION | NO WARP IN WIDTH DIRECTION (LACKING HEAT) |

FIG. 61

3D

| PRIORITY ORDER | CONTROL FACTOR | WARP STATUS (PUSH BUTTON) TYPE | | | | | | |
|---|---|---|---|---|---|---|---|---|
| | | UPWARD WARP | | | RESET | DOWNWARD WARP | | |
| | | LARGE | MEDIUM | SMALL | | LARGE | MEDIUM | SMALL |
| 1 | WRAP AMOUNT AROUND SINGLE-FACE WEB PREHEATER | ◎ | ◎ | ○ | RETURNING ALL THE OUTPUT TO ORIGINAL | ◎ | ◎ | ○ |
| 1 | WRAP AMOUNT AROUND TOP LINER PREHEATER | ◎ | ◎ | ○ | | ◎ | ◎ | ○ |
| 3 | WRAP AMOUNT AROUND BOTTOM LINER PREHEATER | ○ | | | | ○ | | |

FIG. 65

8D

| | | UPPER WEB (BOTTOM LINER) TEMPERATURE Te1 | | |
|---|---|---|---|---|
| | | HIGH | NORMAL | LOW |
| LOWER WEB (TOP LINER) TEMPERA TURE Te2 | HIGH | NO WARP IN WIDTH DIRECTION (SURPLUS HEAT) | UPWARD WARP (MEDIUM) IN WIDTH DIRECTION | UPWARD WARP (LARGE) IN WIDTH DIRECTION |
| | NORMAL | DOWNWARD WARP (MEDIUM) IN WIDTH DIRECTION | NO WARP IN WIDTH DIRECTION (OPTIMUM HEAT) | UPWARD WARP (SMALL) IN WIDTH DIRECTION |
| | LOW | DOWNWARD WARP (LARGE) IN WIDTH DIRECTION | DOWNWARD WARP (SMALL) IN WIDTH DIRECTION | NO WARP IN WIDTH DIRECTION (LACKING HEAT) |

SYSTEM FOR FABRICATING CORRUGATED BOARD

CROSS REFERENCE TO RELATED APPLICATIONS

This application is a continuation application of U.S. application Ser. No. 10/502,643, filed Aug. 2, 2004, now U.S. Pat. No. 7,424,904, in the name of Hiroshi ISHIBUCHI, Junichi KAWASE, and Yukuharu SEKI as a national phase entry of PCT/JP2003/01111, which application is incorporated by reference herein.

TECHNICAL FIELD

The present invention relates to a system for fabricating a corrugated board sheet, which system includes a preheater, a double facer, a warp detection apparatus, a counter of corrugated board sheets and a warp correction system and the like for a corrugated-board fabrication machine.

BACKGROUND OF THE INVENTION

A corrugated board sheet is fabricated by the following process in which a liner (a bottom liner) is glued to a corrugated medium web with adhesive to form a single-face web, gluing the medium web of the single-face web to the other liner (a top liner) and then cutting the fabricated corrugated board into an appropriate length with a cut-off device. During the process, a web (each of a bottom liner, a top liner, a single-face web, and a corrugated board) is heated by a preheater exemplified by a bottom liner preheater, a single-face web preheater and a top liner preheater, and heated by a double facer, and is pasted by a single facer and a glue machine. At that time, an inappropriate level of heat or amount of glue causes defects in a resultant corrugated board sheet, e.g., width-direction upward or downward warp (hereinafter simply called width-direction warp) or inferior gluing. For example, an excessive moisture content of a bottom liner causes a convex surface toward a top liner when being dried; and an excessive moisture content of the top liner causes a convex surface toward the bottom liner when being dried.

Further, during the fabrication process, if a transfer-direction (hereinafter also called travel-direction) tension of a top liner or a single-face sheet is out of the appropriate range so that there is a significant difference in travel-direction tension between a top liner and a single-face web, the resultant corrugated board sheet has a defect such as travel-direction upward/downward warp (hereinafter simply called travel-direction warp) or inferior gluing.

Still further, when a travel-direction tension distribution (hereinafter simply called tension) of each web is varied in the web-width direction as compared with an appropriate distribution, a resultant corrugated board sheet has twist warp.

Generally, an optimum tension distribution (i.e., a tension distribution that causes no twist warp) is uniform over the web width direction. But, if fiber fabricating a web is inclined with respect to the travel direction of the web, the resulting corrugated board sheet has twist warp in spite of uniform a tension distribution in the web-width direction because the tension distribution is relatively varied in the width direction compared to the optimum tension distribution.

Conventionally, in order to correct warp of the above types, an operator visually checks warp status of a corrugated board sheet, appropriately selects one or more control factors that affect type of warp on the basis of experience or know-how and manually adjusts the individual control factors.

However, such an adjustment manner depending on experience or know-how may lead to inconsistency in quality of resultant corrugated board sheets depending on different operators's skill levels. Additionally, the same operator may repeat the adjustment over and over and may make errors in the adjustment operation leading to difficulties in obtaining constant product quality. Further, since there are a great number of control factors to be adjusted and adjustment variables of each control factor are determined considering current values, the adjustment operation is complex and time-consuming.

Engineers have been working on development of a technology that inhibits warp of the corrugated board sheets and thereby improves quality of resultant corrugated board sheets by matrix control that automatically adjusts each control factor such as wrap amount around each preheater, gap amounts in the single facer and the glue machine and pressure applied by the double facer, based on production state information such as a base-board composition, basis weight of the base board, width of corrugated board sheet, flute and the like so that width-direction warp is corrected. With such a system, a matrix prepared beforehand can deal with fabrication of corrugated board sheets even if a base board having a special composition or a specially processed base board is used for the fabrication.

During an exceptional production state in which a top liner and a bottom liner have the same base board composition and have different moisture contents or base boards of the same type are different in moisture content, even if each control factor is automatically adjusted in the above system, temperature of a web does not reach a predetermined appropriate temperature and, as a result, the resultant corrugated board sheets may have width-direction warp.

For this reason, warp caused under such an exceptional production state should be corrected by an operator visually checking warp status of the corrugated board sheet and dealing with the warp on the basis of experience and/or know-how.

In order to deal with travel-direction warp, Japanese Patent Application Laid-Open (Kokai) No. HEI 10-128881 discloses a technique in which appropriate tensions to be applied to a top liner and/or a bottom liner are calculated on the basis of a detection signal from a warp detection apparatus and tension adjusting apparatus adjusts the tensions thereof to those calculated.

However, since this technique simply controls one or more particular control factors, each of which has previously been selected as a tension adjusting apparatus, in accordance with warp status of a corrugated board sheet, adjustment of each control factor is constant irrespective of warp amount. Therefore, adjustment for only the above selected control factors takes a long time to correct warp of large extent and, in extreme cases, there is a possibility that travel-direction warp cannot be corrected.

A double facer presses a top liner, which is piled together with a single-face web, against hotplates to heat the single-face web and the top liner whereby the single-face web is heated through the top liner and is joined to the top liner.

A conventional double facer has hotplates, each of which is in a single form across the width of a web, so that the double facer cannot dissolve width-direction unevenness of the moisture contents (i.e., unevenness of temperatures) of a single-face web and/or a top liner transferred into the double facer. The moisture-content unevenness or the temperature unevenness may therefore tend to cause width-direction S-shape warp (hereinafter, simply called S-shape warp), that is, a sheet curling in a wave-shape in the width direction.

FIG. 86 schematically shows a front sectional view (seen from the web traveling direction) of a conventional preheater. The preheater 300 is in the form of a heating roll to heat web being wrapped around the roll during rotation thereof in synchronization with the travel of the web. The preheater 300 includes a cylindrical shell 301 into which vapor is supplied in order to heat web, axes 302*a* and 302*b* arranged at the both ends of the shell 301 and rotatably supported by bearings 303.

One axis 302*a* takes the form of a pipe through which vapor for heating a web is supplied into the inside of the shell 301. A drain pipe 304 is passed into the shell 301 through the axis 302*a* so that the vapor becomes condensation and is drained from the shell 301 through the drain pipe 304.

Similar to the above-described conventional hotplates included in a double facer, the conventional preheater is also in the form of a single form across the web-width direction (perpendicular to the web travel direction) and therefore cannot dissolve width-direction unevenness of water content (unevenness of temperature) of a base board (a top liner, a bottom liner, a medium web) transferred into a corrugated-board fabrication machine. The above moisture-content unevenness and temperature unevenness may sometimes cause a resultant corrugated board sheet to have width-direction S-shape warp.

Japanese Patent Application Laid-Open (Kokai) No. HEI 9-131814 discloses a technique to inhibit width-direction S-shape warp of a corrugated board sheet by dissolving width-direction unevenness of moisture content of the web.

In this technique, a plurality of press rolls, which press web in the process of being transferred, are arranged along the width direction of the web upstream or downstream of a preheater roll around which the web is wrapped. Each of these press rolls can be attached or detached the travel path of a web. Control for the position of each individual press roll varies tension acting on individual portions of the web which portions are arranged along the web width direction and also varies pressure applied to each of the portions of the web toward the preheater roll. It is thereby possible to vary a heat amount applied to each of the portions along the width direction and to dissolve water-content unevenness whereupon occurrence of S-shape warp is inhibited.

However, this technique largely affects tension of a web, e.g., variation in tension distribution in the width direction of the web, resulting in warp. There is a possibility that the S-shape warp cannot be satisfactorily inhibited and that warp of another type may be generated on a resultant corrugated board sheet.

As described above, an operator may correct warp of a corrugated board sheet by visually checking warp status (warp type and warp amount) of the corrugated board sheet, selecting one or more corresponding factors associated with the warp status from the control factors on the basis of experience and know-how, and manually adjusting the selected factors.

A visual operator check, however, cannot quantitatively grasp a warp amount of a corrugated board sheet, so it is difficult to accurately correct the warp of the corrugated board sheet as a result of such a visual check. Warp correction in this manner takes time until a corrugated board sheet of product quality can be obtained. Additionally, the operator has to continuously check status of corrugated board sheets that have been loaded.

In order to solve the above problem, an apparatus for quantitatively detecting warp amount of a corrugated board sheet has been developed. There has not been developed a technique to quantitatively detect an amount of travel-direction warp or twist warp.

A double-face web, which has been cut by a cut-off device to serve as a final product of a corrugated board sheet, is transferred from the cut-off device to a stacker by a conveyer and is stacked in the stacker.

In such a conventional corrugated-board fabrication machine, a counting roll that rotates following transfer of a double-face web is installed at a web transferring unit arranged upstream of the cut-off device. The number of corrugated board sheets is counted on the basis of amount of rotation of the counting roll.

The above counting roll, however, may be not able to obtain an exact number of fabricated corrugated board sheets because of slipping between the counting roll and transferred double-face web.

Further, corrugated board sheets having large warp or inferior gluing may sometimes be removed as being defective during transfer. If removal of defectives is carried out downstream of the counting roll, the number of corrugated board sheets obtained by the counting roll is consequently different from the number of corrugated board sheets serving as final products.

DISCLOSURE OF THE INVENTION

(1)

It is the first object of the present invention is to provide a system for correcting warp of a corrugated board sheet in which warp of a corrugated board sheet is accurately corrected with ease without depending on the experience of an operator and know-how.

In order to attain the first object, there is provided a system for correcting warp of a corrugated board sheet (hereinafter simply called system) comprising warp status information obtaining means, running-state information obtaining means, control variable calculating means and control means, and correcting warp of a corrugated board sheet fabricated in the corrugated-board fabrication machine with these elements. Further, the system may preferably comprise control factor selecting means.

Hereinafter is a description of each of the above elements in relation to (1-1) correction of width-direction warp, (1-2) correction of travel-direction warp and (1-3) correction of twist warp.

(1-1) Correction of Width-Direction Warp of a Corrugated Board Sheet:

In order to accomplish the above first object, the system has the following configuration (a) or (b) to deal with width-direction warp of a corrugated board sheet.

(a)

The warp status information obtaining means obtains warp status information concerning status (up/downward direction and largeness (extent) of warp) of the warp of the corrugated board sheet fabricated by the corrugated-board fabrication machine. The manner of obtaining information may be carried out by manual input by an operator or automatically. If manual input by an operator is performed, the system may preferably include selection means for receiving an operator's selection for an arbitrary one from a plurality of candidates indicating status of, for example, width-direction warp of a corrugated board sheet and obtains the selected candidate as information concerning status of the warp.

On the other hand, if the system automatically obtains the information, the system may preferably include, for example, imaging means for imaging a corrugated board sheet fabricated by the corrugated-board fabrication machine and detection means for detecting the warp of the corrugated board sheet on the basis of image data obtained by the imaging means so that the system obtains the data detected by the detection means as information concerning status of the warp. In this case, for example, the imaging means images edges along the width direction of a corrugated board sheet fabricated by the corrugated-board fabrication machine and the detection means detects width-direction warp of the corrugated board sheet based on the image data obtained by the imaging means, so that it is possible to correct the width-direction warp.

Otherwise, the system may further comprise variation amount detecting means for detecting a vertical variation amount of a corrugated board sheet and detection means for detecting warp of the corrugated board sheet on the basis of information on the vertical variation amount obtained by the variation amount detecting means so that information detected by the detection means is regarded as information concerning status of the warp of the corrugated board sheet. In this case, for example, the variation amount detecting means measures the variation amount along the direction of the width of the corrugated board sheet and the detection means detects width-direction warp of the corrugated board sheet based on the variation amount information obtained by the variation amount detecting means, whereupon it is possible to correct the width-direction warp.

The running-status information obtaining means obtains running state information concerning a running state of the corrugated-board fabrication machine. The running state information represents running speed, wrap amount of a web around each preheater, vapor pressure applied to each preheater, gap amount of each pasting device, pressure applied by and vapor pressure applied to a double facer, and/or amount of lubricant if the corrugated-board fabrication machine includes a lubrication unit.

The control factor selecting means selects at least one particular control factor from a plurality of control factors that affect water content of a bottom liner or a top liner in accordance with the warp status of the corrugated board sheet and an influence of each of the plurality of particular control factors on the warp. The particular control factors are exemplified by control factors that control a heat amount applied to a bottom liner by bottom liner heating means, a glue amount applied to a medium web in a single facer, a heat amount applied to a single-face web by single-face web heating means, a heat amount applied to a top liner by top liner heating means, a glue amount applied to the single-face web at a glue machine, or a heat amount applied to a double-face web in a double facer.

Specifically, control factors for a heat amount applied to a web (a bottom liner, a single-face web, a top liner) by corresponding heating means (bottom liner heating means, single-face web heating means, top liner heating means) are a wrap amount of each web around a corresponding heating roll, which amount is adjusted by each wrap amount adjusting means, and/or vapor pressure applied to each heating roll. Further, in order to control a glue amount applied to a medium web in the single facer, at least one of one or more gap amounts between rolls used during a procedure to apply glue to the medium web being transferred by a corrugated roll, which gap amounts are exemplified by that between the corrugated roll and a pasting roll or between rolls included in a pasting unit can be determined as a control factor. In order to control a pasting amount applied to a single-face web in the glue machine, a gap amount between a pasting roll disposed along a travel path of the single-face web and the travel path can be determined as a control factor. In relation to control over a heat amount applied to a double-face web in the double facer, at least one item serving as a control factor is selected from pressure applied to one surface of the double-face web towards hotplates arranged along the travel path of the double-face web by a press unit, a vapor pressure applied to the hotplates, and a travel speed of the double-face web on the hotplates.

If the corrugated-board fabrication machine further includes a bottom liner lubrication unit to lubricate a bottom liner before or after gluing a single-face web to a top liner in the double facer, and a top liner lubrication unit to lubricate a top liner, a lubrication amount to a bottom liner from the bottom liner lubrication unit and a lubrication amount to a top liner from the top liner lubrication unit may be added to the particular control factors. The lubrication manner is exemplified by spraying water onto a web from a shower unit or by applying water onto the web with a water-applying roll.

The control variable calculating means calculates a control variable of the particular control factor selected by the control factor selecting means based on the warp status information of the corrugated board sheet and the running state of the corrugated-board fabrication machine.

The control means controls the selected particular control factor using the control variable calculated by the control variable calculating means. Specifically, the control means controls each actuator associated with the particular control factor such that the current value of the particular control factor becomes the control variable calculated by the control variable calculating means.

With this configuration, since a particular control factor that affects warp of a corrugated board sheet is automatically controlled in accordance with the warp status obtained by the warp status information obtaining means, it is possible to accurately correct width-direction warp of the corrugated board sheet with ease without depending on the experience of an operator and the know-how. In particular, if the information obtaining means automatically obtains information, width-direction warp of a corrugated board sheet is automatically corrected during the entire process.

As a preferable feature, the control factor selecting means of the system sequentially selects particular control factors in accordance with largeness of warp of a corrugated board sheet, considering a predetermined priority order. The extent of correction can therefore be larger in accordance with largeness of warp so that it is possible to rapidly correct the warp of the corrugated board sheet. Especially, if a particular control factor that more largely affects warp gets a higher priority, warp correction can be further rapidly accomplished.

(b)

The warp status information obtaining means detects information (up/downward direction and largeness of warp) concerning status of warp of a corrugated board sheet, and includes moisture content measuring means for measuring moisture contents of a bottom liner and a top liner or parameters correlating with the moisture contents and detection means for detecting the warp of the corrugated board sheet on the basis of data obtained by the moisture content measuring means. The warp status information obtaining means regards data obtained by the detection means as the warp status information.

The moisture content measuring means may perform the measurement at the entrance of a double facer in which a single-face web, which has been formed by joining a medium web to a bottom liner, is glued to a top liner to thereby fabricate a double-face web, or at the exit of the double facer. For example, the moisture content measuring means is in the form of one or more moisture sensors or temperature sensors.

Preferable measurement by the moisture content measuring means is carried out along the width direction of the bottom and the top liners.

The running-state information obtaining means obtains information concerning a running state of the corrugated-board fabrication machine. The running-state information concerns a running speed, a wrap amount of a web around each preheater, vapor pressure applied to each preheater, a gap amount of each pasting device, pressure applied by and vapor pressure applied to the double facer, and/or an amount of lubricant if the corrugated-board fabrication machine includes a lubrication unit.

The control factor selecting means selects at least one particular control factor from a plurality of control factors that affect a water content of a bottom liner or a top liner in accordance with the warp status of the corrugated board sheet and an influence of each of the plurality of particular control factors on the warp. The particular control factors are exemplified by control factors that control a heat amount applied to a bottom liner by bottom liner heating means, a glue amount applied to a medium web in a single facer, a heat amount applied to a single-face web by single-face web heating means, a heat amount applied to top liner by top liner heating means, a glue amount applied to the single-face web at a glue machine, or a heat amount applied to a double-face web in the double facer.

The control variable calculating means calculates a control variable of the particular control factor selected by the control factor selecting means based on the warp status information of the corrugated board sheet and the running state of the corrugated-board fabrication machine.

The control means controls the selected particular control factor using the control variable calculated by the control variable calculating means. Specifically, the control means controls each actuator associated with the particular control factor such that the current value of the particular control factor becomes the control variable calculated by the control variable calculating means.

With this configuration, since a particular control factor that affects warp of a corrugated board sheet is automatically controlled in accordance with the warp status obtained by the warp status information obtaining means, it is possible to automatically and accurately correct width-direction warp of the corrugated board sheet with ease without depending on the experience of an operator and know-how.

As a preferable feature, the control factor selecting means of the system sequentially selects particular control factors in accordance with largeness of warp of a corrugated board sheet, considering a predetermined priority order. The extent of correction can therefore be larger in accordance with the largeness of warp so that it is possible to rapidly correct warp of the corrugated board sheet. Especially, if a particular control factor that has a more significant effects on warp gets a higher priority, warp correction can be further rapidly accomplished.

In particular, since the moisture content measuring means measures the moisture contents of a single-face web and a top liner at the entrance or the exit (preferably the entrance) of the double facer, and control in order to correct width-direction warp of a corrugated board sheet is executed based on the detected contents, the control can be performed at an early stage and it is therefore possible to correct warp even if short-run fabrication (short order) is performed.

Further, when the moisture content measuring means is configured so as to measure moisture content along the width direction of the bottom liner and the top liner, it is possible to precisely judge warp status based on the measurement result even if both the bottom liner and the top liner have variation in moisture content.

(1-2) Correction of Travel Direction-Warp of a Corrugated Board Sheet:

The warp status information obtaining means obtains warp status information concerning status (an up/downward direction and largeness of travel-direction warp) of the warp of the corrugated board sheet fabricated by the corrugated-board fabrication machine. The manner of obtaining information may be carried out by a manual input of an operator or automatically. If manual input by an operator is performed, the warp status information obtaining means may preferably include selection means for receiving an operator's selection for an arbitrary one from a plurality of candidates indicating status of, for example, travel-direction warp of a corrugated board sheet, and warp status information obtaining means obtains the selected candidate as information concerning status of the travel-direction warp.

On the other hand, if the warp status information obtaining means automatically obtains the information, the warp status information obtaining means may preferably include, for example, imaging means for imaging edges along the travel direction of a corrugated board sheet fabricated by the corrugated-board fabrication machine, and detection means for detecting the travel-direction warp on the basis of image data obtained by the imaging means so that the warp status information obtaining means obtains the data detected by the detection means as information concerning status of the travel-direction warp of the corrugated board sheet.

Otherwise, the warp status information obtaining means may comprise variation amount detecting means for detecting a vertical variation amount of a corrugated board sheet along the travel direction of the sheet and detection means for detecting travel-direction warp of the corrugated board sheet on the basis of information of the vertical variation amount obtained by the variation amount detecting means so that information detected by the detection means is regarded as information concerning status of the travel-direction warp of the corrugated board sheet.

The running-state information obtaining means obtains information concerning a running state of the corrugated-board fabrication machine. The information concerning running-state information is exemplified by running speed, brake force of each braking device and/or wrap amount of a web around a wrap roll.

The control factor selecting means selects at least one particular control factor from a plurality of particular control factors that affect travel-direction tension of a bottom liner or a top liner in accordance with the warp status of the corrugated board sheet and an influence of each of the plurality of particular control factors on travel-direction warp. The particular control factors are braking force that a braking device applies to traveling single-face web or top liner, and a wrap amount of a single-face web or a top liner around a wrap roll for at least one of the single-face web and the top liner in the form of a sheet. A wrap amount is adjusted by wrap amount adjusting means.

The control means controls the selected particular control factor using the control variable calculated by the control variable calculating means. Specifically, the control means controls each actuator associated with the particular control factor such that the current value of the particular control factor becomes the control variable calculated by the control variable calculating means.

With this configuration, since a particular control factor that affects warp of a corrugated board sheet is automatically controlled in accordance with the travel-direction warp status obtained by the warp status information obtaining means, it is possible to accurately and effectively correct travel-direction warp of the corrugated board sheet with ease without depending on the experience of an operator and the know-how. In particular, if the information obtaining means automatically obtains information, the entire correction of travel-direction warp of a corrugated board sheet is automatically executed.

As a preferable feature, the control factor selecting means of the system sequentially selects particular control factors in accordance with largeness of warp of a corrugated board sheet, considering a predetermined priority order. The extent of correction can therefore be larger in accordance with the largeness of warp so that it is possible to rapidly correct warp of the corrugated board sheet. Especially, if a particular control factor that more largely affects warp gets a higher priority, warp correction can be further rapidly accomplished.

(1-3) Correction of Twist Warp of a Corrugated Board Sheet:

The warp status information obtaining means obtains warp status information concerning status (pattern and extent of twist warp) of the twist warp of the corrugated board sheet fabricated by the corrugated-board fabrication machine. The manner of obtaining information may be carried out by manual input by an operator or automatically. If manual input by an operator is performed, the wrap status information obtaining means may preferably include selection means for receiving the operator's selection for an arbitrary one from a plurality of candidates indicating status of, for example, twist warp, and wrap status information obtaining means obtains the selected candidate as information concerning status of the twist warp.

On the other hand, if the wrap status information obtaining means automatically obtains the information, the wrap status information obtaining means may preferably include, for example, imaging means for imaging the four corners of a corrugated board sheet fabricated by the corrugated-board fabrication machine and detection means for detecting twist warp of the corrugated board sheet on the basis of image data obtained by the imaging means so that the system obtains the data detected by the detection means as information concerning status of the twist warp of the corrugated board sheet.

Otherwise, the system may further comprise variation amount detecting means for detecting vertical variation amounts at points near the four corners of a corrugated board sheet and detection means for detecting twist warp of the corrugated board sheet on the basis of information of the vertical variation amounts obtained by the variation amount detecting means so that information detected by the detection means may be regarded as information concerning status of the twist warp of the corrugated board sheet.

The running-status information obtaining means obtains running state information of the corrugated-board fabrication machine. The running state information concerns running speed, tilt angle of press means of the double facer in relation to the web-travel direction, web-width-direction distribution of press force of the press means, the heights of both axis ends of a wrap roll arranged upstream of the double facer, and distribution of suction force of a suction brake along the web width direction for a single-face web.

The control variable calculating means calculates a control variable of a particular control factor based on the warp status information of a corrugated board sheet and the running state of the corrugated-board fabrication machine. A particular control factor is a control factor that affects web-width-direction distribution of travel-direction tension of a top liner.

For example, if the corrugated-board fabrication machine includes a double facer to glue the single-face web to the top liner, and the double facer includes hotplates and pressing means arranged along the travel direction of webs, which pressing means is divided into a plurality of pieces and presses the single-face web and the top liner to the hotplates. At the same time, if at least one piece of the pressing means has a structure able to vary the tilt angle thereof in relation to the web width direction, the tilt angle of the pressing means is also defined as a particular control factor.

Alternatively, if at least one piece of the pressing means is able to control web-width-direction distribution of pressure applied to the single-face web and the top liner, the web-width-direction distribution of the pressure is included in the particular control factors.

Further alternatively, if a wrap roll around which the single-face web is wrapped is disposed upstream of the double facer and the heights of the both axis ends of the wrap roll can be individually controlled, the height of each axis end of the wrap roll is defined as the particular control factor.

Still further alternatively, when the corrugated-board fabrication machine includes a suction brake that applies suction force serving as brake force for the travel of the single-face web and the suction brake is able to control the web-width-direction distribution of the suction force, the web-width-direction distribution of the suction force is included in the particular control factors.

The control means controls the selected particular control factor using the control variable calculated by the control variable calculating means. Specifically, the control means controls each actuator associated with the particular control factor such that the current value of the particular control factor becomes the control variable calculated by the control variable calculating means.

With this configuration, since a particular control factor that affects warp of a corrugated board sheet is automatically controlled in accordance with the twist warp status obtained by the warp status information obtaining means, it is possible to accurately correct twist warp of a corrugated board sheet with ease without depending on the experience of an operator and the know-how. In particular, if the information obtaining means automatically obtains information, twist warp of a corrugated board sheet is fully-automatically corrected.

Preferably, the system comprises control factor selecting means to select at least one of a plurality of particular control factors that affect web-width-direction distribution of travel-direction tension of a single-face web or a top liner on the basis of status of twist warp of a corrugated board sheet and influence of each particular control factor on the twist warp of a corrugated board sheet.

As a preferable feature, the control factor selecting means of the system sequentially selects particular control factors in accordance with largeness of warp of a corrugated board sheet, considering a predetermined priority order. The extent of correction can therefore be larger in accordance with the largeness of warp so that it is possible to rapidly correct warp of the corrugated board sheet. Especially, if a particular control factor that has greater effect on warp gets a higher priority, warp correction can be further rapidly accomplished.

(2)

The second object of the present invention is to provide a system for fabricating a corrugated board sheet that satisfies predetermined quality without depending on the experience of an operator and the know-how.

In order to attain the second object, the system for fabricating a corrugated board sheet of the present invention (hereinafter simply called the system) comprises running-state information obtaining means, production-state information obtaining means, control variable calculating means, quality information detecting means, optimum running condition information retaining means and control means, which are to be described below. A feature of the system is inhibiting width-direction warp of a corrugated board sheet fabricated in a corrugated-board fabrication machine with the above elements.

The running-state information obtaining means obtains information concerning a running state of the corrugated-board fabrication machine. The running-state information concerns a running speed, a wrap amount of a web around each preheater, vapor pressure applied to each preheater, a gap amount of each pasting device, pressure applied by and vapor pressure applied to a double facer, and/or an amount of lubricant when the corrugated-board fabrication machine includes a lubrication unit.

The production-state information obtaining means obtains production state information concerning a production state in the corrugated-board fabrication machine. The production state information represents a base-board composition, a basis weight of the base board, the width of a corrugated board sheet, a flute and the like.

The quality information detecting means detects that a corrugated board sheet fabricated in the corrugated-board fabrication machine satisfies a predetermined quality, and is, for example, in the form of a quality information inputting means for inputting the information about satisfaction of the predetermined quality of the corrugated board sheet as the result of judgment by an operator. Here, quality means the warp status of the corrugated board sheet, for example, so that satisfaction of the predetermined quality means that the corrugated board sheet has no warp.

The control variable calculating means calculates a control variable of each control factor based on the running state information obtained by the running-state information obtaining means and the production-state information obtained by the production-state information obtaining means.

The optimum running-condition information retaining means retains, if the quality information detecting means detects that the corrugated board sheet satisfies the predetermined quality, a portion of the running state information obtained by the running-state information obtaining means which portion is associated with a particular control factor that affects the predetermined quality, so that the portion of the running-state information serves as an optimum running condition of the corrugated-board fabrication machine when the quality information detecting means detects that the corrugated board sheet satisfies the predetermined quality.

For example, if the predetermined quality of a corrugated board sheet represents warp status of the corrugated board sheet, the typical particular control factors are control factors that affect moisture content of a bottom liner or a top liner. The particular control factors are exemplified by control factors that control a heat amount applied to a bottom liner by bottom liner heating means, a glue amount applied to a medium web in a single facer, a heat amount applied to a single-face web by single-face web heating means, a heat amount applied to a top liner by top liner heating means, a glue amount applied to the single-face web at a glue machine, or a heat amount applied to a double-face web in a double facer.

Specifically, concerning about control factors for a heat amount applied to a web (a bottom liner, a single-face web, a top liner) by corresponding heating means (bottom liner heating means, single-face web heating means, and top liner heating means), the particular control factors are exemplified by a wrap amount of each web around a corresponding heating roll, which amount is adjusted by each wrap amount adjusting means, and/or vapor pressure applied to each heating roll. Further, concerning about control of a glue amount applied to a medium web in the single facer, the particular control factors are exemplified by at least one of the gap amounts between rolls used during a procedure to apply glue to a medium web being transferred by a corrugated roll. The gap amount is exemplified by that between the corrugated roll and a pasting roll or that between rolls included in a pasting unit. Concerning about a glue amount applied to a single-face web in the glue machine, the particular control factors are exemplified by a gap amount between a pasting roll disposed along a travel path of the single-face web and the travel path. In relation to a heat amount applied to a double-face web in the double facer, the particular control factors are pressure applied by a press unit to the double-face web toward hotplates arranged along the travel path of the double-face web, a vapor pressure applied to the hotplates, a travel speed of the double-face web on the hotplates.

If the corrugated-board fabrication machine further includes a bottom liner lubrication unit to lubricate a bottom liner before or after gluing a single-face web to a top liner in the double facer, and a top liner lubrication unit to lubricate a top liner before or after the gluing, a lubrication amount to a bottom liner from the bottom liner lubrication unit and a lubrication amount to a top liner from the top liner lubrication unit may be added to the particular control factors. The lubrication manner is exemplified by spraying water onto a web from a shower unit or by applying water onto the web with a water-applying roll.

The control means preferentially controls, if the optimum running-condition information retaining means retains the optimum running-condition information corresponding to a current production state, a particular control factor so as to attain the optimum running condition. It is satisfactory that the control means controls at least one of the particular control factors.

With this configuration, if the current production state is identical to a former production state, particular control factors are automatically controlled so as to be in the optimum running state corresponding to the former production state. The quality of corrugated board sheets is thereby ensured without depending on the experience of an operator and the know-how.

Preferably, the system further comprises warp status information obtaining means and control factor selecting means.

The warp status information obtaining means obtains information concerning warp of a corrugated board sheet fabricated by the corrugated-board fabrication machine.

The warp status information obtaining means includes selection means for receiving the operator's selection for an arbitrary one from a plurality of candidates indicating status of warp. The warp status information obtains the selected candidate as information concerning the warp status of the corrugated board sheet.

Otherwise, the warp status information obtaining means may include imaging means for imaging a corrugated board sheet fabricated by the corrugated-board fabrication machine and detection means for detecting the warp of the corrugated board sheet on the basis of image data obtained by the imaging means so that the warp status information obtaining means obtains the data detected by the detection means as information concerning status of the warp.

Alternatively, the warp status information obtaining means comprises variation amount detecting means for detecting a vertical variation amount of a corrugated board sheet and detection means for detecting warp of the corrugated board sheet on the basis of information of the vertical variation amount obtained by the variation amount detecting means so that the warp status information obtaining means obtains detected by the detection means may be regarded as information concerning status of the warp of the corrugated board sheet.

Further alternatively, the warp status information obtaining means includes moisture content measuring means is for measuring moisture contents of a bottom liner and a top liner or parameters correlating with the moisture contents and detection means for detecting the warp of the corrugated board sheet on the basis of data obtained by the moisture content measuring means, and the warp status information obtaining means regards data obtained by the detection means as the warp status information. One or more temperature sensors or moisture sensors serve as the moisture content measuring means, for example.

The control factor selecting means selects at least one from a plurality of particular control factors affecting moisture content of a bottom liner or a top liner in accordance with warp status of the corrugated board sheet and an influence of each of the plurality of particular control factors on warp of the corrugated board sheet.

In this case, the control variable calculating means calculates a control variable of the selected particular control factor based on the warp status information of the corrugated board sheet and the running state information of the corrugated-board fabrication machine. If any optimum running-condition information retained in the optimum running-condition information retaining means does not correspond to the current production state, the control means controls the selected particular control factor using the controls variable calculated by the control variable calculating means.

As detailed described above, each time a corrugated board sheet fabricated in the system for fabricating a corrugated board sheet of the present invention satisfies the predetermined quality, a portion of the running state of particular control factors, which portion is associated with a particular control factor that affects the predetermined quality, is stored in the optimum running-condition information retaining means so that the portion of the running-state information serves as optimum running-condition information concerning an optimum running condition of the corrugated-board fabrication machine corresponding to the concurrent production state. Since, if the optimum running condition corresponding to the current production state is retained in the optimum running-condition information retaining means, the particular control factor is automatically controlled so as to be in the optimum running condition, it is advantageously possible to fabricate a corrugated board sheet which satisfies the predetermined quality without depending on the experience of an operator and the know-how.

(3)

The third object of the present invention is quantitative detection of travel-direction warp and twist warp of a corrugated board sheet.

In order to attain the above third object, a warp detection apparatus, of the present invention, comprising: variation amount detecting means for detecting an amount of vertical variation of the corrugated board sheet fabricated in a corrugated-board fabrication machine in a direction of travel of the corrugated board sheet; and warp amount calculating means for calculating an amount of warp in the direction of travel on the basis of the amount of vertical variation detected by the variation amount detecting means.

Otherwise, a warp detection apparatus, of the present invention comprising: variation amount detecting means for detecting amounts of vertical variation at the four corners of the corrugated board sheet fabricated in a corrugated-board fabrication machine; and warp amount calculating means for calculating an amount of twist warp of the corrugated board sheet on the basis of the amounts of vertical variation detected by the variation amount detecting means.

Otherwise, in the present invention, a warp detection apparatus, comprising: variation amount detecting means for detecting amounts of vertical variation at the four corners and at the centers of the four sides of the corrugated board sheet fabricated in a corrugated-board fabrication machine; and warp amount calculating means for calculating amounts of warp in a direction across a width, warp in a direction of travel, and twist warp of the corrugated board sheet on the basis of the amounts of vertical variation detected by the variation amount detecting means.

In these warp detection apparatuses, the variation amount detecting means may include imaging means and image analysis means to analyze vertical variation amounts on the basis of image data from the imaging means. In this case, the imaging means has one or more CCD cameras, for example.

Still further, the present invention may be featured by a method for detecting a warp amount of a corrugated board sheet fabricated in a corrugated-board fabrication machine comprising the steps of: detecting amount of vertical variation of the corrugated board sheet in a direction of travel of the corrugated board sheet; and calculating amount of the warp in the direction of travel on the basis of the amount of vertical variation detected in the detecting step.

Still further, the present invention is featured by another method for detecting warp amount of a corrugated board sheet fabricated in a corrugated-board fabrication machine comprising the steps of: detecting amounts of vertical variation at the four corners of the corrugated board sheet; and calculating amount of twist warp of the corrugated board sheet on the basis of the amounts of vertical variation detected in the detecting step.

Still further, the present invention is featured by another method for detecting a warp amount of a corrugated board sheet fabricated in a corrugated-board fabrication machine comprising the steps of: detecting amounts of vertical variation at the four corners and at the centers of the four sides of the corrugated board sheet; and calculating amounts of warp in a direction across a width, warp in a direction of travel, and twist warp of the corrugated board sheet on the basis of the amounts of vertical variation detected in the detecting step.

With this configuration, it is possible for the present invention to quantitatively obtain an amount of each type of warp, particularly travel-direction warp and twist warp, so that, on the basis of the detection result, an accurate status of the warp can effectively be detected.

The above detection of warp status enables warp correction to be automatically executed whereby an operator does not have to visually check the warp status and burden on the operator can be greatly reduced.

(4)

The fourth object of the present invention is to inhibit width-direction S-shape warp of a corrugated board sheet, while concurrently maintaining an optimum tension of the corrugated board sheet.

To attain the above object, the present invention has the following configuration (a) or (b).

(a)

In order to accomplish the above fourth object, a preheater, included in a corrugated-board fabrication machine of the present invention, for heating a web, which is to be made into a corrugated board sheet by gluing the web to a web in a corrugated-board fabrication process, prior to the gluing using heating means including a plurality of heating units arranged in a direction across a width of the first web and being operable to adjust an amount of heat to be applied to the first web by each of the plurality of heating units.

As a preferable feature, the corrugated-board fabrication machine may include moisture content measuring means for measuring moisture content of the first web or a parameter correlating with the moisture content along the width direction of the first sheet and control means for individually controlling the plurality of heating units arranged in the width direction of the first sheet based on the detection result obtained by the moisture content measuring means such that the moisture content of the first web becomes a predetermined value.

Preferably, the heating means, for example, takes the form of a heating roll that heats a web wrapped around the roll. In this case, the heating means further includes wrap amount adjusting means, and, first of all, controls a wrap amount of a web using the wrap amount adjusting means to a heat amount applied to the web across the entire width thereof based on the measurement result obtained by the moisture content measuring means such that the moisture contents of the web become a predetermined value. Then the control means controls the individual heating units arranged along the web width direction so as to adjust a heat amount applied to the web in accordance with the width direction.

With this structure, the preheater of the present invention can control heat amounts of individual heating units arranged along the web width direction so that the heat amount applied to a web can be adjusted in accordance with the web width direction, maintaining the optimum tension of the web. As a result of the adjustment, variation in the moisture content along the width direction of a web can be inhibited whereby width-direction S-shape warp can also be inhibited.

Further, when the moisture content measuring means is arranged as described above and the control means controls a heat amount applied by each individual heating unit on the basis of the measurement result obtained by the moisture content measuring means in such a manner that the moisture content of the web becomes the predetermined value, it is possible to automatically inhibit width-direction S-shape warp.

Also as described above, when the control means, first of all, controls a warp amount of a web together with the warp amount adjusting means in order to adjust a heat amount applied to the web across the entire width of the web such that the moisture content of the web becomes a predetermined value and then controls heat amounts applied by the individual heating units such that a heat amount applied to the web is adjusted in accordance with the width direction, temperature control for the web can be carried out effectively.

(b)

To accomplish the fourth object, the invention's double facer, disposed in a corrugated-board fabrication machine, for fabricating a double-face corrugated board sheet by gluing a single-face web to a top liner while the single-face web and the top liner are sliding on a hotplate, wherein the hot plate includes a plurality of heating chambers arranged in a direction across a width of the single-face web and is operable to adjust an amount of heat to be applied to the single-face web and the top liner by each of the plurality of heating chambers.

Preferably in this case, the double facer further includes moisture content measuring means for measuring a moisture content or a parameter correlating with the moisture content of at least one of the single-face web and the top liner and control means for controlling the heat amount applied to each individual heating chamber arranged along the width direction of the web and the liner on the basis of the measurement result obtained by the moisture content measuring means such that the moisture contents of the single-face web and the top liner become predetermined values.

For example, a press unit is disposed in order to press the single-face web and the top liner toward the hotplate. And, on the basis of the measurement result by the moisture content measuring means, such that the moisture contents of the single-face web and the top liner become the predetermined values, the control means controls, first of all, pressing force of the press unit to adjust a heat amount applied to the entire width of the single-face web and the top liner, and then controls a heat amount applied by each of the heating chambers arranged in the web width direction so that a heat amount applied to the single-face web and the top liner is controlled in accordance with the width direction.

The hotplates may be disposed on the single-face-web side and the top-liner side so as to be interposed by the travel path of the single-face web and the top liner.

With this configuration, control over a heat amount by each of the heating chambers along the web width direction adjusts the heat amount applied in the web-width direction so that variation in moisture content of the single-face web and the top liner can be diminished and with-direction S-shape warp can be advantageously inhibited.

Since the moisture content measuring means is installed and the control means controls heat amounts of individual heating chambers based on the measurement result of the moisture content measurement means such that the moisture contents of a single-face web and a top liner become predetermined values, it is possible to automatically inhibit width-direction S-shape warp.

Further, the press unit is disposed in order to press a single-face web and a top liner toward the hotplate and the control means controls, first of all, press force of the press unit to adjust a heat amount applied to the single-face web and the top liner along the entire width thereof such that the moisture contents of the single-face web and the top liner become the predetermined values, and then controls a heat amount applied by each of the heating chambers arranged in the web width direction so that a heat amount applied to the single-face web and the top liner is adjusted in accordance with the width direction. With this configuration, the temperatures of the single-face web and the top liner can be effectively controlled.

Still further, hotplates disposed on the single-face-web side and the top-liner side can execute sensitive temperature control over a single-face web and a top liner.

(5)

The fifth object of the present invention is to provide a counter for counting the number of corrugated board sheets fabricated, as final products to be shipped, in a corrugated-board fabrication machine.

To attain the fifth object, there is provided a counter for counting the number of corrugated board sheets fabricated in a corrugated-board fabrication machine, comprising: imaging means for imaging edges of the corrugated board sheets stacked in a stack section which edges are along a direction of the width of the corrugated board sheets; and image analysis means for counting the number of corrugated board sheets by analyzing image data obtained by the imaging means and recognizing each of the corrugated board sheets on the basis of a specification for a flute of medium webs of the corrugated board sheets.

With this configuration, the number of corrugated board sheets stacked in the stack section is counted by analyzing image data obtained by the imaging means on the basis of the flute specification for a medium web, it is possible to count the accurate number of corrugated board sheets that are to be shipped as final products.

Further, there is provided a counter for counting the number of corrugated board sheets fabricated in a corrugated-board fabrication machine, comprising: height measuring means for measuring a height of the corrugated board sheets stacked in a stack section; and number calculating means for calculating the number of corrugated board sheets on the basis of the height measured by the height measuring means and a thickness per corrugated board sheet.

With this configuration, the number of corrugated board sheets stacked in the stack section is calculated based on the height of the corrugated board sheets stacked in the stacking section measured by the height measuring means and a thickness per corrugated board sheet, it is possible to accurately count the number of corrugated board sheets that can be shipped as final products.

Still further, there is provided a counter for counting the number of corrugated board sheets fabricated in a corrugated-board fabrication machine, comprising: height measuring means for measuring a height of the corrugated board sheets stacked in a stack section; and number calculating means for counting the number of corrugated board sheets by increasing the number each time the height measured by the height measuring means increases as compared to the previous height measurement.

With such a configuration, the number of corrugated board sheets are counted in increments of one each time the height of corrugated board sheets stacked in the stacking section increases. Even if the specifications of corrugated board sheets are changed, it is advantageously possible to omit an operation of inputting a flute specification and/or a sheet thickness in addition to the foregoing advantages.

Each of the above counters may preferably include sheet number printing means for printing the counted number of corrugated board sheets.

Advantageously, with this sheet number printing means for printing the counted number of corrugated board sheets, production management for corrugated board sheets can be carried out with ease.

BRIEF DESCRIPTION OF THE DRAWINGS

FIG. 5 is a table showing an acquaintance database according to the first embodiment of the present invention;

FIG. 7 is a table showing an acquaintance database according to a second embodiment of the present invention;

FIG. 8 is a table showing an acquaintance database according to a third embodiment of the present invention;

FIG. 9 is a table showing an acquaintance database according to a fourth embodiment of the present invention;

FIG. 10 is a table showing an acquaintance database according to a fifth embodiment of the present invention;

FIG. 20 is a table showing an acquaintance database according to a tenth embodiment of the present invention;

FIG. 23 is a table showing an acquaintance database according to the tenth embodiment;

FIG. 34 is a table showing an acquaintance database according to the thirteenth embodiment;

FIG. 37 is a table showing an acquaintance database according to the fourteenth embodiment;

FIG. 38 is a table showing an acquaintance database according to a fifteenth embodiment of the present invention;

FIG. 40 is a table showing an acquaintance database according to a sixteenth embodiment of the present invention;

FIG. 48 is a table showing an acquaintance database of the nineteenth embodiment;

FIG. 49 is a table illustrating a configuration of a warp status judgment section of the nineteenth embodiment;

FIG. 51 is a table showing an acquaintance database according to a twentieth embodiment;

FIG. 52 is a table showing an acquaintance database according to a twenty-first embodiment;

FIG. 53 is a table showing an acquaintance database according to a twenty-second embodiment;

FIG. 54 is a table showing an acquaintance database according to a twenty-third embodiment;

FIG. 56 is a table showing a configuration of a warp status judgment section according to the twenty-fourth embodiment;

FIG. 61 is a table showing an acquaintance database according to the twenty-seventh embodiment;

FIG. 65 is a table showing a configuration of a warp status judgment section of the twenty-ninth embodiment;

BEST MODE FOR CARRYING OUT THE INVENTION

(A)

Hereinafter is a description of a system for correcting a possible warp of a corrugated board sheet according to first through eighth embodiments and modifications thereof with reference to FIGS. 1 through 16.

(A-1) First Embodiment

Figure 1:
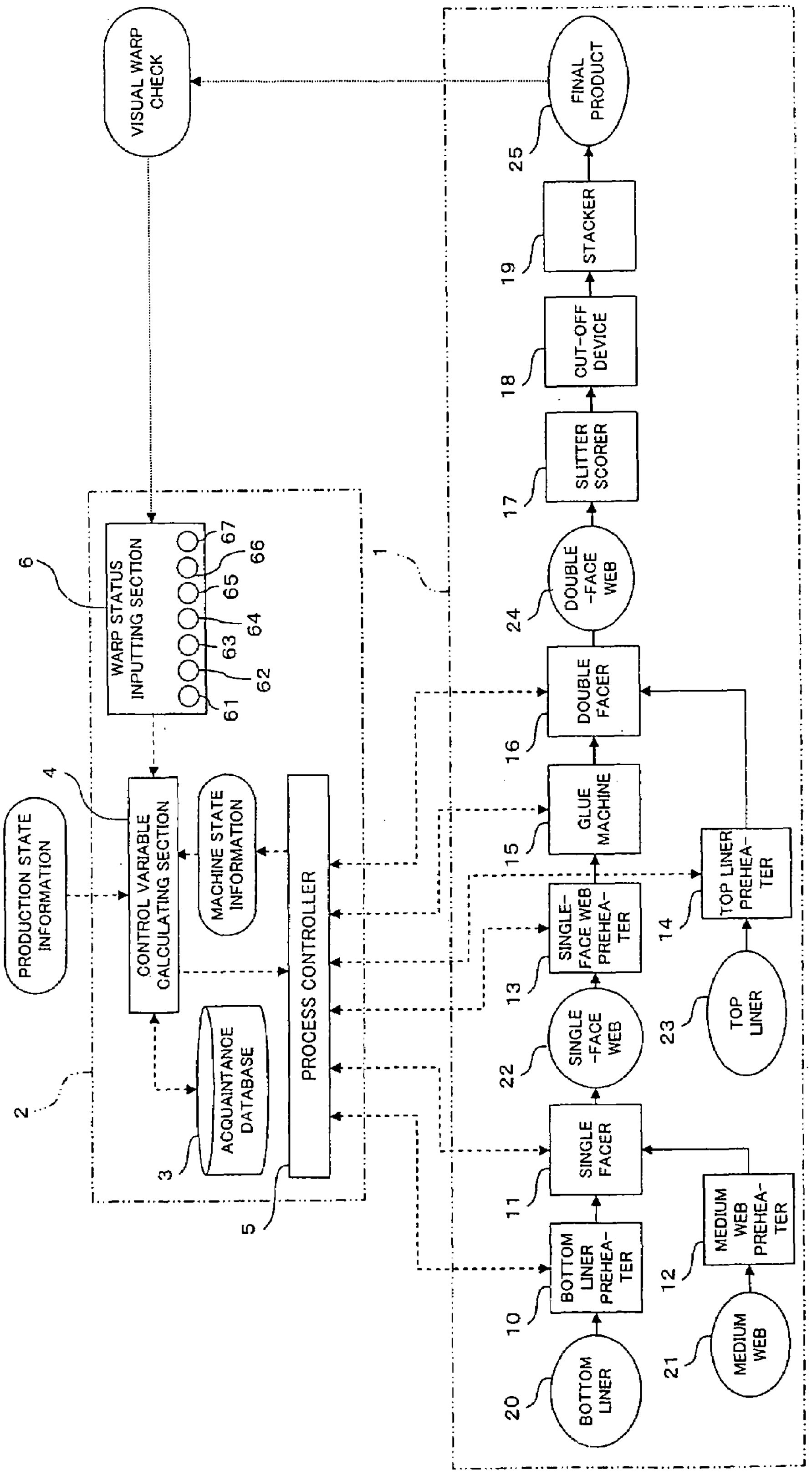
FIG. 1 is a block diagram schematically showing a system for correcting possible warp of a corrugated board sheet according to a first embodiment of the present invention.

FIG. 1 schematically shows a system for correcting possible warp according to a first embodiment of the present invention. The system for correcting possible warp of the first embodiment includes a corrugated-board fabrication machine 1 and a production management machine 2 to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by a medium web preheater 12 and then glue the medium web 21 to a bottom liner 20 heated by the bottom liner preheater 10, a single-face web preheater 13 to heat a single-face web 22 formed by the single facer 11, a top liner preheater 14 to heat a top liner 23, a glue machine 15 to paste the single-face web 22 heated by the single-face web preheater 13, a double facer 16 to fabricate a corrugated board 24 by gluing the single-face web 22 pasted by the glue machine 15 and the top liner 23 heated by the top liner preheater 14, a slitter scorer 17 to slit and score the corrugated board 24 fabricated by the double facer 16, a cut-off device 18 to make a final product (a corrugated board sheet) 25 by dividing a corrugated board 24 scored by the slitter scorer 17 into separated forms, and a stacker 19 to sequentially stack corrugated board sheets in order of fabrication.

Figure 2:
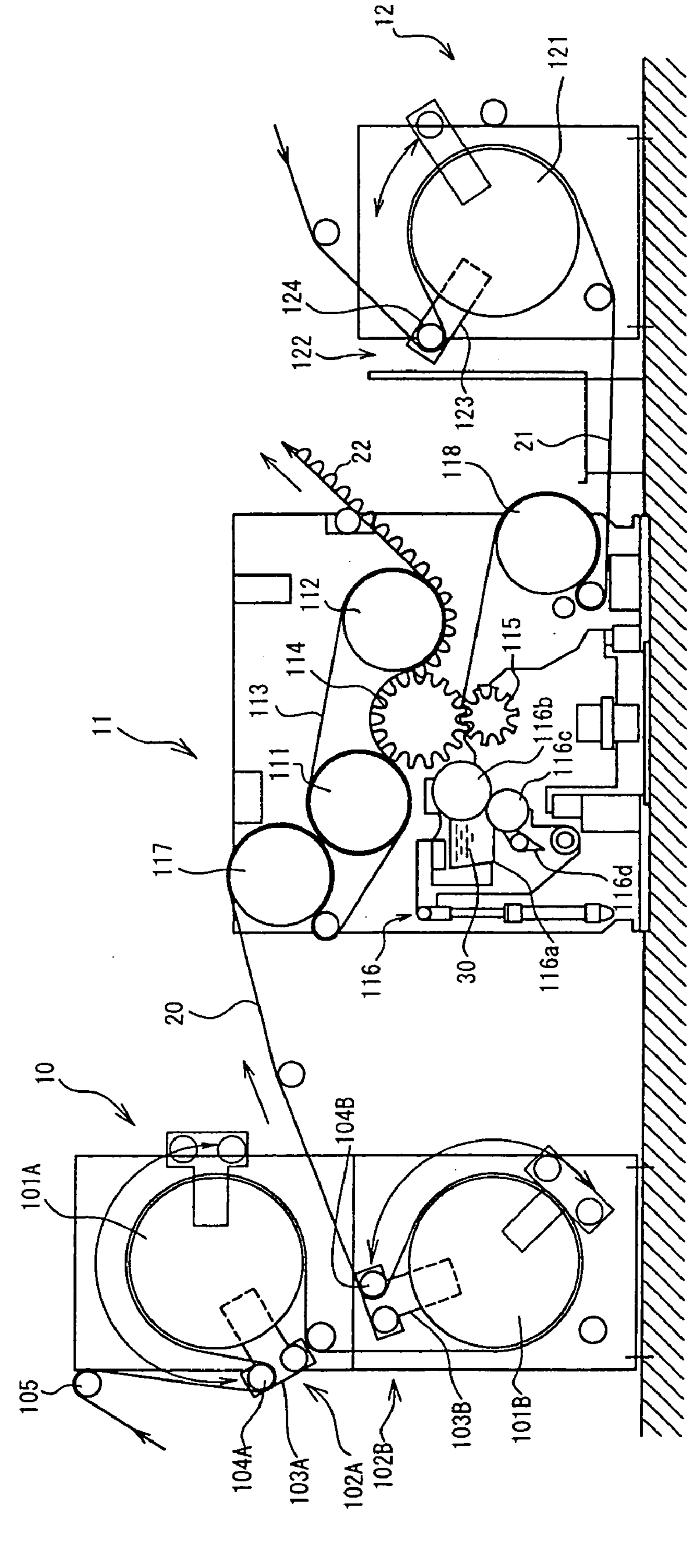
FIG. 2 is a diagram schematically showing a configuration of a bottom liner preheater, a single facer and a medium web preheater of a corrugated-board fabrication machine.
Figure 3:
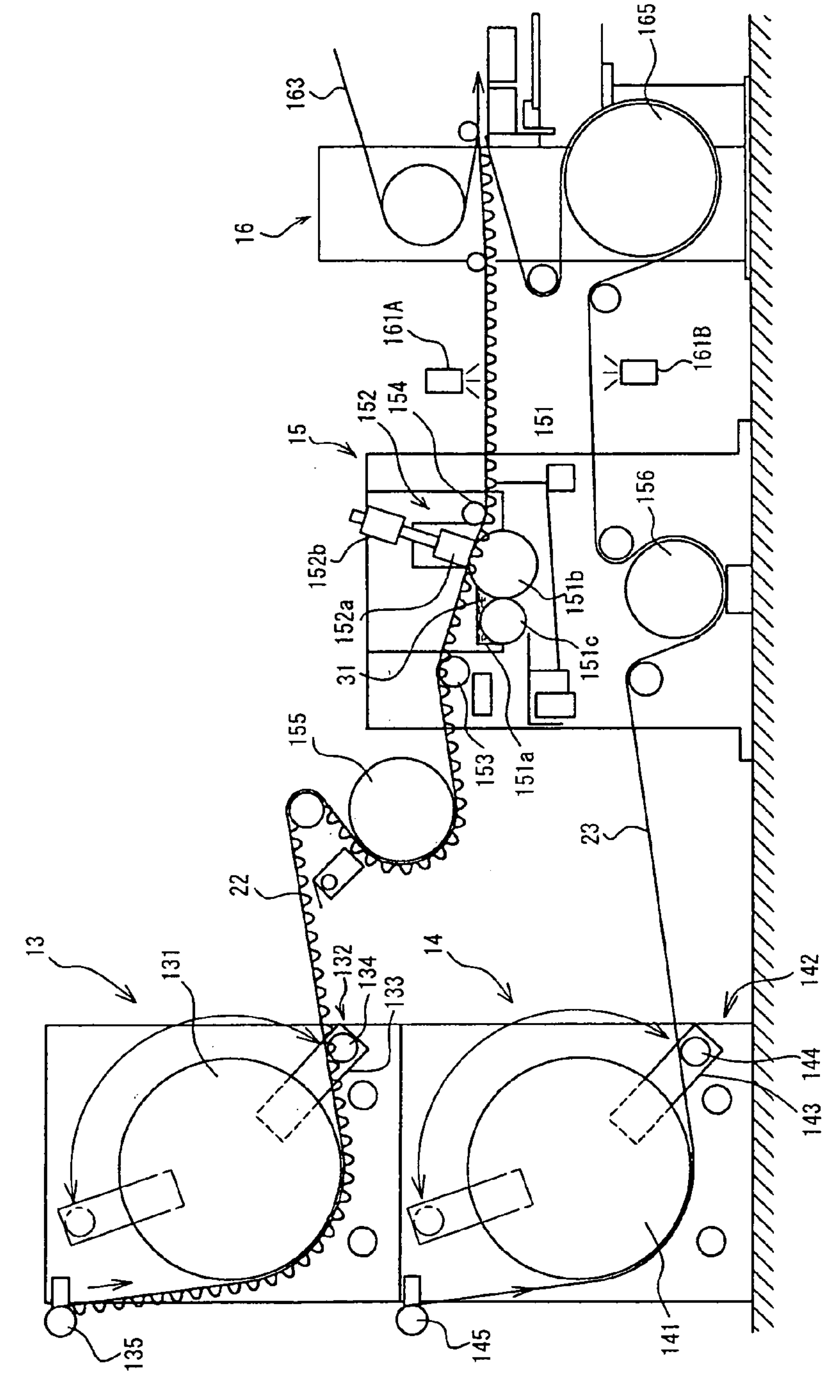
FIG. 3 is a diagram schematically showing a configuration of a single-face web preheater, a top liner preheater, a glue machine, and a part of a double facer of the corrugated-board fabrication machine.

Among elements 10 to 19, an element that affects moisture content of a bottom liner 20 and an element that affects moisture content of a top liner 23 are elements associated with (affect) warp of a corrugated board 25 in the width direction (cross-machine direction) of a corrugated board sheet 25. Here, the bottom liner preheater 10, the single-face web preheater 13, the top liner preheater 14, the single facer 11, the glue machine 15 and the double facer 16 correspond to such elements. Hereinafter, these elements 10, 11, 13-16 will be described with reference to FIGS. 2-4. FIG. 2 schematically shows a configuration of the bottom liner preheater 10, the single facer 11, and the medium web preheater 12; FIG. 3, the single-face web preheater 13, the top liner preheater 14, a configuration of the glue machine 15 and a part of the double facer 16; and FIG. 4, a configuration of the double facer 16.

As shown in FIG. 2, the bottom liner preheater 10 includes bottom liner heating rolls 101A and 101B vertically arranged. Supplying the inside of the bottom liner heating rolls 101A and 101B with vapor heats the bottom liner heating rolls 101A and 101B to predetermined temperatures. A bottom liner 20 sequentially guided by guide rolls 105A, 104A, 106 and 104B is wrapped around the curved surfaces of the bottom liner heating rolls 101A and 101B. Therefore the bottom liner 20 is preheated.

Among these guide rolls 105, 104A, 106 and 104B, the guide roll 104A, which is arranged adjacent to the bottom liner heating roll 101A, is supported by the tip of an arm 103A swingably mounted on the axis of the bottom liner heating roll 101A; and the guide roll 104B, which is arranged adjacent to the other bottom liner heating roll 101B, is supported by the tip of an arm 103B swingably mounted on the axis of the bottom liner heating roll 101B. The arms 103A and 103B are respectively moved to an arbitrary position within the angle ranges indicated by the arrows in the accompanying drawing by non-illustrated motors. Here, a set of the guide roll 104A, the arm 103A and the non-illustrated motor and a set of the guide roll 104B, the arm 103B and the non-illustrated motor function as wrap-amount adjusting units 102A and 102B, respectively.

With this configuration, the bottom liner preheater 10 can adjust moisture content of bottom liner 20, using vapor pressure supplied to the bottom liner heating rolls 101A and 101B, and wrap amounts (wrap angles) of the bottom liner 20 around bottom liner heating rolls 101A and 101B by the wrap-amount adjusting units 102A and 102B. Specifically, higher vapor pressure and/or the larger wrapped amount increases heat applied to a bottom liner 20 from the bottom liner heating rolls 101A and 101B so that the bottom liner 20 gets drier and thereby the moisture content thereof declines.

The single facer 11 includes a press belt 113 wrapped around a belt roll 111 and a tension roll 112, an upper roll 114 having a wave-form surface that contacts with the press belt 113 in a state of forcing the press belt 113, and a lower roll 115 also having a wave-form surface that engages with the upper roll 114. A bottom liner 20 heated by the bottom liner preheater 10 is wrapped around a liner preheating roll 117 to be preheated and then guided, together with the press belt 113, to a nip between the press roll 113 and the upper roll 114 by the belt roll 111. Meanwhile, a medium web 21 heated by the medium web preheater 12 is wrapped around a medium web preheating roll 118 to be preheated, then corrugated at the engaging point of the upper roll 114 and the lower roll 115, and guided to the nip between the press belt 113 and the upper belt 114 by the upper roll 114.

A pasting unit 116 is disposed close to the upper roll 114. The pasting unit 116 is formed by a glue dam 116*a* to store glue 30, a pasting roll 116*b* to apply the glue to a medium web 21 transferred by the upper belt 114, a meter roll 116*c* to adjust a glue amount applied to the curved surface of the pasting roll 116*b*, and a glue sweeping blade 116*d* to sweep glue from the meter roll 116*c*. Each flute tip of a medium web 21 corrugated at the engaging point of the upper roll 114 and the lower roll 115 is pasted by pasting roll 116*b* and the medium web 21 is glued to the bottom liner 20 at the nip between the press belt 113 and the upper roll 114 whereby a single-face web 22 is fabricated.

With this configuration, the single facer 11 can adjust a moisture content of a bottom liner 20 by adjusting a gap amount between the pasting roll 116*b* and the upper roll 114 and a gap amount between the pasting roll 116*b* and the meter roll 116*c*. Concretely, a larger gap amount increases an amount of glue applied to a contact point of medium web 21 with bottom liner 20 so that water contained in the glue includes a moisture content of the bottom liner 20. The above gap amounts can be adjusted by a move of the pasting roll 116*b* and/or the meter roll 116*c*.

The medium web preheater 12 is identical in configuration to the bottom liner preheater 11, and includes a medium web heating roll 121 that is heated to a predetermined temperature by vapor being supplied to the inside thereof, and a wrap amount adjusting unit 122 to adjust a wrap amount (wrap angle) of a medium web 21 around the medium web heating roll 121. The wrap amount adjusting unit 122 includes a guide roll 124 around which medium web 21 is to be wrapped, an arm 123 swingably mounted on the axis of the medium web heating roll 121 to support the guide roll 124, and a non-illustrated motor to rotate the arm 123.

As shown in FIG. 3, the single-face web preheater 13 and the top liner preheater 14 are vertically arranged and are identical in configuration to the above-described bottom liner preheater 11.

The single-face web preheater 13 includes a single-face web heating roll 131 and a wrap amount adjusting unit 132. Supplying the inside of the single-face web heating roll 131 heats with vapor the single-face web heating roll 131 to a predetermined temperature. A bottom liner 20 serving one side of a single-face web 22 guided by guide rolls 135 and 134 is wrapped around the curved surface of the single-face web heating roll 131 and is preheated by the single-face web heating roll 131.

The wrap amount adjusting unit 132 is formed by the guide roll 134, an arm 133 swingably mounted on the axis of the single-face web heating roll 131 to support the guide roll 134, and a non-illustrated motor to rotate the arm 133. The guide roll 134 is moved to an arbitrary position within the angle range indicated by the arrows in the accompanying drawing under control of the motor so that a wrap amount (a wrap angle) of a single-face web 22 around the single-face web heating roll 131 can be adjusted.

With such a configuration, the single-face web preheater 13 can adjust moisture content of the bottom liner 20 by adjusting pressure of vapor supplied to the single-face web heating roll 131 and a wrap amount (a wrap angle) of the single-face web 22 around the single-face web heating roll 131. Specifically, higher vapor pressure or a larger wrap amount increases heat amount applied to the bottom liner 20 from the single-face web heating roll 131 so that the bottom liner 20 gets drier and the moisture content thereof declines.

The top liner preheater 14 includes a top liner heating roll 141 and a wrap amount adjusting unit 142. Supplying inside of the top liner heating roll 141 with vapor heats top liner heating roll 141 to a predetermined temperature. A top liner 23 guided by guide rolls 145 and 144 is wrapped around the curved surface of the top liner heating roll 141, and is preheated by the top liner heating roll 141.

The wrap amount adjusting unit 142 is formed by the guide roll 144, an arm 143 swingably mounted on the axis of the top liner heating roll 141 in order to support the guide roll 144, and a non-illustrated motor to rotate the arm 143. The guide roll 144 is moved to an arbitrary position within the angle range indicated by the arrows in the accompanying drawing under control of the motor so that a wrap amount (a wrap angle) of a top liner 23 around the top liner heating roll 141 can be adjusted.

With such a configuration, the top liner preheater 14 can adjust a moisture content of the top liner 23 by adjusting pressure of vapor supplied to the top liner heating roll 141 and wrap amount (a wrap angle) of the top liner 23 around the top liner heating roll 141. Specifically, higher vapor pressure or a larger wrap amount increases a heat amount applied to the top liner 23 from the top liner heating roll 141 so that the top liner 23 gets drier and the moisture content thereof declines.

The glue machine 15 includes a pasting unit 151 and a pressure bar unit 152. A single-face web 22 that has been heated by the single-face web preheater 13 is preheated by a single-web preheating roll 155 and then is guided into the inside of the glue machine 15 by guide rolls 153 and 154. The pasting unit 151 is disposed on the lower side (the medium-web-21 side) of the travel path of a single-face web 22 between the guide rolls 153 and 154 while the pressure bar unit 152 is disposed on the upper side (the bottom-liner-20 side) of the travel path.

The pasting unit 151 includes a glue dam 151*a* to store glue 31, a pasting roll 151*b* disposed adjacent to the travel path of the single-face web 22, and a doctor roll 151*c* being in contact with the pasting roll 151*b* and rotating in the opposite direction to the pasting roll 151*b*. The pressure bar unit 152 is formed by a pressure bar 152*a* arranged opposite to the pasting roll 151*b* in relation to the single-face web 22, and an actuator 152*b* to press the pressure bar 152*a* against the pasting roll 151*b*. The single-face web 22 is pressed against the pasting roll 151*b* by the pressure bar 152*a*, and the tip of each flute of the medium web 21 is pasted by the pasting roll 151*b* when the single-face web 22 passes through the space between the pressure bar 152*a* and the pasting roll 151*b*. The single-face web 22, whose medium web 21 is pasted, is to be glued to a top liner 23 in the ensuing process performed in the double facer 16.

With such a configuration of the glue machine 15, a moisture content of top liner 23 can be adjusted by a gap amount between the pasting roll 151*b* and the pressure bar 152*a* (i.e., a gap amount of the pasting roll 151*b* in relation to the travel path of the single-face web 22). Specifically, a larger gap amount increases an amount of glue applied to each combining point of a medium web 21 with a top liner 23, so that moisture contained in the top liner 23 increases, thereby increasing moisture content of the top liner 23. The actuator 152*b* can adjust the above gap amount by adjusting the position of the pressure bar 152*a*.

The single-face web 22 pasted in the glue machine 15 is transferred to the double facer 16 in which the ensuing step is to be performed. The top liner 23 heated in the top liner preheater 14 is also transferred to the double facer 16 through inside of the glue machine 15. During the transfer, the top liner 23 is guided and preheated by a liner preheating roll 156, which is arranged in the glue machine 15.

At the entrance of the double facer 16, a first shower unit (a bottom liner lubrication unit) 161A is disposed on the bottom-liner-20 side alongside a travel path of the single-face web 22; and a second shower unit (a top line lubrication unit) 161B is disposed alongside a travel path of a top liner 23. These shower units 161A and 161B are respectively used to adjust moisture contents of a bottom liner 20 and a top liner 23, respectively; the shower unit 161A sprays water over a bottom liner 20 and the shower unit 161B sprays water over a top liner 23. The moisture content of the bottom liner 20 increases in accordance with an amount of water sprayed from the shower unit 161A, and the moisture content of the top liner 23 increases in accordance with an amount of water sprayed from the shower unit 161B. These shower units 161A and 161B are controlled independently of each other.

Figure 4:
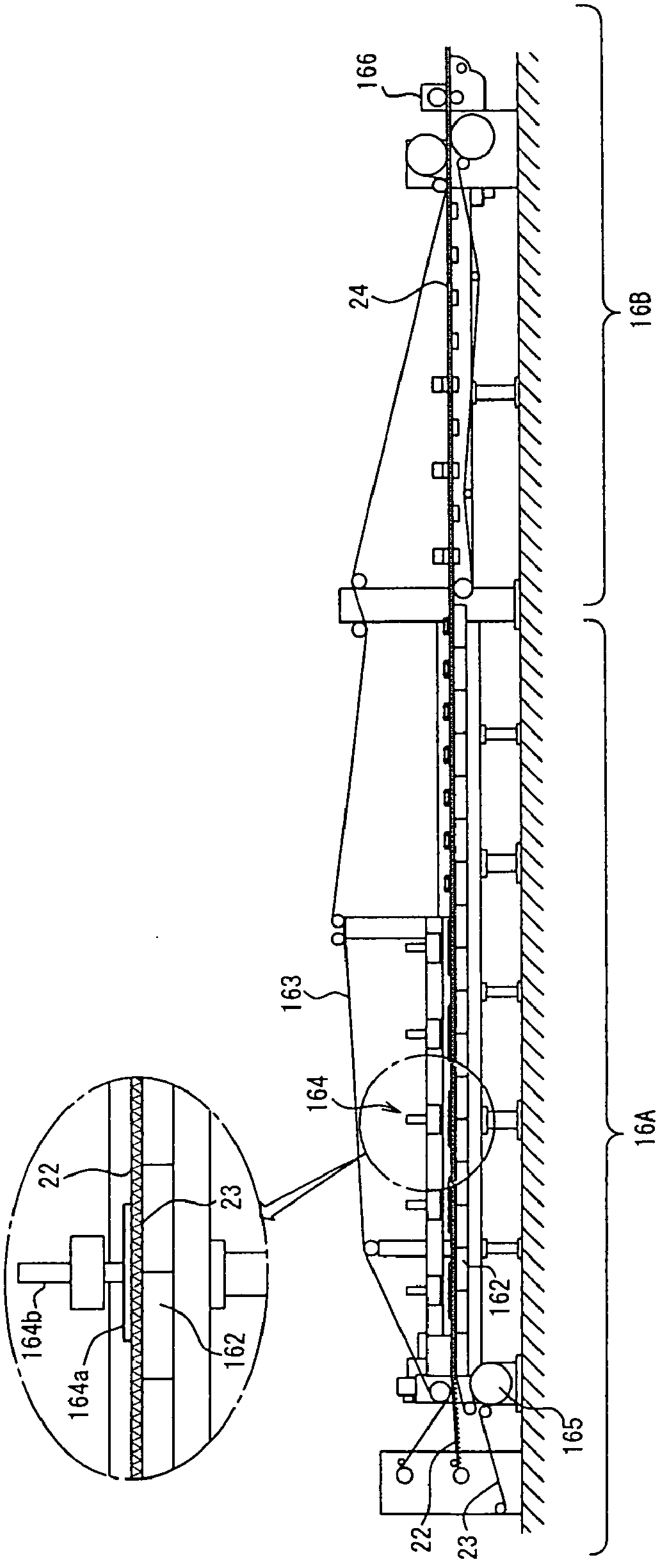
FIG. 4 is a diagram schematically showing a configuration of the double facer of the corrugated-board fabrication machine.

The double facer 16 is, as shown in FIG. 4, divided into an upstream heating section 16A and a downstream cooling section 16B which sections lie along the travel path of bottom liner 20 and top liner 23. In the heating section 16A, a plurality of hotplates 162 are arranged and top liner 23 passes along upper faces of hotplates 162. Vapor supplied to the inside of each hot plate 162 heats the hotplate 162 to a predetermined temperature.

On the hotplates 162, a loop-shape press belt 163 interposed by the travel path runs in synchronization with a single-face web 22 and a top liner 23. A plurality of pressure units 164 are disposed in the loop formed by the press belt 163 so as to be opposite to the hotplates 162. Each of the pressure units 164 is formed by a pressure bar 164*a* in contact with the back of the press belt 163 and an actuator 164*b* to press the pressure bar 164*a* against the hotplate 162.

A single-face web 22 pasted in the glue machine 15 is introduced into a space between the press belt 163 and the hotplates 162 so as to be in contact with the press belt 163 while a top liner 23 heated by the top liner preheater 14 is further preheated by the liner entrance preheating roll 165 and then introduced into the space between the press belt 163 and the hotplates so as to be in contact with the hotplates 162. After being introduced into the space between the press belt 163 and the hotplates 162, the single-face web 22 and the top liner 23 pile up to form one body and are transferred to the cooling section 16B. While the single-face web 22 and the top liner 23 are transferred, the single-face web 22 and the top liner 23 are pressed by the pressure unit 164 with the press belt 163 interposed and are heated from the top-liner-23 side whereupon the single-face web 22 and the top liner 23 are glued together to form a double-face web 24. The overall width or the edge of the double-face web 24 is cut by a rotary shear 166 installed at the exit of the cooling section 16B and then the double-face web 24 is transferred to the slitter scorer 17 at which the ensuing step is to be performed.

With this configuration of the double facer 16, a moisture content of a top liner 23 can be adjusted by vapor pressure supplied to the hotplates 162 and pressures applied by pressure units 164. Specifically, higher vapor pressures or higher pressures increase heat amount transferred to the top liner 23 from the hotplates 162, so that the top liner 23 gets drier and has a low moisture content. A passing rate of a single-face web 22 and a top liner 23 in the double facer also adjusts moisture content of the top liner 23. A lower rate makes the top liner 23 drier and thereby lowers the moisture content thereof because the top liner 23 is in contact with the hotplates 162 for a longer time.

The production management machine 2 corrects width-direction warp of a corrugated board sheet 25 by appropriately controlling these elements 10, 11, and 13-16. Focusing on a function for correcting warp of corrugated-board-25, the production management machine 2, as shown in FIG. 1, comprises the acquaintance database 3, the control variable calculating section 4, the process controller 5 and the warp status inputting section 6.

The acquaintance database 3 retains setting values of control variables (adjustment variations from the current values) associated with one or more particular control factors that affect the possible warp of a corrugated board sheet 25 which particular control factors are among control factors used to control the corrugated-board fabrication machine 1, or formulae used to determine the control variables that correlate with warp status (warp direction, warp extent) of the corrugated board sheet 25. Here, the particular control factors are control factors that affect moisture contents of bottom liner 20 or top liner 23, and more particularly are wrap amounts of the bottom liner 20 around the above-described bottom liner heating rolls 101A and 101B and a wrap amount of the top liner 23 around the top liner heating roll 141.

For example, when a corrugated board sheet 25 has upward warp in the width direction (has the convex surface toward a top liner 23), a setting value or a formula of each control variable is defined in order to increase a moisture content of the top liner 23 and/or decrease a moisture content of the bottom liner 20. Conversely, when a corrugated board sheet 25 has downward warp in the width direction (has a convex surface toward the bottom liner 20), a setting value or a formula of each control variable is defined in order to increase moisture content of the bottom liner 20 and/or decrease moisture content of the top liner 23.

A setting value or a formula of each control variable is defined in accordance with a predetermined priority order, which is a priority order for outputs. For example, when the extent of warp is small, only control variables with higher priorities are output; and when the extent of warp is increasing, other control variables are additionally output in accordance with the priority order. A control factor that has greater effect on warp, i.e., a control factor that contributes more to warp correction, gets a higher priority.

The table in FIG. 5 shows the configuration of the acquaintance database 3 according to the first embodiment. In the illustrated example, six warp status types of large upward warp, medium upward warp, small upward warp, large downward warp, medium downward warp and small downward warp are set corresponding to the number of push buttons that is to be described later. For each of the warp state types, control variables that are to be output are defined in accordance with a priority order. In the first embodiment, control factors (particular control factors) that are set are a wrap amount around the single-face web preheater (a wrap amount of a single-face web 22 around the single-web heating roll 131), a wrap amount around a top liner preheater (a wrap amount of a top liner 23 around the top liner heating roll 141) and a wrap amount around a bottom liner preheater (a wrap amount of a bottom liner 20 around the bottom liner heating roll 101); the wrap amounts around the single-face web preheater and around the top liner preheater are given the first priority in the priority order and the wrap amount around the bottom liner preheater is given the third priority.

In FIG. 5, a control factor with a circle (○) or a double circle (◎) is an output when a corrugated board sheet is in a corresponding warp status. A circle and a double circle represent amounts of control variable (variations from current values) and a double circle represents a larger control variable than a circle of the same control factor. Accordingly, in this embodiment, if a corrugated board sheet 25 has small upward warp for example, only the wrap amounts around the single-face web preheater and around the top liner preheater are adjusted; if corrugated board sheet 25 has medium upward warp, only the amounts around the single-face web preheater and around the top liner preheater are similarly adjusted and the amounts of the adjustment variables thereof are increased; and if a corrugated board sheet 25 has large upward warp, a wrap amount around the bottom liner preheater is additionally adjusted. Specific setting values and formulae to derive the setting values are of individual control factors defined by experiments and simulations.

In this embodiment, a warp status of a corrugated board sheet 25 is manually input to the warp status inputting section (warp status information obtaining means) 6 by an operator. The warp status inputting section 6 includes six push buttons 61 (large upward warp), 62 (medium upward warp), 63 (small upward warp), 65 (large downward warp), 66 (medium downward warp) and 67 (small downward warp), each of which associates with a warp status classified in the acquaintance database 3, and a reset button 64. An operator depressing a corresponding button inputs a selection signal to the control variable calculating section 4. Warp status of a corrugated board sheet 25 is determined by an operator as a result of visual observation of the corrugated board sheet 25 stacked in the stacker 19.

The control variable calculating section 4 retrieves and reads a setting variable or a formula to deriver the variable of each corresponding control factor from the acquaintance database 3 on the basis of the selection signal received from the warp status inputting section 6, and calculates each control variable associated with a machine state (a running state) of the corrugated-board fabrication machine 1. In the illustrated embodiment, the control variable calculating section 4 and the acquaintance database 3 serve as the control factor selecting means and the control variable calculating means according to the present invention.

A machine state represents the current values of a running speed of the corrugated-board fabrication machine 1 (a travel rate of a web), a wrap amount of a web around each of the heating rolls 101A, 101B, 131 and 141, a vapor pressure applied to each of the heating rolls 101A, 101B, 131 and 141, gap amounts between the rolls 116*b* and 114 and between the rolls 116*b* and 116*c* in the single facer 11, a gap amount between the pasting roll 151*b* and the pressure bar 152*a* in the glue machine 15, pressure applied by the pressure units 164 and vapor pressure applied to the hotplates 162 in the double facer 16, and spray amounts of the shower units 161A and 161B. These values of the machine state are input from the process controller 5, which is to be described later.

When the reset button 64 is selected in the warp status inputting section 6, the control variable calculating section 4 instructs the process controller 5 to return all the control factors to their original values (values determined by matrix control based on production state information such as base-board composition, basis weight of the base board, the width of corrugated board sheet, flute and the like).

The process controller 5 has overall control of each of the elements 10-19 that constitute the corrugated-board fabrication machine 1. The process controller 5 usually controls each of the elements 10-19 by performing matrix control based on production state information. However, when one from the push buttons 61-63 and 65-67 is depressed in the warp status inputting section 6, the process controller 5 controls each of control factors (here, one or an arbitrary combination of a wrap amount around the single-web preheater 13, a wrap amount around the top liner preheater 14, and a wrap amount around the bottom liner preheater 10) using one or more control variables calculated in the control variable calculating section 4. When the reset button 64 is depressed, the process controller 5 controls elements 10, 13, and 14 to return all the control factors to their original values. The process controller 5 always grasps a current machine state of the corrugated-board fabrication machine 1, and outputs the current machine state to the control variable calculating section 4 periodically or in response to a request from the control variable calculating section 4. Namely, the process controller 5 serves as the control means and the running-state information obtaining means according to the present invention.

Figure 6:
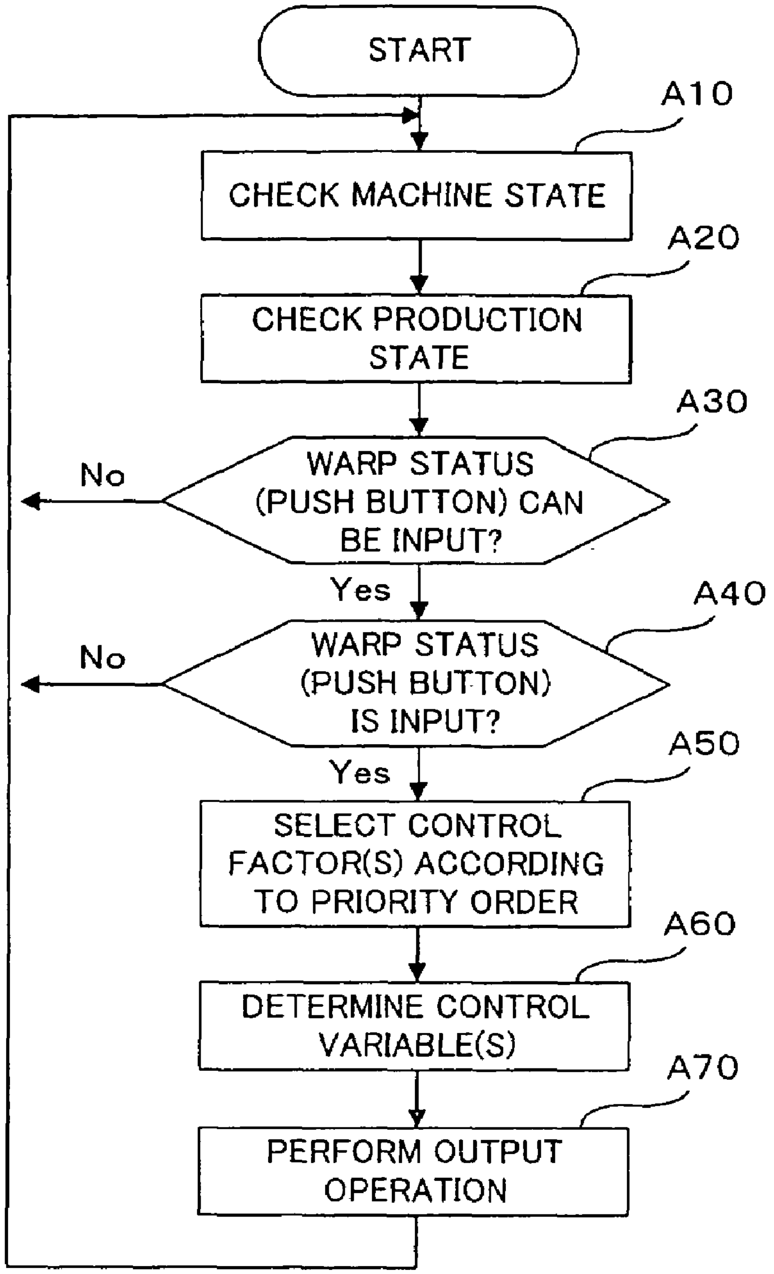
FIG. 6 is a flow diagram illustrating a succession of procedural steps of correcting warp according to the first embodiment of the present invention.

The flow diagram in FIG. 6 describes a succession of procedural steps of correcting warp of a corrugated board sheet 25 using the above-described functions of the production management machine 2.

First of all, the production management machine 2 checks a machine state at step A10 and checks a production state at step A20. In the ensuing step A30, the production management machine 2 judges whether or not a warp status can be currently input (one from the push button 61-67 can be depressed). The judgment is made so as not to correct warp while another problem arises because warp correction is useless when such a problem, e.g., a low rate of web travel due to an excessively strong adhesive of glue, arises.

If a warp status can be input at step A30, the production management machine 2 judges whether or not a warp status has been actually input at step A40. If a warp status has been input, the production management machine 2 selects one or more control factors (here, one or a combination of a wrap amount around the single-face web preheater, a wrap amount around the top liner preheater, and a wrap amount of the bottom liner preheater) in accordance with a priority order of the input warp status, i.e., the selected one of the push buttons 61-63 and 65-67.

In succession at step A60, the production management machine 2 refers to the acquaintance database 3 and calculates one or more control variables associated with the machine state obtained in step A10. At this time, production management machine 2 may use the production state information obtained at step A20 as reference data, for example, in order to change wrap amounts considering base paper composition (thick paper, thin paper). The production management machine 2 outputs the calculated control variables to corresponding elements (here, one or a combination of the single-face web preheater 13, the top liner preheater 14, and the bottom liner preheater 10) at step A70.

According to the system for correcting possible warp of a corrugated board sheet of the first embodiment, by an operator visually judging a warp status of a corrugated board sheet 25 fabricated in the corrugated-board fabrication machine 1 and simply depressing one of buttons 61-63 and 65-67 in accordance with the judged warp status, a wrap amount around the single-face web preheater, a wrap amount around the top liner preheater and a wrap amount around the bottom liner preheater, which amounts affect warp of a corrugated board sheet 25, are automatically adjusted by the production management machine 2. Thereby, it is possible to accurately correct warp of corrugated board sheets with ease without depending on the experience of an operator and the know-how.

At that time, since the production management machine 2 successively adds selected control factors in accordance with the predetermined priority order, considering extent of warp of a corrugated board sheet 25, the extent of adjustment for warp correction can be larger in accordance with the warp extent so that warp correction of corrugated board sheet 25 can be accomplished rapidly. In particular in this embodiment, it is possible to correct warp of a corrugated board sheet 25 yet faster by providing a control factor that more largely affects the warp with a higher priority.

In the first embodiment, the control factors to correct warp of a corrugated board sheet 25 are a wrap amount around the single-face web preheater, a wrap amount around the top liner preheater and a wrap amount around the bottom liner preheater. These control factors are only one example and a greater number of control factors to be controlled may be used likewise in the following second through fifth embodiments.

(A-2) Second Embodiment

FIG. 7 shows the configuration of the acquaintance database 3 according to the second embodiment of the present invention. The elements except the acquaintance database 3 are identical to those of the first embodiment, so repetitious description will be omitted here.

In this embodiment, the single facer 11 and the glue machine 15 are also controlled in order to correct warp. An adhesive-gap amount of the single facer (a gap amount between the pasting roll 116*b* and the upper roll 114 (or a gap amount between the pasting roll 116*b* and the meter roll 116*c*)) and an adhesive-gap amount of the glue machine (a gap amount between the pasting roll 151*b* and the pressure bar 152*a*) are set as particular control factors in addition to control factors of the first embodiment. In the same manner as the first embodiment, the wrap amounts around the single-face web preheater and around the top liner preheater are given the first priority in the priority order and the wrap amount around the bottom liner preheater is given the third priority. Meanwhile the adhesive-gap amount of the single facer and the adhesive-gap amount of the glue machine are given the fourth and the fifth priorities, respectively.

Since the system for correcting a possible warp of a corrugated board sheet according to this embodiment has a larger number of control factors than the first embodiment, it is possible to perform more sensitive control than the first embodiment so that warp of a corrugated board sheet 25 can be corrected more accurately.

(A-3) Third Embodiment

FIG. 8 shows the configuration of the acquaintance database 3 according to a third embodiment of the present invention. The elements in this embodiment except the acquaintance database 3 are also identical to those of the first embodiment, so repetitious description will be omitted here.

In this embodiment, the double facer 16 is also controlled in order to correct warp. A pressure applied by the double facer (pressure applied by the pressure units 164) and a rate of the double facer (a travel rate of a single-face web 22 and the top liner 23 in the double facer 16) are set as particular control factors in addition to control factors of the second embodiment. In the same manner as the second embodiment, the wrap amounts around the single-face web preheater and around the top liner preheater are given the first priority in the priority order; the wrap amount around the bottom liner preheater is given the third priority; the adhesive-gap amount of the single facer is given the fourth priority; and the adhesive-gap amount of the glue machine is given the fifth priority while the pressure of the double facer and the rate of the double facer are given the sixth and the seventh priorities, respectively.

Since the system for correcting a possible warp of a corrugated board sheet according to this embodiment has a larger number of control factors than the second embodiment, it is possible to perform more sensitive control than the second embodiment so that warp of a corrugated board sheet 25 can be corrected more accurately.

(A-4) Fourth Embodiment

FIG. 9 shows the configuration of the acquaintance database 3 according to a fourth embodiment of the present invention. Also in this embodiment, the elements except the acquaintance database 3 are identical to those of the first embodiment, so repetitious description will be omitted here.

In this embodiment, a vapor pressure in the double facer (a pressure of vapor applied to the hotplates 162) is added as a particular control factor to the control factors of the third embodiment. In the same manner as the second embodiment, the wrap amounts around the single-face web preheater and around the top liner preheater are given the first priority in the priority order; the wrap amount around the bottom liner preheater is given the third priority; the adhesive-gap amount of the single facer is given the fourth priority; and the adhesive-gap amount of the glue machine is given the fifth priority; and the pressure of the double facer is given the sixth priority. Meanwhile the vapor pressure in double facer and the rate of the double facer are given the seventh and the eighth priorities, respectively.

Since the system for correcting a possible warp of a corrugated board sheet according to this embodiment has a larger number of control factors than the third embodiment, it is possible to perform more sensitive control than the third embodiment so that warp of a corrugated board sheet 25 can be corrected more accurately.

(A-5) Fifth Embodiment

FIG. 10 shows the configuration of the acquaintance database 3 according to a fifth embodiment of the present invention. The elements except the acquaintance database 3 are also identical to those of the first embodiment, so repetitious description will be omitted here.

In this embodiment, the shower units 161A and 161B are also controlled in order to correct warp. A spray amount onto the bottom liner side (an amount of spray from the shower unit 161A) and a spray amount onto the top liner side (an amount of spray from the shower unit 161B) are added as particular control factors to the control factors of the fourth embodiment. These spray amounts are given the first priority while the wrap amounts around the single-face web preheater and around the top liner preheater are given the second priority in the priority order; the wrap amount around the bottom liner preheater is given the fourth priority; the adhesive-gap amount of the single facer is given the fifth priority; and the adhesive-gap amount of the glue machine is given the sixth priority; the pressure of the double facer is given the seventh priority; the vapor pressure in double facer is given the eighth priority; and the rate of the double facer is given the ninth priority.

Since the system for correcting possible warp of a corrugated board sheet according to this embodiment has a larger number of control factors than the fourth embodiment, it is possible to perform more sensitive control than the fourth embodiment so that warp of a corrugated board sheet 25 can be corrected more accurately. The added spray amounts with high correction capacities can contribute to further rapid warp correction.

(A-6) Sixth Embodiment

Next, a sixth embodiment of the present invention will now be described with reference to FIGS. 11-13. The sixth embodiment is featured by means for obtaining data in relation to a warp status of a corrugated board sheet 25. The acquaintance database 3 used in this embodiment can be any of the first to the fifth embodiments.

Figure 11:
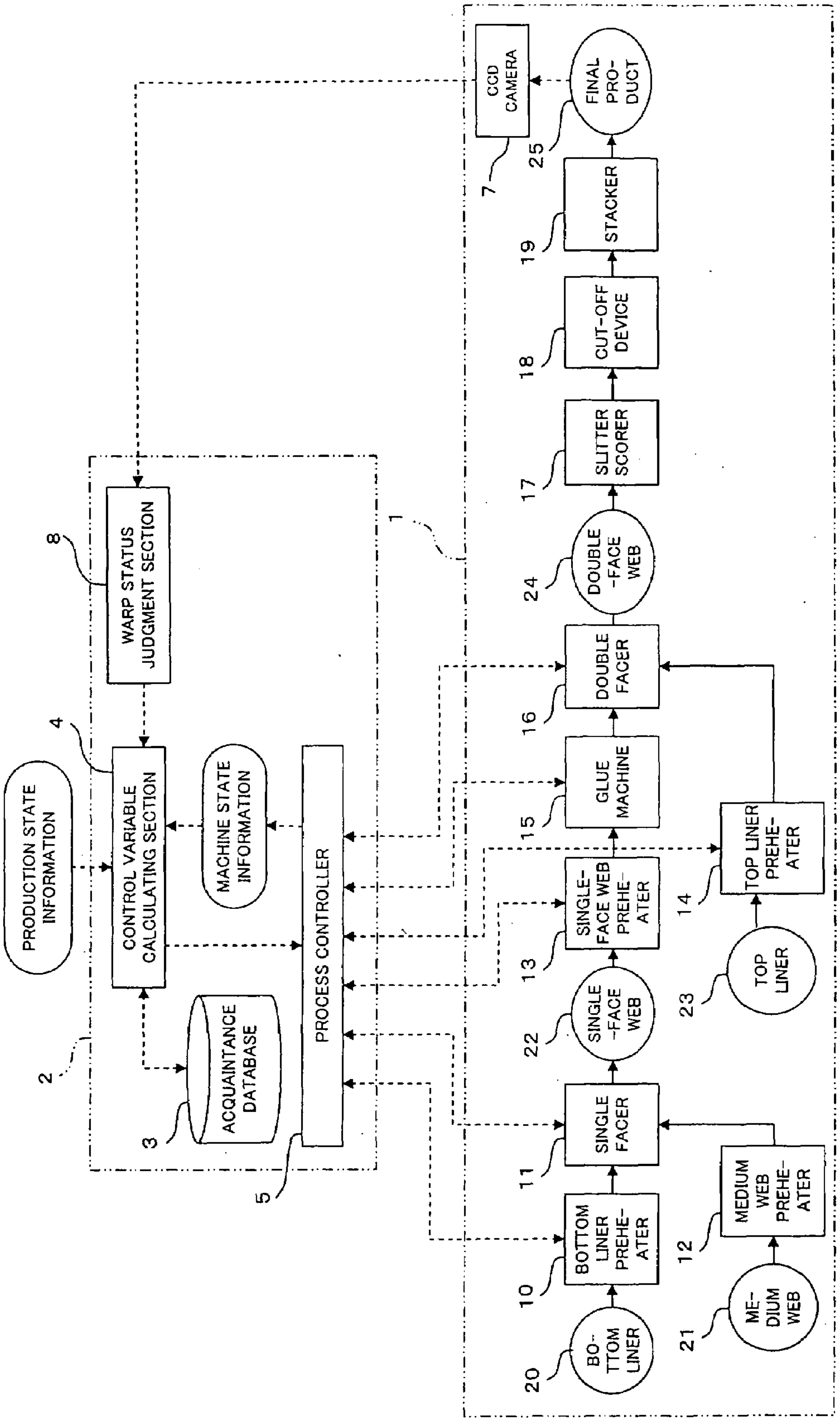
FIG. 11 is a block diagram schematically illustrating a system for correcting possible warp of a corrugated board sheet according to a sixth embodiment of the present invention.

As shown in FIG. 11, the production management machine 2 of the sixth embodiment includes a warp status judgment section 8 as a substitute for the warp status inputting section (push buttons) 6 of the first embodiment. A CCD camera (imaging means) 7 is disposed at the rearmost section of the corrugated-board fabrication machine 1.

Figure 12:
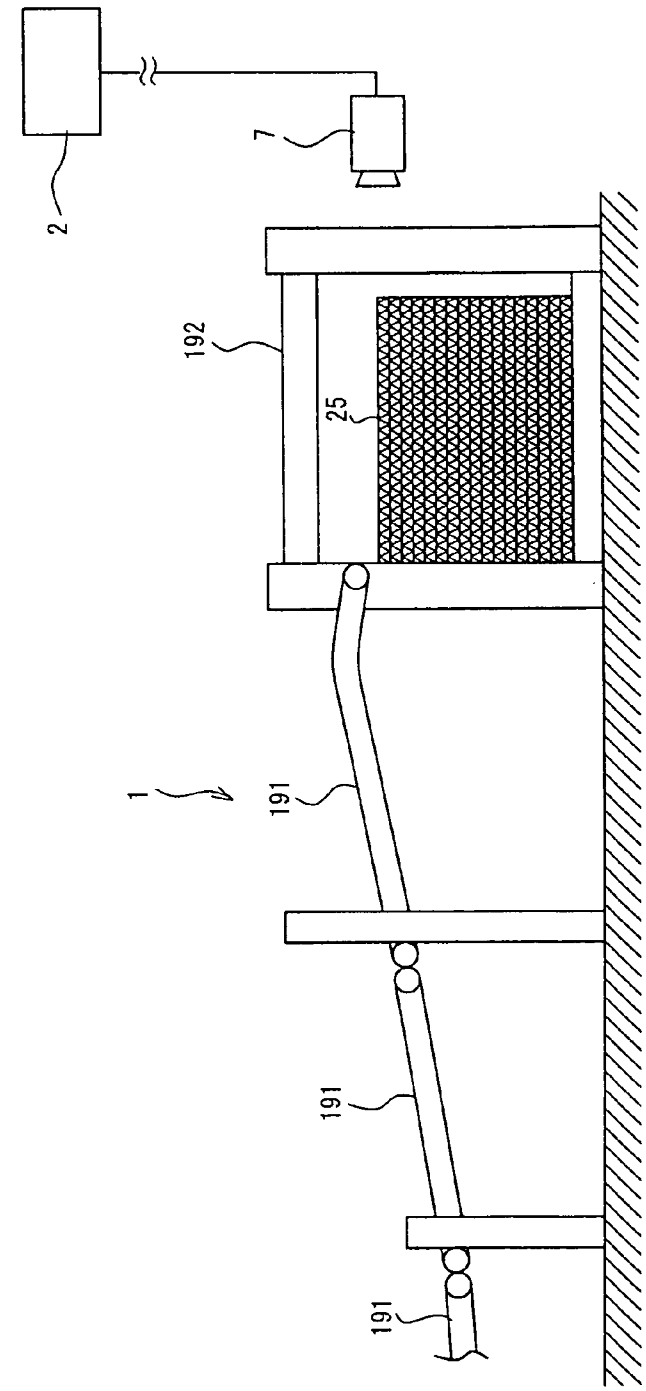
FIG. 12 is a diagram schematically showing a configuration of a stacker of the corrugated-board fabrication machine and warp status information obtaining means according to a sixth embodiment of the present invention.

The CCD camera 7 is arranged at a stacking section 192 of the stacker 19 as shown in FIG. 12. Corrugated board sheets 25 are formed by being cut by the cut-off device 18, transferred by a plurality of conveyors 191, and then subsequently piled in the stacking section 192. The CCD camera 7 images the width-direction side of corrugated board sheets 25 piled in the stacking section 192 and outputs the image data to the warp status judgment section 8.

The warp status judgment section 8 performs image processing on the image data from the CCD camera 7 and measures the heights of, for example, three points (both ends and the center) of the top corrugated board sheet 25 which points are arranged along the width direction thereof. Then the warp status judgment section 8 judges a wrap direction (upward or downward) along the width direction and a height extent (large, medium or small) on the basis of the variance of the measured heights. The result of the judgment is sent to the control variable calculating section 4, which then selects a control factor based on the judgment result and calculates a control variable of the selected control factor in accordance with machine state information with reference to the acquaintance database 3.

Figure 13A:
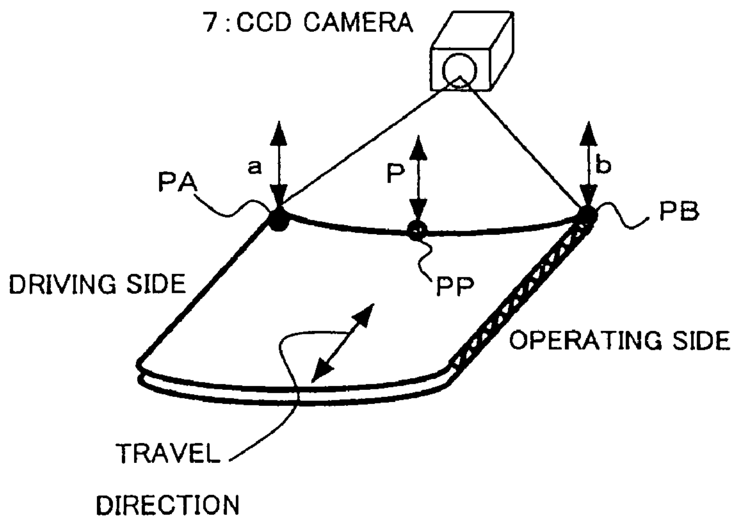
FIG. 13*a* is a perspective diagram schematically showing the warp status information obtaining means according to the sixth embodiment, imaging a corrugated board sheet using a CCD camera (imaging means)
Figure 13B:
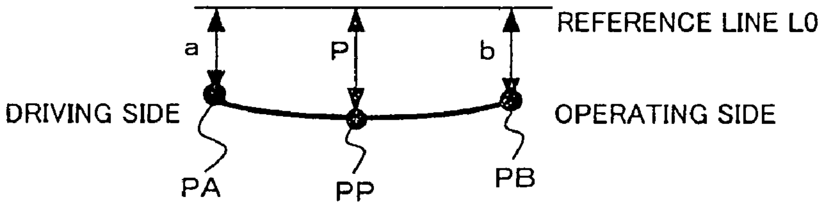
FIG. 13*b* is a schematic diagram showing the warp status information obtaining means according to the sixth embodiment to explain a manner of warp detection.

Here, the judgment of a warp status by the warp status judgment section 8 will now be specifically described with reference to FIGS. 13*a* and 13*b*. The CCD camera 7 photographs the width-direction side of a corrugated board sheet 25 as shown in FIG. 13*a*. The warp status judgment section 8 performs image processing (analysis) on image data from the CCD camera 7 and calculates vertical variations a, b and p of predetermined three points (the driving-side corner PA, the operating-side corner PB and the web center PP) arranged in the width direction with respect to the reference line L0.

The warp status judgment section 8 calculates vertical curl-up amounts A1 and B1 of the corners PB and PP with respect to a flat floor, assuming that a corrugated board sheet 25 is placed on the flat floor, on the basis of the vertical variation a, b and p using the following formulae (1) and (2). Further, the warp status judgment section 8 calculates an amount $WF_{CD}$ of warp in the width direction defined in terms of the formula below (3) using the vertical curl-up amounts A1 and B1. The warp direction is determined by positiveness and negativeness of the warp amount $WF_{CD}$, and the warp height is determined by the largeness of the absolute value of the warp amount $WF_{CD}$.

$$A1 = p - a \tag{1}$$

$$B1 = p - b \tag{2}$$

$$WF_{CD}(A1, B1) = \frac{(A1 + B1)}{2} \times \frac{\alpha}{W^2} \tag{3}$$

where, W represents the length of the width of a corrugated board sheet 25, and α is a constant used to make a warp amount dimentionless.

In the system for correcting possible warp of a corrugated board sheet according to this embodiment, warp of a corrugated board sheet 25 is automatically corrected so that it is further possible to accurately correct warp of corrugated board sheets with ease without depending on experience of an operator and know-how. In the illustrated example, the usage of the acquaintance database 3 according to the first to the fifth embodiments classified a determined warp extent into large, medium and small. It is possible for this system to judge a warp extent more sensitively so that warp of a corrugated board sheet 25 can be corrected more accurately.

(A-7) Seventh Embodiment

Figure 14A:
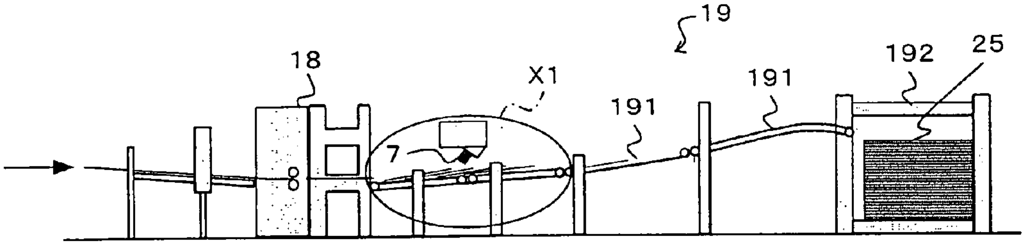
FIG. 14*a* is a diagram schematically showing a side view of warp status information obtaining means according to a seventh embodiment of the present invention.
Figure 14B:
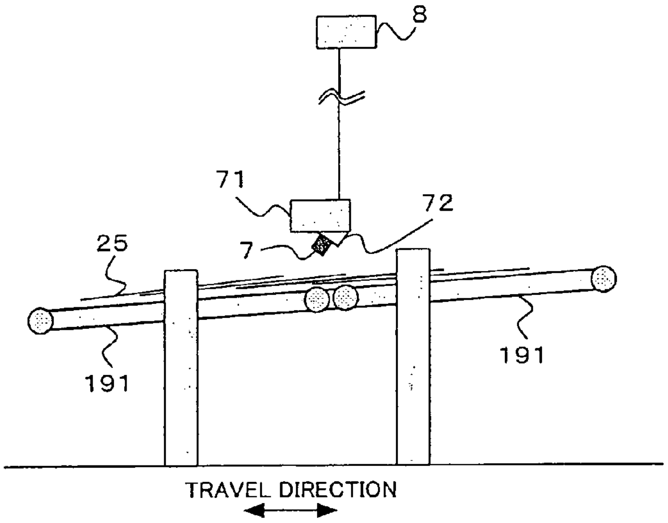
FIG. 14*b* is a diagram showing the warp status information obtaining means, enlarging the X1 part in FIG. 14*a;*

FIGS. 14*a* and 14*b* show a mounting position of a CCD camera 7 according to a seventh embodiment of the present invention. In this embodiment, the configuration other than the mounting position of the CCD camera 7 is identical to that of the sixth embodiment, so any repetitious description is omitted here.

In the above sixth embodiment, the CCD camera 7 photographs a corrugated board sheet 25 that has been formed by being cut by the cut-off device 18 and that has been piled in the stacking section 192. Meanwhile, the present embodiment photographs a corrugated board sheet 25 at a conveyer 191 arranged upstream of the stacking section 192 as shown in FIGS. 14*a* and 14*b*. In the illustrated example, the CCD camera 7 is fixed through a frame 71 and a CCD camera mounting member 72 in order to be positioned over the conveyer 191 (i.e., above the travel path of a corrugated board sheet 25).

Accordingly, the system for correcting a possible warp of a corrugated board sheet of this embodiment ensures the same advantages as the sixth embodiment.

(A-8) Eighth Embodiment

This embodiment uses a variation sensor 7A (variation amount detecting means) as a substitute for the CCD camera (imaging means) 7 so that a warp status judgment section 8 obtains a warp status of a corrugated board sheet based on information obtained by the variation sensor 7A while the above-described seventh embodiment obtains a warp status of a corrugated board sheet 25 on the basis of image data obtained by a CCD camera 7.

Figure 15A:
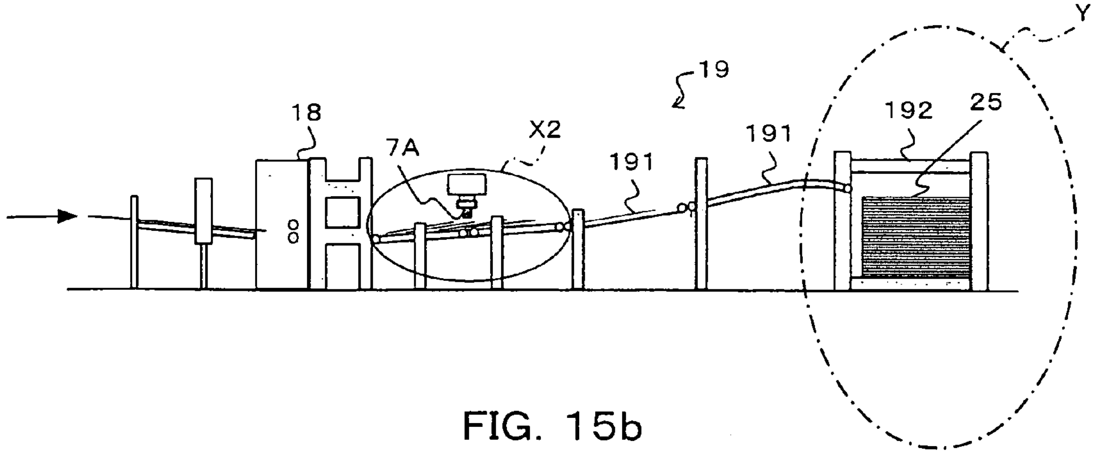
FIG. 15*a* is a diagram schematically showing a side view of warp status information obtaining means according to an eighth embodiment of the present invention.
Figure 15B:
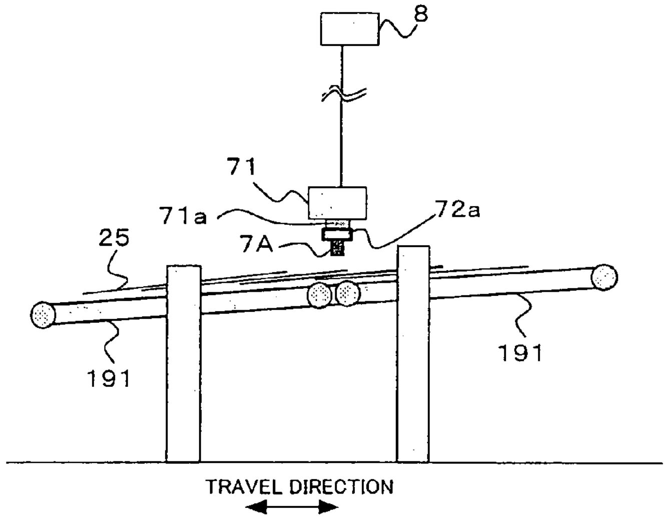
FIG. 15*b* is a diagram showing the warp status information obtaining means, enlarging the X2 part in FIG. 15*a;*
Figure 15C:
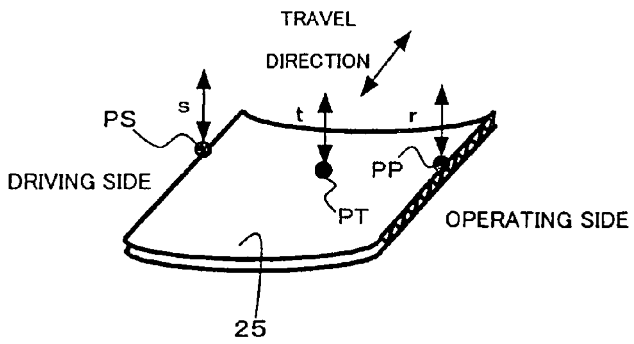
FIG. 15*c* is a schematic diagram showing the warp status information obtaining means according to the eighth embodiment to explain a manner of warp detection.

Specifically, the variation sensor 7A in the illustrated embodiment is attached a variation sensor mounting member 72*a*, and is slidably attached to a rail 71*a* (which is fixed to a Flame 71 and extends horizontally along the width direction of a corrugated board sheet 25), being interposed by the variation sensor mounting member 72*a*, as shown in FIGS. 15*a* and 15*b*. Further, non-illustrated driving means is installed in the variation sensor mounting member 72*a* and the variation sensor 7A is driven by the driving means so that the variation sensor 7A is controlled to be positioned over the points of an operating-side edge PR, a driving-side edge PS and a sheet center PT. As a result, it is thereby possible to obtain vertical variation amounts s, t and r between the lens surface of the variation sensor and each point of PR, PS and PT, as shown in FIG. 15*c*.

The warp status judgment section 8 calculates vertical curl-up amounts A1 and C1 of corners PR and PS of a corrugated board sheet 25 with respect to a flat floor using the following formulae (4) and (5), and a width-direction warp amount $WF_{CD}$ is obtained by the above formula (1).

$$A1=t-s \quad (4)$$

$$B1=t-r \quad (5)$$

The remaining configuration is identical to those of the sixth embodiment, so repetitious description will be omitted here.

Accordingly, the system for correcting a possible warp of a corrugated board sheet of this embodiment ensures the same advantages as the sixth and seventh embodiments.

Figure 16:
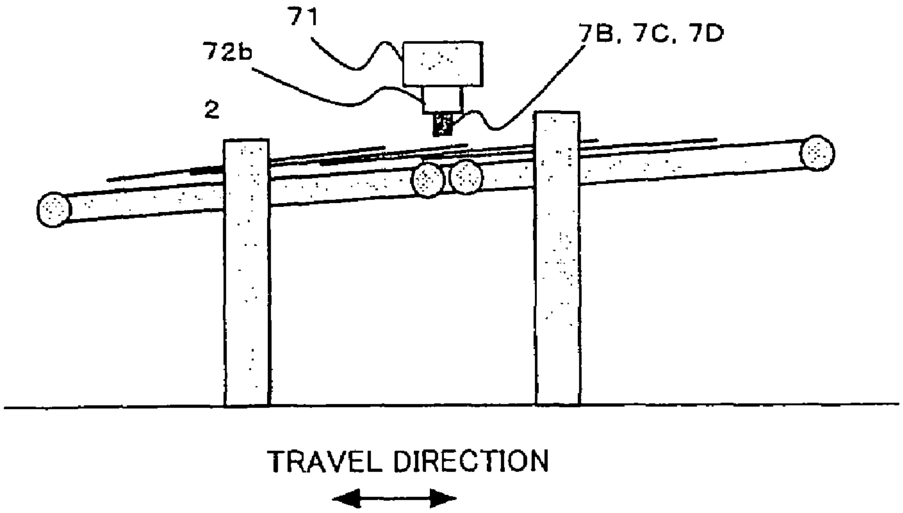
FIG. 16 is a diagram schematically showing a modification of the warp status information obtaining means according to the eighth embodiment.

In the illustrated embodiment, movement of a single variation sensor 7A in the width direction of a corrugated board sheet 25 obtains vertical variation amounts s–r at the respective points PR-PT. Alternatively, as shown in FIG. 16, three variation sensors 7B, 7C and 7D may be fixed to a frame 71 on the same horizontal level so as to be arranged along the width direction of a corrugated board sheet 25 (here, vertically over the points PR-PT), so that vertical variation amounts s–r can be obtained. A part with reference number 72*b* in FIG. 16 represents a variation sensor mounting member.

Further alternatively, measurement of vertical variations by the variation sensor 7A (or the variation sensors 7B, 7C and 7D) may be performed at the stacking section 192 in the same manner as the sixth embodiment, instead of over the conveyer 191.

(A-9) Others

The above is the description of the first through the eighth embodiments of the present invention. But, the present invention should by no means be limited to the foregoing first to the eighth embodiments and various alternations and modifications can be suggested without departing from the gist of the present invention.

For example, the above embodiments do not use vapor pressures applied to each of the heating rolls 101, 131 and 141 as particular control factors; alternatively, it is, of course, possible to correct warp of a corrugated board sheet 25 by using these control factors. Further, other than the above example, any control factor that affects a moisture content of a bottom liner 20 or a top liner 23 can be used as a particular control factor to correct warp of a corrugated board sheet 25. Accordingly, the configurations of the acquaintance databases 3 of the first through the fifth embodiments are only examples and can be created in accordance with particular control factors to be used. The priority orders in the acquaintance databases 3 should by no means be limited to the foregoing examples and can be arbitrarily set.

(B)

Hereinafter is a description concerning systems for correcting possible warp of a corrugated board sheet according to the ninth through twelfth embodiments and their modifications of the present invention with reference to FIGS. 17-29. Parts and elements identical to those described in the foregoing embodiments are to be referred to by the same reference numbers.

(B-1) Ninth Embodiment

Figure 17:
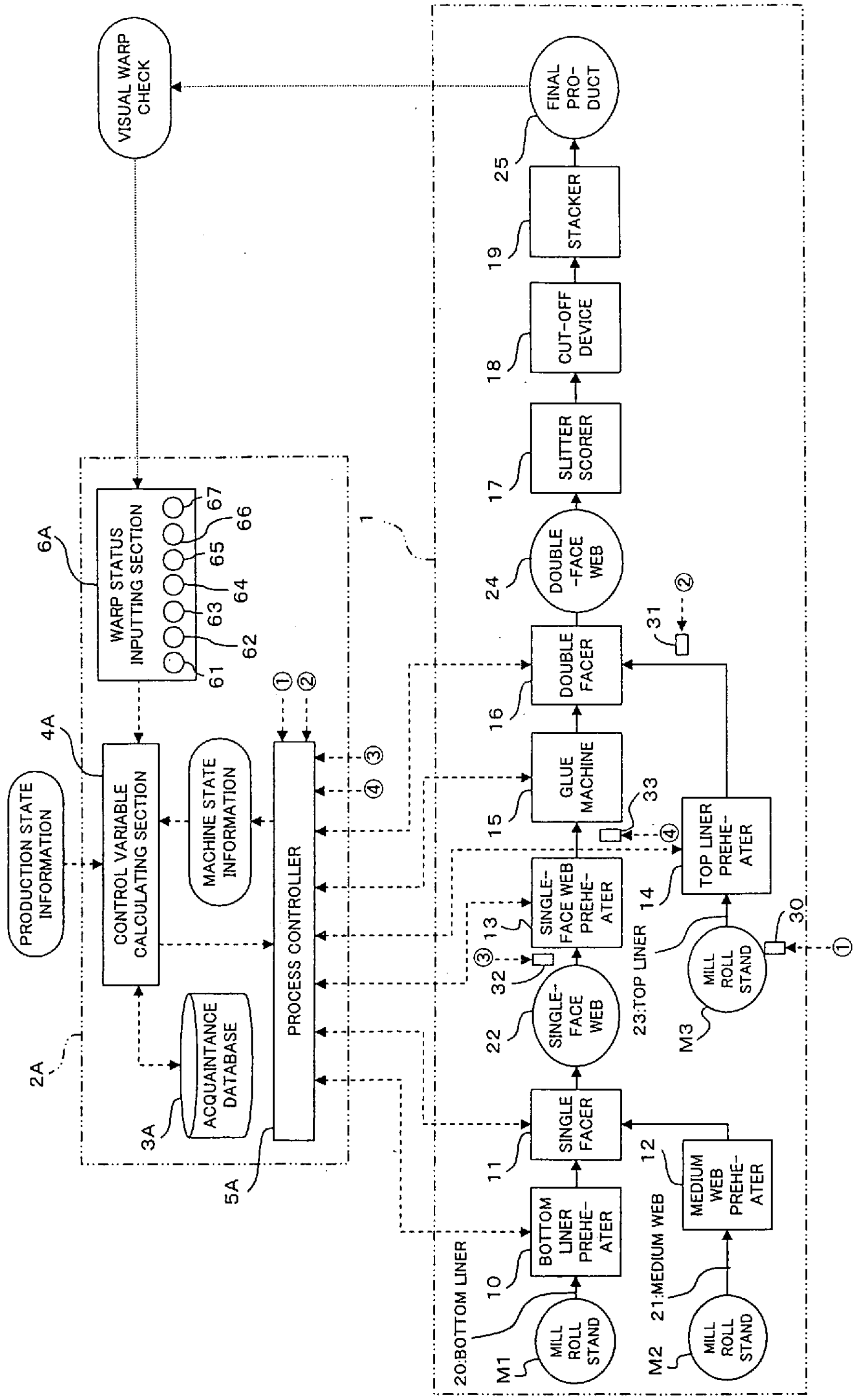
FIG. 17 is a block diagram schematically showing a system for correcting possible warp of a corrugated board sheet according to a ninth embodiment of the present invention.

FIG. 17 schematically shows a system for correcting possible warp of a corrugated board sheet according to the ninth embodiment, which includes a corrugated-board fabrication machine 1 and a production management machine 2A to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by a medium web preheater 12 and then glue the medium web 21 to a bottom liner 20 heated by the bottom liner preheater 10, a single-face web preheater 13 to heat a single-face web 22 formed by the single facer 11, a top liner preheater 14 to heat a top liner 23, a glue machine 15 to paste the single-face web 22 heated by the single-face web preheater 13, a double facer 16 to fabricate a double-face web 24 by gluing the single-face web 22 pasted by the glue machine 15 and the top liner 23 heated by the top liner preheater 14, a slitter scorer 17 to slit and score the double-face web 24 fabricated by the double facer 16, a cut-off device 18 to make a final product (a corrugated board sheet) 25 by dividing a double-face web 24 scored by the slitter scorer 17 and subjected to another procedure into separated forms, and a stacker 19 to sequentially stack corrugated board sheets 25 in order of fabrication.

Webs 20, 21 and 23 are forwarded from base-paper rolls rotatably mounted on mill roll stands M1, M2 and M3, respectively.

Brake devices which provide braking force to traveling single-face web 22 and top liner 23 are installed in the corrugated-board fabrication machine 1 in order to serve as control factors that affect tension on webs 22 and 23 in the travel direction (the flow direction, the machine direction), i.e., control factors that adjust travel-direction tensions. For instance, the brake device for a top liner 23 takes the form of a mill brake 30 arranged at the mill stand M3 for the top liner 23 and a powder brake 31 for a top liner that provides braking force at a point between the top liner preheater 14 and the double facer 16; and the brake device for a single-face web 22 takes the form of a suction brake 32 for a single-face web that provides the single-face web 22 with braking force at a point between the single facer 11 and the single-face web preheater 13 and a powder brake 33 for a single-face web that provides the single-face web 22 with braking force at the entrance of the glue machine 15.

These brake devices will now be briefly described.

Figure 18:
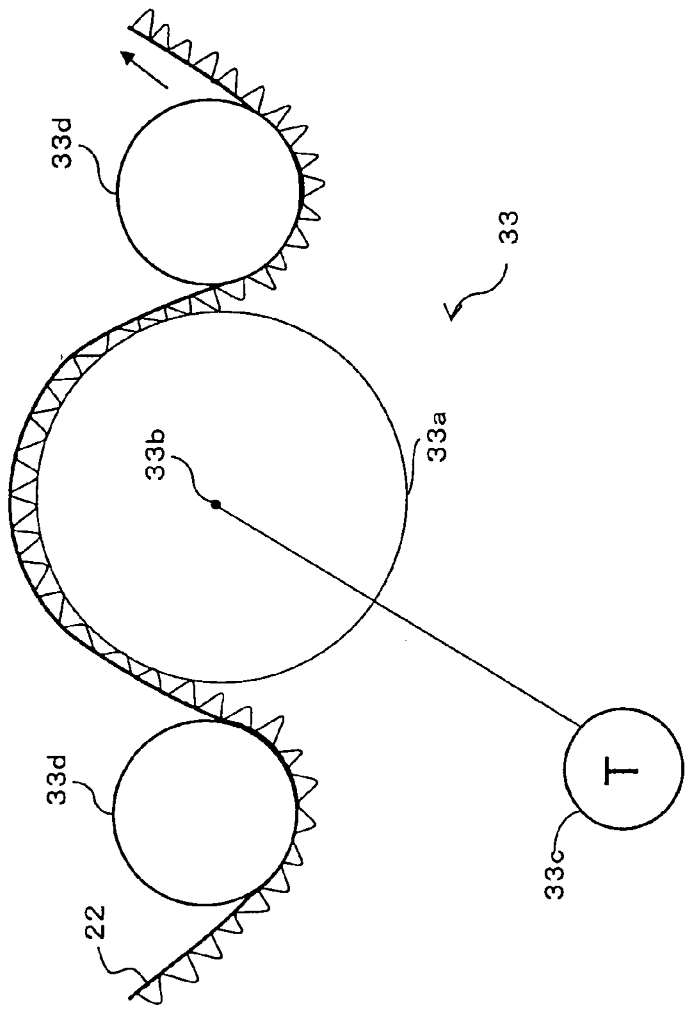
FIG. 18 is a diagram schematically showing a configuration of a powder brake (a brake device) for a single-face web according to the ninth embodiment.

First of all, the powder brake 33 for a single-face web is illustrated to explain the structures of the powder brakes 31 and 33. The powder brake 33 for a single-face web, as shown in FIG. 18, includes a brake roll 33*a* and a torque adjusting unit 33*c*, which is connected to the rotating axis 33*b* of the brake roll 33*a*, to adjust torque of the brake roll 33*a*. Additionally, guide rolls 33*d* are arranged upstream and downstream of the powder brake 33 for a single-face web, so that a single-face web 22 travels the space between each guide roll 33*d* and the brake roll 33*a* so as to be wrapped around the powder brake 33 for a single-face web.

Torque of the brake roll 33*a* is controlled by the torque adjusting unit 33*c* under control of a later-described process controller 5A. Such torque control can apply braking force of a predetermined strength to a single-face web 22 wrapped around the brake roll 33*a* and a travel-direction tension of a predetermined amount can be generated on the single-face web 22.

Figure 19:
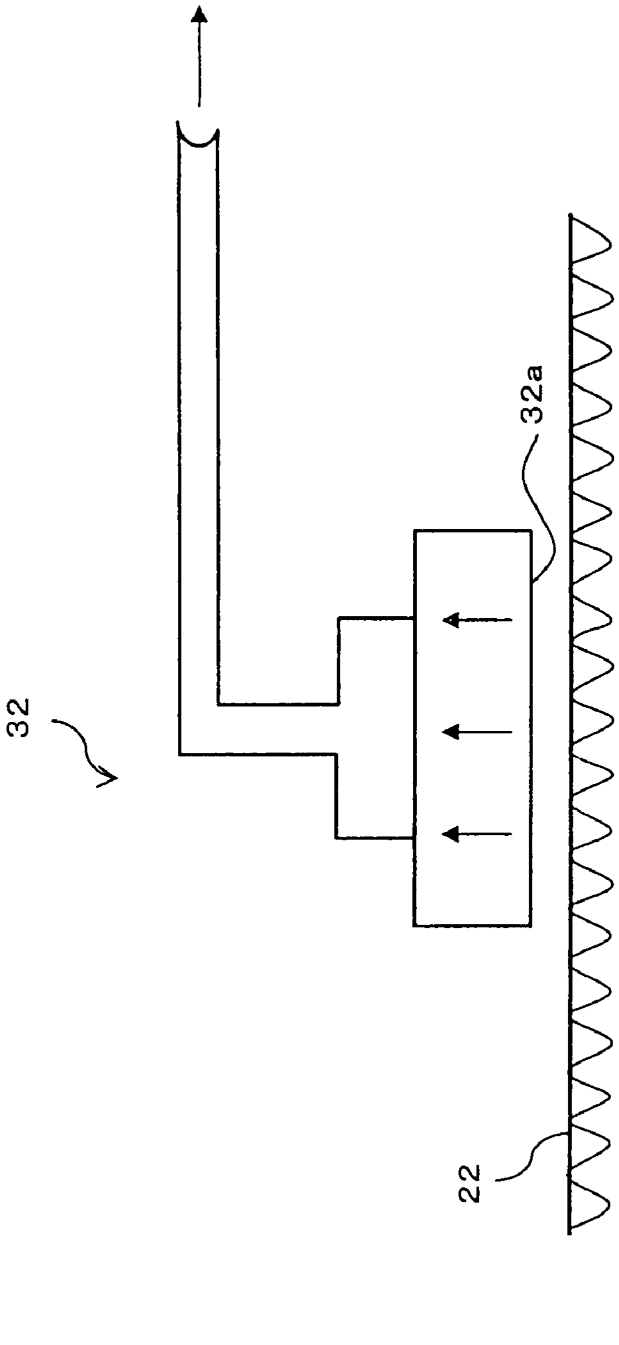
FIG. 19 is a diagram schematically showing a suction brake (a brake device) for a single-face web according to the ninth embodiment.

Next, the suction brake 32 for a single-face web will be described. The suction brake 32 for a single-face web affects suction force serving as braking force on a traveling single-face web 22 and is arranged in such a posture that the suction opening 32*a* faces the travel path of the single-face web 22, as shown in FIG. 19. The suction opening 32*a* is linked to a non-illustrated suction source. The process controller 5A adjusts, for example, an opening amount of a valve disposed on a suction line between the suction brake 32 for a single-face web and the non-illustrated suction source or a load on the suction source, and thereby controls a travel-direction tension of a single-face web 22 to be a predetermined strength.

The mill brake 30 of the top-liner mill stand M3 also applies a top liner 23 to braking force by controlling torque of the mill roll for the top liner 23 in the same manner performed for the above powder brakes 31 and 33.

The production management machine 2A appropriately controls each brake device and corrects warp of a corrugated board sheet 25. Focusing on a function for warp correction, the production management machine 2A includes an acquaintance database 3A, a control variable calculating section 4A, the process controller 5A and a warp status inputting section 6A, as shown in FIG. 17.

The acquaintance database 3A retains setting values of control variables (adjustment variations from the current values) associated with one or more particular control factors that affect warp in the travel direction of a corrugated board sheet 25 which particular control factors are among control factors used to control the corrugated-board fabrication machine 1, or formulae used to determine the control variables that correlate with warp status (warp direction, a warp extent) in the travel direction of the corrugated board sheet 25. The particular control factors herein are control factors that affect travel-direction tensions of a single-face web 22 and a top liner 23, and more specifically are braking force of the above-described mill brake 30 for a top liner 23, powder brakes 31 and 33, braking force of the above suction brake 32 for a single-face web, and the like.

For example, when a corrugated board sheet 25 has upward warp in the travel direction (has a convex surface toward a top liner 23), a setting value or a formula of each control variable is defined in order to increase a travel-direction tension of the top liner 23 and/or decrease a travel-direction tension of the single web 22. Conversely, when the corrugated board sheet 25 has downward warp in the travel direction (has a convex surface toward the single web 22), a setting value or a formula of each control variable is defined in order to increase a travel-direction tension of the single-face web 22 and/or decrease a travel-direction tension of the top liner 23.

A setting value or a formula of each control variable is defined in accordance with a predetermined priority order, which is a priority order for outputs. For example, when a warp extent is small, only control variables with higher priorities are output; and when a warp extent is getting larger, other control variables are additionally output in accordance with the priority order. In relation to the priority order, control factor that more largely affects warp, i.e., a control factor that more largely contributes to warp correction, gets a higher priority.

A table FIG. 20 shows the configuration of the acquaintance database 3A according to the ninth embodiment. In the illustrated example, six warp status types of large upward warp, medium upward warp, small upward warp, large downward warp, medium downward warp and small downward warp are set correspondingly to the number of push buttons that is to be described later. For each of the warp state types, control variables that are to be output are defined in accordance with a priority order. In this embodiment, control factors (particular control factors) are braking force of the mill brake 30 for a top liner 23, braking force of each of the powder brakes 31 and 33, and braking force of the suction brake 32 for a single-face web. When a corrugated board sheet 25 has upward warp, braking force of the mill brake 31 for a top liner 23 is given the first priority and a braking force of the mill brake 30 for a top liner is given the second priority. On the contrary, when a corrugated board sheet 25 has downward warp, a braking force of the powder brake 33 for single-face web is given the first priority and the braking force (a suction pressure) of the suction brake 32 for single-face web is given the second priority.

In FIG. 20, control factors with a triangle (Δ), a circle (○) or a double circle (◎) are outputs when a corrugated board sheet is in a corresponding warp status. A triangle, a circle and a double circle represent largeness of a control variable (adjustment variation from the current values). When the three marks of the same control factor are compared, a circle represents a larger control variable than a triangle and a double circle represents a larger control variable than is a circle (Δ<○<◎). Accordingly, in this embodiment, if a corrugated board sheet 25 has small upward warp for example, only braking force of the powder brake 31 for a top liner is controlled; if the corrugated board sheet 25 has medium warp, an adjustment amount of the powder brake 31 for a top liner is increased and the braking force of the mill brake 30 is additionally adjusted; and corrugated board sheet 25 has large warp, adjustment amounts of braking force of the powder brake 31 for a top liner and the mill brake 30 are increased. Specific setting values of control factors and formulae to derive the setting values are defined by experiments and simulations.

In this embodiment, a warp status of a corrugated board sheet 25 is manually input to the warp status inputting section (warp status information obtaining means) 6 by an operator. The warp status inputting section 6 includes six push buttons 61 (large upward warp), 62 (medium upward warp), 63 (small upward warp), 65 (large downward warp), 66 (medium downward warp) and 67 (small downward warp), each of which associates with a warp status classified by the acquaintance database 3, and a reset button 64. An operator depressing a corresponding button inputs a selection signal to the control variable calculating section 4A. A warp status of a corrugated board sheet 25 is judged by an operator as a result of visual observation on the corrugated board sheet 25 stacked in the stacker 19.

The control variable calculating section 4A retrieves and reads a setting variable or a formula to deriver the variable of each corresponding control factor from the acquaintance database 3A on the basis of the selection signal received from the warp status inputting section 6A, and calculates each control variables associated with a machine state (a running state) of the corrugated-board fabrication machine 1. In the illustrated embodiment, the control variable calculating section 4A and the acquaintance database 3A serves as the control factor selecting means and the control variable calculating means of the present invention.

A machine state represents current values of a running speed of the corrugated-board fabrication machine 1 (a travel rate of webs), braking force (exactly, electric current values of torque adjusting units) of the powder brakes 31 and 33, braking force of mil brake 30 and braking force (precisely, an opening amount of the valve disposed at the suction pressure line) of the suction brake 32 for a single-face web. These values of the machine state is input from the process controller 5A, which is to be described later.

When the reset button 64 is selected in the warp status inputting section 6A, the control variable calculating section 4A instructs the process controller 5A to return all the control factors to the original (values determined by matrix control based on production state information such as a base-board composition, a basis weight of the base board, the width of a corrugated board sheet, a flute and the like).

The process controller 5A overall controls each of the elements that constitute of the corrugated-board fabrication machine 1. The process controller 5A usually controls each of elements 10-19 by performing matrix control based on production state information. However, when one from the push buttons 61-63 and 65-57 is depressed in the warp status inputting section 6A, the process controller 5A controls each of the control factors (here, one or an arbitrary combination of braking force of brakes 30-33) using one or more control variables calculated by the control variable calculating section 4A. When the reset button 64 is depressed, the process controller 5A controls elements 30-33 to return all the control factors to the original. The process controller 5A always grasps a current machine state of the corrugated-board fabrication machine 1, and outputs the current machine state to the control variable calculating section 4A regularly or in response to a request from the control variable calculating section 4A. Namely, the process controller 5A serves as the control means and the running-state information obtaining means according to the present invention.

A succession of procedural steps of correcting warp of a corrugated board sheet performed by the above-described production management machine 2A is substantially identical to that of the first embodiment, which has been explained with reference to flow diagram FIG. 6.

Namely, first of all, the production management machine 2A checks a machine state at step A10 and checks a production state at step A20. In the ensuing step A30, the production management machine 2 judges whether or not a warp status can be currently input (one from the push button 61-67 can be input). The judgment is made so as not to correct warp while another trouble arises because warp correction is useless when such another problem, e.g., a low rate of web travel due to an excessively strong glue adhesive, arises.

If a warp status can be input at step A30, the production management machine 2 judges whether or not a warp status has been actually input at step A40. If a warp status has been input, the production management machine 2A selects one or more control factors (here, one or an arbitrary combination of braking forces of brakes 30-33) in accordance with a priority order of the input warp status, i.e., the selected one of the push buttons 61-63 and 65-67.

In succession at step A60, the production management machine 2 refers to the acquaintance database 3A and calculates one or more control variables associated with the machine state obtained in step A10. At this time, production management machine 2A may use the production state information obtained at step A20 as reference data, for example, in order to change wrap amounts considering base paper composition (thick paper, thin paper). The production management machine 2A outputs the calculated control variables to corresponding elements (here, one or an arbitrary combination of braking forces of brakes 30-33) at step A70.

According to the system for correcting a possible warp of a corrugated board sheet of the illustrated embodiment, braking force of the brakes 30-33 which forces affect warp of a corrugated board sheet 25 is automatically adjusted in the production management machine 2A by an operator visually judging a warp status of a corrugated board sheet 25 fabricated in the corrugated-board fabrication machine 1 and simply depressing one of buttons 61-63 and 65-67, whichever one corresponds to a warp status. Thereby, it is possible to accurately correct warp of corrugated board sheets with ease without depending on experience of an operator and knowhow.

Since one or more control factors are selected based on an amount of warp (here, one or more control factors are additionally selected in accordance with a priority order, considering an extent of warp of a corrugated board sheet 25), it is possible to effectively correct warp irrespective of a warp amount. In particular in this embodiment, it is possible to correct warp of a corrugated board sheet 25 faster by providing a control factor that more largely affects the warp with a higher priority.

In the present ninth embodiment, warp of a corrugated board sheet 25 is corrected using braking force of the brakes 30-33 as control factors. These control factors are only one example and a greater number of control factors to be controlled may be used likewise in the following tenth embodiment.

(B-2) Tenth Embodiment

Figure 21:
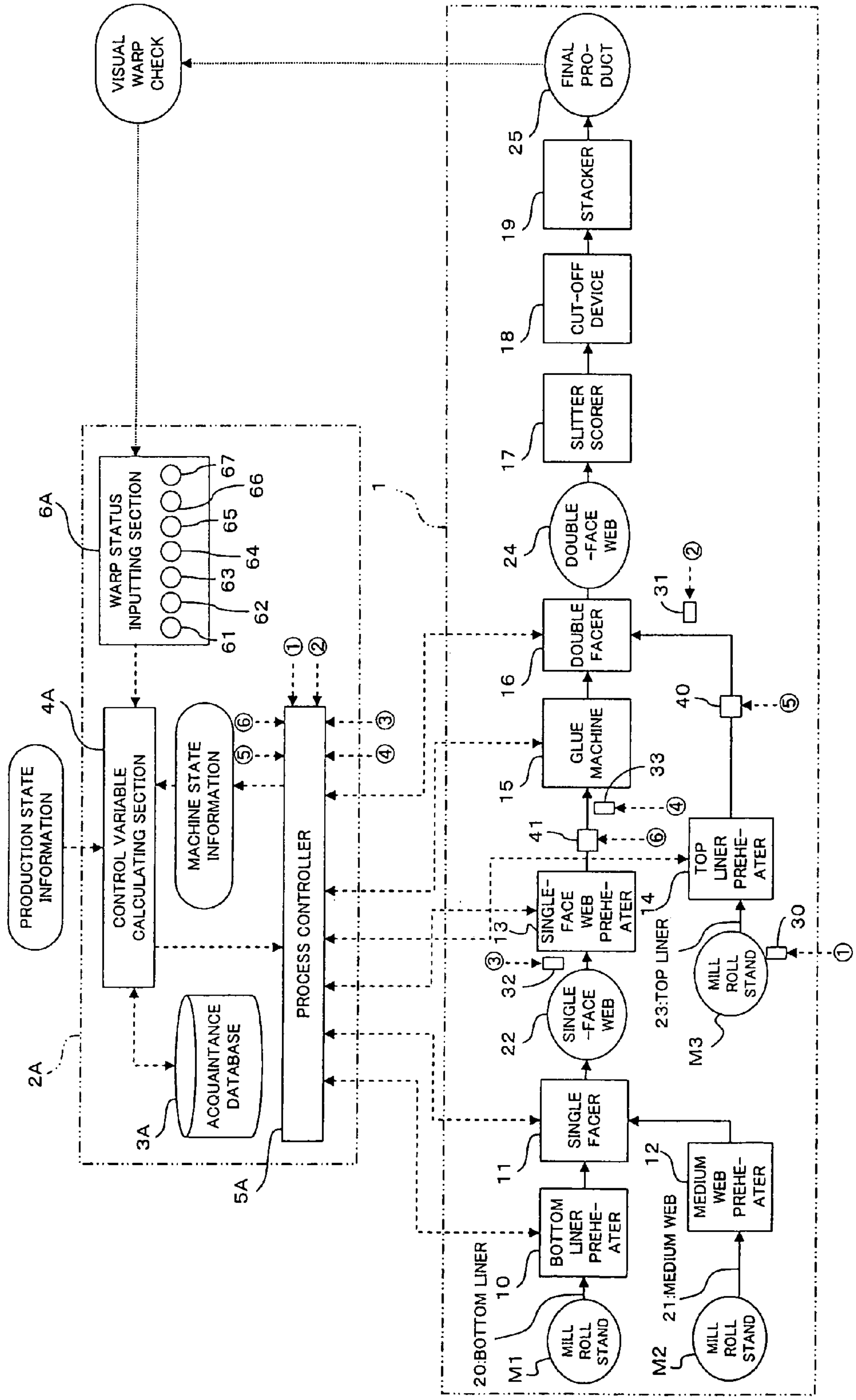
FIG. 21 is a block diagram schematically showing a system for correcting possible warp of a corrugated board sheet according to the tenth embodiment.

FIG. 21 shows a system for fabricating a corrugated board sheet according to the tenth embodiment of the present invention.

The corrugated-board fabrication machine 1 of this embodiment includes a wrap roll 40 for a top liner 23 (a top liner wrap roll) and a wrap roll 41 for a single-face web 22 (a wrap roll for a single-face web) in addition to the parts and elements of the corrugated-board fabrication machine 1 of the ninth embodiment shown in FIG. 17. Here, the wrap roll 40 for a top liner is disposed between the top liner preheater 14 and the double facer 16, and the wrap roll 41 for a single-face web is disposed between the single-face web preheater 13 and the glue machine 15.

Figure 22:
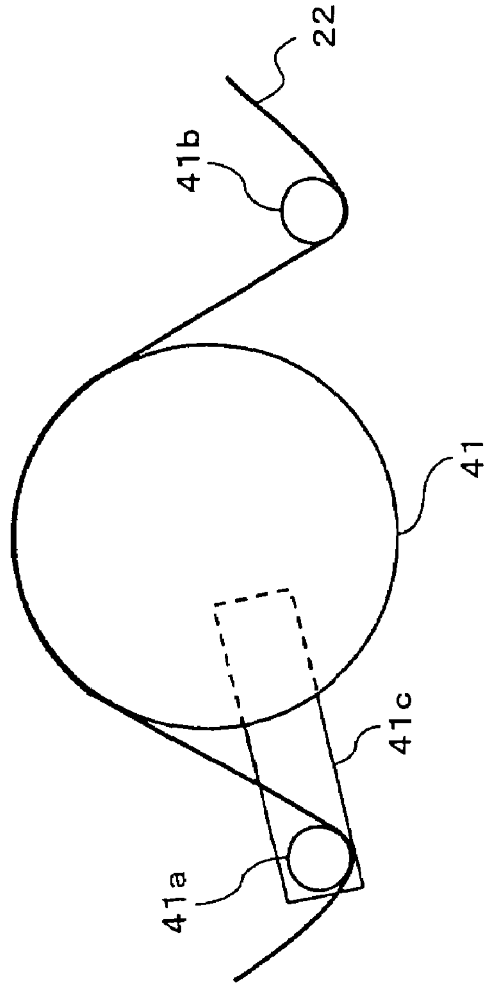
FIG. 22 is a diagram schematically showing a wrap roll for a single-face web according to the tenth embodiment.

The wrap roll 41 for single-face web will now be illustrated with reference to FIG. 22 to explain the wrap rolls 40 and 41. Guide rolls 41*a* and 41*b* are arranged close to the wrap roll 41 for a single-face web and are disposed upstream and downstream of the wrap roll 41 for a single-face web. A single-face web 22 travels the space between the wrap roll 41 for single-face web and each of the guide rolls 41*a* and 41*b* so as to be wrapped around the wrap roll 41 for a single-face web.

One of the guide rolls 41*a* is fixed to the tip of an arm 41*c*, which is swingably attached to the axis of the wrap roll 41 for a single-face web. The arm 41*c* is driven by a non-illustrated motor, and a combination of the guide roll 41*a* and the non-illustrated motor serves as a wrap amount adjusting unit. In other words, the motor drives the arm 41*c* to turn the guide roll 41*a* to a desired position whereupon it is possible to adjust a wrap amount of a single-face web 22 around the wrap roll 41 for a single-face web. An increase of the above wrap amount increases the running resistance of the single-face web 22 so that the travel-direction tension of the single-face web 22 is increased. On the other hand, a decrease of the above wrap amount reduces the travel-direction tension of the single-face web 22.

Any position upstream of the double facer 16 is satisfactory to place the wrap roll 40 for a top liner and any position upstream of the glue machine 15 is satisfactory to place the wrap roll 41 for a single-face web.

FIG. 23 shows the configuration of the acquaintance database 3A according to the tenth embodiment of the present invention.

Focusing on a function for warp correction, the present embodiment includes control factors of wrap amounts of a web around the wrap rolls 40 and 41 in addition to the control factors of the ninth embodiment. In order to correct upward warp, braking force of the powder brake 31 for a top liner, braking force of the mill brake 30 for a top liner, and the wrap roll 40 for a top liner are respectively given the first, the second and the third priorities in the same manner as the ninth embodiment. For downward warp, braking force of the powder brake 33 for a single-face web, braking force of the suction brake 32 for a single-face web, and wrap roll 41 for single-face web are respectively given the first, the second and the third priorities similarly to the ninth embodiment.

The remaining configuration thereof is identical to that of the ninth embodiment, so repetitious description will be omitted.

As a result, the system for correcting possible warp of a corrugated board sheet according to the illustrated embodiment can perform more detail management and more accuracy warp correction of a corrugated board sheet 25 than the ninth embodiment because of the greater number of control factors than the ninth embodiment.

(B-3) Eleventh Embodiment

An eleventh embodiment of the present invention will now be described with reference to FIGS. 24-26. The present embodiment is featured by means to obtain information about a warp status of a corrugated board sheet 25 and the remaining configuration is identical to the ninth embodiment shown in FIG. 21.

Figure 24:
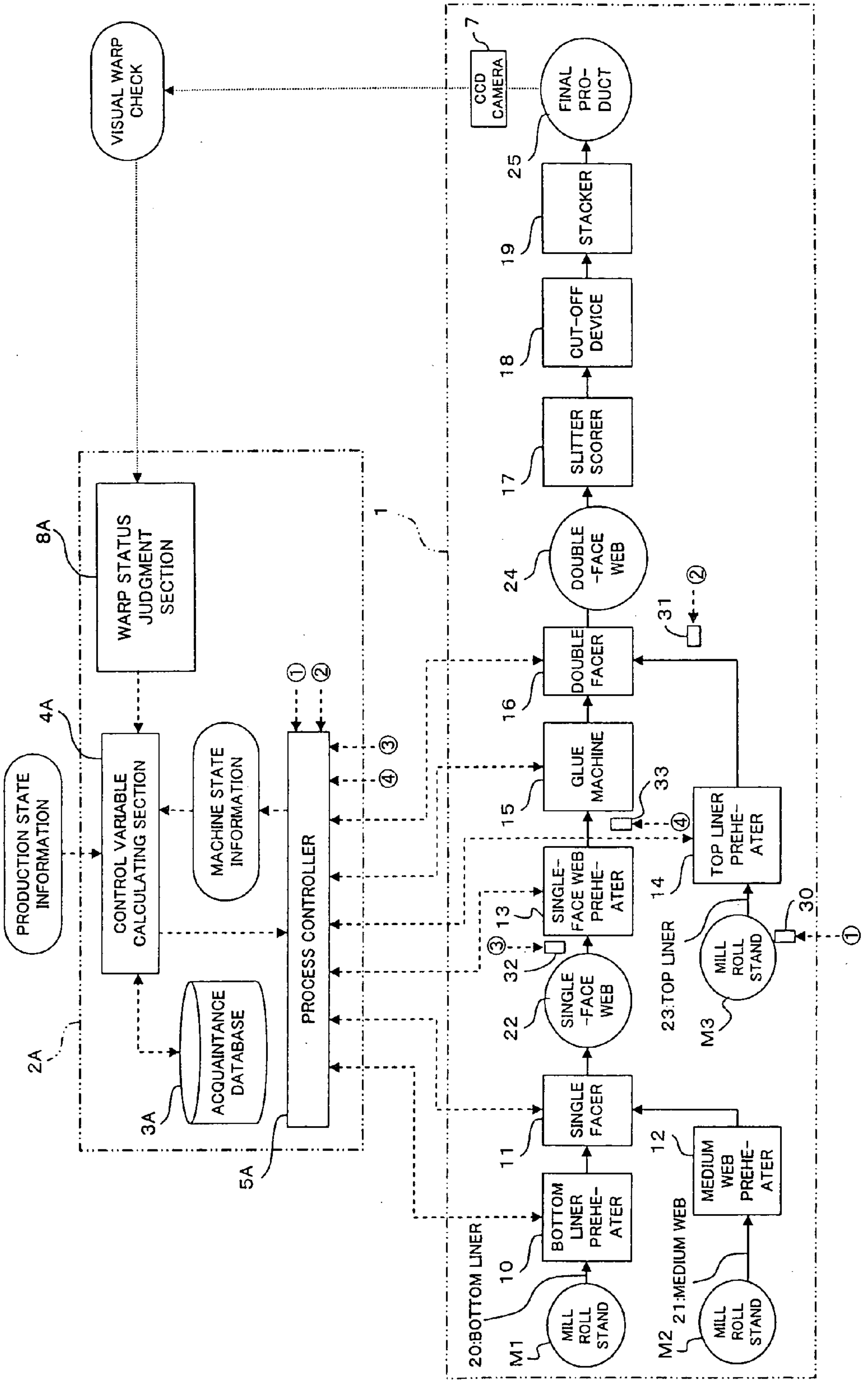
FIG. 24 is a block diagram schematically showing a system for correcting possible warp of a corrugated board sheet according to an eleventh embodiment of the present invention.

As shown in FIG. 24, the production management machine 2A of this embodiment comprises a warp status judgment section 8A as a substitute for the warp status inputting section (push buttons) 6 of the ninth embodiment. A CCD camera (imaging means) 7 is arranged at the rearmost section of the corrugated-board fabrication machine 1.

Figure 25:
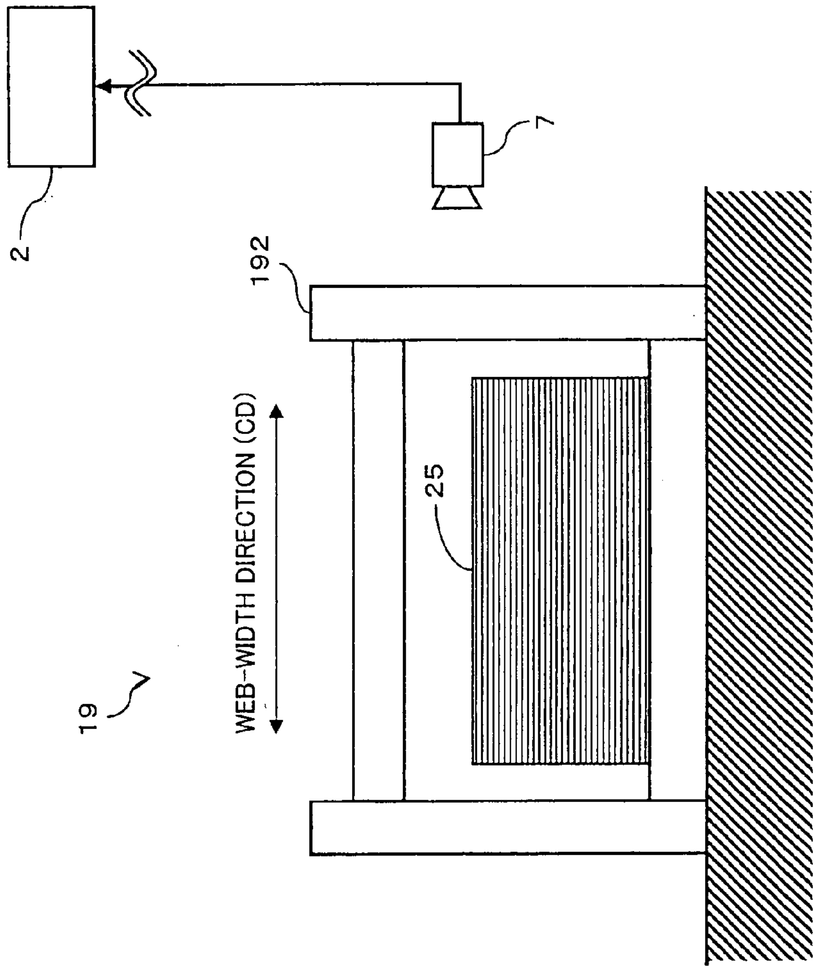
FIG. 25 is a diagram schematically showing corrugated-board warp status obtaining means according to the eleventh embodiment.

As shown in FIG. 25, the CCD camera 7 is arranged at a stacking section 192 of the stacker 19. Corrugated board sheets 25 are cut by the cut-off device 18, transferred by a plurality of non-illustrated conveyors 191, and then subsequently piled in the stacking section 192. The CCD camera 7 images the side of corrugated board sheets 25 piled in the stacking section 192 along the travel direction and outputs the image data to the warp status judgment section 8.

The warp status judgment section 8A performs image processing on the image data and measures the heights of three points (both ends and the center) of a corrugated board sheet 25 which points are arranged in the travel direction. Then the warp status judgment section 8 judges a wrap direction (upward or downward) along the travel direction and a height extent (large, medium or small) on the basis of the variance of the measured heights. The result of the judgment is sent to the control variable calculating section 4A, which then selects a control factor based on the judgment result and calculates a control variable of the selected control factor in accordance with machine state information with reference to the acquaintance database 3A.

Figure 26A:
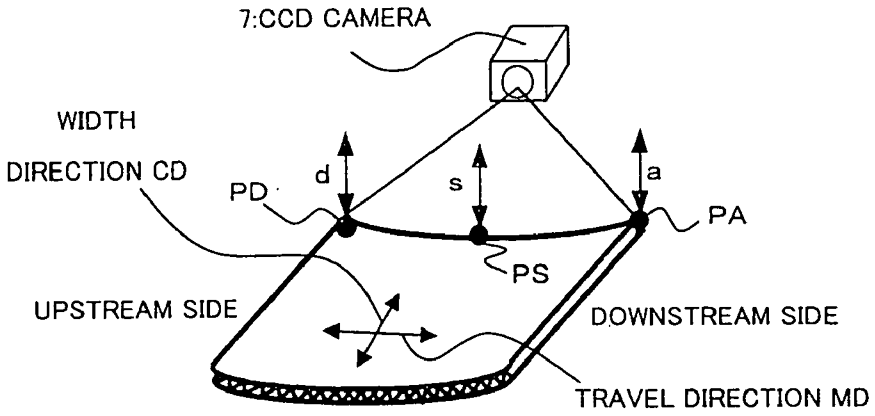
FIG. 26*a* is a perspective diagram schematically showing the warp status information obtaining means according to the eleventh embodiment, imaging a corrugated board sheet using a CCD camera (imaging means)
Figure 26B:
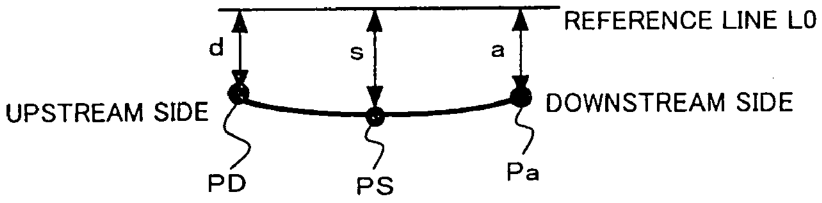
FIG. 26*b* is a schematic diagram showing the warp status information obtaining means according to the eleventh embodiment to explain a manner of obtaining warp status of a corrugated board sheet.

Here, the judgment of a warp status by the warp status judgment section 8 will now be specifically described with reference to FIGS. 26*a* and 26*b*. The CCD camera 7 photographs a travel-direction side of a corrugated board sheet 25 as shown in FIG. 26*a*. The warp status judgment section 8 performs image processing on image data from the CCD camera 7 and calculates vertical variations d, s and a of predetermined three points (the upstream corner PD, the web center PS and the downstream corner PA) arranged in the travel direction with respect to the reference line L0.

The warp status judgment section 8 calculates vertical curl-up amounts A2 and D2 of the corners PD and PA with respect to a flat floor, assuming that a corrugated board sheet 25 is placed on a flat floor, on the basis of the vertical variation d, s and using the following formulae (6) and (7). Further, the warp status judgment section 8 calculates an amount $WF_{MD}$ of warp along the travel direction defined in terms of the formula (8) below using the vertical curl-up amounts A2 and D2. The warp direction is judged by positiveness and negativeness of the warp amount $WF_{MD}$, and the warp height is determined by the largeness of the absolute value of the warp amount $WF_{MD}$.

$$A2 = s - a \tag{6}$$

$$D2 = s - a \tag{7}$$

$$WF_{MD} = \frac{(A2 + D2)}{2} \times \frac{\alpha}{W^2} \tag{8}$$

where, W represents the length of the width of a corrugated board sheet 25, and α is a constant used to make a warp amount dimentionless.

In the system for correcting possible warp of a corrugated board sheet according to this embodiment, warp of a corrugated board sheet 25 is automatically corrected so that it is possible to accurately correct travel-direction warp of corrugated board sheets with ease without depending on experience of an operator and know-how. In the illustrated example, the usage of the acquaintance database 3A according to the ninth embodiment classified a warp extent that had been determined into large, medium and small. It is possible for this system to judge a warp extent more sensitively so that warp of a corrugated board sheet 25 can be corrected more accurately.

(B-4) Twelfth Embodiment

Figure 27:
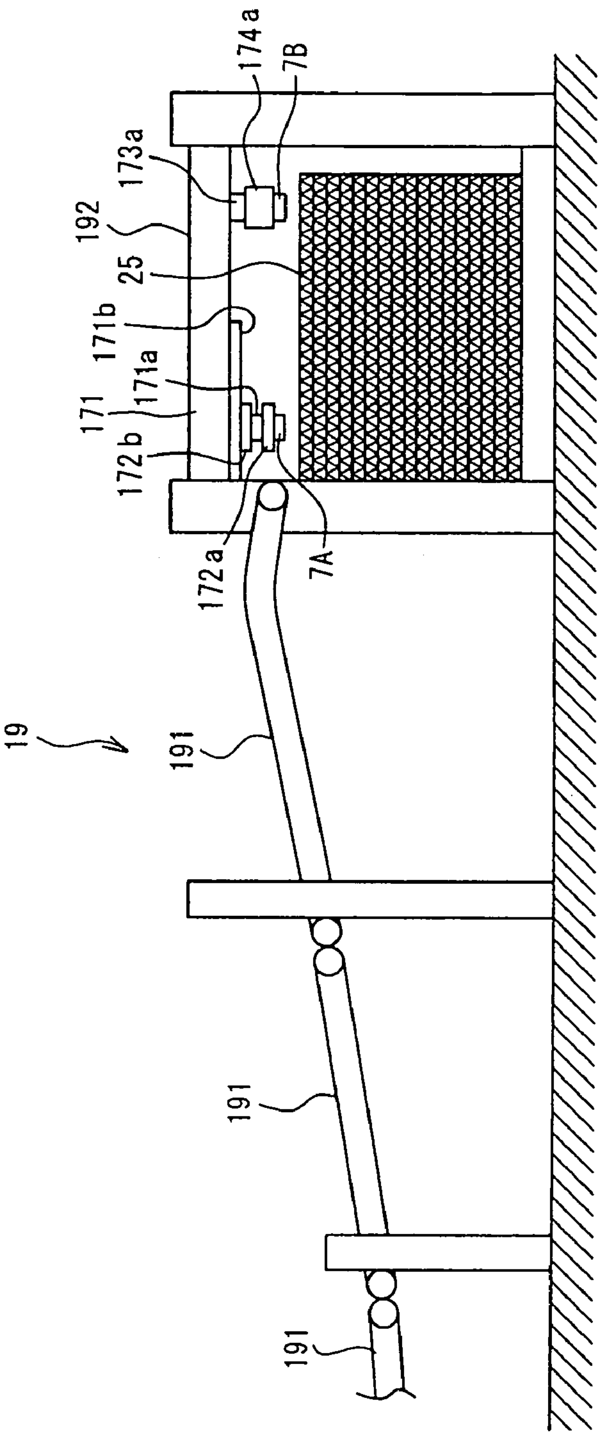
FIG. 27 is a diagram schematically showing corrugated-board warp status obtaining means according to a twelfth embodiment of the present invention.

FIG. 27 schematically shows the main part of the corrugated-board warp detection unit according to a twelfth embodiment.

In the above eleventh embodiment described with reference to FIG. 24, the warp status judgment section 8A obtains a warp status of a corrugated board sheet 25 based on image data obtained by the CCD camera 7. This embodiment uses variation sensors (variation amount detecting means) 7A and 7B as a substitute for the CCD camera (imaging means) 7 so that a warp status judgment section 8A obtains a status of possible warp of a corrugated board sheet based on measurement data obtained by the variation sensor 7A, 7B.

As shown in FIG. 27, the variation sensor 7A is slidably attached to the rail 171*a*, which extends horizontally along the width direction of a corrugated board sheet 25, through a variation sensor mounting member 172*a*, the rail 171*a* being slidably attached to a rail 171*b*, which is fixed to an upper frame 171 at the stacking section 192 through a variation sensor mounting member 172*b* and which horizontally extends in the travel direction of the corrugated board sheet 25.

Figure 28:
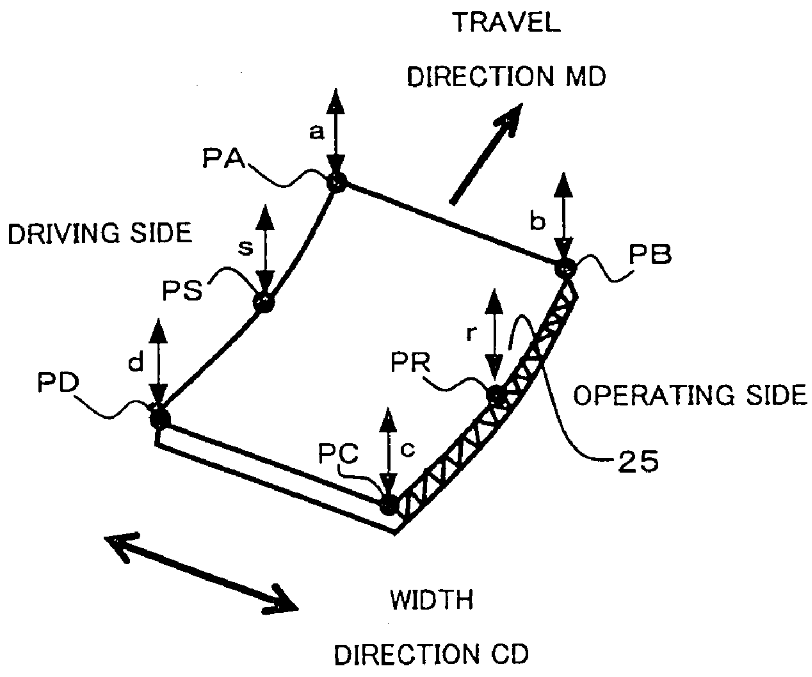
FIG. 28 is a schematic diagram showing a manner of obtaining a warp status of a corrugated board sheet according to the twelfth embodiment.
Figure 29:
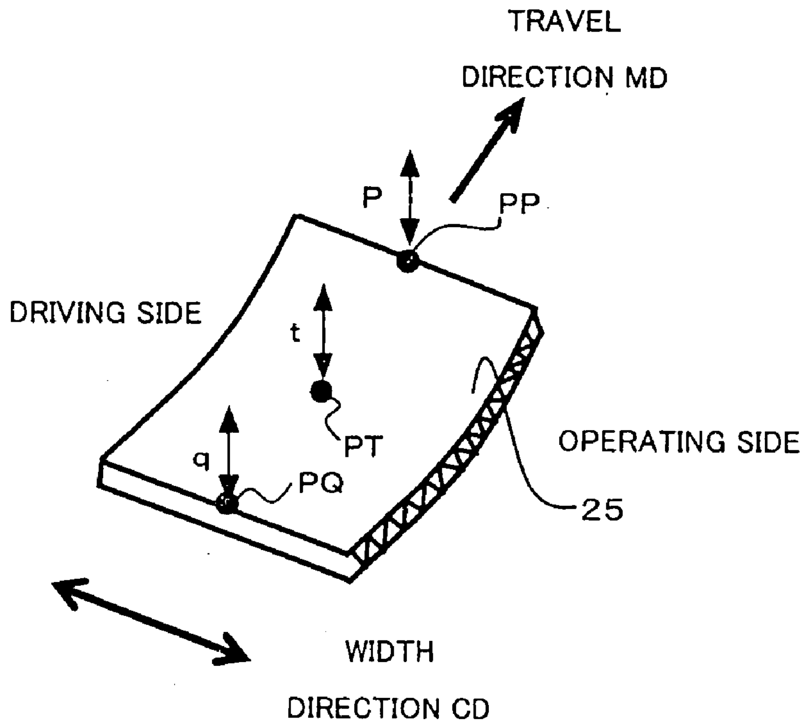
FIG. 29 is a block schematic diagram showing a modification of the manner of obtaining a warp status of a corrugated board sheet according to the twelfth embodiment.

Non-illustrated driving means is attached to the variation sensor mounting members 172*a* and 172*b*. The variation sensor 7A is driven by the driving means so that the variation sensor 7A can horizontally move along the width and travel directions of a corrugated board sheet 25. Thereby, as shown in FIG. 28, the variation sensor 7A is a control to be positioned over a measurement point PD near the upstream corner on the driving side of a corrugated board sheet 25, a measurement point PC near the upstream corner on the operating side, a measurement point PS near the center of the driving-side end in the travel direction and a measurement point PR near the center of the operating-side end in the travel direction. It is possible to obtain vertical variation amounts c, d, r, and s of the points PC, PD, PR and PS, respectively, with respect to the variation sensor.

Meanwhile, as shown in FIG. 27, the variation sensor 7B is slidably attached to a rail 173*a*, which is fixed to the frame 171 and which horizontally extends along the width direction of a corrugated board sheet 25, through a variation sensor mounting member 174*a*, which includes non-illustrated driving means. The variation sensor 7B is driven by this driving means and can horizontally move along the width direction of a corrugated board sheet 25. Thereby, the variation sensor 7B is controlled to be positioned above a measurement point PA near the downstream corner on the driving side of a corrugated board sheet 25 and a measurement point PB near the downstream corner on the operating side of the corrugated board sheet 25 shown in FIG. 28. It is possible to obtain vertical variation amounts a and b of the respective points PA and PB with respect to the variation sensor.

Then the warp status judgment section 8 obtains a warp amount $WF_{MD}$ in the travel direction based on the difference of the vertical variation amounts of both ends of a web in the travel direction with respect to the centers in the travel direction by using the following formula (9). Here, the warp status judgment section 8 regards the vertical variation amount s of point PS at the center of the driving side in the travel direction as a reference to obtain a travel-direction warp amount on the driving side, regards the vertical variation amount r of point PR at the center of the operating side in the travel direction as a reference to obtain a warp amount of the operating side in the travel direction and then calculate a warp amount $WF_{MD}$ in the travel direction of a corrugated board sheet 25 by using the average of the above travel-direction warp amounts as shown in the formula (9).

$$WF_{MD} = \frac{1}{2}\left[\left\{s - \frac{a+d}{2}\right\} + \left\{r - \frac{b+c}{2}\right\}\right] \times \frac{\alpha}{W^2} \tag{9}$$

The remaining configuration is identical to that of the ninth embodiment, so any repetitious description is omitted here.

As a result, the system for correcting possible warp of a corrugated board sheet according to the present embodiment guarantees the same advantages as the eleventh embodiment.

In order to obtain warp $WF_{MD}$ of the travel direction, it is enough to obtain a vertical variation amount along the travel direction of a corrugated board sheet 25. For example, the simple configuration to obtain vertical variation distributions p, t, and q of the three points PP, PT, and PQ shown in FIG. 29 may be satisfactory. In this case, the warp amount $WF_{MD}$ is calculated by using the following formula (10), for example.

$$WF_{MD} = \frac{1}{2}[(t - p) + (t - q)] \times \frac{\alpha}{W^2} \tag{10}$$

Further, in the illustrated embodiment, the variation sensor 7A, 7B detect vertical variation amounts at the stacking section 192 of the stacker 19. Detecting vertical variation amounts on a corrugated board sheet 25 serving as a final product, the overall width of which has been cut by the cut-off device 18 is satisfactory. In other words, a satisfactory variation sensor detects vertical variation amounts of a corrugated board sheet 25 at any point downstream of the cut-off device 18. For example, a variation sensor may be arranged over a conveyer between the cut-off device 18 and the stacker 19 so that variation detecting is performed on a corrugated board sheet 25 being transferred on the conveyer.

(B-5) Others

The ninth to twelfth embodiments of the present invention are described in the above. But the present invention should by no means be limited to these embodiments and another alternation and modification can be suggested without departing from the concept of the present invention.

For example, the eleventh embodiment shown in FIG. 24 includes the warp status judgment section 8 and the CCD camera (imaging means) 7 as a substitute for the warp status inputting section (push buttons) 6A of the ninth embodiment shown in FIG. 17; and the twelfth embodiment shown in FIG. 27 includes the warp status judgment section 8 and the variation sensors (variation amount detecting means) 7A and 7B as a substitute for the warp status inputting section (push buttons) 6A of the ninth embodiment. Alternatively, the tenth embodiment shown in FIG. 21 may be modified to include the warp status judgment section 8A and the CCD camera (imaging means) 7 as a substitute for the warp status inputting section (pushbuttons) 6A or to include the warp status judgment section 8 and the variation sensors (variation amount detecting means) 7A and 7B as a substitute for the warp status inputting section (push buttons) 6A.

In the ninth to twelfth embodiments, the brake devices 30-33 and the wrap rolls 40 and 41 are used as particular control factors. Another control factor that affects the travel-direction tension of a top liner 23 or a bottom liner 20 can be used as a particular control factor to correct warp of a corrugated board sheet 25. Therefore, the configurations of the acquaintance databases 3A described along with the ninth and tenth embodiments are only examples, and an acquaintance database 3 may be formed in accordance with particular control factors that are to be used. A priority order thereof should by no means be limited to those of the embodiments and may be arbitrarily set.

(C)

Hereinafter is a description of systems for correcting possible warp of corrugated board sheet according to the thirteenth to eighteenth embodiments and modifications thereof with reference to FIGS. 30-45. Parts and elements identical to those described in the foregoing embodiments are to be referred to by the same reference numbers.

(C-1) Thirteenth Embodiment

Figure 30:
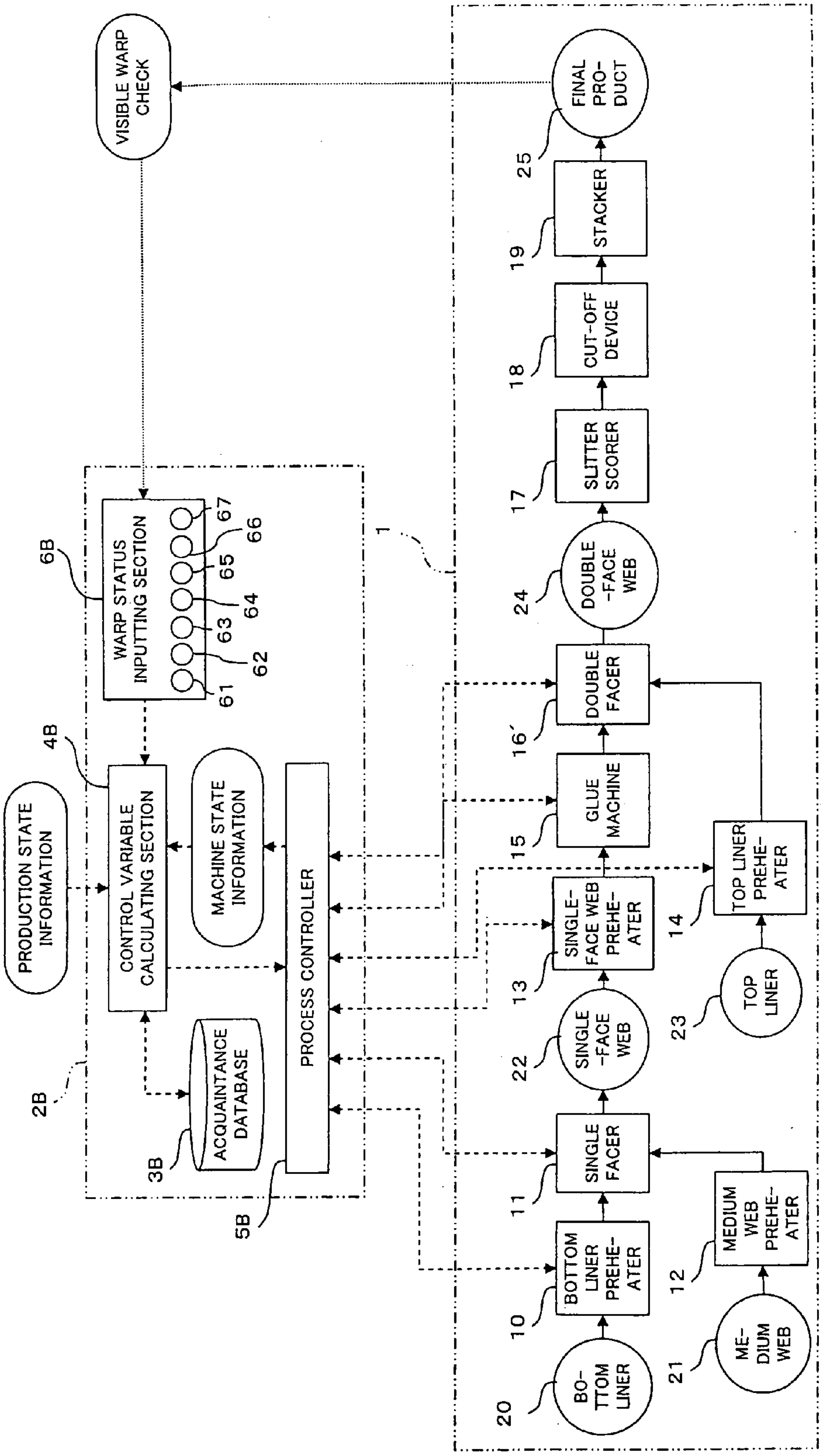
FIG. 30 is a block diagram schematically showing a system for correcting possible warp of a corrugated board sheet according to a thirteenth embodiment of the present invention.

FIG. 30 schematically shows a system for correcting possible warp according to the thirteenth embodiment of the present invention. The system for correcting possible warp of the thirteenth embodiment includes a corrugated-board fabrication machine 1 and a production management machine 2B to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by a medium web preheater 12 and then glue the medium web 21 to the bottom liner 20 heated by the bottom liner preheater 10, a single-face web preheater 13 to heat a single-face web 22 formed by the single facer 11, a top is liner preheater 14 to heat a top liner 23, a glue machine 15 to paste the single-face web 22 heated by the single-face web preheater 13, a double facer 16' to fabricate a corrugated board 24 by gluing the single-face web 22 pasted by the glue machine 15 to a top liner 23 heated by the top liner preheater 14, a slitter scorer 17 to slit and score the corrugated board 24 fabricated by the double facer 16', a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets 25 in a fabricated order.

Among the parts and elements 10-19, the double facer 16' affects a tension distribution in the width direction of a web (is able to adjust a tension distribution in the width direction of a web). The structure of the double facer 16' of this embodiment is partially different from that of the double facer 16 shown in FIG. 4. Hereinafter, the double facer 16' will now be described with reference to FIG. 31. The double facer 16' is divided into an upstream heating section 16A and a downstream cooling section 16B which sections lie along the travel path of a single-face web 22 and a top liner 23. In the heating section 16A, a plurality of hotplates 162 are arranged and a top liner 23 passes on these hotplates 162. Vapor supplied to the inside of each hotplate 162 heats the hotplate 162 to a predetermined temperature.

On the hotplates 162, a loop-shaped press belt 163 interposed by the travel path runs in synchronization with a single-face web 22 and a top liner 23. A plurality of press rolls (press means) 264 are disposed within the loop formed by the press belt 163 so as to be opposite to the hotplates 162 (i.e., in such a posture that the press rolls 264 face the hotplates 162 and that the rotating axis of the press rolls 264 are parallel to the surface of the hotplates 162). Press rolls 264A, which is the upstream half of the press rolls 264, include rotation mechanisms to rotate keeping parallel relationship with the hotplates 162 and change tilt angles of the press rolls 264A with respect to the width direction of a web.

Figure 32:
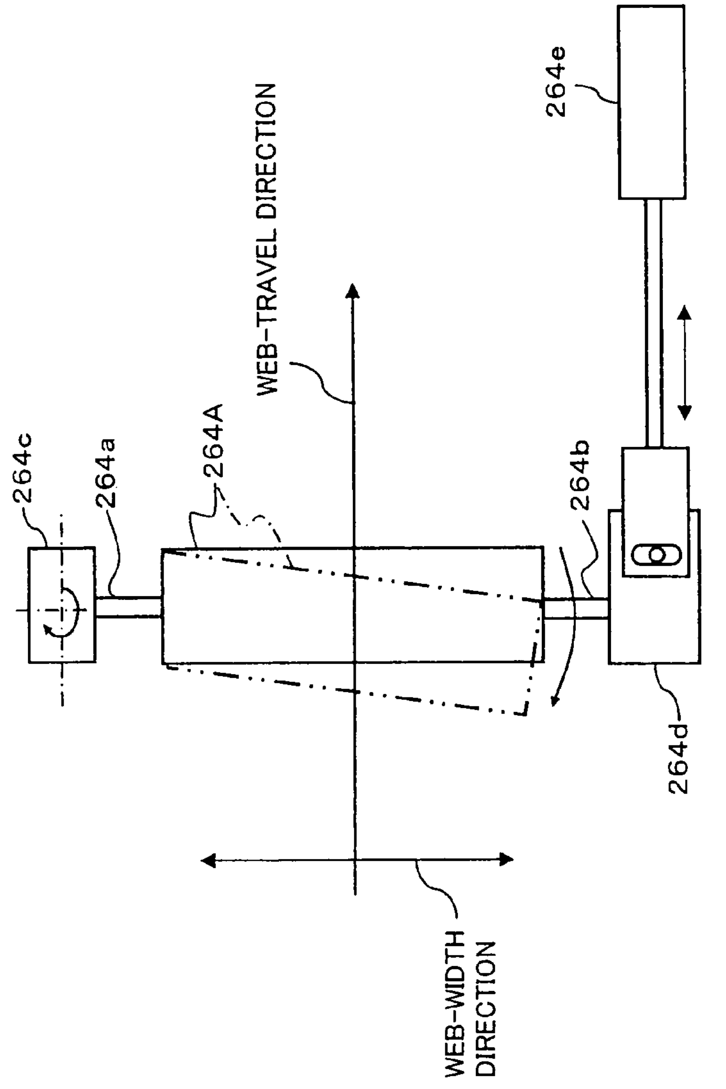
FIG. 32 is a plain view showing a configuration of a press roll in the double facer according to the thirteenth embodiment.

Namely, as shown in plain view FIG. 32, a supporting member 264*c*, which rotatably supports a end 264*a* of one rotating axis of press roll 264A, is rotatably supported around the rotating axis by a non-illustrated frame, and a supporting member 264*d*, which rotatably supports a end 264*b* of the other rotating axis, is swingably connected to the piston rod of a fluid pressure cylinder 264*e*. Variation of the length of the piston rod of the fluid pressure cylinder 264*e* moves the press roll 264A circlewise around the supporting member 264*c* to thereby change the tilt angles with respect to the width direction of a web. A fluid pressure cylinder 264*e* is supported by a non-illustrated frame.

A single-face web 22 pasted in the glue machine 15 is introduced into a space between the press belt 163 and the hotplates 162 so as to be in contact with the press belt 163 while a top liner 23 heated by the top liner preheater 14 is further preheated by the liner entrance preheating roll 165 and is then introduced into the space between the press belt 163 and the hotplates 162 from the hotplates-162 side (so as to be in contact with the hotplates 162). After being introduced into the space between the press belt 163 and the hotplates 162, the single-face web 22 and the top liner 23 pile up to form one body and are transferred to the cooling section 16B. While the single-face web 22 and the top liner 23 are transferred, the single-face web 22 and the top liner 23 are pressed by the pressure rolls 264 being interposed by the press belt 163 and are heated from the top-liner-23 side whereupon the single-face web 22 and the top liner 23 are glued together to form a double-face web 24. The overall width or the edge of the double-faced web 24 is cut by a rotary shear installed at the exit of the cooling section 16B and then the double-faced web 24 is transferred to the slitter scorer 17 at which the ensuing step is to be performed.

The production management machine 2B shown in FIG. 30 appropriately controls a width-direction tension distribution of a corrugated board sheet 25 in order to correct twist warp of corrugated board sheets 25. Focusing on a function for correcting warp of corrugated board sheets 25, the production management machine 2B, as shown in FIG. 30, comprises an acquaintance database 3B, a control variable calculating section 4B, a process controller 5B and a warp status inputting section 6B.

The acquaintance database 3B retains setting values of control variables (adjustment variations from the current values) associated with one or more particular control factors that affect the possible twist warp of a corrugated board sheet 25 which particular control factors are among control factors used to control the corrugated-board fabrication machine 1, or formulae used to determine the control variables that correlate with a twist warp status (a warp pattern and/or a warp amount) of the corrugated board sheet 25. Here, particular control factors are the tilt angles of the press rolls 264A in the above-described double facer 16' and the like.

Figure 33A:
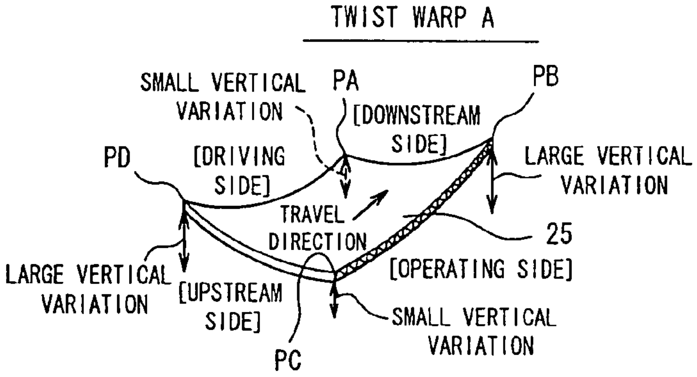
FIG. 33*a* is a perspective view schematically explaining a manner of correcting twist warp and showing types of twist warp according to the thirteenth embodiment.

When a tension on the operating side of a corrugated board sheet 25 is greater than that on the driving side, the corrugated board sheet 25 has twist warp A shown in FIG. 33*a* (resulting in large vertical variation (curl) amounts at the downstream corner PB on the operating side and at the upstream corner PD on the driving side, that is the diagonal corner of the corner PB). Therefore, in order to reduce such twist warp A, the acquaintance database 3B defines a setting value or a setting formula of a control variable for a tilt angle θ (specifically, a stroke amount of the piston rod of the fluid pressure cylinder 264*d*(see FIG. 32)) used to, for example, rotate press rolls 264A from the position indicated by a solid line in FIG. 33*c* to the position indicated by the double-dotted broken line therein (i.e., to move the operating side of the press roll 264A downstream with respect to the rotating axis) so that the tension on the operating side of the corrugated board sheet 25 is reduced.

Figure 33B:
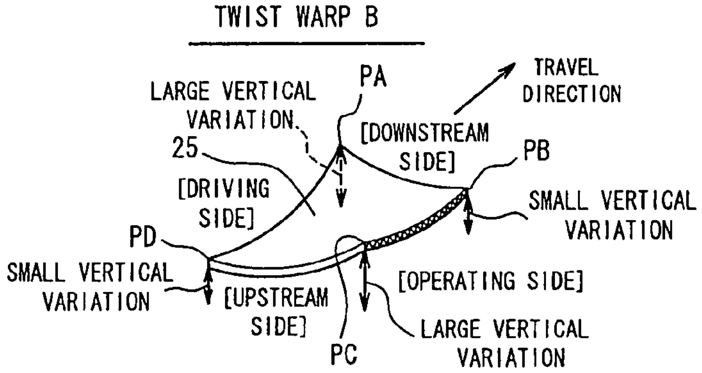
FIG. 33*b* is a perspective view schematically explaining a manner of correcting twist warp and showing types of twist warp according to the thirteenth embodiment.
Figure 33C:
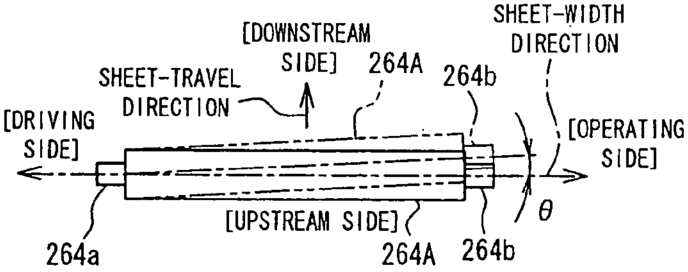
FIG. 33*c* is a plain view schematically explaining a manner of correcting twist warp and showing a press roll according to the thirteenth embodiment.
Figure 33D:
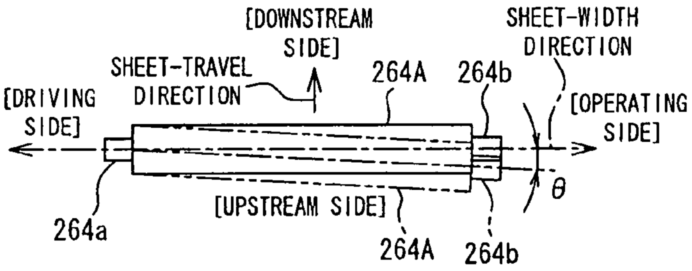
FIG. 33*d* is a plain view schematically explaining a manner of correcting twist warp and showing a press roll according to the thirteenth embodiment.

On the other hand, when a tension on the driving side of a corrugated board sheet 25 is greater than that on the operating side, the corrugated board sheet 25 has twist warp B shown in FIG. 33*b* (resulting in large vertical amounts at the downstream driving-side corner PA and at the upstream operating-side corner PC, that is diagonal corner of the corner PA). Therefore, in order to reduce such twist warp B, the acquaintance database 3B defines a setting value or a setting formula of a control variable of a tilt angle θ used to, for example, rotate a press roll 264A from the position indicated by a solid line in FIG. 33*d* to the position indicated by the double-dotted broken line therein (i.e., to move the operating side of the press rolls 264A upstream with respect to the rotating axis 264*a*) so that the tension on the operating side of the corrugated board sheet 25 is increased.

FIG. 34 shows the configuration of the acquaintance database 3B according to this embodiment. Here, six warp status types of twist warp A (large), twist warp A (medium), twist warp A (small), twist warp B (large), twist warp B (medium) and twist warp B (small) are set corresponding to the number of push buttons that are to be described later. For each of the warp status types, a tilt angle θ of the press rolls 264A, which angle serves as a particular control factor, is controlled.

Specifically, a triangle, a circle and a double circle represent largeness of control variables (adjustment variations from the current values). When the three marks of the same control factor are compared, a circle represents a larger control variable than a triangle and a double circle represents a larger control variable than a circle (Δ<○<◎). Accordingly, in this embodiment, if a corrugated board sheet 25 has small twist warp A, the tilt angle θ is adjusted such that the operating side of the press roll 264A comes forward (moves downstream in the travel direction); if a corrugated board sheet 25 has medium twist warp A, the tilt angle θ is adjusted such that the operating side of the press roll 264A comes forward more than the case of small twist warp A; and if a corrugated board sheet 25 has large twist warp A, the tilt angle θ is adjusted such that the operating side of the press roll 264A comes forward more than the case of medium twist warp A. Definite adjustment setting values and setting formulae are defined by experiments and simulations.

In this embodiment, a warp status of a corrugated board sheet 25 is manually input to the warp status inputting section (warp status information obtaining means) 6 by an operator. The warp status inputting section 6B includes six push buttons 61 (large twist warp A (large warp)), 62 (medium twist warp A (medium warp)), 63 (small twist warp A (small warp)), 65 (large twist warp B (large warp)), 66 (medium twist warp B (medium warp)) and 67 (small twist warp B (small warp)), each of which associates with a warp status classified by the acquaintance database 3, and a reset button 64. An operator depressing a corresponding button inputs a selection signal to the control variable calculating section 4B. A warp status of a corrugated board sheet 25 is determined by an operator as a result of visual observation on the corrugated board sheet 25 stacked in the stacker 19.

The control variable calculating section 4B retrieves and reads a setting variable or a formula to deriver the variable of each corresponding control factor from the acquaintance database 3B on the basis of the selection signal received from the warp status inputting section 6B, and calculates each of the control variables associated with a machine state (a running state) of the corrugated-board fabrication machine 1. In the illustrated embodiment, the control variable calculating section 4B and the acquaintance database 3B serve the control variable calculating means of the present invention.

A machine state represents the current values of a running speed of the corrugated-board fabrication machine 1 (a travel rate of a web), a tilt angle θ of the press roll 264A and so on. These values of the machine state are input from the process controller 5B, which is to be described later.

When the reset button 64 is selected in the warp status inputting section 6B, the control variable calculating section 4B instructs the process controller 5B to return all the control factor to the originals (values determined by matrix control based on production state information such as a base-board composition, a basis weight of the base board, the width of a corrugated board sheet, a flute and the like).

The process controller 5B overall controls each of the elements 10-19 that constitute the corrugated-board fabrication machine 1. The process controller 5B usually controls each of elements 10-19 by performing matrix control based on production state information. However, when one from the push buttons 61-63 and 65-57 is depressed in the warp status inputting section 6A, the process controller 5 controls each of the control factors (here, the tilt angle θ of the press rolls 264A) using one or more control variables calculated in the control variable calculating section 4B. When the reset button 64 is depressed, the process controller 5B controls elements 10, 13, and 14 to return all the control factors to the originals. The process controller 5B always grasps a current machine state of the corrugated-board fabrication machine 1, and outputs the current machine state to the control variable calculating section 4B regularly or in response to a request from the control variable calculating section 4B. Namely, the process controller 5B serves the control means and the running-state information obtaining means of the present invention.

Figure 35:
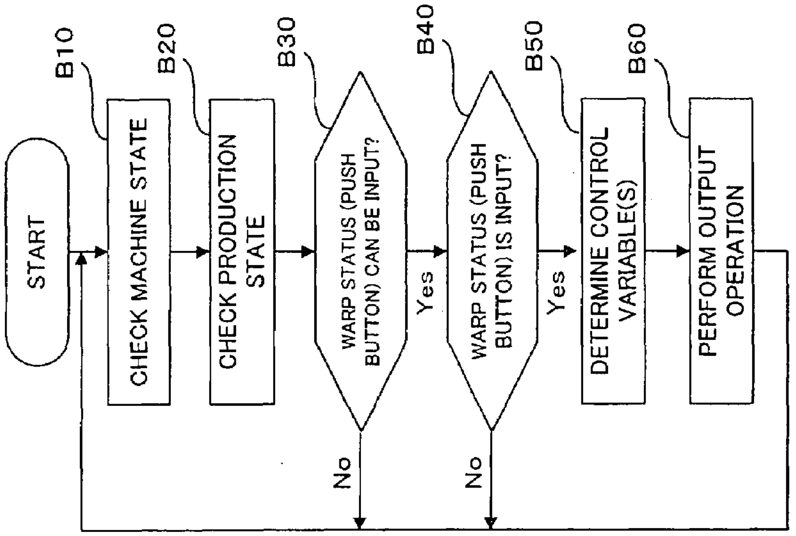
FIG. 35 is a flow diagram illustrating a succession of procedural steps for correcting warp according to the thirteenth embodiment.
Figure 36:
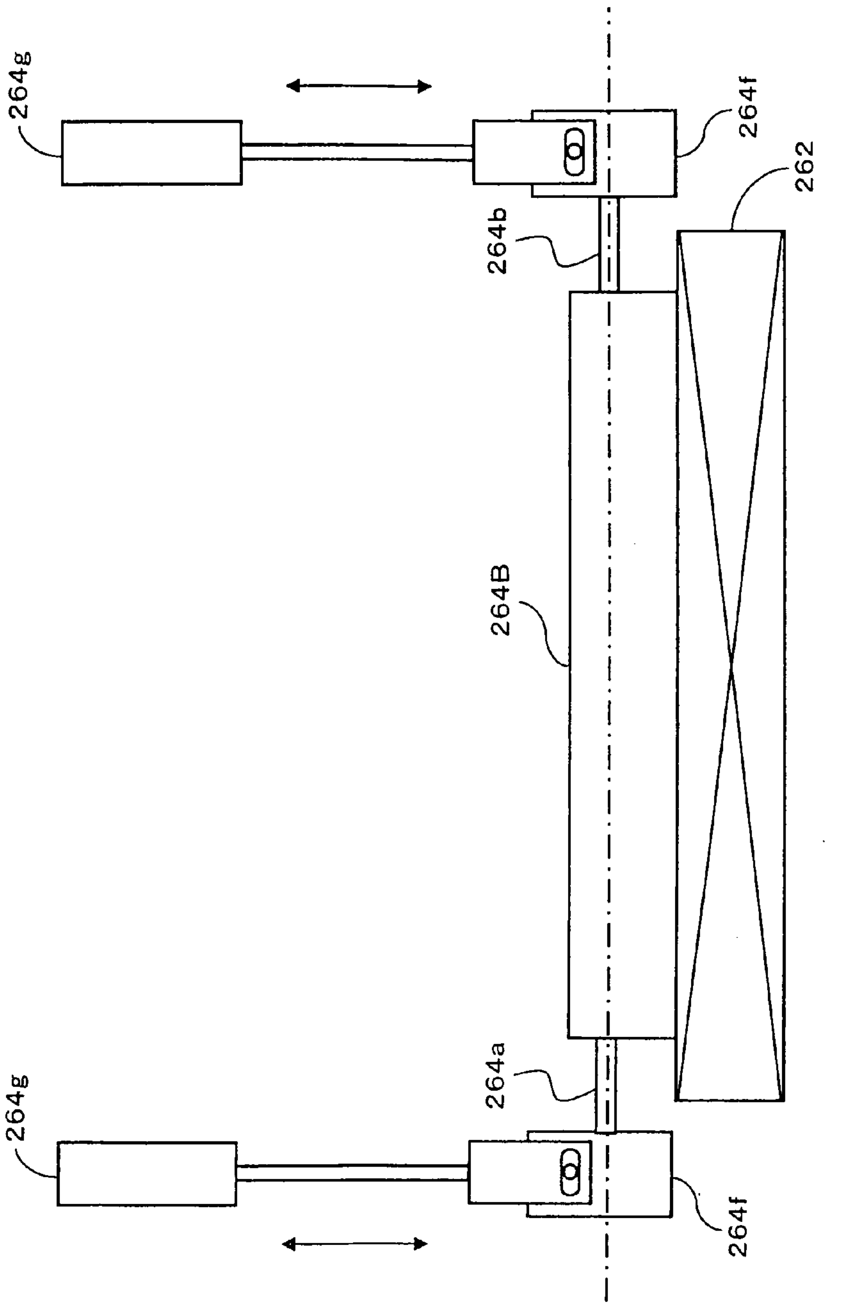
FIG. 36 is a front view (seen from web-travel direction) schematically showing a press roll of a double facer according to a fourteenth embodiment of the present invention.

The flow diagram in FIG. 35 describes a succession of procedural steps of correcting warp of a corrugated board sheet 25 using the above-described functions of the production management machine 2B.

First of all, the production management machine 2B checks a machine state at step B10 and checks a production state at step B20. In the ensuing step B30, the production management machine 2 judges whether or not a warp status can be currently input (one from the push button 61-67 can be input). The judgment is made so as not to correct warp while another trouble arises because warp correction is useless when such problem, e.g., a low rate of web travel due to an excessively strong adhesive, arises.

If a warp status can be input at step B30, the production management machine 2B judges whether or not a warp status has been actually input at step B40. If a warp status has been input, the production management machine 2B calculates a control variable of each control factor (here, the tilt angle θ of the press rolls 264A) to be controlled in accordance with the input warp status by referring to the acquaintance database 3B on the basis of the machine state information obtained in step B10, at step B50. At that time, the production state information obtained in step B10 may be used as reference data in order to, for example, change the tilt angle θ in accordance with the base paper composition (thick paper, thin paper) that is data obtained in step B20. The production management machine 2B outputs the calculated control variable to the corresponding element at step B60.

According to the system for correcting possible warp of a corrugated board sheet of the first embodiment, the tilt angle θ of the press rolls 264A which angle affects twist warp of a corrugated board sheet 25 is automatically adjusted by the production management machine 2B in response to an operator visually judging a warp status of a corrugated board sheet 25 fabricated in the corrugated-board fabrication machine 1 and simply depressing one of buttons 61-63 and 65-67, the one corresponding to a warp status. Thereby, it is possible to accurately correct warp of corrugated board sheets with ease without depending on experience and know-how of an operator.

In this thirteenth embodiment, the tilt angle θ of the press rolls 264A is explained as a control factor to correct possible warp of corrugated board sheets 25. The tilt angle θ is only an example, and a greater number of control factors to be controlled may be used likewise in the following fourteenth embodiment.

Further, in the illustrated example, the tilt angle θ of the half of the press rolls 264A can be changed. However, a satisfactory double facer 16' has at least one press the tilt angle of which can be changed.

(C-2) Fourteenth Embodiment

Figure 31:
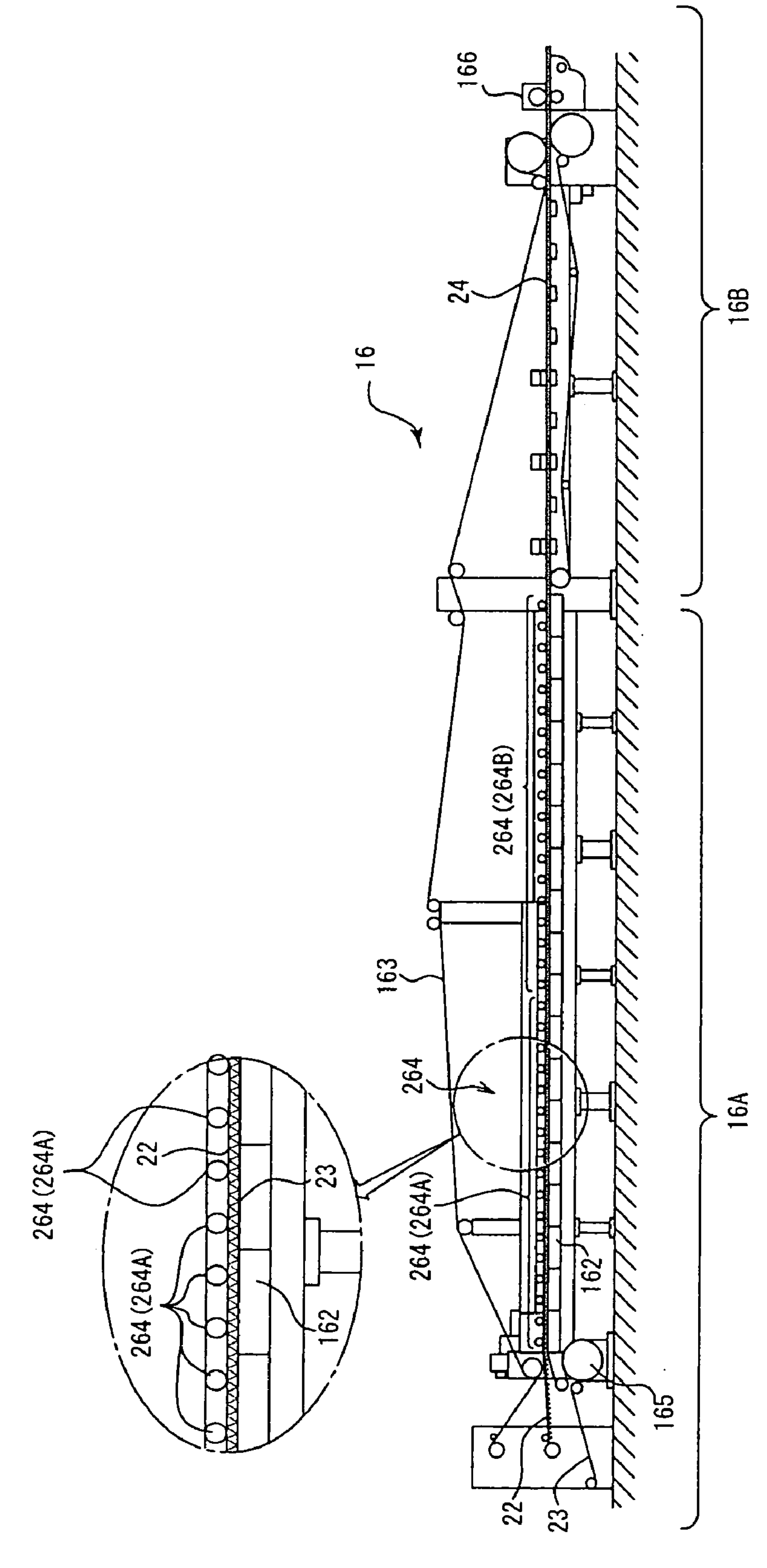
FIG. 31 is a schematic diagram showing a configuration of a double facer according to the thirteenth embodiment.

A corrugated-board fabrication system according to the present embodiment includes, differently from the thirteenth embodiment, a pressure variable mechanism to vary a pressure to be applied to a web in the web-width direction at the each downstream press roll 264B of the double facer 16' shown in FIG. 31. Namely, as shown in the front view FIG. 36, supporting members **264*f* and 264*f* respectively support the ends 264*a* and 264*b* of the rotating axis of each press roll 264B are swingably fixed to the ends of piston rods of fluid pressure cylinders 264*g***, which are attached to a frame (not shown).

With this structure, an increase in fluid pressure to be applied to the fluid pressure cylinder **264*g* arranged on the driving side increases pressure applied to the driving side of a single-face web 22 and a top liner 23 being transferred in the double facer 16' and thereby increases driving-side tensions of the webs 22 and 23. In the same manner, an increase in fluid pressure to be applied to the other fluid pressure cylinder 264*f* arranged on the operating side increases pressure applied to the operating side of the webs 22 and 23 and thereby increases driving-side tensions of the webs 22 and 23. The fluid pressure to be applied to each fluid pressure cylinder 264*f* is controlled by adjusting a pressure adjusting valve placed at a pipe to provide the fluid pressure cylinder 264*f*** with fluid.

Table FIG. 37 illustrates the configuration of an acquaintance database 3B according to the fourteenth embodiment of the present invention.

Focusing on warp correction, a width-direction distribution of a pressure to be applied to the above press rolls 264B is assigned as a particular control factor in addition the control factors used in the thirteenth embodiment. Here, a priority order of control factors to be output is determined in association with each of the above-described push buttons (i.e., a warp status of a corrugated board sheet 25). The priority order represents an output order. For example, if a corrugated board sheet 25 has small extent warp, only control factors of higher priority order are output; and other control factors are determined to be sequentially output in the priority order as warp extent becomes larger. A priority order gives a control factor having a greater effect on warp, in other words, a control factor having a higher capability of warp correction, a higher priority.

Specifically, an adjustment of the tilt angle θ of the press rolls 264A is given the first priority and an adjustment of the width-direction distribution of a pressure from the press rolls 264B is given the second priority. When a corrugated board sheet 25 has small twist warp A, the tilt angle θ of the press rolls 264A is adjusted such that the operating side of the press rolls 264A come forward in order to decrease an operating-side tension of the corrugated board sheet 25 or increase a driving-side tension. When a corrugated board sheet 25 has medium twist warp A, an adjustment amount of the tilt angle θ is increased and concurrently the pressures applied by the driving side of the press rolls 264B are also increased; and when the twist warp A is large, the adjusting amounts (control variables) of both the tilt angle and the applied pressures are increased.

Conversely, when a corrugated board sheet 25 has small twist warp B, the tilt angle θ of the press rolls 264A is adjusted such that the operating side of the press rolls 264A comes backward in order to increase an operating-side tension of the corrugated board sheet 25 or to decrease a driving-side tension. When a corrugated board sheet 25 has medium twist warp B, the adjustment amount of the tilt angle θ is increased and concurrently the pressures applied by the operating side of the press rolls 264B are also increased; and the twist warp B is large, the adjustment amounts of both the tilt angle θ and the applied pressures are increased.

A control variable of a particular control factor that has been selected in the above manner is calculated by the control variable calculating section 4B. In the illustrated embodiment, the control variable calculating section 4B and the acquaintance database 3B serve as the control factor selecting means and the control variable calculating means of the present invention.

According to the system for correcting possible warp of a corrugated board sheet of this embodiment, since one or more control factors are selected in accordance with an extent of warp (here, one or more control factors are additionally selected in accordance with a priority order, considering an extent of warp of a corrugated board sheet 25), it is possible to accurately correct warp irrespective of a warp extent. In particular in this embodiment, it is possible to correct warp of a corrugated board sheet 25 faster by providing a control factor that more largely affects the warp with a higher priority.

As a substitute for the press rolls 264A and/or the press rolls 264B, a plurality of press units (press means) each of which is formed by a shoe and an actuator (e.g., a fluid pressure cylinder) to press the shoe onto a hotplates 162 may be disposed along the direction of the width of a web. It is possible to adjust web-width-direction pressures that is to be applied to a single-face web 22 and a top liner 23 against the hotplates by individually controlling the actuators arranged along the web width direction. Whereupon the width-direction tension distribution can be adjusted.

(C-3) Fifteenth Embodiment

Next, the fifteenth embodiment of the present invention will now be described. The corrugated-board fabrication machine 1 of this embodiment includes a wrap roll 41 for a single-face web 22 (wrap roll for a single face web) shown in FIG. 22 in addition to elements and parts of the corrugated-board fabrication machine 1 included in the fourteenth embodiment. In the illustrated embodiment, the wrap roll 41 for a single-face web is disposed between the single-face web preheater 13 and the glue machine 15.

As already described with reference to FIG. 22, the guide rolls 41*a* and 41*b* are arranged close to the wrap roll 41 for a single-face web and are disposed upstream and downstream of the wrap roll 41 for a single-face web. A single-face web 22 travels the space between the wrap roll 41 for a single-face web and each of the guide rolls 41*a* and 41*b* so as to wrap around the wrap roll 41 for a single-face web. The both ends of the rotating axis of the wrap roll 41 for a single-face web are respectively connected to piston rods of non-illustrated fluid pressure cylinders in the same manner as the press rolls 264B of the double facer 16' so that the heights of the both ends cab be individually changed. With this structure, for example, an upward movement of the driving-side end of the rotating axis in FIG. 22 increases a web tension on the driving side; conversely, a downward movement of the operating side of the rotating axis in FIG. 22 increases a web tension of the operating side.

One guide roll 41*a* is fixed to the tip of an arm 41*c*, which is swingably attached to the axis of the wrap roll 41 for a single-face web. The arm 41*c* is driven by a non-illustrated motor, and a combination of the guide roll 41*a* and the non-illustrated motor serves as a wrap amount adjusting unit. In other words, when the motor drives the arm 41*c* to turn the guide roll 41*a*, a wrap amount of a single-face web 22 around the wrap roll 41 for a single-face web is adjusted. An increase of the above wrap amount increases the running resistance of the single-face web 22 so that the travel-direction tension of the entire width of the single-face web 22 is increased. On the other hand, a decrease of the above wrap amount reduces the travel-direction tension of the entire width of the single-face web 22.

Further, the transfer path of a top liner 23 may include the same wrap roll as the wrap roll 41 at an upstream point of the double facer 16'. Any position upstream of the glue machine 15 is satisfactory to place the wrap roll 41 for a single-face web.

FIG. 38 shows the configuration of an acquaintance database 3B according to the fifteenth embodiment of the present invention.

Focusing on warp correction, in the present embodiment, the heights of the both ends of the rotating axis of the wrap roll 41 for a single-face web are assigned as particular control factors in addition to each control factor of the fourteenth embodiment. When a corrugated board sheet 25 has twist warp A, an adjustment of the tilt angle θ of the press rolls 264A is given the first priority; an adjustment of the heights of the both ends of the rotating axes of the press rolls 264B is given the second priority; and an adjustment of the heights of the both ends of the rotating axis of the wrap roll 41 is given the third priority. The remaining configuration is identical that of the thirteenth embodiment, so repetitious description is omitted here.

According to the system for correcting possible warp of a corrugated board sheet of this embodiment, the above control factors that are larger in number than the fourteenth embodiment can realize management more detail than the fourteenth embodiment whereupon warp of a corrugated board sheet 25 can be corrected further accurately.

(C-4) Sixteenth Embodiment

Figure 39:
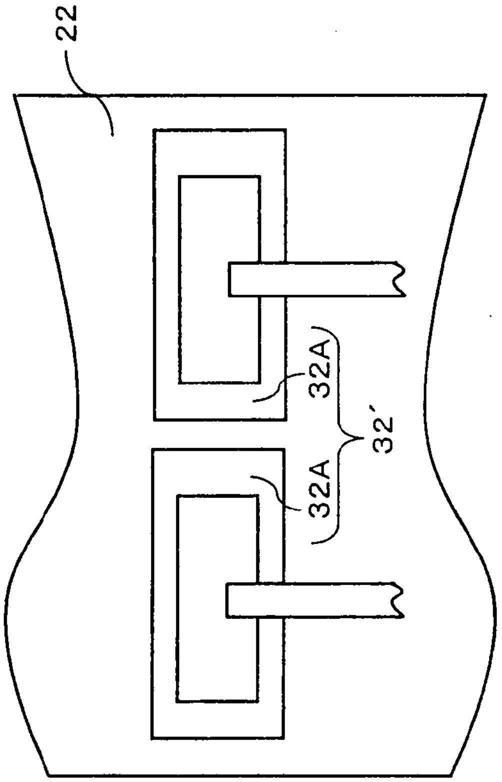
FIG. 39 is a plain view schematically showing a suction brake for a single-face web according to the fifteenth embodiment.

A sixteenth embodiment of the present invention will now be described. FIG. 39 is a plain view schematically showing a suction brake for a single-face web according to the sixteenth embodiment.

In addition to the corrugated-board fabrication machine 1 of the fifteenth embodiment, the corrugated-board fabrication machine 1 of the present embodiment further includes a suction brake 32' for a single-face web shown in FIG. 39. Dividing the suction brake 32, which has been described with reference to FIG. 19, in the width direction forms the suction brake 32'. The side shape of the suction brake 32' is identical to that of the suction brake 32 shown in FIG. 19.

As described above, a suction brake affects suction force, serving as braking force, on a traveling single-face web 22 and is included in a conventional corrugated-board fabrication machine. A single suction brake has been conventionally arranged for a single-face web and braking force (suction force) thereof cannot have been adjusted in accordance with the width direction of a web.

On the other hand, the suction brake 32' for a single-face web of this embodiment is formed by a plurality (here, two) of suction boxes 32A arranged in the web width direction as shown in FIG. 39. Each of the suction boxes 32A is arranged such that a suction opening 32*a* (see FIG. 19), which is connected to a non-illustrated suction source, faces to travel path of a single-face web 22. The process controller 5B individually controls, for example, an opening amount of a valve disposed on a suction line between each suction box 32A and the suction source to adjust a distribution of a travel-direction tension of the driving side of a single-face web 22. Specifically, an increase of driving-side suction force of the suction brake 32' for a single-face web increase a travel-direction tension of the driving side of a single-face web 22; and an increase of operating-side suction force of the suction brake 32' for a single-face web increase a travel-direction tension of the operating side of a single-face web 22.

Table FIG. 40 shows the configuration of an acquaintance database 3B according to the sixteenth embodiment.

Focusing on warp correction, the present embodiment further includes, as a particular control factor, a distribution of braking force of the suction brake 32' for a single-face web in addition to the control factors of the fifteenth embodiment.

When a corrugated board sheet 25 has twist warp A, for example, an adjustment of the tilt angle θ of the press rolls is given the first priority; an adjustment of a width-direction distribution of pressure applied by the press rolls 264B is given the second priority; an adjustment of the heights of the both ends of the rotating axis of the wrap roll 41 is given the third priority; and an adjustment of braking force of the suction brake 32' is given the fourth priority. The remaining configuration is identical to that of the thirteenth embodiment, so repetitious description is omitted here.

According to the system for correcting possible warp of a corrugated board sheet of this embodiment, the above control factors that are larger in number than the fifteenth embodiment can realize management more detail than the fifteenth embodiment whereupon warp of a corrugated board sheet can be corrected further accurately.

(C-5) Seventeenth Embodiment

A seventeenth embodiment of the present invention will now be described. This embodiment is featured by means to obtain information in relation to a warp status of a corrugated board sheet 25 and the remaining configuration is identical to that of the thirteenth embodiment.

Figure 41:
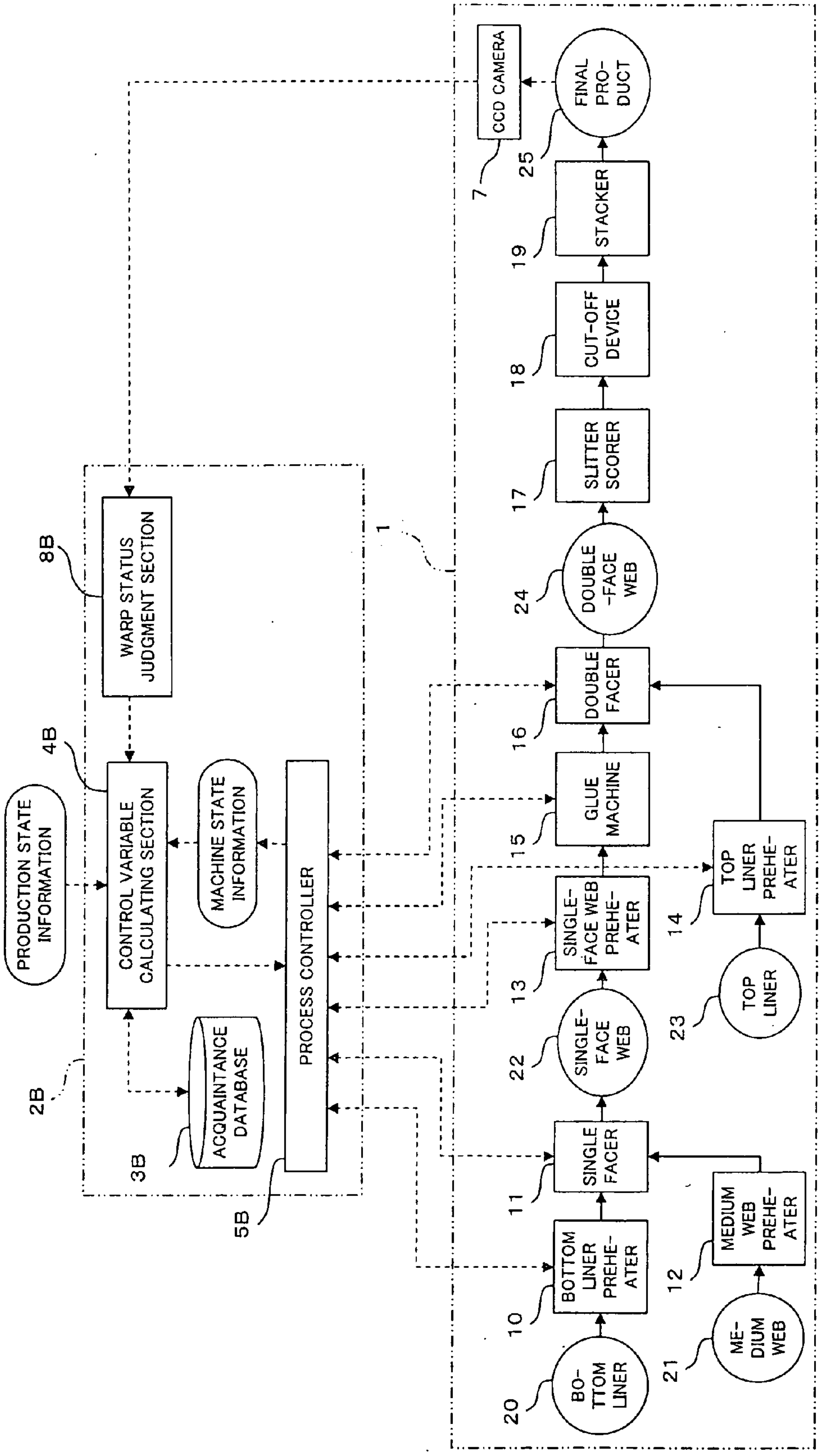
FIG. 41 is a block diagram schematically showing a system for correcting possible warp of a corrugated board sheet according to a seventeenth embodiment of the present invention.

As shown in FIG. 41, the production management machine 2B of this embodiment comprises a warp status judgment section 8A as a substitute for the warp status inputting section (push buttons) 6B of the thirteenth embodiment. Two CCD cameras (imaging means) 7 are arranged at the rearmost section of the corrugated-board fabrication machine 1.

Figure 42:
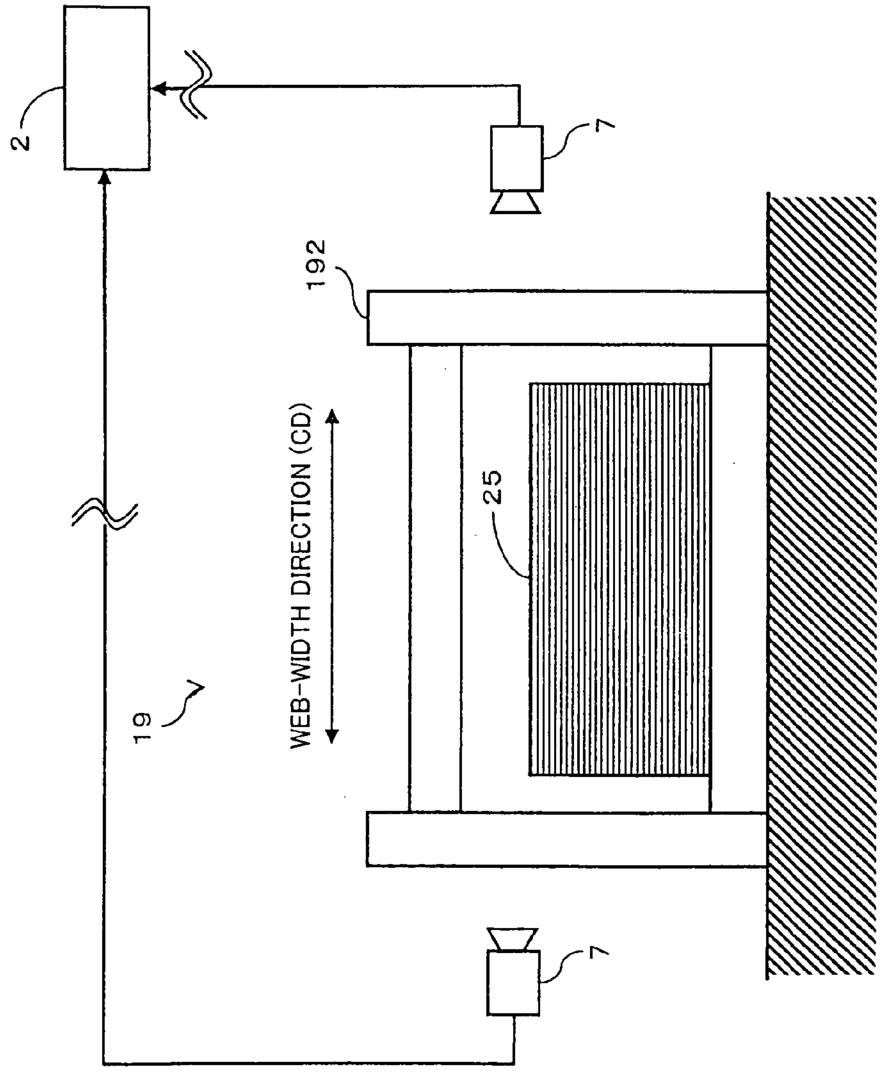
FIG. 42 is a diagram schematically showing corrugated-board warp status obtaining means according to the seventeenth embodiment.

As shown in FIG. 42, the CCD cameras 7 are arranged at the both ends of the width direction of a stacking section 192 of the stacker 19. Corrugated board sheets 25 formed by being cut by the cut-off device 18 are transferred by a plurality of non-illustrated conveyors 191, and then subsequently piled in the stacking section 192. The respective CCD cameras 7 photograph corrugated board sheets 25 from the respective different sides along the width direction thereof and output the image data to the warp status judgment section 8B.

The warp status judgment section 8B performs image processing on the image data and measures the heights of the four corner points. Then, on the basis of the differences of the measured heights, the warp status judgment section 8B judges a pattern of twist warp (twist warp A or twist warp B) and an extent of warp (large, medium or small). The result of the judgment is sent to the control variable calculating section 4B, which refers to the acquaintance database 3B based on the judgment result in order to respond to machine state information and to calculate a control variable of each particular control factor.

Figure 43A:
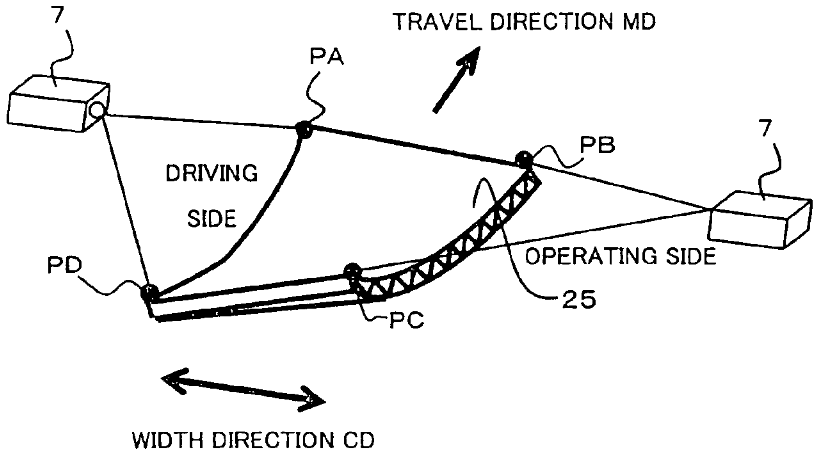
FIG. 43*a* is a perspective diagram showing a manner of obtaining warp status information of a corrugated board sheet according to the seventeenth embodiment when imaging a corrugated board sheet using a CCD camera (imaging means)
Figure 43B:
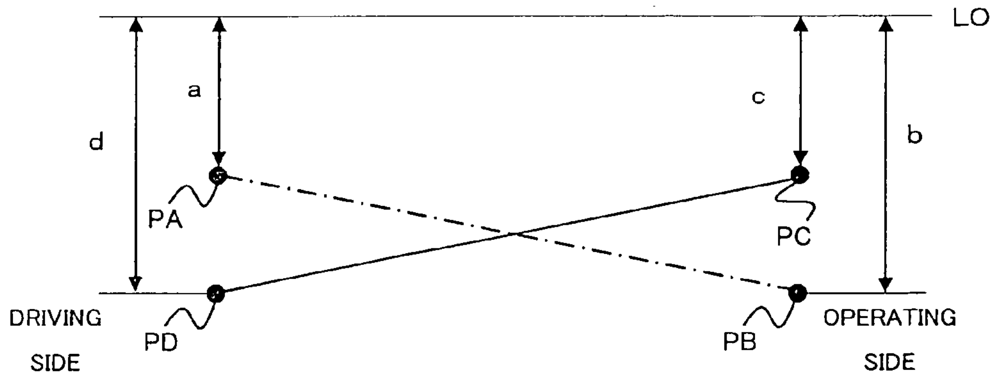
FIG. 43*b* is a front view schematically showing a warped corrugated board sheet to explain a manner of obtaining a warp status of the corrugated board sheet.

Here, the specific manner of judgment of warp status performed by the warp status judgment section 8B will be described with reference to FIGS. 43*a* and 43*b*. As shown in FIG. 43*a*, the CCD cameras 7 photograph corrugated board sheets 25 from the both sides of the width direction respectively. Then the warp status judgment section 8B performs image processing on image data from the CCD cameras 7 and calculates vertical variation amounts a-d of the four corner points PA-PD of the corrugated board sheet 25 with respect to the reference line L0 shown in FIG. 43*b*.

The warp status judgment section 8B calculates an amount TWF of twist warp defined by the following formula (11) by using the vertical variation amounts a-d. The warp pattern is determined by positiveness and negativeness of the warp amount TWF, and the warp height is determined by the largeness of the absolute value of the warp amount TWF.

$$TWF=\left[\frac{(b-a)+(d-c)}{2}\right]\times\frac{\alpha}{W\times L} \tag{11}$$

where, W represents the length of the width of a corrugated board sheet 25, L represents the length of the travel direction of a corrugated board sheet 25, and α is a constant used to make a warp amount dimentionless.

In the system for correcting possible warp of a corrugated board sheet according to this embodiment, twist warp of a corrugated board sheet 25 is automatically corrected so that it is possible to accurately correct twist warp of corrugated board sheets 25 with ease without depending on experience and know-how of an operator. In the illustrated example, the usage of the acquaintance database 3B according to the ninth embodiment classified a determined warp extent into large, medium and small. It is possible for this system to determine a warp extent more sensitively so that warp of a corrugated board sheet 25 can be corrected more accurately.

(C-6) Eighteenth Embodiment

Figure 44:
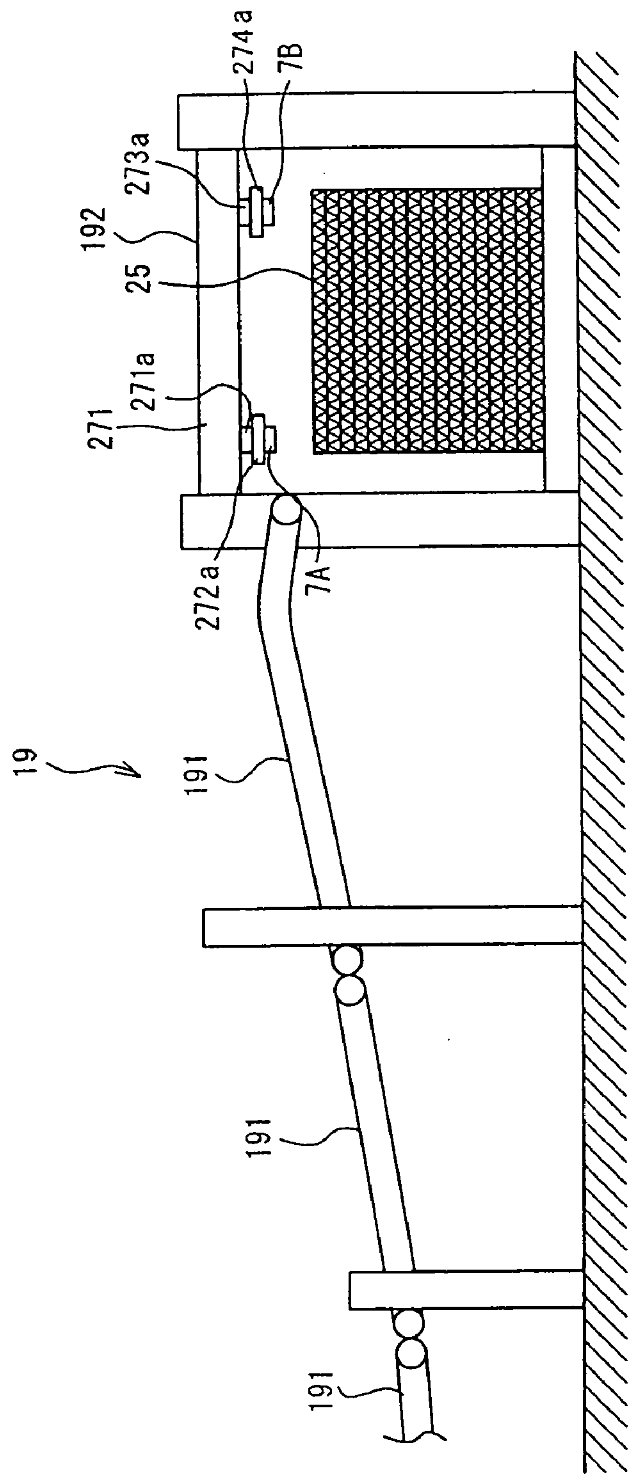
FIG. 44 is a schematic diagram showing a corrugated-board warp status obtaining means according to an eighteenth embodiment.
Figure 45:
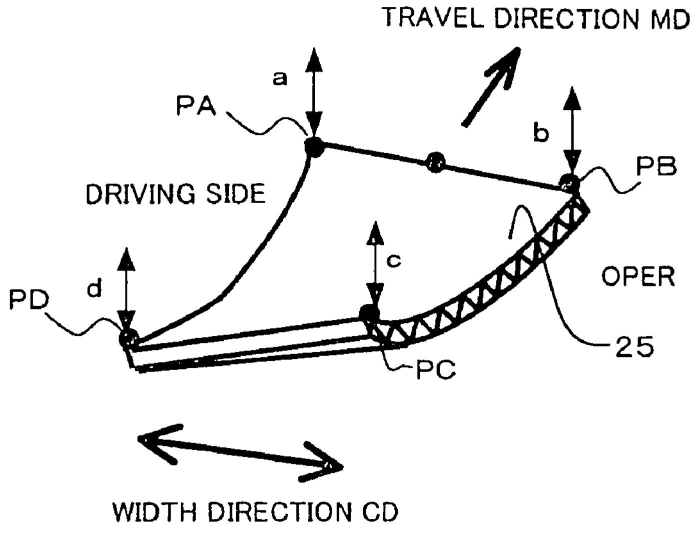
FIG. 45 is a schematic diagram illustrating a manner of obtaining a warp status of a corrugated board sheet according to the eighteenth embodiment.

FIG. 44 schematically shows the main part of a warp detection unit according to the present embodiment.

In the above seventeenth embodiment, the warp status judgment section 8B detects a warp status of a corrugated board sheet 25 on the basis of image data obtained by the CCD cameras 7. In the present embodiment, the two CCD cameras (imaging means) 7 are substituted by two variation sensors (variation amount detecting means) 7A and 7B, and the warp status judgment section 8B detects a warp status of a corrugated board sheet on the basis of measurement data obtained by the variation sensors 7A and 7B.

As shown in FIG. 44, the variation sensor 7A is slidably attached to a rail 271*a*, which horizontally extends along the width direction of a corrugated board sheet 25, through a variation sensor mounting member 272*a*. The variation sensor 7A includes non-illustrated driving means and, within the above structure, is driven by the driving means so that the variation sensor 7A can horizontally moves along the width direction of a corrugated board sheet 25 and can be controlled to be positioned vertically over measurement points PC and PD respectively near the two upstream corners of a corrugated board sheet 25 shown in FIG. 45. As a result, it is thereby possible to obtain vertical variation amounts c and d between the variation sensor and each of the points PD and PC, respectively.

The other variation sensor 7B is, as shown in FIG. 44, slidably attached to a rail 273*a*, which is mounted to a frame 271 and which horizontally extends along the width direction of a corrugated board sheet 25, through a variation sensor mounting member 274*a*, which includes non-illustrated driving means. The variation sensor 7B is driven by the driving means and can horizontally moves in the width direction of a corrugated board sheet 25. As a result, the variation sensor 7B is controlled to be positioned vertically over measurement points PA and PB respectively near the two downstream corners of a corrugated board sheet 25 shown in FIG. 45 and can obtain vertical variations a and b between the variation sensor and each of the points PA and PB, respectively.

The warp status judgment section 8B calculates an amount of twist warp by using the above formula (11).

The remaining configuration is identical to that of the seventeenth embodiment, so repetitious description is omitted here.

In order to detect twist warp, obtaining variation amounts in vertical direction of the measurement points PA-PD near the four corners of a corrugated board sheet 25 is satisfactory. Alternatively, a variation sensor may be fixed to a position over each of the measurement points PA-PD.

In the present embodiment, the variation sensors detect variation amounts of the vertical direction of a corrugated board sheet 25 at the stacking section 192 of the stacker 19. Alternatively, it is sufficient that a variation sensor obtains variation amounts in the vertical variation of a corrugated board sheet the overall width of which has been cut by the cut-off device 18 to serve as a final product. In other words, satisfactory detection is performed on a corrugated board sheet 25 at any point down stream of the cut-off device 18. For example, variation sensors may be disposed on the conveyer 191 (see FIG. 44) arranged between the cut-off device 18 and the stacker 19, so that the detection is performed on a corrugated board sheet 25 being transferred on the conveyer.

(C-7) Others

The thirteenth to the eighteenth embodiments have been described above. But the present invention should by no means be limited to these thirteenth to eighteenth embodiments and various modifications and alteration can be suggested without departing from the gist of the present invention.

For example, the seventeenth embodiment shown in FIG. 41 includes the warp status judgment section 8B and the CCD camera (imaging means) 7 as substitute for the warp status inputting section (push buttons) 6B of the thirteenth embodiment shown in FIG. 30. The eighteenth embodiment shown in FIGS. 44 and 45 includes the warp status judgment section 8B and the variation sensors (variation amount detecting means) 7A and 7B as substitute for the warp status inputting section (push buttons) 6B of the thirteenth embodiment. Alternatively, the fourteenth through the sixteenth embodiments may be modified so as to include the warp status judgment section 8B and the CCD camera (imaging means) 7 as substitute for the warp status inputting section (push buttons) 6B or so as to include the warp status judgment section 8B and the variation sensors (variation amount detecting means) 7A and 7B as substitute for the warp status inputting section (push buttons) 6B.

The particular control factors should by no means be limited to those used in the foregoing embodiments, and another control factor that affects a width-direction distribution of a tension of a single-face web 22 or a top liner 23 can be used as a control factor to correct possible warp of a corrugated board sheet 25. The configurations of the acquaintance databases 3B described in the thirteenth and the fourteenth embodiment are therefore only examples and the acquaintance database 3 can be set up in accordance with particular control factors that are to be used. Also priority order thereof should by no means be limited to those set in the foregoing embodiments and can be arbitrarily decided.

(D)

Hereinafter, systems for correcting possible warp of a corrugated board sheet according to a nineteenth to a twenty-fifth embodiments and modifications thereof of the present invention will now be described with reference to FIGS. 46-58. Parts and elements identical to those described in the foregoing embodiments are to be referred by the same reference numbers and description thereof will be partially omitted.

(D-1) Nineteenth Embodiment

Figure 46:
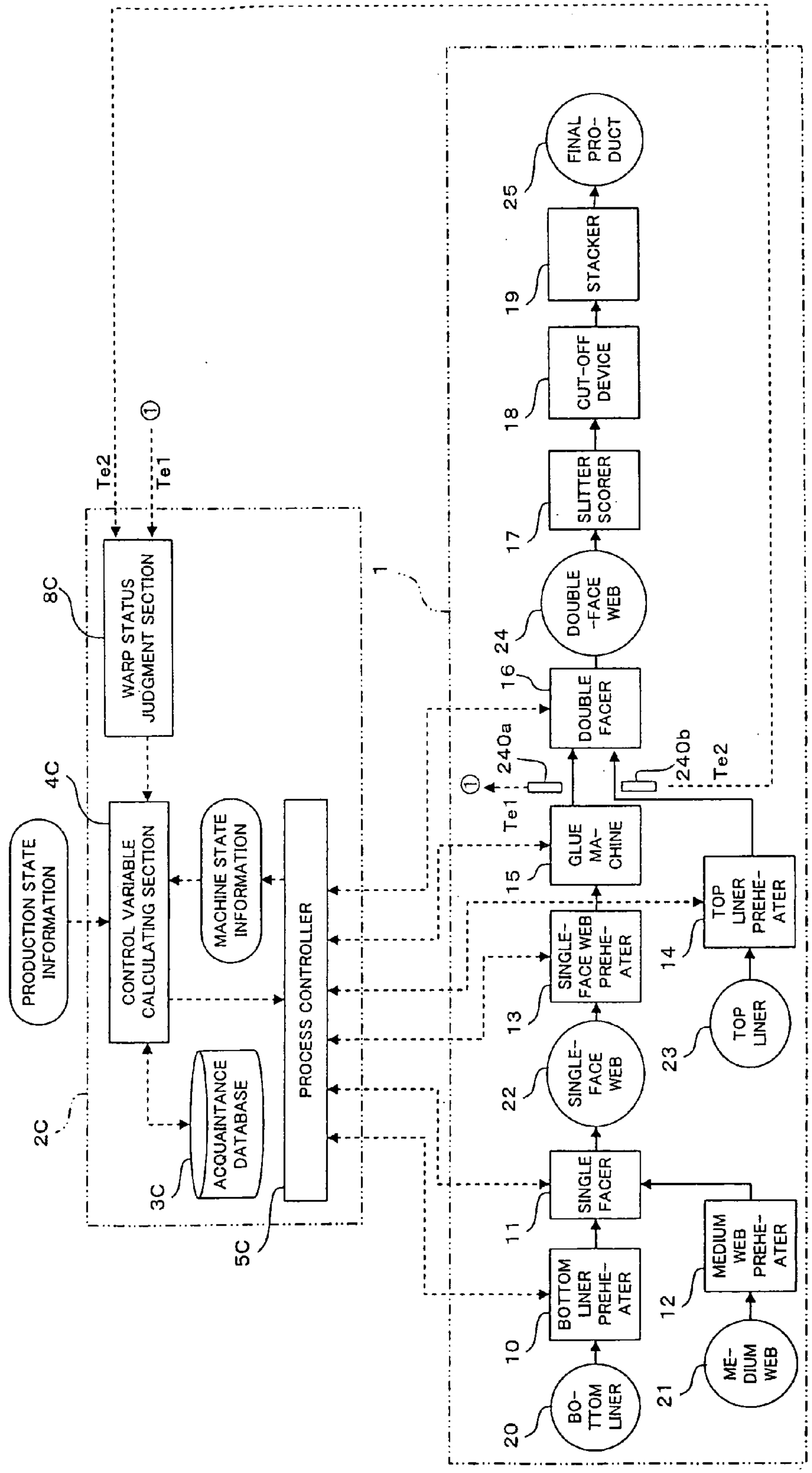
FIG. 46 is a block diagram schematically illustrating a system for correcting possible warp of a corrugated board sheet according to a nineteenth embodiment of the present invention.

FIG. 46 schematically shows a system for correcting possible warp of a corrugated board sheet according to the nineteenth embodiment, which includes a corrugated-board fabrication machine 1 and a production management machine 2C to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by a medium web preheater 12 and then glue the medium web 21 to the bottom liner 20 heated by the bottom liner preheater 10, a single-face web preheater 13 to heat a single-face web 22 formed by the single facer 11, a top liner preheater 14 to heat a top liner 23, a glue machine 15 to paste the single-face web 22 heated by the single-face web preheater 13, a double facer 16 to fabricate a corrugated board (double-face web) 24 by gluing the single-face web 22 pasted by the glue machine 15 and the top liner 23 heated by the top liner preheater 14, a slitter scorer 17 to slit and score the corrugated board 24 fabricated by the double facer 16, a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets in order of fabrication.

Among these elements 10 to 19, an element that affects a moisture content of a bottom liner 20 and an element that affects a moisture content of a top liner 23 associate with (affect) warp of a corrugated board sheet 25 in the width direction. Here, the bottom liner preheater 10, the single-face web preheater 13, the top liner preheater 14, the single facer 11, the glue machine 15 and the double facer 16 correspond to such elements.

Figure 47:
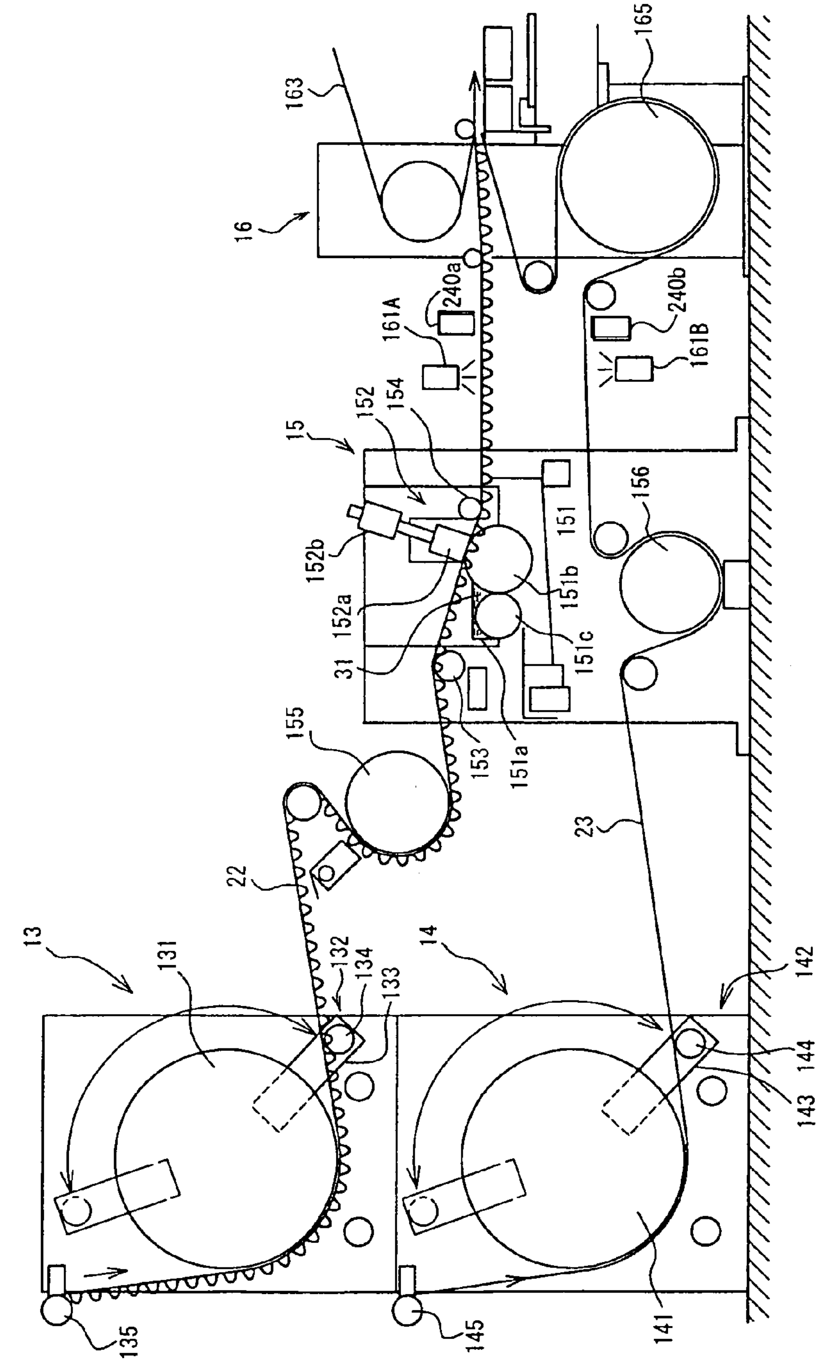
FIG. 47 is a schematic diagram illustrating a single-face web preheater, a top liner preheater, a glue machine, and a part of a double facer included in a corrugated-board fabrication machine.

As shown in FIG. 47, temperature sensors (moisture content measuring means) 240*a* and 240*b* are disposed at the entrance of a double facer 16 (i.e., immediately upstream of the double facer 16) in such a posture that the transfer path of a single-face web 22 or a top liner 23 is interposed between the temperature sensors 240*a* and 240*b*. The temperature sensors 240*a* and 240*b* are respectively arranged so as to face to the center of the width direction of a single-face web 22 and a top liner 23, respectively in the illustrated example. The upper temperature sensor 240*a* detects a temperature Te1 of the bottom liner 20, which temperature is the parameter associated with a moisture content of the upper surface (i.e., the bottom liner 20) of a single-face web 22 immediately prior to being transferred into the double facer 16; and the lower temperature sensor 240*b* detects a temperature Te2 of a top liner 23, which temperature is the parameter associated with a moisture content of the top liner 23 immediately prior to being transferred into the double facer 16. As described below, a width-direction warp status of a corrugated board sheet is detected based on these measured temperatures.

The production management machine 2C appropriately manages each of elements 10, 11, 13-16 to correct warp of a corrugated board sheet 25. Focusing on a function for correcting warp of a corrugated board sheet 25, the production management machine 2C includes an acquaintance database 3C, a control variable calculating section 4C, the process controller 5C, and a warp status judgment section 8C, as shown in FIG. 46.

The acquaintance database 3C retains setting values of control variables (adjustment variations from the current values) associated with particular control factors affect the possible warp of a corrugated board sheet 25, which particular control factors are among control factors used to control the corrugated-board fabrication machine 1, or formulae used to determine the control variables that correlate with warp status (a warp direction, a warp extent) of the corrugated board sheet 25. Here, the particular control factors are control factors that affect moisture contents of a bottom liner 20 or a top liner 23, and more particularly are wrap amounts of the bottom liner 20 around the above-described bottom liner heating rolls 101A and 101B and a wrap amount of the top liner 23 around the top liner heating roll 141.

For example, when a corrugated board sheet 25 has upward warp in the width direction (has a convex surface toward a top liner 23), a setting value or a formula of a control variable of each control factor is defined in order to increase a moisture content of the top liner 23 and/or decrease a moisture content of a bottom liner 20. Conversely, when a corrugated board sheet 25 has downward warp in the width direction (has a convex surface toward a bottom liner 20), a setting value or a formula of a control variable of each control factor is defined in order to increase a moisture content of the bottom liner 20 and/or decrease a moisture content of the top liner 23.

A setting value or a formula of a control variable of each control factor is defined in accordance with a predetermined priority order, that is, a priority order for outputs. For example, when a warp extent is small, only control variables with higher priorities are output; and when a warp extent is getting larger, other control variables are additionally output in accordance with the priority order. In relation to the priority order, a control factor that more largely affects warp, i.e., a control factor that more largely contributes to warp correction, gets a higher priority.

A table in FIG. 48 shows the configuration of the acquaintance database 3C according to the present embodiment. In the illustrated example, a warp status of a corrugated board sheet 25 is judged by the warp status judgment section 8C to be described later by selecting one from seven warp status types of large upward warp, medium upward warp, small upward warp, no warp, large downward warp, medium downward warp and small downward warp. For each of the warp state types, control factors that are to be output are determined in accordance with a priority order. In this embodiment, control factors (particular control factors) that are set are a wrap amount around a single-face web preheater (a wrap amount of a single-face web 22 around the single-web heating roll 131), a wrap amount around a top liner preheater (a wrap amount of a top liner 23 around the top liner heating roll 141), and a wrap amount around a bottom liner preheater (a wrap amount of a bottom liner 20 around the bottom liner preheater 101); the warp amounts around the single-face web preheater and around the top liner preheater are given the first priority in the priority order and the warp amount around the bottom liner preheater is given the third priority.

In FIG. 48, a control factor with a circle (○) or a double circle (◎) is an output when a corrugated board sheet is in a corresponding warp status. A circle and a double circle represent an amount of control variable (adjustment variation from the current value) and a double circle represents a larger control variable than a circle of the same control factor. Accordingly in this embodiment, if a corrugated board sheet 25 has small upward warp for example, only wrap amounts around the single-face web preheater and around the top liner preheater are adjusted; if a corrugated board sheet 25 has medium upward warp, only wrap amounts around the single-face web preheater and around the top liner preheater are similarly adjusted and the amounts of the adjustments thereof are increased; and if a corrugated board sheet 25 has large upward warp, a wrap amount around the bottom liner preheater is additionally adjusted. Specific setting values and formulae to derive the setting values are determined by experiments and simulations.

Width-direction warp of a corrugated board sheet 25 is caused by a difference in moisture content between a bottom liner 20 and a top liner 23, which are to be joined together with a medium web 21 interposed. The warp status judgment section 8C judges a status of warp in the width direction in relation to a corrugated board sheet 25 on the basis of a temperature Te1 of a bottom liner 20, which temperature is the parameter associated with a moisture content of the bottom liner 20 and which is detected by the temperature sensor 240*a*, and a temperature of Te2 of a top liner 23, which temperature is the parameter associated with a moisture content of the top liner 23 and which is detected by the temperature sensor 240*b*.

The manner for judgment of a warp status by the warp status judgment section 8C is described with reference to FIG. 49. First of all, the warp status judgment section 8C judges which one of the three levels of high, normal and low the temperatures Te1 and Te2 of liners 20 and 23 are respectively on. If the combination of a bottom-liner temperature Te1 and a top-liner temperature Te2 is (high, high), (normal, normal) or (low, low), no temperature difference (i.e., no moisture content difference) exists between the bottom liner 20 and the top liner 23 and the warp status judgment section 8C estimates and judges that a corrugated board sheet that is to be formed by joining the bottom liner 20 and the top liner 23 together generates no warp. If the combination of a bottom-liner temperature Te1 and a top-liner temperature Te2 is (high, high) or (low, low), the process controller 5C executes normal matrix control that is to be described later such that a bottom-liner temperature Te1 and a top-liner temperature Te2 become normal.

The warp status judgment section 8C is set to estimate and judge that a resultant corrugated board sheet has downward warp (has a convex surface toward the bottom liner 20) if the upper bottom liner 20 is higher in temperature than the top liner 23, that is, the lower top liner 23 is higher in moisture content than the bottom liner 20. The warp status judgment section 8C further estimates and judges the extent of the warp in accordance with the absolute value ΔT of the temperature difference between the liners 20 and 23. In other words, if a bottom-liner temperature Te1 is high and a top-liner temperature Te2 is normal, the resultant corrugated board sheet is estimated to have medium downward warp; if a bottom-liner temperature Te1 is high and a top-liner temperature Te2 is low, the resultant corrugated board sheet is judged to have large downward warp larger in extent than the above medium downward warp because of relatively high temperature difference ΔT; and if a bottom-liner temperature Te1 is normal and a top-liner temperature Te2 is low, the resultant corrugated board sheet is judged to have small downward warp that is smaller in extent than the above medium downward warp because of the low-side temperatures of both liners 20 and 23.

On the other hand, if a lower top liner 23 is high in temperature than a bottom liner 20, the warp status judgment section 8C estimates and judges that a resultant corrugated board sheet has upward warp (has a convex surface toward the top liner 23). If a top-liner temperature Te2 is high and a bottom-liner temperature Te1 is normal, the resultant corrugated board sheet is estimated to have medium upward warp; if a top-liner temperature Te2 is high and a bottom-liner temperature Te1 is low, the resultant corrugated board sheet is judged to have large upward warp larger in extent than the above medium upward warp because of high temperature difference ΔT; and if a top-liner temperature Te2 is normal and a bottom-liner temperature Te1 is low, the resultant corrugated board sheet is judged to have small upward warp that is smaller in extent than the above medium upward warp because of the high-side temperatures of both liners 20 and 23.

On the basis of warp information from the warp status judgment section 8C, the control variable calculating section 4C retrieves and reads a setting value or a setting formula of a control variable for each corresponding control factor from the acquaintance database 3C and calculates each control variable associated with machine state (operating state) of the corrugated-board fabrication machine 1. The control variable calculating section 4C and the acquaintance database 3C of this embodiment serve as the control factor selecting means and the control variable calculating means of the present invention.

A machine state represents the current values of a running speed of the corrugated-board fabrication machine 1 (a travel rate of a web), a wrap amount of a web around each of the heating rolls 101A, 101B, 131 and 141, vapor pressure applied to each of the heating rolls 101A, 101B, 131 and 141, gap amounts between the rolls 116*b* and 114 and between the rolls 116*b* and 116*c* in the single facer 11, a gap amount between the pasting roll 151*b* and the pressure bar 152*a* in the glue machine 15, pressures applied by the pressure units 164 and vapor pressure applied to the hotplates 162 in the double facer 16, and spray amounts of the shower units 161A and 161B. These values of the machine state is input from the process controller 5C, which is to be described later.

When the warp status judgment section 8C estimates and judges no warp is generated on a corrugated board sheet, the control variable calculating section 4C instructs the process controller 5C to return all the control factors to the originals (values determined by matrix control based on production state information such as a base-board composition, a basis weight of the base board, the width of a corrugated board sheet, a flute and the like).

The process controller 5C overall controls each of the elements 10-19 that constitute of the corrugated-board fabrication machine 1. The process controller 5C usually controls each of the elements 10-19 by performing matrix control based on production state information. However, when the warp status judgment section 8C estimates and judges that warp is to be generated on a corrugated board sheet, the process controller 5C controls each of control factors (here, one or an arbitrary combination of a wrap amount around the single-web preheater 13, a wrap amount around the top liner preheater 14, and a wrap amount around the bottom liner preheater 10) using one or more control variables calculated in the control variable calculating section 4C.

Conversely, if the warp status judgment section 8C estimates and judges no warp is to be generated on a corrugated board sheet, the process controller 5C controls the elements 10, 13 and 14 to return all the control factors to the originals. The process controller 5C always grasps a current machine state of the corrugated-board fabrication machine 1, and outputs the current machine state to the control variable calculating section 4C periodically or in response to a request from the control variable calculating section 4C. Namely, the process controller 5C serves as the control means and the running-state information obtaining means according to the present invention.

Figure 50:
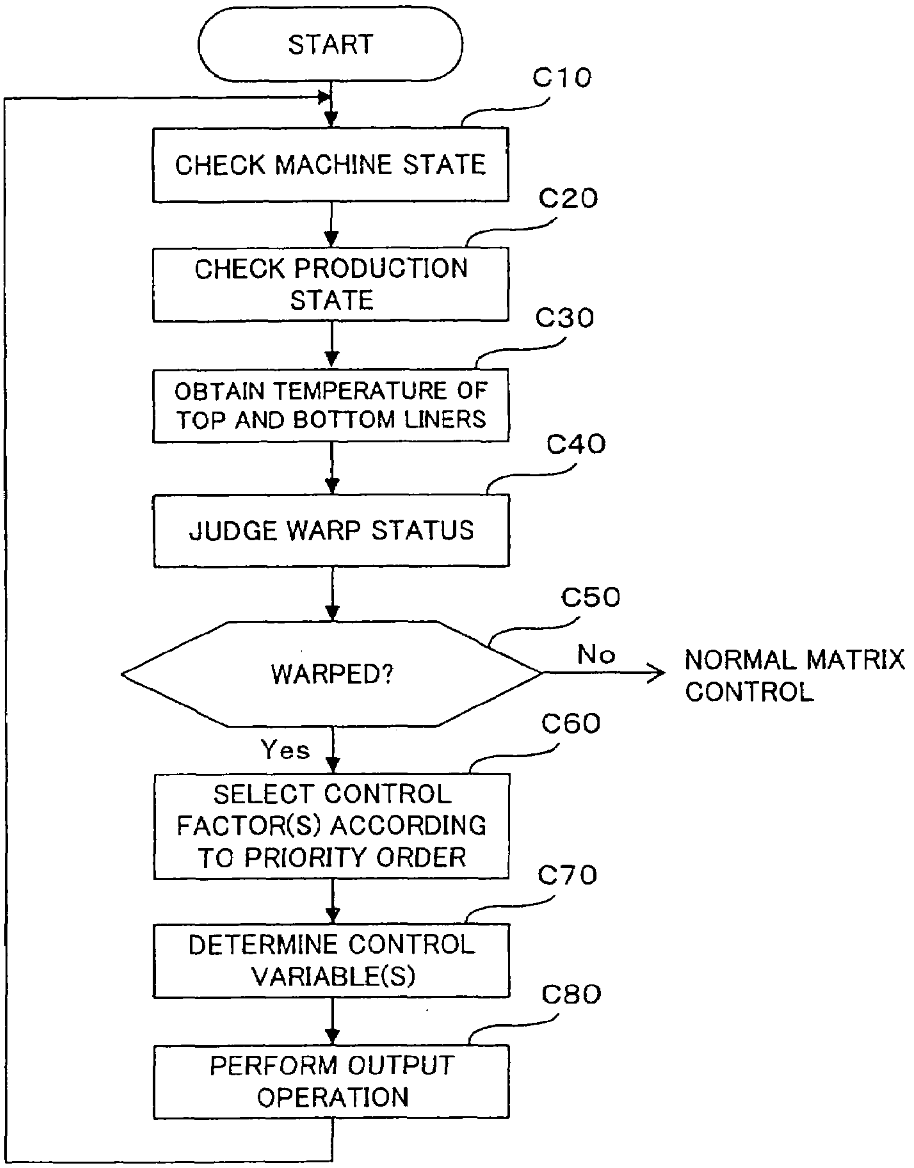
FIG. 50 is a flow diagram illustrating a succession of procedural steps of warp correction according to the nineteenth embodiment.

The flow diagram FIG. 50 describes a succession of procedural steps of correcting warp of a corrugated board sheet 25 using the above-described functions of the production management machine 2C.

First of all, the production management machine 2C checks a machine state at step C10 and checks a production state at step C20. In the ensuing step C30, the production management machine 2C obtains information of temperatures of a bottom liner 20 and a top liner 23 via the temperature sensors 240*a* and 240*b*. In the manner described above, the production management machine 2C estimates and judges a warp status of the corrugated board sheet 25 based on the temperature information at step C40 and further estimates and judges whether or nor the corrugated board sheet 25 is to have warp at the ensuing step C50. If the corrugated board sheet 25 is judged to have warp, the procedural steps proceed to step C60, so that one or more control factors (here, one or a combination of a wrap amount around the single-face web preheater, a wrap amount around the top liner preheater, and a wrap amount of the bottom liner preheater) to be controlled are selected based on the warp status, considering the priority order.

In the subsequent step C70, the production management machine 2C calculates a control variable of each selected control factor in line with machine state information obtained in the step C10 with reference to the acquaintance database 3C. At this time, production management machine 2C may use the production state information obtained at step A20 as reference data, for example, in order to change wrap amounts considering base paper composition (thick paper, thin paper). After that, the production management machine 2C outputs the calculated control variables to corresponding elements (here, one or a combination of the single-face web preheater 13, the top liner preheater 14, and the bottom liner preheater 10) at step C80.

On the other hand, if the corrugated board sheet 25 is judged to have no warp at the step C50, the production management machine 2C carries out normal matrix control.

According to the system for correcting a possible warp of a corrugated board sheet of the present embodiment, a warp status of a corrugated board sheet 25 is automatically judged and a wrap amount around the single-face web preheater, a wrap amount around the top liner preheater and/or a wrap amount around the bottom liner preheater which amounts affect warp of a corrugated board sheet 25 are adjusted by the production management machine 2C. Thereby, it is possible to accurately and automatically correct warp of corrugated board sheets with ease without depending on experience and know-how of an operator.

When short-run fabrication of corrugated board sheets is performed (the specification of corrugated board sheets to be fabricated is varied in a short term), there is possibility that warp cannot be corrected by feed-back control, in which a status of warp actually generated on a corrugated board sheet 25 is detected and the warp is corrected based on the detected warp status, because liners 20 and 23 may have passed through elements (in this case, the single-face web preheater 13, the top liner preheater 14, and the bottom liner preheater 10) that are able to correct the warp before such feed-back control takes effect. Advantageously in this system for correcting possible warp, a warp status of a corrugated board sheet 25 is estimated and judged on the basis of temperatures of liners 20 and 23 before being joined together and management for correct possible warp is carried out based on the result of the determination and the judgment at an early stage so that a warp can be corrected even during short-run fabrication.

At that time, since the production management machine 2C successively adds selected control factors in accordance with a priority order, considering an extent of warp of a corrugated board sheet 25, the extent of adjustment for warp correction can be larger in accordance with the warp extent so that warp correction of a corrugated board sheet 25 can be accomplished rapidly. In particular in this embodiment, it is possible to correct warp of a corrugated board sheet 25 faster by providing a control factor that more largely affects the warp with a higher priority.

In this nineteenth embodiment, the control factors to correct warp of a corrugated board sheet 25 are a wrap amount around the single-face web preheater, a wrap amount around the top liner preheater and a wrap amount around the bottom liner preheater. These control factors are only one example and a greater number of control factors to be controlled may be used likewise in the following second through twenty-third embodiments.

(D-2) Twentieth Embodiment

FIG. 51 shows the configuration of the acquaintance database 3C according to a twentieth embodiment of the present invention. The elements except the acquaintance database 3C are identical to those of the nineteenth embodiment, so repetitious description will be omitted here.

In this embodiment, the single facer 11 and the glue machine 15 are also controlled in order to correct warp. An adhesive-gap amount of the single facer (a gap amount between the pasting roll 116*b* and the upper roll 114 (or a gap amount between the pasting roll 116*b* and the meter roll 116*c*)) and an adhesive-gap amount of the glue machine (a gap amount between the pasting roll 151*b* and the pressure bar 152*a*) are set as particular control factors in addition to control factors of the nineteenth embodiment. In the same manner as the nineteenth embodiment, the wrap amounts around the single-face web preheater and around the top liner preheater are given the first priority in the priority order and a wrap amount around the bottom liner preheater is given the third priority. Meanwhile the adhesive-gap amount of the single facer and the adhesive-gap amount of the glue machine are given the fourth and the fifth priorities, respectively.

Since the system for correcting possible warp of a corrugated board sheet according to this embodiment has a larger number of control factors than the nineteenth embodiment, it is possible to perform more sensitive control than the nineteenth embodiment so that warp of a corrugated board sheet 25 can be corrected more accurately.

(D-3) Twenty-First Embodiment

FIG. 52 shows the configuration of the acquaintance database 3C according to a twenty-first embodiment of the present invention. The elements in this embodiment except the acquaintance database 3C are also identical to those of the nineteenth embodiment, so repetitious description will be omitted here.

In this embodiment, the double facer 16 is also controlled in order to correct warp. A pressure applied by the double facer (pressure applied by the pressure units 164) and a rate of the double facer (a travel rate of a single-face web 22 and a top liner 23 in the double facer 16) are set as particular control factors in addition to control factors of the twentieth embodiment. In the same manner as the twentieth embodiment, the wrap amounts around the single-face web preheater and around the top liner preheater are given the first priority in the priority order; the wrap amount around the bottom liner preheater is given the third priority; the adhesive-gap amount of the single facer is given the fourth priority; and the adhesive-gap amount of the glue machine is given the fifth priority. Further, the pressure of the double facer and the rate of the double facer are given the sixth and the seventh priorities, respectively.

Since the system for correcting possible warp of a corrugated board sheet according to this embodiment has a larger number of control factors than the twentieth embodiment, it is possible to perform more sensitive control than the twentieth embodiment so that warp of a corrugated board sheet 25 can be corrected more accurately.

(D-4) Twenty-Second Embodiment

FIG. 53 shows the configuration of the acquaintance database 3C according to a twenty-second embodiment of the present invention. Also in this embodiment, the elements except the acquaintance database 3C are identical to those of the nineteenth embodiment, so repetitious description will be omitted here.

In this embodiment, a vapor pressure in the double facer (a pressure of vapor supplied to the hotplates 162) is added as a particular control factor to control factors of the twenty-first embodiment. In the same manner as the twenty-first embodiment, the wrap amounts around the single-face web preheater and around the top liner preheater are given the first priority in the priority order; the wrap amount around the bottom liner preheater is given the third priority; the adhesive-gap amount of the single facer is given the fourth priority; and the adhesive-gap amount of the glue machine is given the fifth priority; and the pressure of the double facer is given the sixth priority. Meanwhile the vapor pressure in double facer and the rate of the double facer are given the seventh and the eighth priorities, respectively.

Since the system for correcting a possible warp of a corrugated board sheet according to this embodiment has a larger number of control factors than the twenty-first embodiment, it is possible to perform more sensitive control than the twenty-first embodiment so that warp of a corrugated board sheet 25 can be corrected more accurately.

(D-5) Twenty-Third Embodiment

FIG. 54 shows the configuration of the acquaintance database 3C according to a twenty-third embodiment of the present invention. The elements except the acquaintance database 3C are also identical to those of the nineteenth embodiment, so repetitious description will be omitted here.

In this embodiment, the shower units 161A and 161B are also controlled in order to correct warp. A spray amount onto the bottom liner side (an amount of spray from the shower unit 161A) and a spray amount onto the top liner (an amount of spray from the shower unit 161B) are added as particular control factors to the control factors of the twenty-second embodiment. These spray amounts are given the first priority while the wrap amounts around the single-face web preheater and around the top liner preheater are given the second priority in the priority order; the wrap amount around the bottom liner preheater is given the fourth priority; the adhesive-gap amount of the single facer is given the fifth priority; and the adhesive-gap amount of the glue machine is given the sixth priority; the pressure of the double facer is given the seventh priority; the vapor pressure in double facer is given the eighth priority; and the rate of the double facer are given the ninth priority.

Since the system for correcting possible warp of a corrugated board sheet according to this embodiment has a larger number of control factors than the twenty-second embodiment, it is possible to perform more sensitive control than the twenty-second embodiment so that warp of a corrugated board sheet 25 can be corrected more accurately. The added spray amounts with high correction capacities can contribute to further rapidly warp correction.

(D-6) Twenty-Fourth Embodiment next, a twenty-fourth embodiment of the present invention will now be described with reference to FIGS. 55 and 56. This embodiment is featured by moisture content measuring means and the remaining configuration is identical to that of the nineteenth embodiment. Any acquaintance database 3C described in the first through twenty-third embodiments can be used here.

Figure 55:
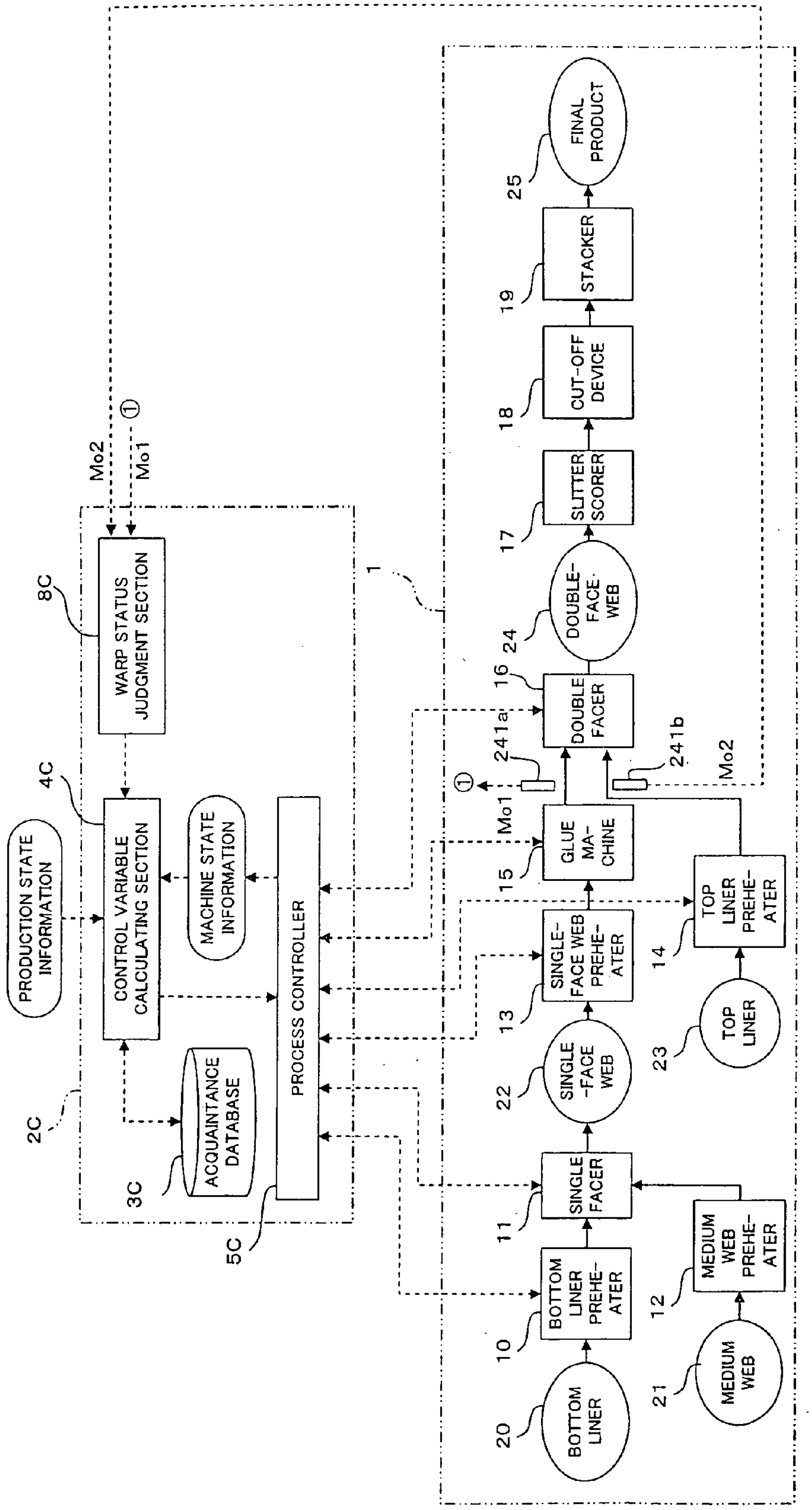
FIG. 55 is a block diagram schematically illustrating a system for correcting possible warp of a corrugated board sheet according to a twenty-fourth embodiment of the present invention.

In the system for correcting possible warp of a corrugated board sheet in this embodiment, the moisture content measuring means takes the form of moisture sensors 241*a* and 241*b* respectively arranged over and under the transfer path of a single-face web 22 and a top liner 23 at the entrance of the double facer 16 as shown in FIG. 55 while the moisture content measuring means of each of the above embodiments takes the form of temperature sensors 240*a* and 240*b*. The moisture sensors 241*a* and 241*b* respectively faces the centers of the width direction of liners 20 and 23, respectively.

As shown in FIG. 56, the warp status judgment section 8C judges which one of the three levels of high, normal and low the moisture content Mo1 and Mo2 of a single-face web 22 and a top liner 23 are respectively on and estimates and judges warp of a resultant corrugated board sheet 25 on the basis of the combination of these moisture content levels. In detail, if the combination of a single-face-web moisture content Mo1 and a top-liner moisture content Mo2 is (high, high), (normal, normal) or (low, low), no difference in moisture content exists between the single-face web 22 and the top liner 23 and the warp status judgment section 8C estimates and judges that no warp is to be generated.

If the combination of moisture content Mo1 and moisture content Mo2 is (high, high) or (low, low), the process controller 5C executes normal matrix control such that moisture contents of the single-face web and the top liner become normal.

The warp status judgment section 8C is set to estimate and judge that a resultant corrugated board sheet generates upward warp if a bottom liner 20 is higher in moisture content than a top liner 23: a normal moisture content Mo1 of a bottom liner 20 and a low moisture content Mo2 of a top liner 23 are judged to have medium upward warp; a high moisture content Mo1 of a bottom liner 20 and a low moisture content Mo2 of a top liner 23 are judged to have large upward warp; and a high moisture content Mo1 of a bottom liner 20 and a normal moisture content Mo2 of a top liner 23 are judged to have small upward warp.

Conversely, the warp status judgment section 8C is set to estimate and judge that a resultant corrugated board sheet generates downward warp if a bottom liner 20 is lower in moisture content than a top liner 23: a low moisture content Mo1 of a bottom liner 20 and a normal moisture content Mo2 of a top liner 23 are judged to have medium downward warp; a low moisture content Mo1 of a bottom liner 20 and a high moisture content Mo2 of a top liner 23 are judged to generate large downward warp; and a normal moisture content Mo1 of a bottom liner 20 and a high moisture content Mo2 of a top liner 23 are judged to generate small downward warp.

On the basis of warp information from the warp status judgment section 8C, the control variable calculating section 4C retrieves and reads a setting value or a setting formulae of a control variable of each corresponding control factor from the acquaintance database 3C in the same manner as the foregoing embodiments. The process controller 5C then controls the control factors using the control variables calculated by the control variable calculating section 4C.

The remaining configuration is identical to those of the nineteenth through twenty-third embodiments, so any repetitious description will be omitted here.

According to the system for correcting possible warp of a corrugated board sheet of the twenty-fourth embodiment, it is possible to correct warp in the width direction of a corrugated board sheet 25 rapidly and also possible to correct warp in the width direction during short-run fabrication.

(D-7) Twenty-Fifth Embodiment

Figure 57:
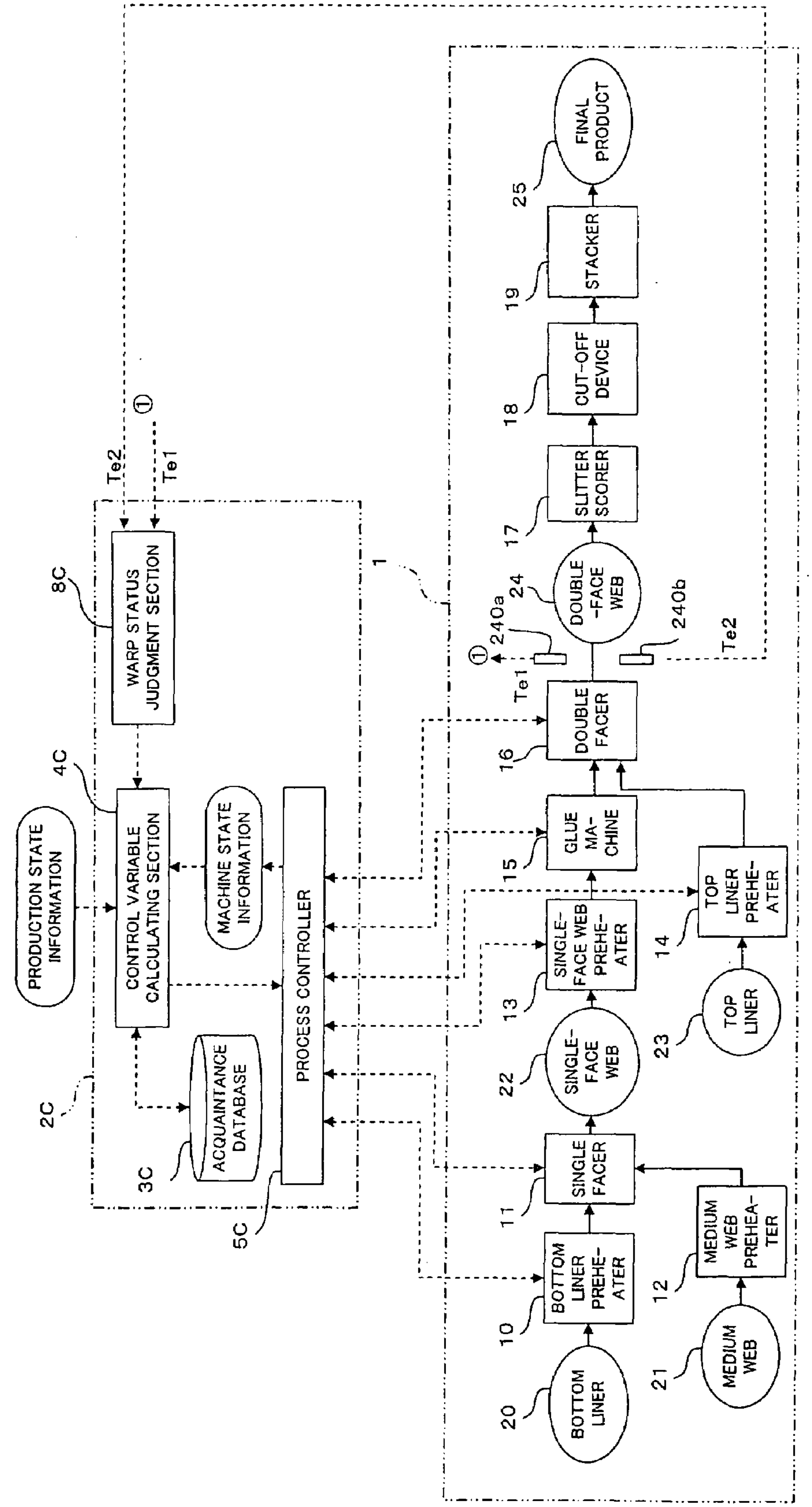
FIG. 57 is a block diagram schematically illustrating a system for correcting possible warp of a corrugated board sheet according to a twenty-fifth embodiment of the present invention.

A twenty-fifth embodiment of the present invention will now be described with reference to FIG. 57. This embodiment is featured by an arrangement of the moisture content measuring means and the remaining configuration is identical to that of the nineteenth embodiment. Any acquaintance database 3C described in the nineteenth through twenty-third embodiments can be used here.

While the temperature sensors 240*a* and 240*b* serving as the moisture content measuring means are disposed at the entrance of the double facer 16 in the above nineteenth to twenty-third embodiment, the system for correcting possible warp of a corrugated board sheet in this embodiment places these temperature sensors 240*a* and 240*b* at the exit of the double facer 16 (i.e., immediate downstream of double facer 16).

Accordingly in the system for correcting possible warp of a corrugated board sheet of the twenty-fifth embodiment, comparing with feed-back control of each control factor on the basis of warp status information about a corrugated board sheet 25 stacked in the stacker 19 for example, obtaining of warp status information is carried out further upstream side in corrugated-board fabrication process. Whereupon warp correction can be accomplished at an early stage and this embodiment can deal with short-run fabrication.

Figure 58:
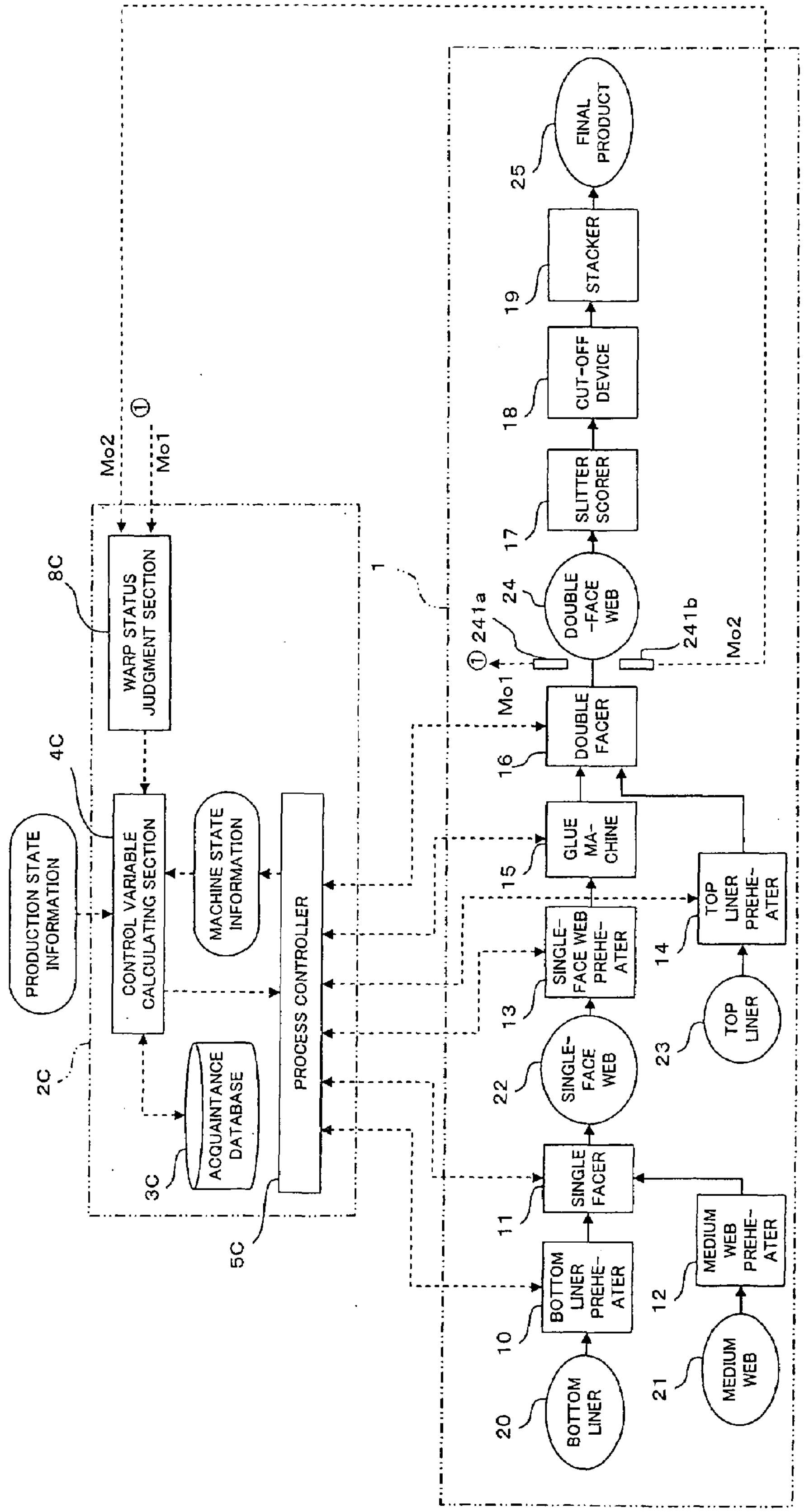
FIG. 58 is a block diagram schematically showing a modification of a system for correcting possible warp of a corrugated board sheet of the twenty-fifth embodiment.

Alternatively, the moisture content sensors 241*a* and 241*b*, serving as substitutes for temperature sensors 240*a* and 240*b*, may be arranged at the exit of the double facer 16 as shown in FIG. 58. In this case, warp status is judged in accordance with moisture contents Mo1 and Mo2 respectively of a single-face web 22 and a top liner 23 in the same manner as the twenty-fourth embodiment shown in FIG. 56.

(D-8) Others

The above is the description of the nineteenth through the twenty-fifth embodiments of the present invention. But, the present invention should by no means be limited to the foregoing nineteenth to the twenty-fifth embodiments and various alternations and modifications can be suggested without departing from the gist of the present invention.

For example, the above embodiments do not use vapor pressures applied to each of the heating rolls 101, 131 and 141 as particular control factors; alternatively, it is, of course, possible to correct warp of a corrugated board sheet 25 by using these control factors. Further, other than the above example, any control factor that affects a moisture content of a bottom liner 20 or a top liner 23 can be used as a particular control factor to correct a warp of a corrugated board sheet 25. Accordingly, the configurations of the acquaintance databases 3C of the nineteenth through the twenty-fifth embodiments are only examples and can be created in accordance with particular control factors that are to be used. The priority orders in the acquaintance databases 3C should by no means be limited to the foregoing examples and can be arbitrary set.

In the foregoing nineteenth to twenty-fifth embodiments, the warp status judgment section 8C judges a warp extent on the three levels of large, medium and small. Alternatively, a warp extent may be classified into further detailed levels so that warp of a corrugated board sheet 25 can be corrected more accurately.

The moisture content measuring means in each of the nineteenth through the twenty-fifth embodiment takes the form of temperature sensors or moisture content sensors. Alternatively, a pair a temperature sensor and a moisture content sensor may be disposed for each of liners 20 and 23. In this case, a measurement value of one of a temperature sensor and a moisture content sensor may be used for judgment of a warp status and a measurement value of the other sensor may be used as a reference that affects the judgment; or measurement values of both of the temperature sensor and the moisture content sensor may be used for judgment of a warp status.

In the above nineteenth through the twenty-fifth embodiments, the moisture content measurement means (a temperature sensor or a moisture content sensor) is placed in the center of the width direction of each of liners 20 and 23 so as to measure a moisture content at the center points of the liners 20 and 23 as representing values. Alternatively, the moisture content measurement means may measure moisture contents of liners 20 and 23 along the width direction. Specifically, a plurality of sensors serving as the moisture content measurement means are fixed in the same height along the width of each of liners 20 and 23; or one sensor serving as the moisture content measurement means is movably installed in the width direction so that a moisture content is continuously monitored. The averages of the measurement results may be used as representing values of moisture contents of liners 20 and 23.

With this configuration, even if a liner 20 or 23 has a moisture content varies in the width direction, it is possible to precisely judge a warp status.

(E)

Hereinafter, systems for correcting possible warp of a corrugated board sheet according to twenty-sixth to twenty-ninth embodiments and modifications thereof of the present invention with reference to FIGS. 59-65. Parts and elements identical to those described in the foregoing embodiments are to be referred by the same reference numbers.

A corrugated board sheet fabricated by means of the present invention can ensure predetermined quality of particular aspects by automated control. An example manner to control to inhibit width-direction upward or downward warp will be described in each of twenty-sixth to twenty-ninth embodiments.

(E-1) Twenty-Sixth Embodiment

Figure 59:
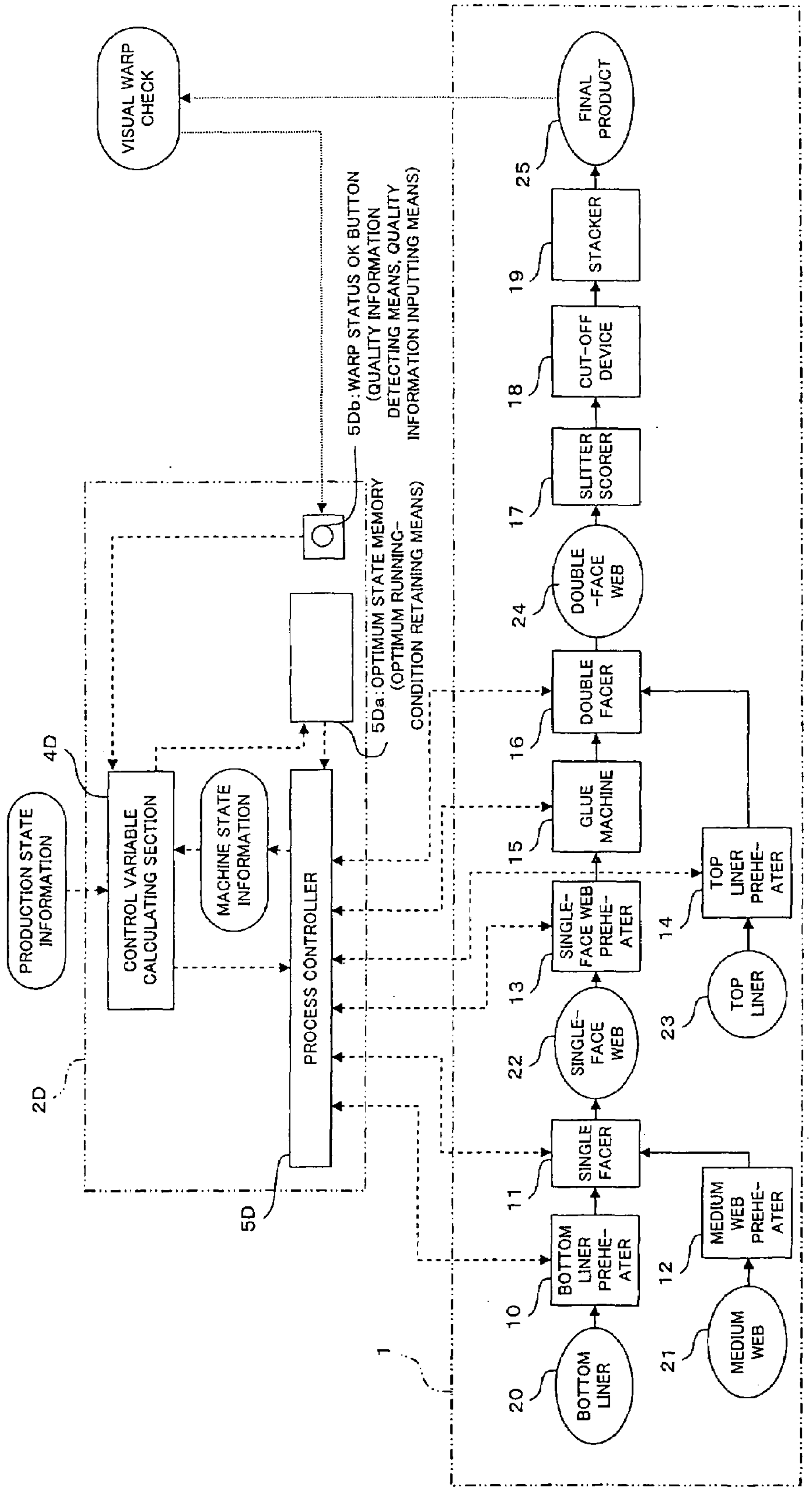
FIG. 59 is a block diagram schematically illustrating a corrugated-board fabrication system according to a twenty-sixth embodiment of the present invention.

FIG. 59 schematically shows a system for fabricating a corrugated board sheet according to the twenty-sixth embodiment of the present invention. The system for fabricating a corrugated board sheet according to the twenty-sixth embodiment includes a corrugated-board fabrication machine 1 and a production management machine 2D to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by the medium web preheater 12 and then glue the medium web 21 to the bottom liner 20 heated by the bottom liner preheater 10, a single-face web preheater 13 to heat the single-face web 22 formed by the single facer 11, a top liner preheater 14 to heat a top liner 23, a glue machine 15 to paste the single-face web 22 heated by the single-face web preheater 13, a double facer 16 to fabricate a corrugated board 24 by gluing the single-face web 22 pasted by the glue machine 15 and the top liner 23 heated by the top liner preheater 14, a slitter scorer 17 to slit and score the corrugated board 24 fabricated by the double facer 16, a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets 25 in order of fabrication.

Among these elements 10 to 19, an element that affects a moisture content of a bottom liner 20 or an element that affects a moisture content of a top liner 23 associates with warp in the width direction of a corrugated board sheet 25. Here, the bottom liner preheater 10, the single-face web preheater 13, the top liner preheater 14, the single facer 11, the glue machine 15 and the double facer 16 correspond to such elements. Hereinafter, the configurations of these elements 10, 11, 13-16 are shown in FIGS. 2-4, and have already been described in detail above, so repetitious description is omitted here.

The production management machine 2D appropriately controls each of the elements 10, 11, and 13-16, and includes, as shown in FIG. 59, a control variable calculating section 4D, a process controller 5D, an optimum running-condition information memory 5Da, and a warp status OK button (quality information detecting means, quality information inputting means) 5Db.

The control variable calculating section 4D has a function as the production-state information obtaining means of the present invention, and obtains production-state information from a non-illustrated upper system used for production management. The control variable calculating section 4D calculates each control variable on the basis of such production state information and machine state information (running state) of the corrugated-board fabrication machine 1 obtained through the process controller 5D, and outputs the result of the calculation to the process controller 5D. The process controller 5D controls each control variable in accordance with control instructions from the control variable calculating section 4D. The control variable calculating section 4D and the process controller 5D carry out matrix control using production-state information and running-state information in the above described manner.

The process controller 5D always grasps a current machine state of the corrugated-board fabrication machine 1, and outputs the current machine state to the control variable calculating section 4D regularly or in response to a request from the control variable calculating section 4D. Namely, the process controller 5D serves as the control means and the running-state information obtaining means according to the present invention.

A machine state represents the current values of a running speed of the corrugated-board fabrication machine 1 (a travel rate of a web), a wrap amount of a web around each of the heating rolls 101A, 101B, 131 and 141, a vapor pressure applied to each of the heating rolls 101A, 101B, 131 and 141, gap amounts between the rolls 116*b* and 114 and between the rolls 116*b* and 116*c* in the single facer 11, a gap amount between the pasting roll 151*b* and the pressure bar 152*a* in the glue machine 15, pressures applied by the pressure units 164 and vapor pressured applied to hotplates 162 in the double facer 16, spray amounts of the shower units 161A and 161B, and so on.

In this system for fabricating a corrugated board sheet, a press of the warp status OK button 5Db notifies the production management machine 2D that a corrugated board sheet has no warp in the width direction. An operator visually checks width-direction warp status of a corrugated board sheet being stacked in the stacker 19 or being transferred from the double facer 16 to the stacker 19, and, if the corrugated board sheet has no warp, presses the warp status OK button 5Db.

As a consequence, production state information and running state information concerning various issues at the time point of the press of the warp status OK button 5Db are output to the optimum running-condition information memory 5Da, which correlates the production-state information with the running-state information and retains these information pieces in the form of a data set. Namely, a running state at the time of a press of the warp status OK button 5Da is stored as an optimum running state at the time of the corresponding production state.

At least one from issues that individually affect warp of a corrugated board sheet is selected as each of production state information and running state information, which are correlated with each other when stored in the optimum running-condition information memory 5Da. Here, the width of a corrugated board sheet, a flute, the configuration and weight of a base paper are stored as production state information, and running state information to be stored are particular control factors that affect a moisture content of a bottom-liner 20 or a top-liner 23 and width-direction warp of a corrugated board sheet which particular control factors are a rate of the double facer (a travel rate of a single-face web 22 and the top liner 23 in the double facer 16), a wrap amount of a single-face web around the single-face web preheater 13, a wrap amount of a top liner around the top liner preheater 14, a wrap amount of a bottom liner around the bottom liner preheater 10, an adhesive-gap amount of the single facer (a gap amount between the pasting roll 116*b* and the upper roll 114 (or a gap amount between the pasting roll 116*b* and the meter roll 116*c*)), an adhesive-gap amount of the glue machine (a gap amount between the pasting roll 151*b* and the pressure bar 152*a*), and a pressure of double facer (pressures applied by the press units 164).

Since the process controller 5D always grasps each issue of production state information as described above, if a specification of corrugated board sheets is switched to another specification so that production state is to change, the process controller 5D retrieves a data set having a production state corresponding to the new specification (having identical width, flute, configuration and weight of base paper (here, including not only a specification perfectly identical but also a specification substantially identical)) from the optimum running-condition information memory 5Da.

If a desired data set is found, the process controller 5D reads the running state information, as the optimum running state, of the desired data set and then controls each control factor such that the control factor corresponds to the read running state information. It can be considered that the optimum running-condition information memory 5Da teaches optimum running state information to the process controller 5D and this control is therefore called teaching control hereinafter.

Conversely, if optimum running state information corresponding to the new production state is not found in the optimum running-condition information memory 5Da, the process controller 5D carries out normal matrix control.

In the system for fabricating a corrugated board sheet according to this embodiment, an operator visually judges a warp status of a corrugated board sheet 25 fabricated in the corrugated-board fabrication machine 1, and presses the warp status OK button 5Db if the corrugated board sheet 25 has no warp. The pressing the warp status ok button 5Dd stores the running state at that time as the optimum running state corresponding to the current production state and, subsequently, when fabrication on the same production state is to be carried out, execution of teaching control can automatically adjust a rate of the double facer, a wrap amount around the single-face web preheater 13, a wrap amount around the top liner preheater 14, a wrap amount around the bottom liner preheater 10, an adhesive-gap amount of the single facer, an adhesive-gap amount of the glue machine, and a pressure of double facer to those in the optimum running state. Thereby, it is possible to accurately correct warp of corrugated board sheets with ease without depending on experience and know-how of an operator.

When short-run fabrication of corrugated board sheets is performed (the specification of corrugated board sheets to be fabricated is varied in the short term), there is a possibility that warp cannot be corrected by feed-back control, in which a status of warp actually generated on a corrugated board sheet 25 is detected and the warp is corrected based on the detected warp status, because liners 20 and 23 being subjected to short-run fabrication pass through elements (in this case, the single-face web preheater 13, the top liner preheater 14, and the bottom liner preheater 10) that are able to correct the warp before such feed-back control takes effect. Advantageously in this system for correcting possible warp, even when short-run fabrication takes place, since particular control factors are adjusted so as to be in the corresponding optimum running state at the same time as switching of production state, warp can be inhibited.

(E-2) Twenty-Seventh Embodiment

Figure 60:
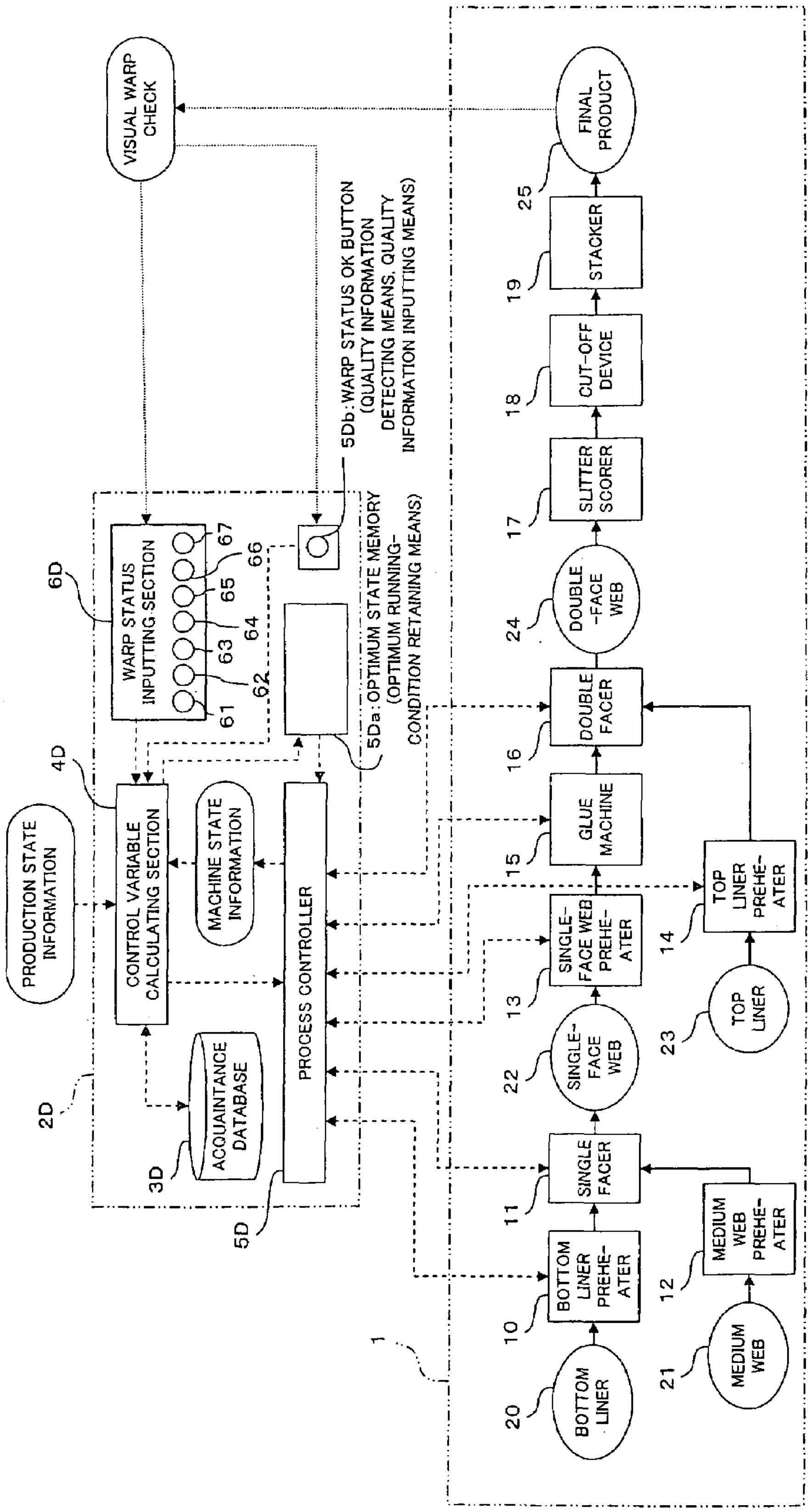
FIG. 60 is a block diagram schematically illustrating a corrugated-board fabrication system according to a twenty-seventh embodiment of the present invention.

FIG. 60 shows a system for fabricating a corrugated board sheet according to a twenty-seventh embodiment of the present invention.

The system for fabricating a corrugated board sheet of this embodiment includes, as shown in FIG. 60, a warp elimination support system formed by an acquaintance database 3D and a warp status inputting section 6D in addition to the elements of the system for fabricating a corrugated board sheet according to the twenty-sixth embodiment described above with reference to FIG. 59. In other words, the production management machine 2D of this embodiment comprises an acquaintance database 3D, control variable calculating section 4D, a process controller 5D, an optimum running-condition information memory 5Da, a warp status OK button 5Db and the warp status inputting section 6D.

The acquaintance database 3D retains setting values of control variables (adjustment variations from the current values) associated with one or more particular control factors that affect the possible width-direction warp of a corrugated board sheet 25 which particular control factors are among control factors used to control the corrugated-board fabrication machine 1, or formulae used to determine the control variables that correlate with warp status (a warp direction, a warp extent) of the corrugated board sheet 25.

For example, when a corrugated board sheet 25 has upward warp in the width direction (has a convex surface toward a top liner 23), a setting value or a formula of each control variable is determined in order to increase a moisture content of the top liner 23 and/or decrease a moisture content of a bottom liner 20. Conversely, when a corrugated board sheet 25 has downward warp in the width direction (has a convex surface toward the bottom liner 20), a setting value or a formula of each control variable is determined in order to increase a moisture content of the bottom liner 20 and/or decrease the moisture content of a top liner 23.

A setting value or a formula of each control variable is defined in accordance with a predetermined priority order, which is a priority order for outputs. For example, when a warp extent is small, only control variables with higher priorities are output; and when a warp extent is getting larger, other control variables are additionally output in accordance with the priority order. In relation to the priority order, a control factor that more largely affects warp, i.e., a control factor that more largely contributes to warp correction, gets a higher priority.

A table in FIG. 61 shows the configuration of the acquaintance database 3D according to the present embodiment. In the illustrated example, a warp status of a corrugated board sheet 25 is classified into six types of large upward warp, medium upward warp, small upward warp, large downward warp, medium downward warp and small downward warp are set corresponding to the number of pushbuttons as described later. For each of the warp state types, control variables that are to be output are defined in accordance with a priority order. In the illustrated embodiment, control factors (particular control factors) that are set are a wrap amount around the single-face web preheater (a wrap amount of a single-face web 22 around the single-web heating roll 131), a wrap amount around the top liner preheater (a wrap amount of a top liner 23 around the top liner heating roll 141), and a wrap amount around the bottom liner preheater (a wrap amount of a bottom liner 20 around the bottom liner preheater 101); the wrap amounts around the single-face web preheater and around the top liner preheater are given the first priority in the priority order, and the wrap amount around the bottom liner preheater is given the third priority.

In FIG. 61, a control factor with a circle (○) or a double circle (◎) is an output when a corrugated board sheet is in a corresponding warp status. A circle and a double circle represent amounts of control variable (adjustment variations from the current values) and a double circle represents a larger control variable than a circle of the same control factor. Accordingly in this embodiment, if a corrugated board sheet 25 has small upward warp for example, only wrap amounts around the single-face web preheater and around the top liner preheater are adjusted; if corrugated board sheet 25 has medium upward warp, only wrap amounts around the single-face web preheater and around the top liner preheater are similarly adjusted and the amounts of the adjustments thereof are increased; and if a corrugated board sheet 25 has a large upward warp, a wrap amount around the bottom liner preheater is additionally adjusted. Specific setting values and formulae to derive the setting values are determined by experiments and simulations.

In this embodiment, a warp status of a corrugated board sheet 25 is manually input to the warp status inputting section (warp status information obtaining means) 6D by an operator. The warp status inputting section 6D includes six push buttons 61 (large upward warp), 62 (medium upward warp), 63 (small upward warp), 65 (large downward warp), 66 (medium downward warp) and 67 (small downward warp), each of which associates with a warp status classified by the acquaintance database 3D, and a reset button 64. Operator's depressing of a corresponding button inputs a selection signal to the control variable calculating section 4D. A warp status of a corrugated board sheet 25 is judged by an operator as a result of visual observation of the corrugated board sheet 25 stacked in the stacker 19.

The control variable calculating section 4D retrieves and reads a setting variable or a formula to deriver the variable of each corresponding control factor from the acquaintance database 3D on the basis of the selection signal received from the warp status inputting section 6D, and calculates each control variables associated with a machine state (a running state) of the corrugated-board fabrication machine 1. In the illustrated embodiment, the control variable calculating section 4D and the acquaintance database 3D include the control factor selecting means of the present invention.

When the reset button 64 is selected in the warp status inputting section 6D, the control variable calculating section 4D instructs the process controller 5D to return all the control factors to the originals (values determined by matrix control based on production state information such as a base-board composition, a basis weight of the base board, the width of a corrugated board sheet, a flute and the like).

The process controller 5D overall controls each of the elements 10-19 that constitute the corrugated-board fabrication machine 1. The process controller 5D usually controls each of elements 10-19 by performing matrix control based on production state information if the process controller 5D does not store an optimum running state corresponding to the current production state. However, when one from the push buttons 61-63 and 65-57 is depressed in the warp status inputting section 6D, the process controller 5D controls each of control factors (here, one or an arbitrary combination of a wrap amount around the single-web preheater 13, a wrap amount around the top liner preheater 14, and a wrap amount around the bottom liner preheater 10) using one or more control variables calculated in the control variable calculating section 4D. When the reset button 64 is depressed, the process controller 5 controls elements 10, 13, and 14 to return all the control factors to the originals.

As described above, the system of this embodiment includes an optimum running-condition information memory 5Da and a warp status OK button 5Db similarly to the twenty-sixth embodiment. An operator visually confirms, at a position downstream of the double facer, that a corrugated board sheet has no warp, and presses the warp status OK button 5Db. As a result, a running state at the time of the press is stored as an optimum running state at the time of the concurrent production state.

Then, when a specification of corrugated board sheets to be fabricated has been changed, the process controller 5D retrieves an optimum running state corresponding to the new current production state in the optimum running-condition information memory 5Da. If the corresponding optimum running state is found, the process controller 5D executes teaching control in order to preferentially adjust predetermined particular control factors (especially here, same as the twenty-sixth embodiment, a rate of the double facer, a wrap amount of a single-face web around the single-face web preheater 13, a wrap amount of a top liner around the top liner preheater 14, a wrap amount of a bottom liner around the bottom liner preheater 10, an adhesive-gap amount of the single facer, an adhesive-gap amount of the glue machine, and a pressure of the double facer) so as to become the corresponding optimum running state.

Figure 62:
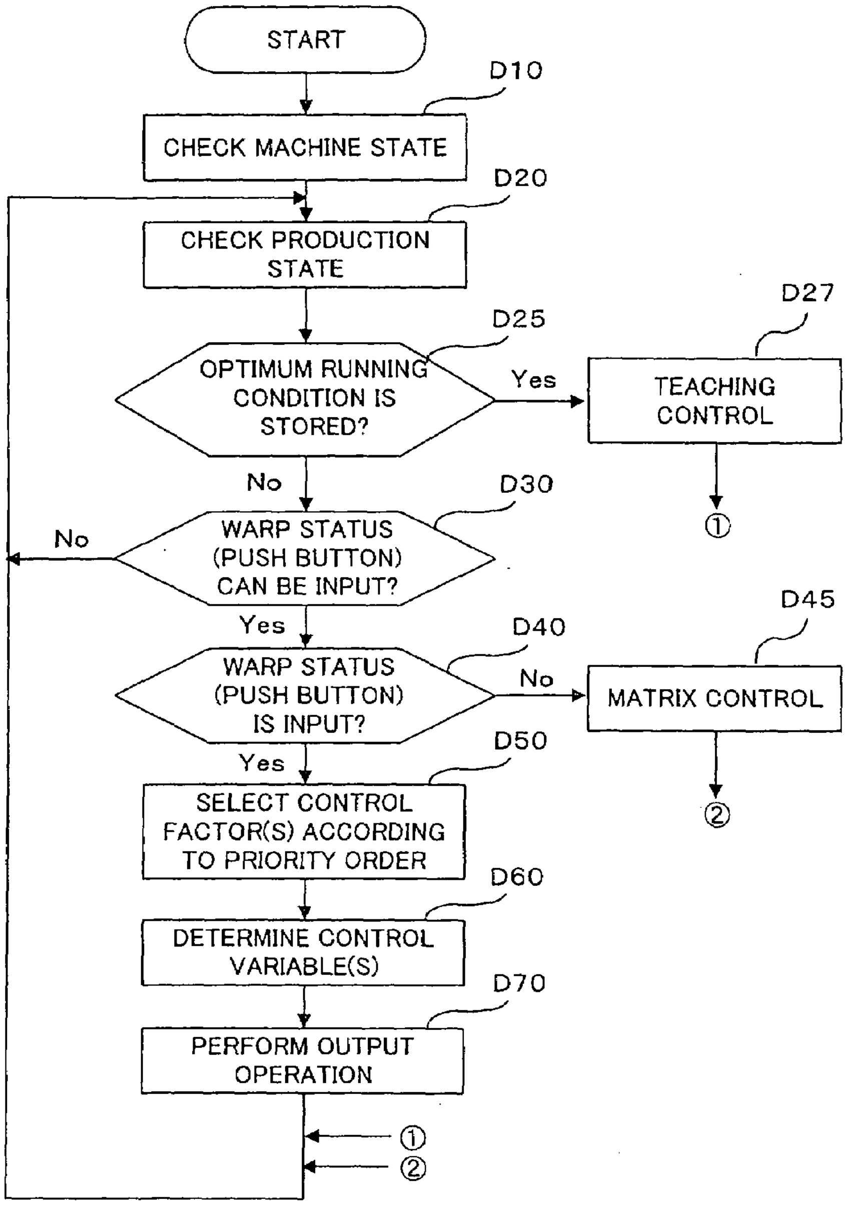
FIG. 62 is a flow diagram illustrating a procedural steps of warp correction of the twenty-seventh embodiment.

The flow diagram FIG. 62 describes a succession of procedural steps of correcting warp of a corrugated board sheet 25 using the above-described functions of the production management machine 2D.

First of all, the production management machine 2D checks a machine state at step D10 and checks a production state at step D20. In the ensuing step D25, the production management machine 2D retrieves an optimum running state corresponding to the current production state checked in step D20 in the optimum running-condition information memory 5Da. If the corresponding optimum running state is stored, the procedural steps proceed to step D27 to execute teaching control while, if the corresponding state is not stored, the procedural state proceeds to step D30.

At step D30, the production management machine 2D determines whether or not a warp status can be currently input (i.e., one from the push button 61-67 can be input). The determination is performed so as not to correct warp while another trouble arises because warp correction is useless when such another problem, e.g., a low rate of web travel due to an excessive strong adhesive of glue, arises.

If a warp status can be input at step D30, the production management machine 2D determines whether or not a warp status has been actually input at step D40. If a warp status has been input, the production management machine 2 selects one or more control factors (here, one or an arbitrary combination of a wrap amount around the single-face web preheater, a wrap amount around the top liner preheater, and a wrap amount of the bottom liner preheater) in accordance with a priority order of the input warp status, i.e., the selected one of the push buttons 61-63 and 65-67 at step D50. Conversely, if judgment in step D40 determines that a warp status has not been input, the procedural steps proceed to step D45 to carry out matrix control.

In succession at step D60, the production management machine 2D refers to the acquaintance database 3D and calculates one or more control variables corresponding to the machine state obtained in step D10. At this time, production management machine 2D may use the production state information obtained at step D20 as reference data in order to, for example, change wrap amounts considering base paper composition (thick paper, thin paper). The production management machine 2D outputs the calculated control variables to corresponding elements (here, one or an arbitrary combination of the single-face web preheater 13, the top liner preheater 14, and the bottom liner preheater 10) at step D70.

According to the system for correcting possible warp of a corrugated board sheet of the present embodiment, even if the optimum running-condition information memory 5Da does not retain an optimum running state corresponding to the current production state, a wrap amount around the single-face web preheater, a wrap amount around the top liner preheater and a wrap amount around the bottom liner preheater which amounts affect warp of a corrugated board sheet 25 are automatically adjusted by the production management machine 2D by an operator visually judging a warp status of a corrugated board sheet 25 fabricated in the corrugated-board fabrication machine 1 and simply depressing one of buttons 61-63 and 65-67, the one corresponding to a warp status. Thereby, it is possible to accurately correct warp of corrugated board sheets with ease without depending on experience and know-how of an operator.

At that time, since the production management machine 2D successively adds control factors in accordance with a priority order, considering an extent of warp of a corrugated board sheet 25, the extent of adjustment for warp correction can be larger in accordance with a warp extent so that warp correction of a corrugated board sheet 25 can be accomplished rapidly. In particular in this embodiment, it is possible to correct warp of a corrugated board sheet 25 faster by providing a control factor that more largely affects the warp with a higher priority.

In the illustrated embodiment, the control factors to correct warp of a corrugated board sheet 25 are a wrap amount around the single-face web preheater, a wrap amount around the top liner preheater and a wrap amount around the bottom liner preheater. These control factors are only one example and a greater number of control factors to be controlled may be used. Control factors able to be added are exemplified by an adhesive-gap amount of the single facer, an adhesive-gap amount of the glue machine, a pressure of the double facer, a rate of the double facer, a vapor pressure of a double facer, a spray amount of the bottom liner side, and a spray amount of the top liner side.

(E-3) Twenty-Eighth Embodiment

Next, a twenty-eighth embodiment of the present invention will now be described with reference to FIGS. 63, 12, 13*a* and 13*b*. The present embodiment is featured by means for obtaining data in relation to a warp status of a corrugated board sheet 25 and the remaining configuration is identical to that of the twenty-seventh embodiment shown in FIG. 60.

Figure 63:
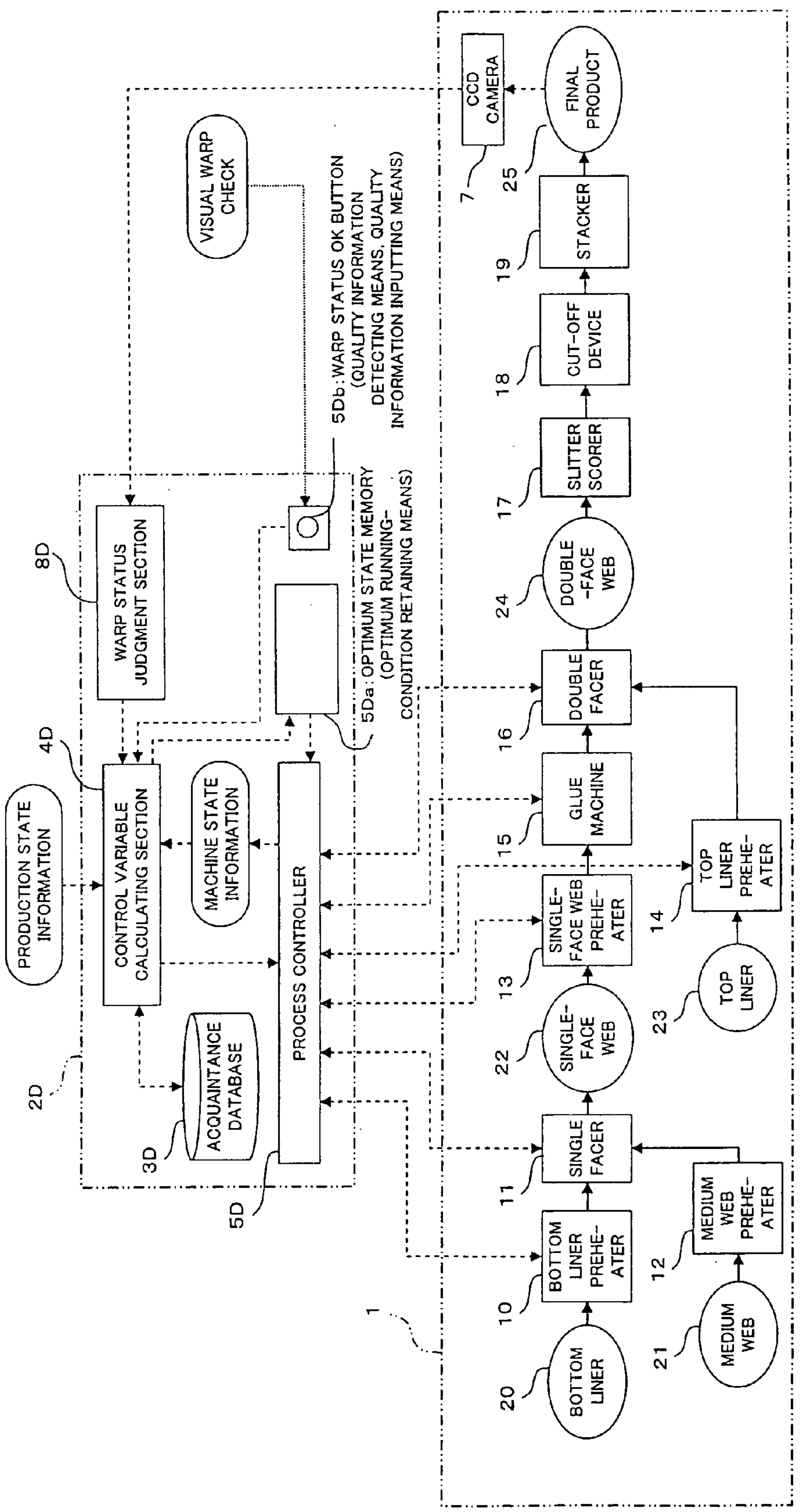
FIG. 63 is a block diagram schematically illustrating a corrugated-board fabrication system according to a twenty-eighth embodiment of the present invention.

As shown in FIG. 63, the production management machine 2D of the twenty-eighth embodiment includes a warp status judgment section (detection means) 8D as a substitution for the warp status inputting section (push buttons) 6D of the twenty-seventh embodiment. A CCD camera (imaging means) 7 is disposed at the rearmost section in the corrugated-board fabrication machine 1.

The CCD camera 7 is arranged at a stacking section 192 of the stacker 19. Corrugated board sheets 25 that have been cut by the cut-off device 18 are transferred by a plurality of conveyors 191 and then subsequently piled in the stacking section 192. The CCD camera 7 images the width-direction side of corrugated board sheets 25 piled in the stacking section 192 and outputs the obtained image data to the warp status judgment section 8D.

The warp status judgment section 8D performs image processing on the image data from the CCD camera 7 and measures the heights of predetermined three points (on the both ends and the center) arranged in the width direction. Then the warp status judgment section 8D judges a wrap direction (upward or downward) in the width direction and a height extent (large, medium or small) on the basis of the variance of the measured heights. The result of the judgment is sent to the control variable calculating section 4D, which then selects one or more control factors based of the received result and calculates control variables of the selected control factors corresponding to machine state information with reference to the acquaintance database 3D.

Here, the judgment of a warp status by the warp status judgment section 8D will now be specifically described with reference to FIGS. 13*a* and 13*b*. The CCD camera 7 photographs a side of a corrugated board sheet 25 across the width thereof as shown in FIG. 13*a*. The warp status judgment section 8D performs image processing on image data from the CCD camera 7 and calculates vertical variations a, b and p of predetermined three points (the driving-side corner PA, the operating-side corner OB and the web center PP) arranged in the width direction with respect to the reference line L0.

The warp status judgment section 8D calculates vertical curl-up amounts A1 and C1 of the corners PB and PP with respect to a flat floor, assuming that a corrugated board sheet 25 is placed on the flat floor, on the basis of the vertical variation a, b and p using the following formulae (A-1) and (A-2). Further, the warp status judgment section 8D calculates an amount $WF_{CD}$ of warp in the width direction defined in terms of the formula below (A-3) using the vertical curl-up amounts A1 and C1. The warp direction is determined by positiveness and negativeness of the warp amount $WF_{CD}$, and the warp height is determined by the largeness of the absolute value of the warp amount $WF_{CD}$.

$$A1 = p - a \tag{A-1}$$

$$B1 = p - b \tag{A-2}$$

$$WF_{CD}(A1, B1) = \frac{(A1 + B1)}{2} \times \frac{\alpha}{W^2} \tag{A-3}$$

where, W represents the length of the width of a corrugated board sheet 25, and α is a constant used to make a warp amount dimentionless.

In the a corrugated-board sheet fabrication system according to this embodiment, warp of a corrugated board sheet 25 is automatically corrected so that it is possible to further accurately correct warp of corrugated board sheets with ease without depending on experience and know-how of an operator. The illustrated example classifies a judged warp extent into three levels of large, medium and small. It is possible for this system to determine a warp extent more sensitively so that warp of a corrugated board sheet 25 can be corrected more accurately.

In this embodiment, the warp status judgment section 8D detects a warp status of a corrugated board sheet on the basis of image data obtained by the CCD camera 7. Alternatively, the CCD camera (imaging means) 7 may be replaced with a variation sensor (variation amount detecting means) 7A shown in FIG. 15*a*-15*c* so that the warp status judgment section 8D detects a warp status of a corrugated board sheet based on a measurement result of the variation sensor 7A.

Specifically, in the example shown in FIGS. 15*a* and 15*b*, the variation sensor 7A is slidably attached to a rail 71*a*, which is fixed to a frame 71 and which extends horizontally along the width direction of a corrugated board sheet 25, being interposed by a variation sensor mounting member 72*a*. Further, non-illustrated driving means is installed in the variation sensor mounting member 72*a* and the variation sensor 7A is driven by the driving means so that the variation sensor 7A is controlled to be positioned over the points of an operating-side edge PR, a driving-side edge PS and a sheet center PT. As a result, it is thereby possible to obtain vertical variation amounts s, t and r between the lens surface of the variation sensor and each point of PR, PS and PT, as shown in FIG. 15*c*.

The warp status judgment section 8D calculates vertical curl-up amounts A1 and C1 of edges PR and PS of a corrugated board sheet 2S with respect to a flat floor using the following formulae (A-4) and (A-5) and a width-direction warp amount $WF_{CD}$ is obtained by the above formula (A-3).

$$A1 = t - s \tag{A-4}$$

$$B1 = t - r \tag{A-5}$$

With this configuration, no warp judgment by the warp status judgment section 8D may automatically store the running state at that time as an optimum running state associated with the current production state. In this case, the warp status OK button 5Db is dispensable, and the warp status judgment section 8D and the CCD camera (imaging means) 7 (or the variation sensor (variation amount detecting means 7A)) serve as the quality information detecting means of the present invention.

(E-4) Twenty-Ninth Embodiment

Next, a twenty-ninth embodiment of the present invention will now be described with reference to FIGS. 64 and 65. This embodiment is, differently from the above twenty-eighth embodiment, featured by means to obtain information about warp of a corrugated board sheet and uses means for measuring moisture contents of liners 20 and 23, as substitute for a CCD camera (imaging means) 7 or a variation sensor (variation amount detecting means) 7A. The remaining configuration is identical to that of the twenty-eighth embodiment.

Figure 64:
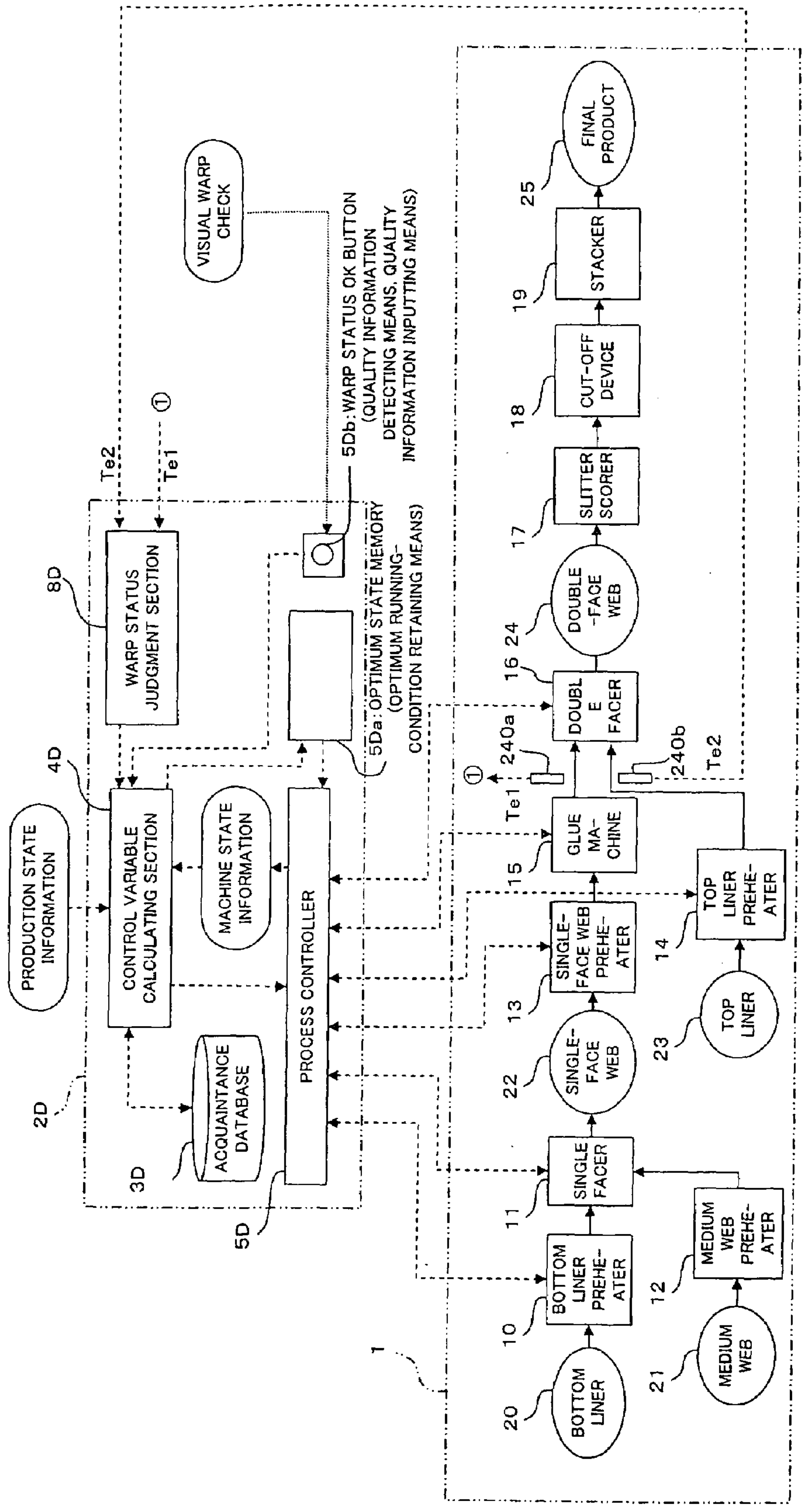
FIG. 64 is a block diagram schematically illustrating a corrugated-board fabrication system according to a twenty-ninth embodiment of the present invention.

As shown in FIG. 64, the production management machine 2D of this embodiment disposes, as moisture content measuring means, a temperature sensor 240*a* to measure a temperature Te1 of a bottom liner 20 which temperature is the parameters correlated with a moisture content of the bottom liner 20 and a temperature sensor 240*b* to measure a temperature Te2 of a top liner 23 which temperature is the parameters correlated with a moisture content of the top liner 23 at the entrance of the double facer 16. The temperature sensors 240*a* and 240*b* are respectively arranged so as to face to the center in the width direction of a single-face web 22 and a top liner 23, respectively. The warp status judgment section 8D judges width-direction warp status of a corrugated board sheet 25 based on the temperatures Te1 and Te2 of liners 20 and 23.

The manner for judgment of a warp status performed by the warp status judgment section 8D is described in detail with reference to FIG. 65. First of all, the warp status judgment section 8D judges which one of the three levels of high, normal and low the temperatures Te1 and Te2 of liners 20 and 23 are respectively on. If the combination of a bottom-liner temperature Te1 and a top-liner temperature Te2 is (high, high), (normal, normal) or (low, low), no temperature difference, i.e., no moisture content difference, exists between the bottom liner 20 and the top liner 23 and the warp status judgment section 8D estimates and judges that a resultant corrugated board sheet that is to be formed by gluing the bottom liner 20 and the top liner 23 together generates no warp.

If the combination of a bottom-liner temperature Te1 and a top-liner temperature Te2 is (high, high) or (low, low), matrix control is executed such that both bottom-liner temperature Te1 and top-liner temperature Te2 become normal.

The warp status judgment section 8D is set to estimate and judge that a resultant corrugated board sheet generates downward warp (has a convex surface toward a bottom liner 20) if the upper bottom liner 20 is higher in temperature than a top liner 23, that is the lower top liner 23 is higher in moisture content than the bottom liner 20. The warp status judgment section 8D additionally estimates and judges the extent of the warp in accordance with the absolute value ΔT of the temperature difference between the liners 20 and 23 or the like. In other words, if a bottom-liner temperature Te1 is high and a top-liner temperature Te2 is normal, the resultant corrugated board sheet is estimated to have medium downward warp; if a bottom-liner temperature Te1 is high and a top-liner temperature Te2 is low, the resultant corrugated board sheet is judged to have large downward warp larger in extent than the above medium downward warp because of relatively large temperature difference ΔT; and if a bottom-liner temperature Te1 is normal and a top-liner temperature Te2 is low, the resultant corrugated board sheet is judged to have small downward warp that is smaller in extent than the above medium downward warp because of the low-side temperatures of both liners 20 and 23.

On the other hand, if the lower top liner 23 is high in temperature than the bottom liner 20, the warp status judgment section 8D estimates and determines that the resultant corrugated board sheet generates upward warp (has a convex surface toward a top liner 23). If a top-liner temperature Te2 is high and a bottom-liner temperature Te1 is normal, the resultant corrugated board sheet is estimated to have medium upward warp; if a top-liner temperature Te2 is high and a bottom-liner temperature Te1 is low, the resultant corrugated board sheet is judged to have large upward warp larger in extent than the above medium upward warp because of larger temperature difference ΔT; and if a top-liner temperature Te2 is normal and a bottom-liner temperature Te1 is low, the resultant corrugated board sheet is judged to have small upward warp that is smaller in extent than the above medium upward warp because of the low-side temperatures of both liners 20 and 23.

Alternatively, the temperature sensors 240*a* and 240*b* may be disposed at the exit of the double facer, as substituted for the entrance thereof.

With the above-described configuration of the system for fabricating a corrugated board sheet according to the twenty-ninth embodiment, especially when the temperature sensors 240*a* and 240*b* are placed at the entrance of the double facer, a warp status of a corrugated board sheet 25 is estimated and judged on the basis of temperatures of liners 20 and 23 before being glued together. Whereupon warp correction can be accomplished at an early stage and this embodiment can deal with short-run fabrication to inhibit warp even if an optimum running state corresponding to the current production state is not stored in the optimum running-condition information memory 5Da.

The moisture content measuring means may take the form of moisture sensors directly measure moisture content of liners 20 and 23, as substituted for the temperature sensors 240*a* and 240*b*, and the warp status judgment section 8D estimates and judges warp of a corrugated board sheet 25 based on measurement result obtained by the moisture sensors.

(E-5) Others

The above is the description of the twenty-sixth through the twenty-ninth embodiments of the present invention. But, the present invention should by no means be limited to the foregoing twenty-sixth through the twenty-ninth embodiments and various alternatives and modifications can be suggested without departing from the gist of the present invention.

For example, the twenty-sixth through the twenty-ninth embodiments of the present embodiment are applied to inhibition of warp of a corrugated board sheet, but, may alternatively be applied to inhibition of inferior gluing of a corrugated board sheet. Specifically, an operator monitors a gluing status of a corrugated board sheet 25 and, if no inferior gluing is observed, inputs the status from quality information inputting means (for example, in the form of a push button). In this case, as a particular control factor affects a gluing state, at least one of control factors of an adhesive amount applied to a medium web at the single facer and an adhesive amount applied to a single-face web in the glue machine should be stored in the optimum running-condition information memory 5Da.

(F)

Hereinafter, a system for correcting possible warp of a corrugated board sheet according to the thirtieth embodiment and a modification thereof will now be described with reference to FIGS. 66-69. Parts and elements identical to those described in the foregoing embodiments are to be referred by the same reference numbers.

(F-1) Thirtieth Embodiment

Figure 66:
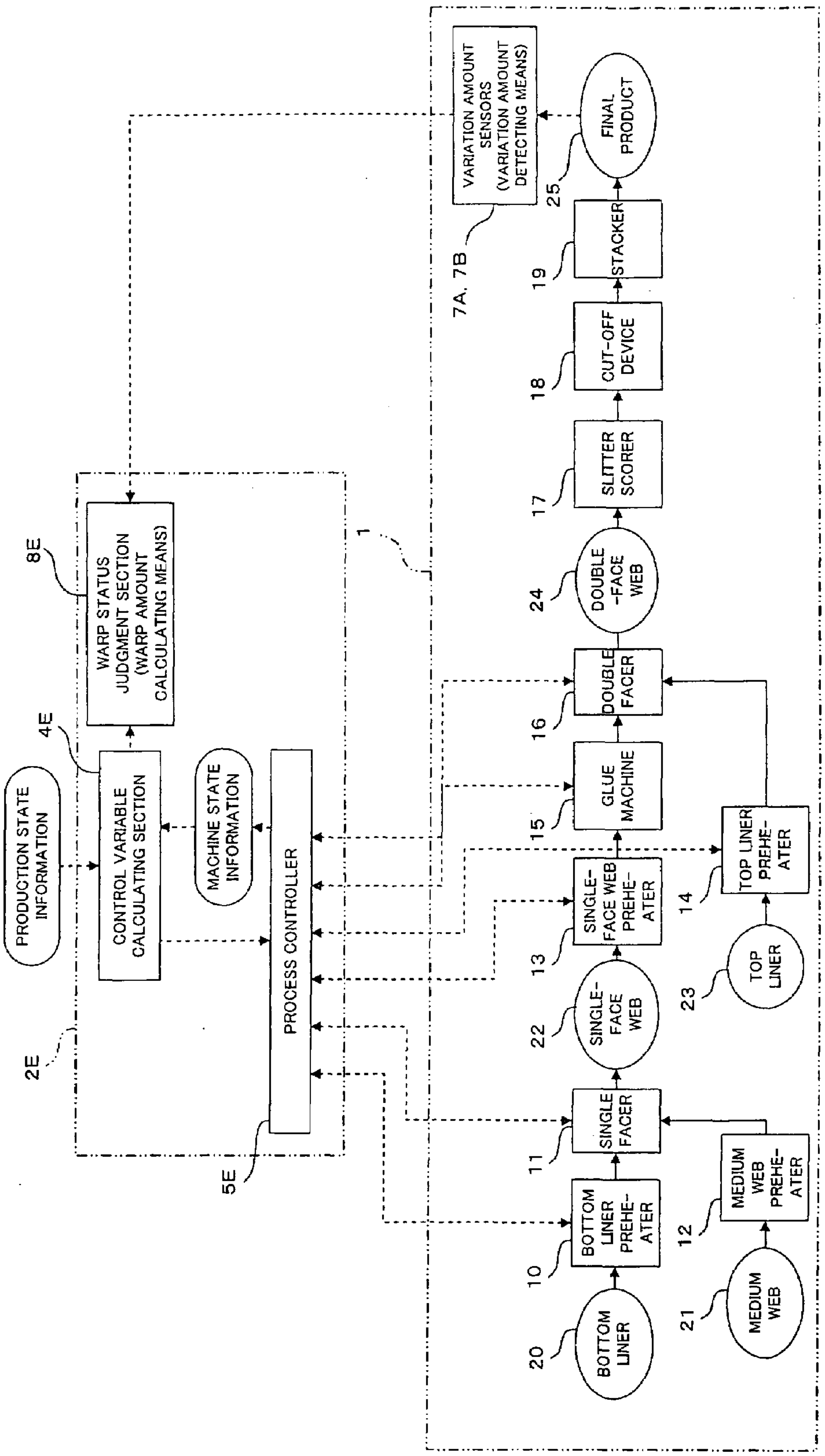
FIG. 66 is a block diagram schematically illustrating a corrugated-board warp status detection unit and a corrugated board sheet fabrication machine according to the thirtieth embodiment of the present invention.

FIG. 66 schematically shows a system for fabricating a corrugated board sheet according to the thirtieth embodiment of the present invention. The system for fabricating a corrugated board sheet of this embodiment comprises a corrugated-board fabrication machine 1 and a production management machine 2E to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by the medium web preheater 12 and then glue the medium web 21 to the bottom liner 20 heated by the bottom liner preheater 10, a single-face web preheater 13 to heat a single-face web 22 formed by the single facer 11, a top liner preheater 14 to heat a top liner 23, a glue machine 15 to paste the single-face web 22 heated by the single-face web preheater 13, a double facer 16 to fabricate a corrugated board 24 by gluing the single-face web 22 pasted by the glue machine 15 and the top liner 23 heated by the top liner preheater 14, a slitter scorer 17 to slit and score the corrugated board 24 fabricated by the double facer 16, a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets in order of fabrication.

The elements 10, 11, 13-16 are shown in FIGS. 2-4, and have been already described in detail above, so repetitious description is omitted here.

The production management machine 2E appropriately controls each of the elements 10, 11, and 13-16, and includes, as shown in FIG. 66, a control variable calculating section 4E, a process controller 5E and a warp status judgment section (warp detection apparatus) 8E. Variation sensors (variation amount detecting means) 7A and 7B are arranged at the rearmost section of the corrugated-board fabrication machine 1. The variation sensors 7A and 7B and the warp status judgment section 8E are included in an apparatus for automatically detecting type and extent of warp of a corrugated board sheet.

The control variable calculating section 4E obtains production-state information from a non-illustrated upper system for production management. The control variable calculating section 4E calculates each control variable on the basis of such production state information and machine state information (running state) obtained through the process controller 5E, and outputs the result of the calculation to the process controller 5E. The process controller 5E controls each control factor in accordance with control instructions from the control variable calculating section 4E. The control variable calculating section 4E and the process controller 5E carry out matrix control using production-state information and running-state information in the above described manner.

The process controller 5E always grasps a current machine state of the corrugated-board fabrication machine 1, and outputs the current machine state to the control variable calculating section 4E regularly or in response to a request from the control variable calculating section 4E.

A machine state represents the current values of a running speed of the corrugated-board fabrication machine 1 (a travel rate of a web), a wrap amount of a web around each of the heating rolls 101A, 101B, 131 and 141, a vapor pressure applied to each of the heating rolls 101A, 101B, 131 and 141, gap amounts between the rolls 116*b* and 114 and between the rolls 116*b* and 116*c* in the single facer 11, a gap amount between the pasting roll 151*b* and the pressure bar 152*a* in the glue machine 15, pressure applied by the pressure units 164 and vapor pressure applied to hotplates 162 in the double facer 16, spray amounts of the shower units 161A and 161B and so on.

As shown in FIG. 27, the variation sensors 7A and 7B are respectively fixed to an upper rail 171 of the stacking section 192 in the stacker 19; the variation sensor 7A measures a variation of the upstream side of a corrugated board sheet 25 stacked in the stacking section 192 and the variation sensor 7B measures a variation of the downstream side of the corrugated board sheet 25 in the same manner as the twenty-seventh embodiment. Corrugated board sheets 25 cut by the cut-off device 18 are transferred, by a plurality of conveyers 191, to and sequentially stacked in the stacking section 192.

The variation sensor 7A is slidably attached to the rail 171*a*, which extends horizontally along the width direction of a corrugated board sheet 25, through a variation sensor mounting member 172*a*, the rail 171*a* being attached to the upper frame 171 at the stacking section 192 through a variation sensor mounting member 172*b* so as to slide along a rail 171*b* that horizontally extends in the travel direction of a corrugated board sheet 25.

Non-illustrated driving means is attached to the variation sensor mounting members 172*a* and 172*b*. The variation sensor 7A is driven by the driving means so that the variation sensor 7A can horizontally move in the width and the travel directions of a corrugated board sheet 25. Thereby, the variation sensor 7A is controlled to be positioned vertically over a measurement point PD at the upstream corner on the driving side of a corrugated board sheet 25, a measurement point PQ at the upstream center in the width direction, a measurement point PC at the upstream corner of the operating side, a measurement point PS at the center of the operating-side end in the travel direction and a measurement point PR at the center of the driving-side edge in the travel direction respectively shown in FIG. 67. It is possible to obtain vertical variation amounts c, d, q, r, and s of the points PC, PD, PQ, PR and PS, respectively, with respect to the variation sensor.

Figure 67:
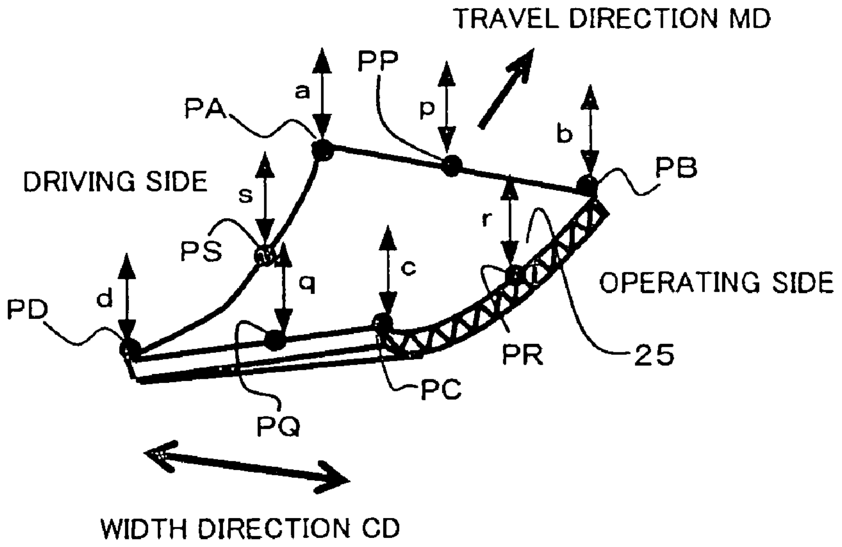
FIG. 67 is a perspective view schematically showing a manner of detecting a warp status of the thirtieth embodiment.

Meanwhile, as shown in FIG. 27, the variation sensor 7B is slidably attached to a rail 173*a*, which is attached to a frame 171 and which horizontally extends along the width direction of a corrugated board sheet 25, through a variation sensor mounting member 174*a*, which includes non-illustrated driving means. The variation sensor 7B is driven by this driving means so as to horizontally move in the width direction of a corrugated board sheet 25. Thereby, the variation sensor 7B is controlled to be positioned vertically over a measurement point PA at the downstream corner on the driving side of a corrugated board sheet 25, a measurement point PP at the center of downstream end in the width direction and a measurement point PB the downstream corner on the operating side of the corrugated board sheet 25, as shown in FIG. 67. It is possible to obtain vertical variation amounts a, b and p of the respective points PA, PB and PP with respect to the variation sensor.

The corner points PA-PD do not necessarily have to be exactly at the four corners of a corrugated board sheet 25 and points PA-PD near the four corners are adequate. The measurement points PP-PS may be near to the center points (being equidistant from the neighboring two corners) of the four sides of the corrugated board sheet 25.

Then the warp status judgment section 8E obtains a warp amount $WF_{CD}$ in the width direction based on the difference of the vertical variation amounts of both ends of a sheet in the width direction with respect to the center in the width direction. Here, the warp status judgment section 8E calculates a warp amount $WF_{CD}$ in the width direction of a corrugated board sheet 25 as shown in the formula (B-1). That is, the warp status judgment section 8E regards the vertical variation amount p of point PP at the center of the downstream side in the width direction as a reference to obtain a warp amount of the downstream side in the width direction. Then, the warp status judgment section 8E regards the vertical variation amount q of point PQ at the center of the upstream side in the width direction as a reference to obtain a warp amount of the upstream side in the width direction. And then the warp status judgment section 8E calculates the warp amount $WF_{CD}$ by using the average of the above two warp amounts as shown in the formula (B-1), where W represents the length of the width of a corrugated board sheet 25, and α is a constant used to make a warp amount dimensionless.

$$WF_{CD} = \frac{1}{2}\left[\left\{p - \frac{a+b}{2}\right\} + \left\{q - \frac{c+d}{2}\right\}\right] \times \frac{\alpha}{W^2} \tag{B-1}$$

Further, the warp status judgment section 8E calculates a warp amount $WF_{MD}$ in the travel direction based on the difference of the vertical variation amount of both sheet ends PA, PD (PB, PC) in the travel direction with respect to the center PS (PR) in the travel direction by using the following formula (B-2). Here, the warp status judgment section 8E regards the vertical variation amount s of point PS at the center of the driving side in the travel direction as a reference to obtain a travel-direction warp amount of the driving side, regards the vertical variation amount r of point PR at the travel-direction center on the operating side as a reference to obtain a warp amount of the operating side in the travel direction and then calculates a warp amount $WF_{MD}$ in the travel direction of a corrugated board sheet 25 by using the average of the above warp amounts as shown in the formula (B-2).

$$WF_{MD} = \frac{1}{2}\left[\left\{s - \frac{a+d}{2}\right\} + \left\{r - \frac{b+c}{2}\right\}\right] \times \frac{\alpha}{W^2} \tag{B-2}$$

Additionally, the warp status judgment section 8E calculates the difference in the vertical variation amounts between two neighboring corners (here, two corners PA and PB, and two corners PC and PD) of a corrugated board sheet 25 and calculates a twist warp amount TWF on the basis of a ratio of the calculated difference with respect to the product (W×L) of the length (W) of the width direction and the length (L) of the travel direction of the corrugated board sheet 25.

$$TWF = \left[\frac{(b-a)+(d-c)}{2}\right] \times \frac{\alpha}{W \times L} \quad \text{(B-3)}$$

The result of the calculation is displayed on a non-illustrated display and an operator confirms a warp status with reference to the display.

The warp detection apparatus of the thirtieth embodiment has the above-described configuration, and warp of a corrugated board sheet 25 is detected in the following manner (a manner to detect warp of the present embodiment).

The variation sensors 7A and 7B detect vertical variation amounts a-d and p-s respectively at the predetermined points PA-PD and PP-PS (the first step) and calculate amounts of width-direction warp, travel-direction warp and twist warp based on the vertical variation amounts a-d and p-s (second step).

After that, on the basis of each warp type of width-direction warp, travel-direction warp and twist warp detected by the warp detection apparatus, an operator selects one or more particular control factors that affect a warp type (that are able to correct warp of that type) and the selected particular control factors and adjusts using control variables associated with warp amount of the warp type, such that warp of a corrugated board sheet is corrected.

Advantageously, it is possible to accurately and effectively correct warp considering a warp amount detected by the warp detection apparatus.

A particular control factor in relation to width-direction warp is able to adjust moisture content of a liner 20 or 23; a particular control factor in relation to travel-direction is able to adjust travel-direction tension of a liner 20 or 23; and a particular control factor in relation to twist warp is able to adjust width-direction distribution of a travel-direction tension of a liner 20 or 23.

(F-2) Others

The warp detection apparatus of the present invention should by no means be limited to the above-described thirtieth embodiment and can be modified without departing from the gist of the present invention.

For example, the thirtieth embodiment displays the result of detection performed by the warp detection apparatus on a display so that an operator confirms the result and appropriately controls one or more particular control factors. Alternatively, warp status information detected by the warp detection apparatus may be output to the process controller and the process controller may automatically correct warp of a corrugated board sheet 25 on the basis of the warp status is information. In this case, an operator does not have to monitor a warp status of a corrugated board sheet 25 whereupon operator work load can be diminished.

Figure 68:
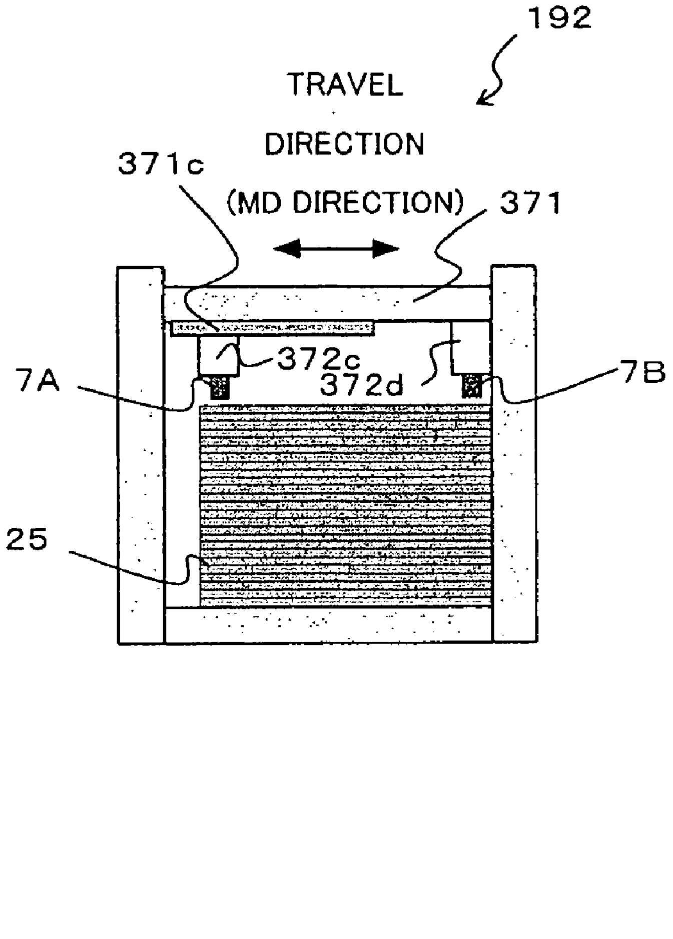
FIG. 68 is a diagram schematically illustrating a configuration of a modification of variation amount detecting means of the thirtieth embodiment.
Figure 69A:
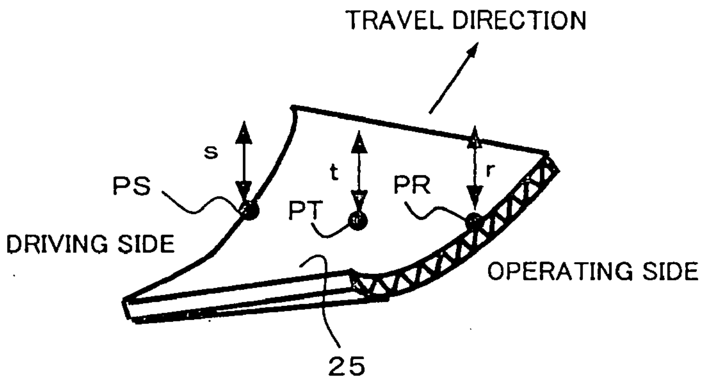
FIG. 69*a* is a diagram schematically illustrating a configuration of a modification of variation amount detecting means of the thirtieth embodiment.
Figure 69B:
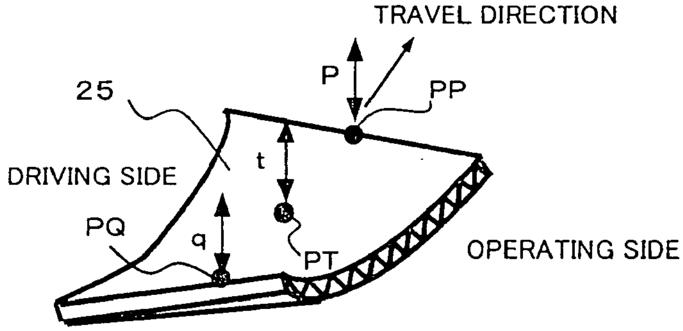
FIG. 69*b* is a diagram schematically illustrating a configuration of a modification of variation amount detecting means of the thirtieth embodiment.

Further, vertical variation amounts a-d and p-s may be measured by the structure shown in FIG. 68. In this example, three variation sensors 7A are fixed to a variation sensor mounting member 372*c*, which is slidably mounted on a rail 371*c* horizontally extending in the travel direction of a corrugated board sheet, at an upstream side of the travel direction of a corrugated board sheet, and are arranged in the same horizontal level along the width direction of a corrugated board sheet. The variation sensor mounting member 372*c* includes non-illustrated driving means, which drives the three variation sensors 7A, which thereby horizontally move in the travel direction together with the variation sensor mounting member 372*c*.

With such a configuration, the two edge variation sensors 7A, among the three variation sensors 7A, measure the vertical variation c, d, r and s shown in FIG. 67 and the center variation sensor 7A measures a variation amount q. In the same manner, three variation sensors 7B are fixed to a variation sensor mounting member 372*d* at downstream side of the travel direction of a corrugated board sheet and are arranged in the same horizontal level along the width direction of a corrugated board sheet. The two edge variation sensors 7B measure variation amounts a and b shown in FIG. 67 and the center variation sensor 7B measures a variation sensor p.

Further, though the illustrated embodiment measures variation amounts at eight points PA-PD and PP-PS and detects width-direction warp and travel-direction warp, detection of width-direction warp can be accomplished by measuring a vertical variation along the width direction of a corrugated board sheet. For example, width-direction warp may be detected in a simple manner on the basis of vertical variation amounts s, t, and r at the three points PS, PT and PR shown in FIG. 69*a*.

In this case, an amount $WF_{CD}$ in the width direction is calculated by the following formula (B-4), for example.

$$WF_{CD} = \frac{1}{2}[(t-s)+(t-r)] \times \frac{\alpha}{W^2} \quad \text{(B-4)}$$

Similarly, detection of travel-direction warp can be accomplished by measuring a vertical variation along the travel direction of a corrugated board sheet. For example, travel-direction warp may be detected in a simple manner on the basis of vertical variation amounts p, t, and q at the three points PP, PE and PQ shown in FIG. 69*b*.

In this case, an amount $WF_{MD}$ in the travel direction is calculated by the following formula (B-5), for example.

$$WF_{MD} = \frac{1}{2}[(t-p)+(t-q)] \times \frac{\alpha}{W^2} \quad \text{(B-5)}$$

In the above thirtieth embodiment, the variation sensors measure vertical variations of a corrugated board sheet 25 at the stacking section 192. Satisfactory measurement of a vertical variation is performed on a final product of a corrugated board sheet 25, the entire width of which has been cut by the cut-off device 18, by the variation sensors. Namely, the satisfactory measurement is carried out downstream of the cut-off device 18. For example, one or more variation sensors may be arranged over a conveyer 191 in the stacker 19 so that the measurement is performed on a corrugated board sheet being transferred on the conveyer 191.

The vertical variation amount detecting means of the thirtieth embodiment takes the form of variation sensors. Alternatively, the vertical variation amount detecting means may be formed by a CCD camera (imaging means) and image analysis means to analyze vertical variation amounts on the basis of image data from the CCD camera, as a substitute for variation sensors.

(G)

Hereinafter, a system for correcting possible warp of a corrugated board sheet according to the thirty-first and thirty-second embodiments and modifications thereof will now be described with reference to FIGS. 70-75. Parts and elements identical to those described in the foregoing embodiments are to be referred to by the same reference numbers.

Embodiments of the present invention will now be described with reference to accompanying drawings.

(G-1) Thirty-First Embodiment

Figure 71:
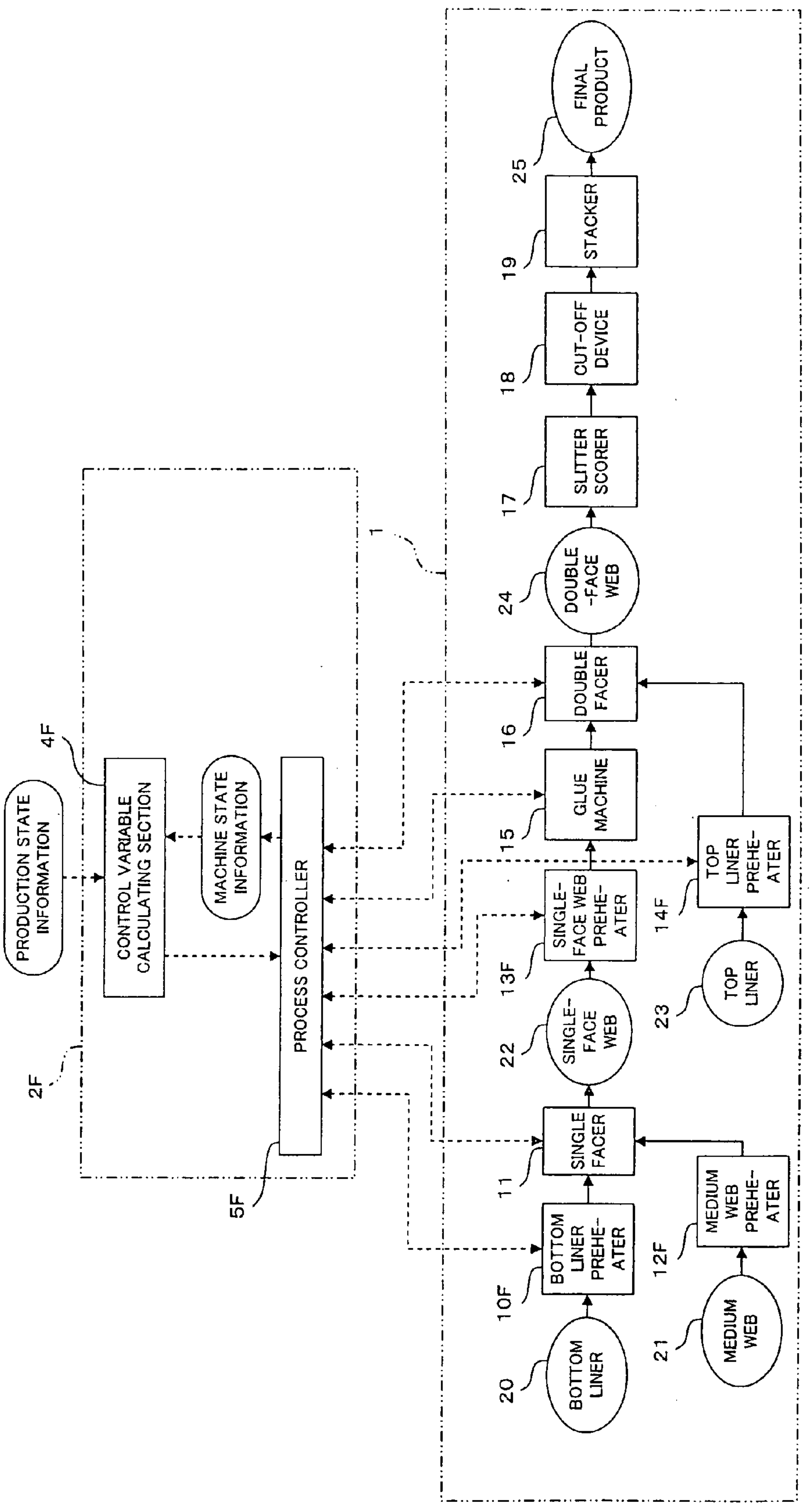
FIG. 71 is a block diagram schematically illustrating a corrugated-board fabrication machine according to the thirty-first embodiment.

FIG. 71 schematically shows a system for fabricating a corrugated board sheet according to the thirty-first embodiment of the present invention. The system for fabricating a corrugated board sheet of this embodiment comprises a corrugated-board fabrication machine 1 and a production management machine 2F to manage the corrugated-board fabrication machine 1.

The corrugated-board fabrication machine 1 includes, as the main elements, a bottom liner preheater 10F to heat a bottom liner 20, a medium web preheater 12F to heat a medium web 21, a single facer 11 to corrugate and paste the medium web 21 heated by the medium web preheater 12F and then glue the medium web 21 to the bottom liner 20 heated by the bottom liner preheater 10F, a single-face web preheater 13F to heat a single-face web 22 formed by the single facer 11, a top liner preheater 14F to heat a top liner 23, a glue machine 15 to paste the single-face web 22 heated by the single-face web preheater 13F, a double facer 16 to fabricate a corrugated board 24 by gluing the single-face web 22 pasted by the glue machine 15 to a top liner 23 heated by the top liner preheater 14, a slitter scorer 17 to slit and score the corrugated board 24 fabricated by the double facer 16, a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets 25 in a fabricated order.

Figure 72:
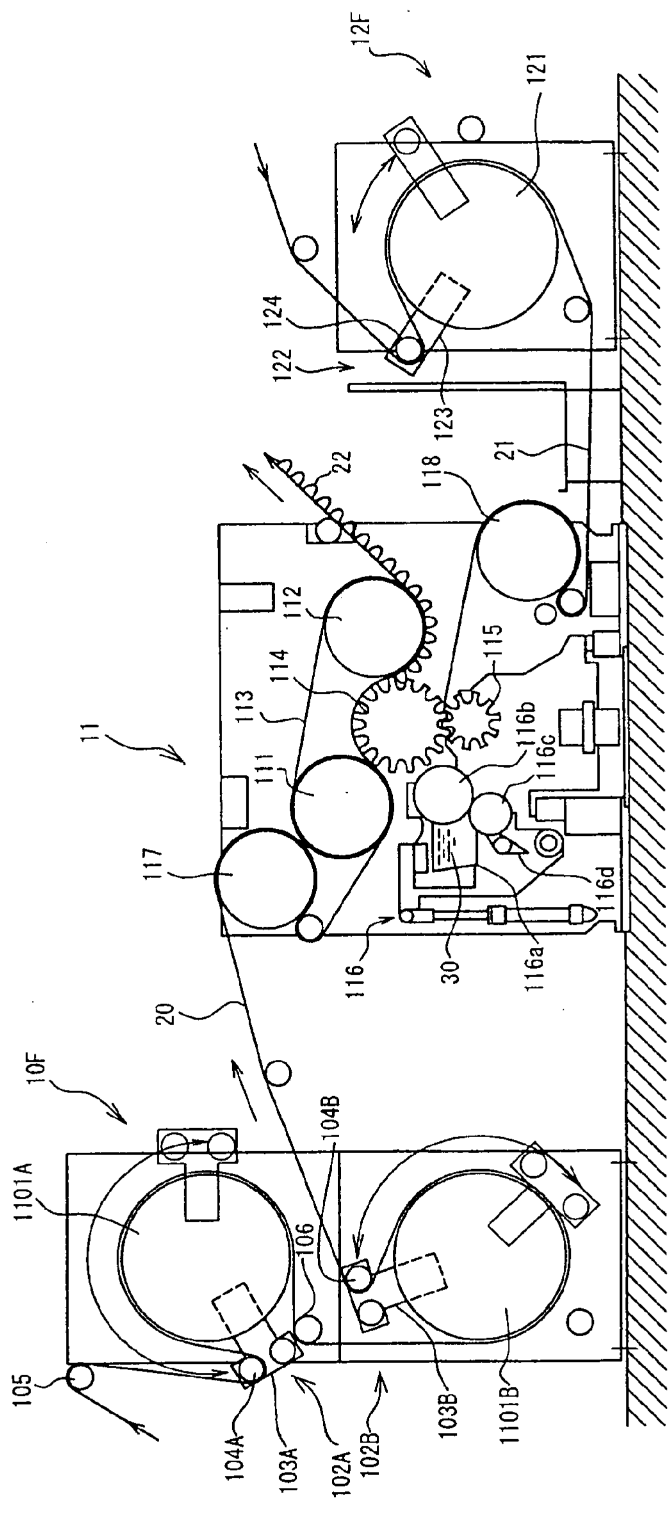
FIG. 72 is a schematic diagram showing the bottom liner preheater, a medium web preheater and a single facer of the thirty-first embodiment.

The detailed structure of elements 10F, 11, 13F, 14F, 15 will be hereinafter described with reference to FIGS. 72 and 73. FIG. 72 schematically shows structures of the bottom liner preheater 10F, the single facer 11 and the medium web preheater 12F; and FIG. 73, structures of the single-face web preheater 13F, the top liner preheater 14F, the glue machine 15 and a part of the double facer 16.

As shown in FIG. 72, the bottom liner preheater 10F includes bottom liner heating rolls 1101A and 1101B vertically arranged. Supplying inside of the bottom liner heating rolls 1101A and 1101B with vapor heats the bottom liner heating rolls 1101A and 1101B to predetermined temperatures. A bottom liner 20 sequentially guided by guide rolls 105, 104A, 106 and 104B is wrapped around the curved surfaces of the bottom liner heating rolls 1101A and 1101B, and preheated by the bottom liner heating rolls 1101A and 1101B.

Among these guide rolls 105, 104A, 106 and 104B, the guide roll 104A, which is arranged adjacent to the bottom liner heating roll 1101A, is supported by the tip of an arm 103A swingably mounted to the axis of the bottom liner heating roll 1101A; and the guide roll 104B, which is arranged adjacent to the other bottom liner heating roll 1101B, is supported by the tip of an arm 103B swingably mounted on the axis of the bottom liner heating roll 1101B. Each of the arms 103A and 103B is moved to an arbitrary position within the angle range indicated by the arrows in the accompanying drawing by a non-illustrated motor. Here, a set of the guide roll 104A, the arm 103A and the non-illustrated motor (see reference symbol M in FIG. 70*b*), and a set of the guide roll 104B, the arm 104B and a motor, function as wrap-amount adjusting units (wrap-amount adjusting means) 102A and 102B, respectively.

With this configuration, the bottom liner preheater 10F can adjust a moisture content of a bottom liner 20, by adjusting vapor pressure supplied to the bottom liner heating rolls 1101A and 1101B, and wrap amounts (wrap angles) of a bottom liner 20 around bottom liner heating rolls 1101A and 1101B by the wrap-amount adjusting units 102A and 102B. Specifically, higher vapor pressure and/or the larger wrapped amount increase heat provided to a bottom liner 20 from the bottom liner heating rolls 1101A and 1101B so that the bottom liner 20 becomes drier and thereby the moisture content thereof declines.

The single facer 11 includes a press belt 113 wrapped around a belt roll 111 and a tension roll 112, an upper roll 114 having a wave-form surface and pressing the press belt 113 in contact with the press belt 113, and a lower roll 115 also having a wave-form surface and engaging with the upper roll 114. A bottom liner 20 heated by the bottom liner preheater 10F is wrapped around a liner preheating roll 117 to be preheated and then guided, together with the press belt 113, to a nip between the press roll 113 and the upper roll 114 by the belt roll 111. Meanwhile, a medium web 21 heated by the medium web preheater 12 is wrapped around a medium web preheating roll 118 to be preheated, corrugated at the engaging point of the upper roll 114 and the lower roll 115, and then guided to the nip between the press belt 113 and the upper belt 114 by the upper roll 114.

A pasting unit 116 is disposed close to the upper roll 114. The pasting unit 116 is formed by a glue dam 116*a* to store glue 30, a pasting roll 116*b* to apply the glue to a medium web 21 to be transferred by the upper belt 114, a meter roll 116*c* to adjust a glue amount applied to the surface of the pasting roll 116*b*, a glue sweeping blade 116*d* to sweep glue from the meter roll 116*c*. Each flute tip of a medium web 21 corrugated at the engaging point of the upper roll 114 and the lower roll 115 is pasted by pasting roll 116*b* and the medium web 21 is glued to the bottom liner 20 at the nip between the press belt 113 and the upper roll 114 whereby a single-face web 22 is fabricated.

With this configuration, the single facer 11 can adjust a moisture content of a bottom liner 20 by adjusting a gap amount between the pasting roll 116*b* and the upper roll 114 and the gap between the pasting roll 116*b* and the meter roll 116*c*. Concretely, a larger gap amount increases an amount of glue applied to each contact point of a medium web 21 with a bottom liner 20 so that water contained in the glue increases a moisture content of the bottom liner 20. The above gap amounts can be adjusted by movement of the pasting roll 116*b* and/or the meter roll 116*c*.

The medium web preheater 12 is identical in configuration to the bottom liner preheater 10F, and includes a medium-web heating roll 121 to be heated to a predetermined temperature by being applied to the inside therein with vapor, and a wrap amount adjusting unit 122 to adjust a wrap amount (a wrap angle) of a medium web 21 around the medium web heating roll 121. The wrap amount adjusting unit 122 includes a guide roll 124 around which a medium web 21 is wrapped, an arm 123 swingably mounted to the axis of the medium web heating roll 121 in order to support the guide roll 124, and a non-illustrated motor to rotate the arm 123.

Figure 73:
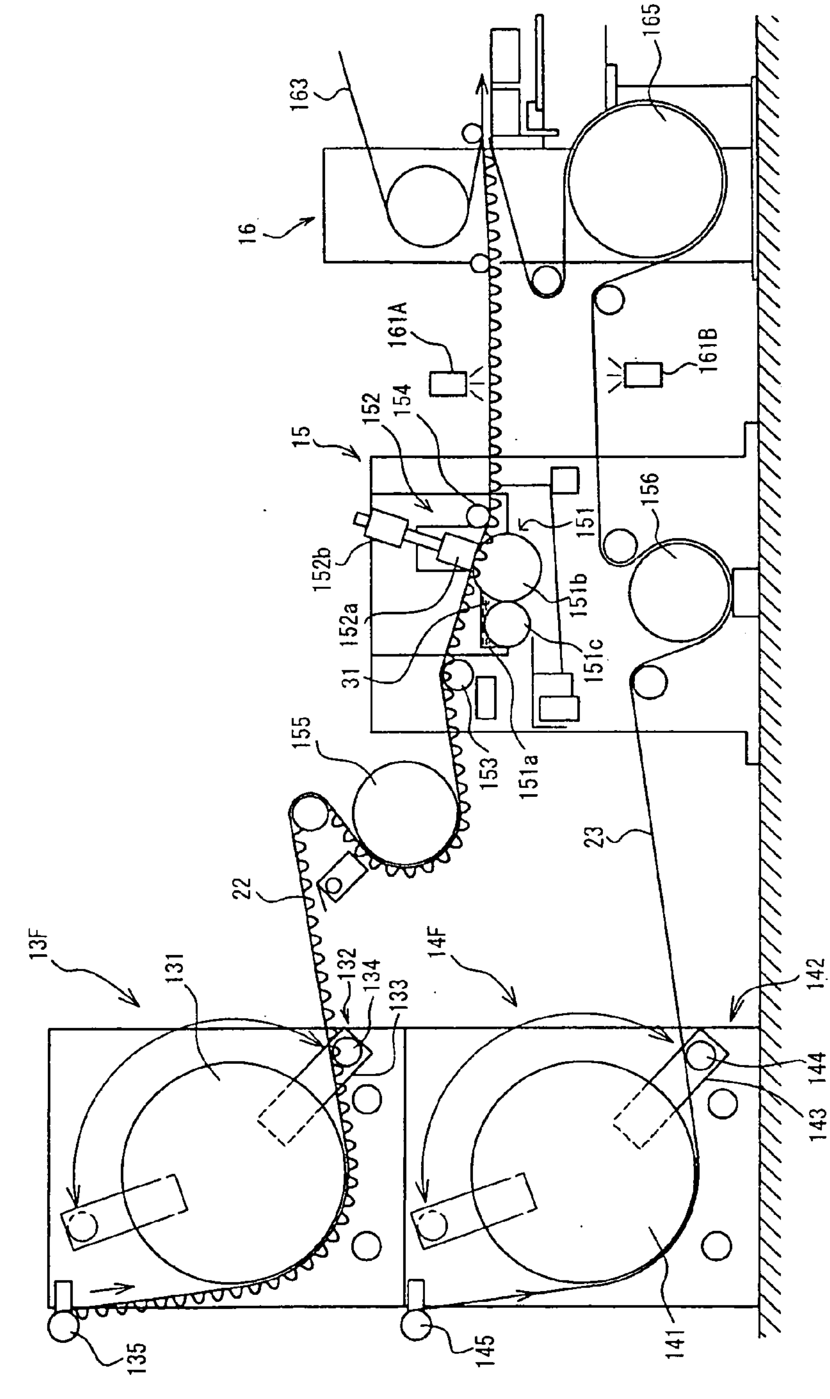
FIG. 73 is a diagram schematically showing a configuration of a single-face web preheater, a top-liner preheater, a glue machine and a part of a double facer of the thirty-first embodiment.

As shown in FIG. 73, the single-face web preheater 13F and the top liner preheater 14F are vertically arranged and are identical in configuration to the above-described bottom liner preheater 11.

The single-face web preheater 13F includes a single-face web heating roll 131 and a wrap amount adjusting unit 132. Supplying the inside of the single-face web heating roll 131 heats with vapor the single-face web heating roll 131 to a predetermined temperature. A bottom liner 20, serving as one side of a single-face web 22 sequentially guided by guide rolls 135 and 134, is wrapped around the curved surface of the single-face web heating roll 131 and is preheated by the single-face web heating roll 131.

The wrap amount adjusting unit 132 is formed by the guide roll 134, an arm 133 swingably mounted to the axis of the single-face web heating roll 131 in order to support the guide roll 134 and a non-illustrated motor to rotate the arm 133. The guide roll 134 is moved to an arbitrary position within the angle range indicated by the arrows in the accompanying drawing under control of the motor so that a wrap amount (a wrap angle) of a single-face web 22 around the single-face web heating roll 131 can be adjusted.

With such a configuration, the single-face web preheater 13F can adjust a moisture content of the bottom liner 20 by adjusting pressure of vapor to be supplied to the single-face web heating roll 131 and a wrap amount (a wrap angle) of the single-face web 22 around the single-face web heating roll 131. Specifically, a higher vapor pressure or a larger wrap amount increases a heat amount applied to the bottom liner 20 from the single-face web heating roll 131 so that the bottom liner 20 gets drier and the moisture content thereof declines.

The top liner preheater 14F includes a top liner heating roll 141 and a wrap amount adjusting unit 142. Supplying the inside of the top liner heating roll 141 heats top liner heating roll 141 to a predetermined temperature. A top liner 23 sequentially guided by guide rolls 145 and 144 is wrapped around the curved surface of the top liner heating roll 141, and is preheated by the top liner heating roll 141.

The wrap amount adjusting unit 142 is formed by the guide roll 144, an arm 143 swingably mounted on the axis of the top liner heating roll 141 in order to support the guide roll 144, and a non-illustrated motor to rotate the arm 143. The guide roll 144 is moved to an arbitrary position within the angle range indicated by the arrows in the accompanying drawing under control of the motor so that a wrap amount (a wrap angle) of a top liner 23 around the top liner heating roll 141 can be adjusted.

With such a configuration, the top liner preheater 14F can adjust a moisture content of the top liner 23 by adjusting pressure of vapor supplied to the top liner heating roll 141 and a wrap amount (a wrap angle) of the top liner 23 around the top liner heating roll 141. Specifically, a higher vapor pressure or a larger wrap amount increases a heat amount applied to the top liner 23 from the top liner heating roll 141 so that the top liner 23 gets drier and the moisture content thereof declines.

The glue machine 15 includes a pasting unit 151 and a pressure bar unit 152. A single-face web 22 that has been heated by the single-face web preheater 13 is preheated by a single-web preheating roll 155 and then is guided into the inside of the glue machine 15 by guide rolls 153 and 154. The pasting unit 151 is disposed on the lower side (the medium-web-21 side) of the travel path of a single-face web 22 between the guide rolls 153 and 154 while the pressure bar unit 152 is disposed on the upper side (the bottom-liner-20 side) of the travel path.

The pasting unit 151 includes a glue dam 151*a* to store glue 31, a pasting roll 151*b* disposed adjacent to the travel path of a single-face web 22, and a doctor roll 151*c* being in contact with the pasting roll 151*b* and rotating in the opposite direction to the pasting roll 151*b*. The pressure bar unit 152 is formed by a pressure bar 152*a* arranged opposite to the pasting roll 151*b* with respect to the single-face web 22, and an actuator 152*b* to press the pressure bar 152*a* towards the pasting roll 151*b*. A single-face web 22 is pressed towards the pasting roll 151*b* by the pressure bar 152*a*, and each flute tip of the medium web 21 is pasted by the pasting roll 151*b* when the single-face web 22 passes through the space between the pressure bar 152*a* and the pasting roll 151*b*. A single-face web 22 having a medium web 21 flutes of which are pasted is to be glued to a top liner 23 in the ensuing process performed in the double facer 16.

With such a configuration, the glue machine 15 can adjust a moisture content of a top liner 23 by adjusting a gap amount between the pasting roll 151*b* and pressure bar 152*a* (i.e., a gap amount of the pasting roll 151*b* in relation to the travel path of the single-face web 22). Specifically, a larger gap amount increases an amount of glue applied to each glued contact point of a medium web 21 with a top liner 23, so that moisture contained in the top liner 23 increases, thereby increasing moisture content of the top liner 23. The actuator 152*b* can adjust the above gap amount by adjusting the position of the pressure bar 152*a*.

A single-face web 22 pasted in the glue machine 15 is transferred to the double facer 16 in which the ensuing step is to be performed. A top liner 23 heated in the top liner preheater 14 is transferred to the double facer 16 through the inside of the glue machine 15. During the transfer, the top liner 23 is guided and preheated by a liner preheating roll 156 disposed in the glue machine 15.

At the entrance of the double facer 16, a first shower unit (a bottom liner lubrication unit) 161A is disposed on the bottom-liner-20 side alongside the travel path of a single-face web 22; and a second shower unit (a top liner lubrication unit) 161B is disposed alongside the travel path of top liner 23. These shower units 161A and 161B are respectively used to adjust moisture contents of bottom liner 20 and top liner 23, respectively; the shower unit 161A sprays water over a bottom liner 20 and the shower unit 161B sprays water over a top liner 23. The moisture content of the bottom liner 20 increases in accordance with an amount of water sprayed from the shower unit 161A, and the moisture content of the top liner 23 increases in accordance with an amount of water sprayed from the shower unit 161B. These shower units 161A and 161B are controlled independently of each other.

Figure 70A:
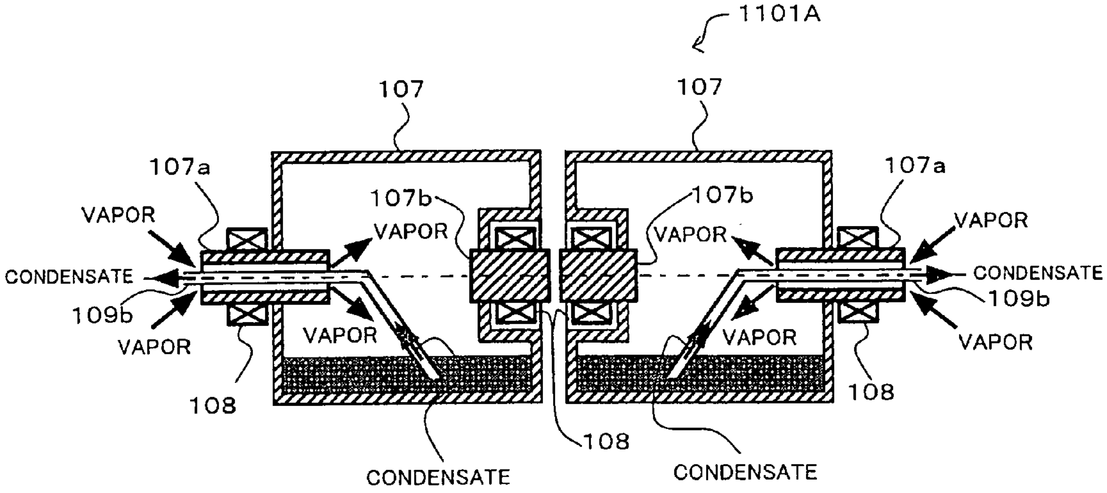
FIG. 70*a* is a sectional front view schematically illustrating the main part (a heating roll) of a bottom liner preheater according to a thirty-first embodiment of the present invention.
Figure 70B:
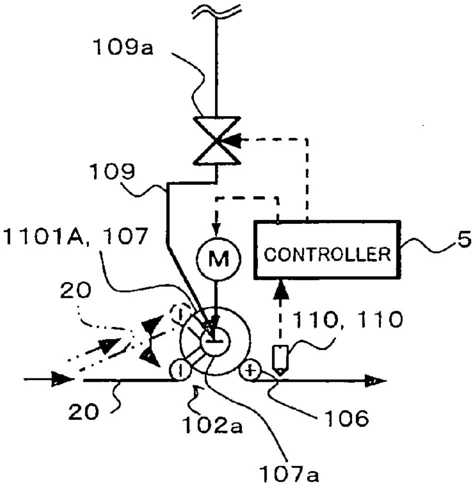
FIG. 70*b* is a schematic diagram showing the main part (a heating roll) of the bottom liner preheater of the thirty-first embodiment.

The preheaters 10F, 12F-14F have characteristic configurations in this invention, which configuration is illustrated by exemplifying the description of the bottom liner preheater 10F with reference to FIG. 70*a*, 70*b*.

FIGS. 70*a* and 70*b* respectively show a configuration of a heating roll of a bottom liner preheater 10F: FIG. 70*a* is a schematic sectional front view (seen from the web traveling direction); and FIG. 70*b* illustrates a manner to control a heat amount. A wrap amount adjusting unit is omitted in FIG. 70*a*.

As described above, the bottom liner preheater 10F includes the heating rolls (heating means) 1101A and 1101B. The configurations thereof are described by exemplifying the heating roll 1101A. As shown in FIG. 70*a*, the heating roll 1101A is formed by a plurality (two in this example) of cylindrical shells (heating units) 107 having the same diameter and arranged in such a posture that the axes of the shells 107 forms a single straight line in the web-width direction. In other words, the heating roll 1101A is divided into the plural shells 107 arranged in the web-width direction.

Each of shells 107 includes axis parts 107*a* and 107*b* at both flat side surfaces and the axis parts 107*a* and 107*b* are supported by bearings 108 so that the shell 107 can rotate. In this embodiment, movement of a bottom liner (a web) wrapped around the curved surfaces of the shells 107 rotates the shells 107. The bearings 108 are supported by non-illustrated frames.

Each shell 107 has a hollow shape, into which vapor is supplied so that a bottom liner wrapping around the curved surface thereof is heated. Specifically, the outer axis part 107*a* of each shell 107 is in the form of a pipe, to which a vapor pipe 109 is connected as shown in FIG. 70*b*. Thereby, vapor supplied from a non-illustrated vapor source is adjusted to a predetermined pressure by a pressure adjusting valve 109*a* installed in each vapor pipe 109 and then supplied into a corresponding shell 107.

A temperature sensor (moisture content measuring means) 110 is disposed downstream of each shell 107 so as to face to a bottom liner 20. A plurality of (in this example, two) temperature sensors 110, one for each of the shells 107, are arranged in the width direction (A temperature sensor 110 is disposed for each shell 107 in order to measure temperature of a portion of a web which portion is heated by the shell 107). Temperature information (information of the parameters concerning a moisture content) obtained by the temperature sensors 110 is output to the process controller 5F in the production management machine 2F. After that, the process controller (control means) 5F controls heat amounts applied to the individual shells 107 arranged in the web-width direction by controlling an opening degree of each pressure adjusting valve 109*a* based on the measurement result obtained by the temperature sensors 110 such that the temperature of a bottom liner 20 becomes a predetermined value without a temperature variation in the web width direction.

The above predetermined temperature is appropriately determined by the process controller 5F in accordance with, for example, production information.

As shown in FIG. 70*a*, a drain pipe 109*b* is passed into the axis part 107*a* of each shell 107 so that vapor applied into the inside of the shell 107 heats a bottom liner 20, becomes condensation and then is drained through the drain pipe 109*b*.

The production management machine 2F appropriately controls each of the above elements 10F, 11 and 13F-16F, and includes, as shown in FIG. 71, the control variable calculating section 4F and the process controller 5F.

The control variable calculating section 4F obtains production state information from a non-illustrated upper system for production management. The control variable calculating section 4F calculates each control variable on the basis of such production state information and machine state information (running state) obtained through the process controller 5F, and outputs the result of the calculation to the process controller 5F. The process controller 5F controls each control factor in accordance with control instructions from the control variable calculating section 4F. The control variable calculating section 4F and the process controller 5F carry out matrix control using production state information and running state information in the above described manner.

The process controller 5F always grasps a current machine state of the corrugated-board fabrication machine 1, and outputs the current machine state to the control variable calculating section 4F regularly or in response to a request from the control variable calculating section 4F. The machine state information is input from the process controller 5F that is to be described later.

A machine state represents the current values of a running speed of the corrugated-board fabrication machine 1 (a travel rate of a web), a wrap amount of a web around each of the heating rolls 1101A, 1101B, 131 and 141, vapor pressure applied to each of the heating rolls 1101A, 1101B, 131 and 141, gap amounts between the rolls 116*b* and 114 and between the rolls 116*b* and 116*c* in the single facer 11, a gap amount between the pasting roll 151*b* and the pressure bar 152*a* in the glue machine 15, spray amounts of the shower units 161A and 161B and so on.

Each of the preheaters 10, and 12-14 of the thirty-first embodiment has a heating roll divided into a plurality of parts arranged in the web-width direction, so that it is possible to adjust heat amounts applied to web-width portions of each of webs 20-23. As a result, a water content (a temperature) of each web 20-23 can be uniform in the width direction and width-direction S-shape warp can be inhibited while maintaining an optimum tension of the web 20-23 (i.e., without affecting the web tension).

On the basis of measurements results obtained by temperature sensors, pressure adjusting valves for the shells arranged in the web-width direction are automatically controlled by the process controller 5F so that, advantageously, temperature management of webs 20-23 is automatically controlled and width-direction S-shape warp is also automatically inhibited.

Adjustment of a web wrap amount around the heating rolls of each preheater 10, and 12-14 by a wrap amount adjusting unit can control heat amounts applied to the entire width of webs 20-23 in a lump. Thereby, if the entire width of a web 20-23 is higher or lower in temperature than a predetermined temperature irrespective of a region in the width direction, the above-described adjustment for a web wrap amount roughly adjusts the temperature and then heat amounts applied to individual shells arranged in the web width direction are controlled whereupon detailed temperature controlling in the width direction can be effectively performed.

Figure 74:
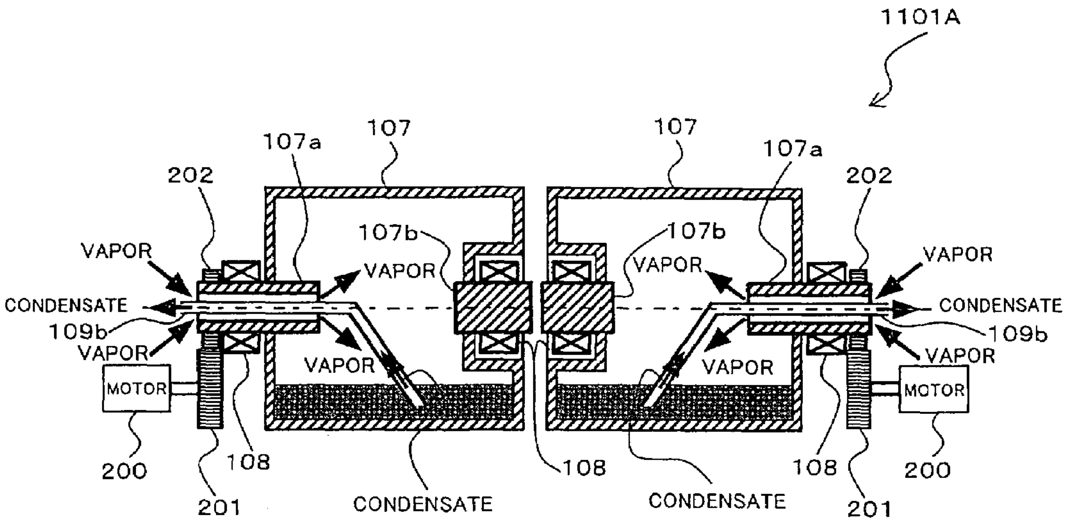
FIG. 74 is a sectional front view schematically showing the main part (a heating roll) of a modification of the bottom liner preheater of the thirty-first embodiment.

In this thirty-first embodiment, rotation of heating rolls (shells) of a preheater follows traveling of a web. Alternatively, a heating roll may include a driving mechanism as shown in FIG. 74. Each shell 107 that forms a heating roll is rotated by a driving motor 200 through a gear 201 fixed to the axis of the motor and a gear 202 fixed to the outer surface of the axis part 107*a* of the shell 107 and engages with the gear 201. The two shells 107 are driven in synchronization (in the same rotating rate).

In the structures shown in FIGS. 70 and 74, the inner axis parts 107*b* of the two shells 107 may be a shared shape commonly used by the two shells 107.

(G-2) Thirty-Second Embodiment

Figure 75A:
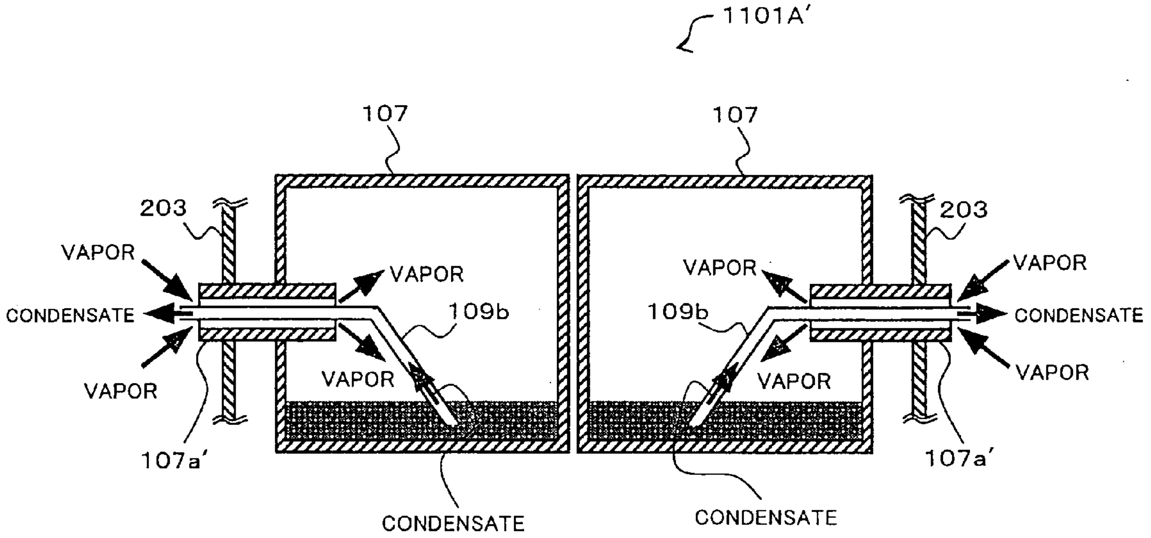
FIG. 75*a* is a sectional front view schematically showing the main part (a heating roll) of a modification of a bottom liner preheater according to thirty-second embodiment of the present embodiment.
Figure 75B:
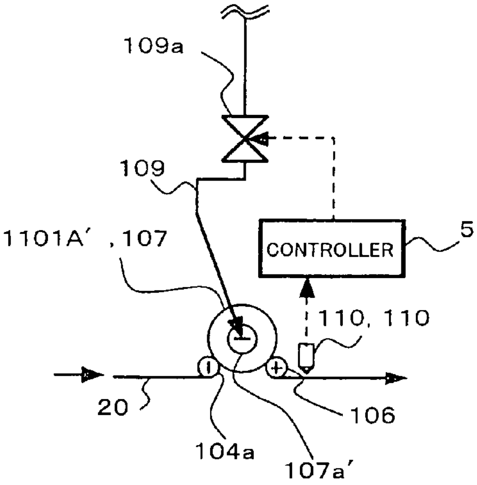
FIG. 75*b* is a diagram showing a configuration of the main part (a heating roll) of a bottom liner preheater of the thirty-second embodiment.

FIGS. 75*a* and 75*b* respectively show a configuration of a heating roll 1101A' of this embodiment; FIG. 75*a* is a front sectional view (seen from the web travel direction); and FIG. 75*b* explains controlling of a heat amount. Parts and elements identical to those described in the foregoing embodiments are to be referred by the same reference numbers, and repetitious description is omitted here.

The heating roll 1101A' is a substitute for the heating roll 1101A of FIG. 72 and is used in the bottom liner preheater 10F. Similar to the first embodiment, two shells having the same diameter are arranged in such a posture that the axes thereof form a single straight line in the web-width direction. Each of these shells 107 and 107 is fixed to and cantilever-supported to frame 203 to form a fixed structure (so as not to rotate) through a supporting member 107*a*' arranged at an outer side wall of the shells so that a bottom liner 20 slides on the shells 107. Supporting members 107*a*' are in the form of a pipe, through which vapor is supplied into the insides of the shells 107. A drainpipe 109*b* passes through a supporting member 107*a*' to insert into a shell 107, so that condensed vapor is drained through the drain pipe 109*b*.

As shown in FIG. 75*b*, a heating roll 1101A' of this embodiment does not include a wrap amount adjusting unit 102A, differently from the heating roll 1101A of the thirty-first embodiment shown in FIG. 70*b*. On the basis of measurement results obtained by temperature sensors 110, one being installed for each shell 107, individual opening degrees of pressure adjusting valves 109*a*, one being installed for each shell 107, are adjusted such that the temperature of the entire width of a bottom liner 20 becomes a predetermined value.

The preheaters of the thirty-second embodiment therefore guarantee the same advantages as those of the thirty-first embodiment.

(G-3) Others

The preheaters of the present invention should by no means limited to those described in the thirty-first and the thirty-second embodiments and can be changed or modified without departing from the spirit of the present invention.

For example, a moisture sensor may be alternatively used as a substitute for a temperature sensor serving as moisture content measurement means to measure a moisture content of a web.

In the thirty-first and the thirty-second embodiments, a heat amount applied to each shell 107 is controlled in accordance with the measurement result obtained by a corresponding temperature sensor (moisture content measurement means). Alternatively, a CCD camera may photograph the travel-direction end of a corrugated board sheet 25 stacked in the stacker 19 and heat amounts (opening degree of pressure adjusting valves 109*a*) may be adjusted on the basis of image data obtained by the CCD camera. In this case, a vertical variation amount (position in height) of a corrugated board sheet 25 is detected along the width direction thereof on the basis of image data obtained by the CCD camera and a status concerning width-direction S-shape warp of the corrugated board sheet 25 is detected based on the detected variation amount.

Further, in the thirty-first and the thirty-second embodiments, the process controller 5F automatically controls the pressure adjusting valves 109*a* on the basis of information detected by the temperature sensors (the moisture content measuring means). Alternatively, an operator may visually observe a warp status of a corrugated board sheet 25, as substitute for installation of the moisture content measuring means, and may manually control the pressure adjusting valves 109*a* in accordance with the observed warp status.

The thirty-first and thirty-second embodiments include preheaters each of which is divided into two parts in the width direction. Alternatively, preheaters may be divided into two or more parts, for example, into three parts.

Still further, a preheater may not take the form of heating rolls. For example, a preheater may take the form of heating boxes into which vapor is supplied and which are arranged in the width direction of a web, so that a web may slides on these heating boxes.

Preheaters of the thirty-first and the thirty-second embodiments are heated by supplying vapor into the insides thereof. The manner to heat preheaters should by no means be limited to vapor heating, but may be alternatively performed by dielectric heating or induction heating, for example.

(H)

Hereinafter, an apparatus for detecting possible warp of a corrugated board sheet according to thirty-third to thirty-fifth embodiments and modifications thereof will now be described with reference to FIGS. 76-81. Parts and elements identical to those described in the foregoing embodiments are to be referred by the same reference numbers and description thereof is partially omitted.

(H-1) Thirty-Third Embodiment

Figure 78:
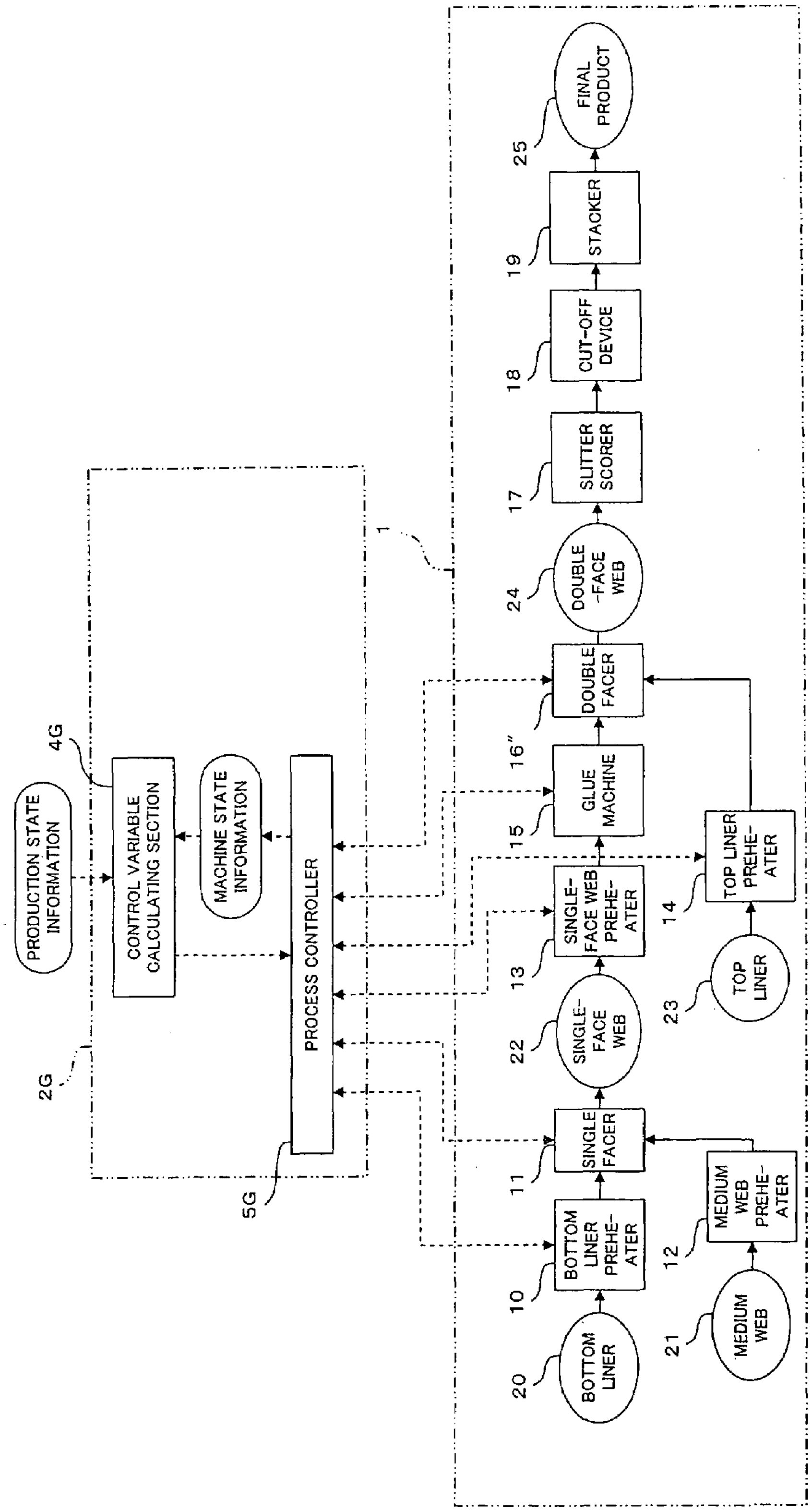
FIG. 78 is a schematic diagram illustrating a configuration of a corrugated-board fabrication machine of the thirty-third embodiment.

A system for fabricating a corrugated board sheet of this embodiment will now be described with reference to FIG. 78. FIG. 78 schematically shows a system for fabricating a corrugated board sheet.

A system for fabricating a corrugated board sheet includes a corrugated-board fabrication machine 1 and a production management machine 2G to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by the medium web preheater 12 and then glue the medium web 21 to the bottom liner 20 heated by the bottom liner preheater 10, a single-face web preheater 13 to heat the single-face web 22 formed by the single facer 11, a top liner preheater 14 to heat a top liner 23, a glue machine 15 to paste the single-face web 22 heated by the single-face web preheater 13, a double facer 16" to fabricate a corrugated board 24 by gluing a single-face web 22 pasted by the glue machine 15 to a top liner 23 heated by the top liner preheater 14, a slitter scorer 17 to slit and score the corrugated board sheet 24 fabricated by the double facer 16", a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets 25 in the order in which they are fabricated.

The production management machine 2G appropriately controls each of the elements 10, 11, and 13-16", and includes, as shown in FIG. 78, a control variable calculating section 4G, and a process controller (control means) 5G.

The control variable calculating section 4G obtains production state information from a non-illustrated upper system for production management. The control variable calculating section 4G calculates each control variable on the basis of such production state information and machine state information (running state) obtained through the process controller 5G, and outputs the result of the calculation to the process controller 5G. The process controller 5G controls each control variable responsive to control instructions from the control variable calculating section 4G. The control variable calculating section 4G and the process controller 5G carry out matrix control using production state information and running state information in the above described manner.

The process controller 5G always grasps a current machine state of the corrugated-board fabrication machine 1, and outputs the current machine state to the control variable calculating section 4G regularly or in response to a request from the control variable calculating section 4G.

A machine state represents the current values of a running speed of the corrugated-board fabrication machine 1 (a travel rate of a web), a pressing force of a later-described press unit 162 of the double facer 16", and a vapor pressure of hotplates 1162 of the double facer 16" and so on.

A detailed structure of the double facer 16" of the thirty-third embodiment will now be described.

Figure 77:
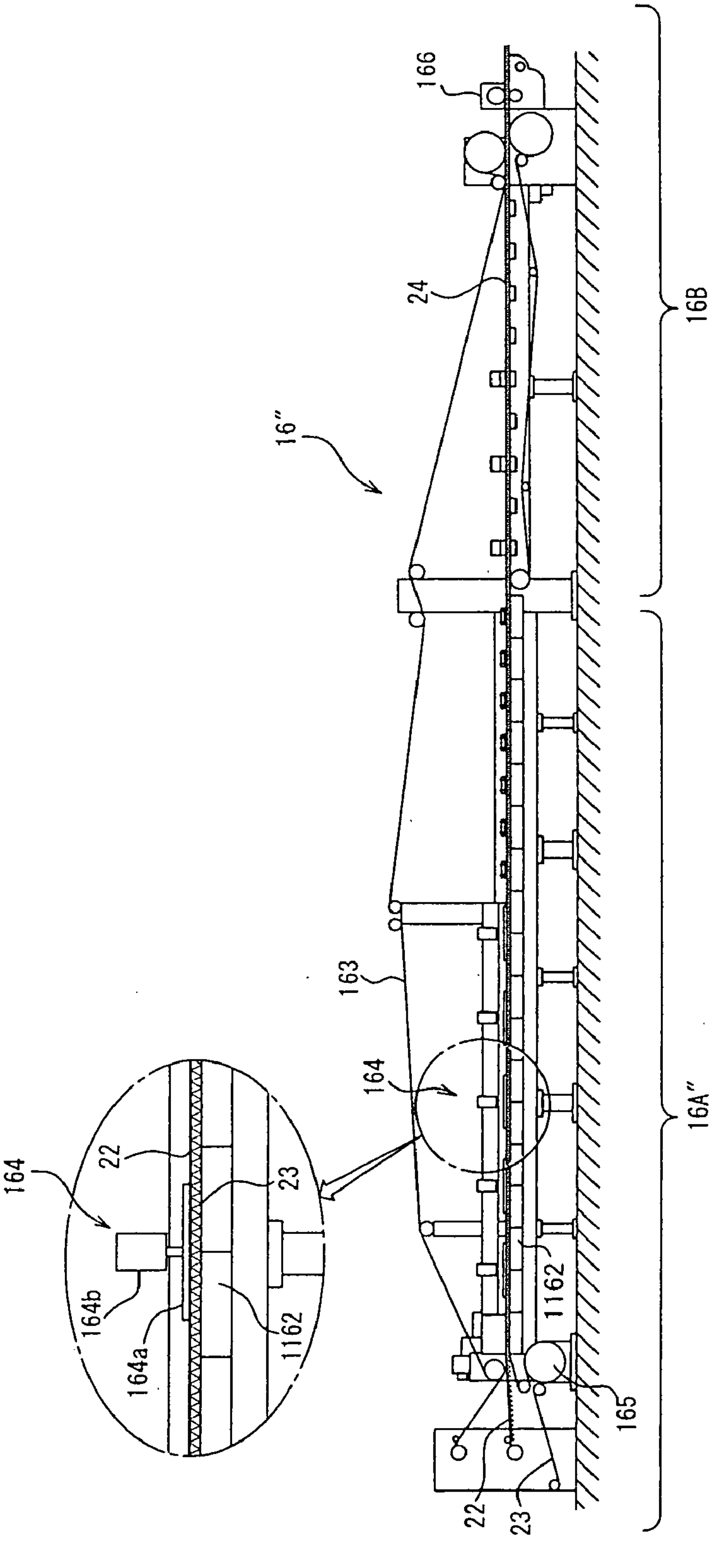
FIG. 77 is a schematic diagram illustrating the entire part of the double facer of the thirty-third embodiment.

First of all, the entire structure of the double facer 16" is described with reference to FIG. 77, which schematically shows the entire structure of the double facer 16".

The double facer 16" is divided into an upstream heating section 16A" and a downstream cooling section 16B" which sections lie along the travel path of a bottom liner 20 and a top liner 23. In the heating section 16A", a plurality of hotplates 1162 are disposed along the travel path and a plurality of press units are arranged on the hotplates 1162 along the travel path. Vapor supplied to the inside of each hotplate 1162 heats the hotplates 1162 to a predetermined temperature.

On the hotplates 1162, a loop-shape press belt 163 interposed by the travel path runs in synchronization with a single-face web 22 and a top liner 23. A plurality of pressure units 164 are disposed in the loop formed by the press belt 163 so as to be opposite the hotplates 1162. Each of the pressure units 164 is constituted of a pressure bar 164*a* in contact with the back of the press belt 163 and an air cylinder 164*b* to press the pressure bar 164*a* to the hotplate-1162 side. Each press unit 164 has a structure to press the entire width of a single-face web 22 or a top liner 23.

A single-face web 22 pasted in the glue machine 15 (see FIG. 78) is introduced to a space between the press belt 163 and the hotplates 1162 from the press-belt-163 side (so as to be in contact with the press belt 163) while a top liner 23 heated by the top liner preheater 14 is further preheated by the liner entrance preheating roll 165 and is then introduced to the space between the press belt 163 and the hotplates 1162 from the hot-plates-1162 side (so as to be in contact with the hotplates 1162). After being introduced to the space between the press belt 163 and the hotplates 162, the single-face web 22 and the top liner 23 pile up to form one body and are transferred to the cooling section 16B. While the single-face web 22 and the top liner 23 are transferred, the single-face web 22 and the top liner 23 are pressed by the pressure unit 164 through the press belt 163 and are heated from the top-liner-23 side so that the single-face web 22 and the top liner 23 are glued together to form a double-face web 24. The overall width or the edge of the double-face web 24 is cut by a rotary shear installed at the exit of the cooling section 16B and then the double-face web 24 is transferred to the slitter scorer 17 at which the ensuing step is to be performed.

Figure 76A:
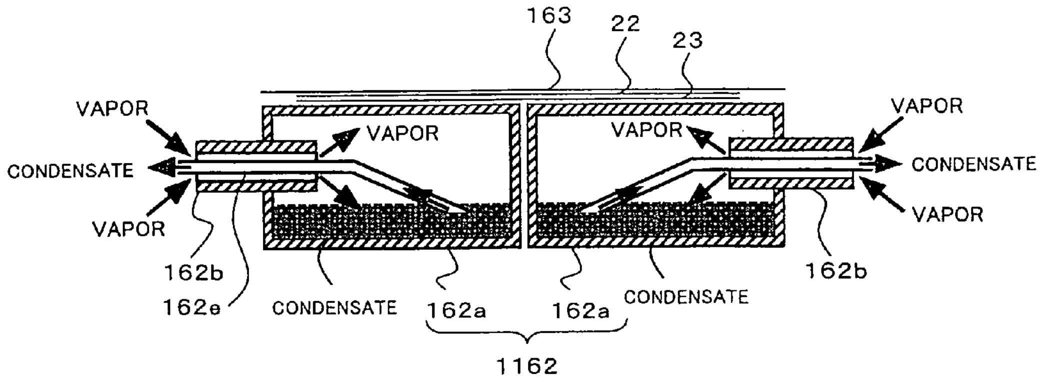
FIG. 76*a* is a sectional front view schematically showing the main part (a hotplate) of a double facer according to a thirty-third embodiment of the present invention.
Figure 76B:
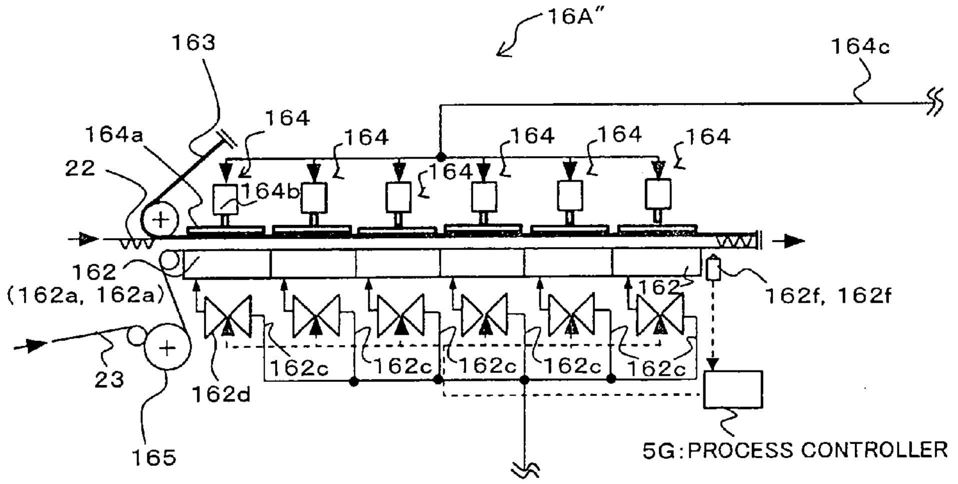
FIG. 76*b* is a sectional view schematically showing the main part (a hotplate) of the double facer according to the thirty-third embodiment.

The hotplates 1162 will now be further detailed described with reference to FIGS. 76*a* and 76*b*. FIGS. 76*a* and 76*b* schematically show the main part (the hotplates 1162) of the double facer 16": FIG. 76*a* is a front sectional view (seen from the web travel direction); and FIG. 76*b* is a side view thereof.

As shown in FIG. 76*a*, each hotplate 1162 includes a plurality (two in the illustrated embodiment) of heating chambers 162 arranged in the web-width direction. In other words, each hotplate 1162 is divided in the web-width direction into a plurality of heating chambers 162*a*.

A vapor inlet 162*b* is installed on one side face of each heating chamber 162*a*. A vapor pipe 162*c* shown in FIG. 76*b* is connected to each vapor inlet 162*b*. Vapor supplied from non-illustrated vapor source in order to heat a web is adjusted to a set pressure by vapor pressure adjusting valves 162*d*, one disposed in each of the vapor pipes 162*b* and then provided to individual heating chambers 162*a*.

At the exit of the heating section 16A", temperature sensors (water content measuring means) 162*f* are installed so as to face a top liner 23. As mentioned above, each of the hotplates 1162 arranged in the web-travel direction is divided into a plurality of forms in the web-width direction, that is, a number of heating chambers 162*a* form two lines in the web-travel direction. A plurality (two in this example) of the above temperature sensors 162*f* are installed in the web-width direction and one of the temperature sensors 162*f* is dedicated to each line formed by heating chambers (i.e., temperature sensors 162*f* are arranged in order to measure a temperature of a web region heated by individual lines formed by heating chambers).

Temperature information (information of the parameters in relation to moisture contents) from these temperature sensors 162*f* is output to the process controller 5G of the production management machine 2G. On the basis of results of measurement performed by temperature sensors 162*f*, process controller 5G adjusts an opening degree of each vapor pressure adjusting valve 162*d* to individually control heat amounts applied to the heating chambers 162*a* arranged in the web-width direction such that a single-face web 22 and a top liner 23 is heated to a predetermined temperature without variations in the web-width direction.

The predetermined temperature is appropriately set by the process controller 5G in accordance with, for example, production information.

As shown in FIG. 76*a*, a drain pipe 162*e* passes through each vapor inlet 162*b*. Vapor in each heating chamber 162*a* is condensed after heating a single-face web 22 and a top liner 23, and drained through the drain pipes 162*e*.

Since the double facer of the thirty-third embodiment includes each hotplate 1162 divided into a number of heating chambers 162*a* arranged in the web-width direction, it is possible to uniformly heat a single-face web 22 and a top liner 23 by adjusting width-direction heat amounts that the hotplates 1162 apply to the single-face web 22 and the top liner 23 whereupon width-direction S-shape warp can be inhibited.

Since the process controller 5G automatically controls the vapor pressure adjusting valves 162*d* of the heating chambers 162*a*, which are arranged in the web-width direction, on the basis of measurement results obtained by temperature sensors 162*f*, it is advantageously possible to automatically control the temperature of a single-face web 22 and a top liner 23 and to thereby automatically inhibit width-direction S-shape warp.

(H-2) Thirty-Fourth Embodiment

Figure 79:
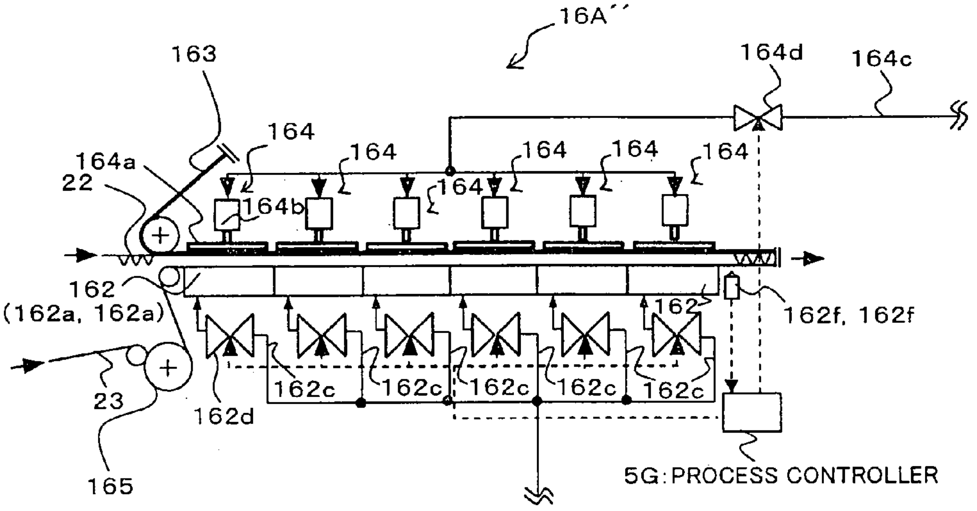
FIG. 79 is a sectional view schematically showing a configuration of the main part of a double facer according to a thirty-fourth embodiment of the present invention.

FIG. 79 schematically shows a side view of a heating section 16A" according to the thirty-fourth embodiment of the present invention. Compared to the thirty-third embodiment shown in FIGS. 76*a* and 76*b*, the heating section 16A" of this embodiment includes an air-pressure adjusting valve 164*d* on an air pipe 164*c*, through which air is provided to air cylinders 164*b* of pressure units 164. The process controller 5G controls the degree to which the air-pressure adjusting valve 164*d* is open, as well as those of the vapor pressure adjusting valves 162*d* for the hotplates 1162, based on results obtained by measurement of the temperature sensors 162*f* such that the temperature of a single-face web 22 and a top liner 23 becomes a predetermined temperature. Controlling the air-pressure adjusting valve 164*d* can collectively control pressures and also heat amounts that are applied to the entire single-face web 22 and top liner 23 by press bars 164*a*, which are arranged so as to cover the entire width of the single-face web 22 and the top liner 23.

As described above, the double facer of the thirty-fourth embodiment can collectively control a heat amount applied to heat the entire width of a single-face web 22 and a top liner 23 by controlling pressures applied by the press units 164. Therefore, if the entire width of a single-face web 22 and a top liner 23 is higher or lower in temperature than a predetermined temperature irrespective of a region in the width direction, controlling pressures applied by the press units 164 roughly adjust the temperature and then heat amounts applied to the individual heat chambers 162*a* arranged in the web width direction are controlled whereupon detailed temperature controlling in the width direction can be effectively performed.

(H-3) Thirty-Fifth Embodiment

Figure 80:
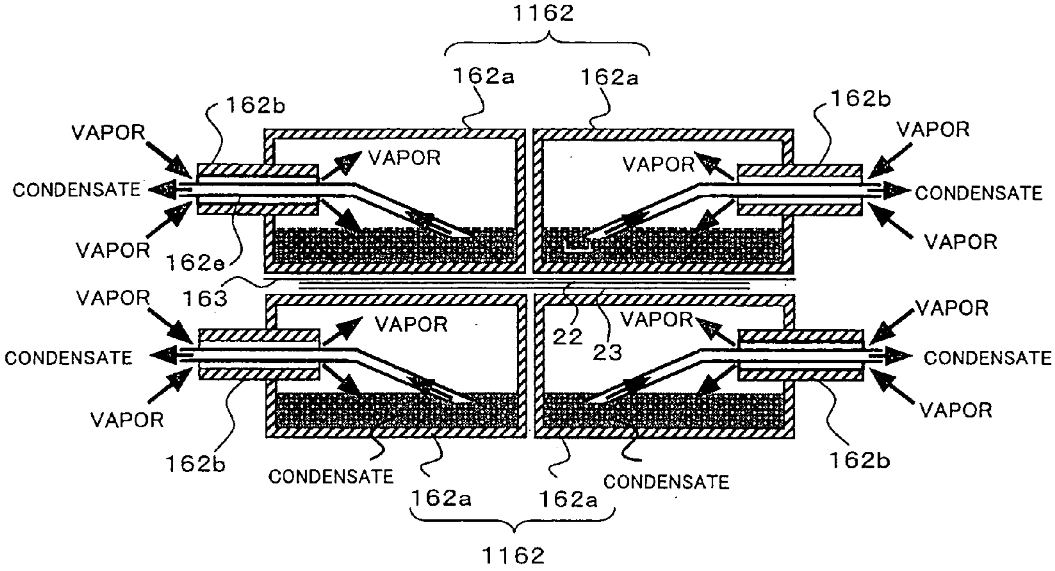
FIG. 80 is a sectional front view, corresponding to FIG. 76*a*, illustrating a configuration of the main part of a double facer according to a thirty-fifth embodiment of the present invention.

FIG. 80 is a sectional diagram schematically showing a front view of a double facer according to the thirty-fifth embodiment of the present invention. In the heating section thereof, similarly to the foregoing embodiments, hotplates 1162, each of which is divided into a plurality (two in this example) of heating chambers 162*a* arranged in the web width direction, are vertically disposed and are interposed by the travel path for a single-face web 22 and a top liner 23. The press units 164 in the thirty-third embodiment shown in FIGS. 76*a* and 76*b* are substituted by the hotplates 1162 in this embodiment. A single-face web 22 and a top liner 23 travel in contact with the hotplates 1164 arranged on and beneath the webs (FIG. 80 illustrates a single-face web 22 and a top liner 23 departing from each other, for convenience). The remaining configuration is identical to that of the thirty-third embodiment, so any repetitious description is omitted here.

The double facer of the thirty-fifth embodiment can inhibit a temperature variation in the web width direction from both sides of a single-face web 22 and a top liner 23 by using the hotplates 1162 so that it is advantageously possible to further effectively inhibit S-shape warp.

(H-4) Others

The double facer of this invention should by no means be limited those described in the thirty-third to the thirty-fifth embodiments and various changes and modifications can be suggested without departing from the concept of the present invention.

For example, an example shown in FIG. 76*b* includes vapor pressure adjusting valves 162, one for each of the heating chambers 162*a*, in order to control heat amounts applied to the individual heat chambers 162*a*. Sufficient control over a heat amount using the heating chambers 162*a* may be individually performed for different positions in relation to the width direction of a web. Alternatively, for this reason, one vapor pressure adjusting valve 162*d* may be applied to each line (chamber line) formed by heating chambers 162*a* arranged in the web travel direction, so that a heat amount applied to each chamber line and thereby a heat amount applied to the width direction of a web are controlled.

In the thirty-third to the thirty-fifth embodiments, the moisture content measurement means (temperature sensors) faces a top liner 23 but, alternatively, may face a single-face web 22. Further, temperature sensors serving as the moisture content measurement means may be substituted by moisture sensors to measure a water content of a single-face web 22 or a top liner 23.

In the thirty-third to the thirty-fifth embodiments, heat amounts applied to the heating chambers 162*a* are controlled on the basis of results of measurement by temperature sensors (moisture content measurement means). Alternatively, a CCD camera may photograph a travel direction edge of a corrugated board sheet 25 (an edge along a wide direction of a corrugated board sheet 25) stacked in the stacker 19 and heat amounts applied to the heating chambers 162*a* (opening degree of the vapor pressure adjusting valve 162*d*) are controlled based on the image data obtained by the CCD camera. In this case, a vertical variation amount (position in height) along the width direction is detected based on image data of the CCD camera and width-direction S-shape warp of the corrugated board sheet 25 is detected based on the vertical variation.

Further, the process controller (control means) 5G of the thirty-third to the thirty-fifth embodiments automatically controls the vapor pressure adjusting valve 162*d* or the air pressure adjusting valve 164*d* based on a result of measurement by temperature sensors (the moisture content detecting means). Alternatively, an operator may visually observe a warp status of a corrugated board sheet 25, as substitute installation of the moisture content measuring means, and may manually control the vapor pressure adjusting valve 162*d* or the air pressure adjusting valve 164*d* in accordance with the observed warp status.

Figure 81:
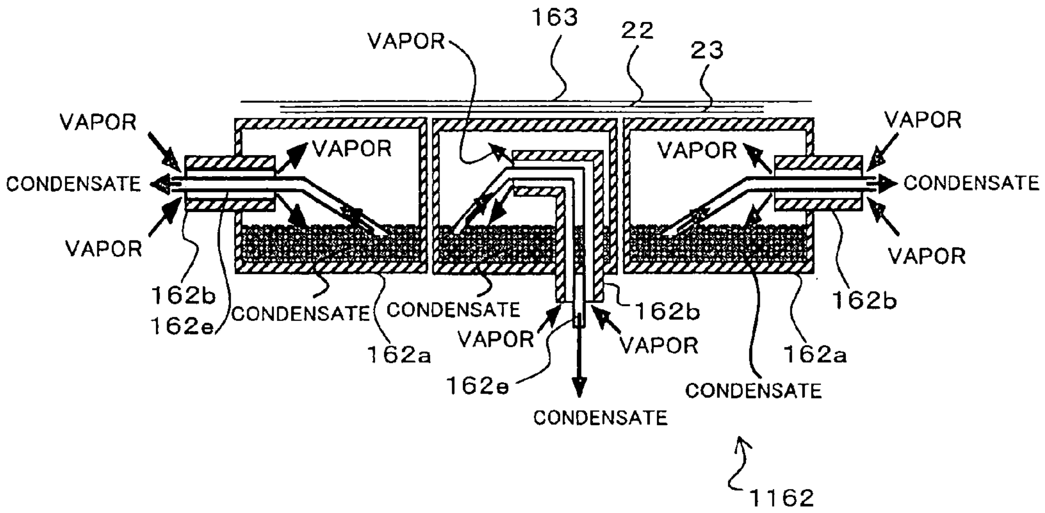
FIG. 81 is a sectional front view schematically illustrating a configuration of the main part of a double facer according to another embodiment of the present invention.

Still further, each hotplate 1162 in the thirty-third to the thirty-fifth embodiments is divided into two parts in the width direction. A satisfactory hotplate 1162 is divided into a number of parts, and for example, each hotplate 1162 may be divided into three parts as shown in FIG. 81.

The hotplates 1162 of the thirty-third to the thirty-fifth embodiments are heated by supplying vapor into the insides thereof. A heating manner should by no means be limited to vapor heating, but may be alternatively performed by dielectric heating or induction heating.

(I)

Hereinafter, a corrugated-board sheet counter according to the thirty-sixth to thirty-eighth embodiments and modifications thereof of the present invention will now be described with reference to FIGS. 82-85. Parts and elements identical to those described in the foregoing embodiments are to be referred to by the same reference numbers, and description is partially omitted here.

(I-1) Thirty-Sixth Embodiment

Figure 82:
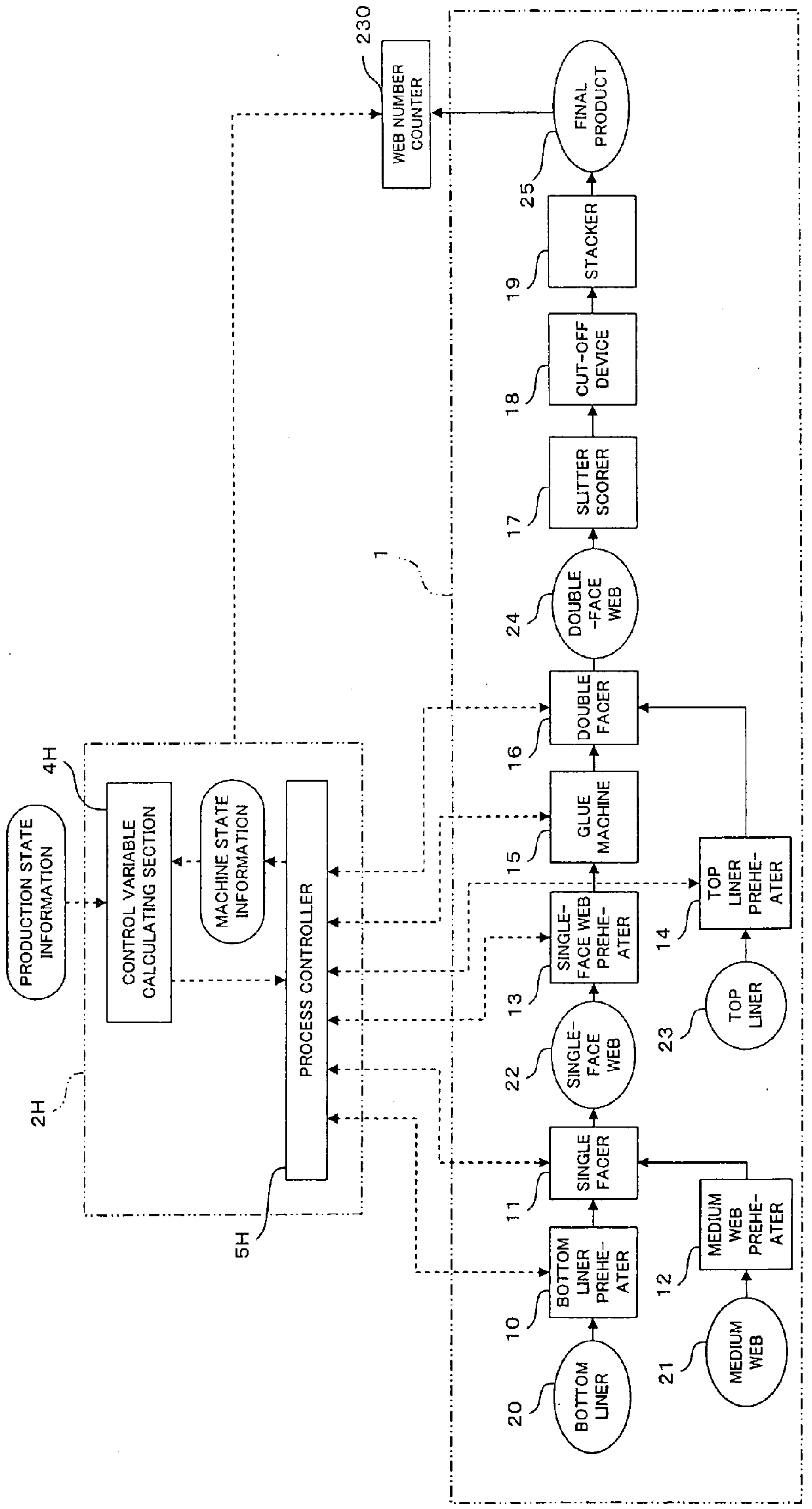
FIG. 82 is a schematic diagram illustrating a corrugated-board fabrication system according to a thirty-sixth embodiment of the present invention.

FIG. 82 schematically shows a system for fabricating a corrugated board sheet according to the thirty-sixth embodiment of the present invention. First of all, description is made in relation to a system for fabricating a corrugated board sheet which incorporates a corrugated-board sheet counter 230 of the thirty-sixth embodiment.

A system for fabricating a corrugated board sheet of this embodiment includes a corrugated-board fabrication machine 1 and a production management machine 2H to manage the corrugated-board fabrication machine 1.

The corrugated-board fabrication machine 1 includes, as the main elements, a bottom liner preheater 10 to heat a bottom liner 20, a medium web preheater 12 to heat a medium web 21, a single facer 11 to corrugate and paste the medium web 21 heated by the medium web preheater 12 and then glue the medium web 21 to the bottom liner 20 heated by the bottom liner preheater 10, a single-face web preheater 13 to heat a single-face web 22 formed by the single facer 11, a top liner preheater 14 to heat a top liner 23, a glue machine 15 to paste a single-face web 22 heated by the single-face web preheater 13, a double facer 16 to fabricate the corrugated board 24 by gluing a single-face web 22 pasted by the glue machine 15 to the top liner 23 heated by the top liner preheater 14, a slitter scorer 17 to slit and score a corrugated board 24 fabricated by the double facer 16, a cut-off device 18 to make a final product (a corrugated board sheet) 25 by dividing a corrugated board 24 scored and subjected to another procedure by the slitter scorer 17 into separated forms, and a stacker 19 to sequentially stack corrugated board sheets 25 in order of fabrication.

The production management machine 2H appropriately controls each of the elements 10, 11, and 13-16, and includes, as shown in FIG. 82, a control variable calculating section 4H and a process controller 5H.

The control variable calculating section 4H obtains production-state information from a non-illustrated upper system for production management. The control variable calculating section 4H calculates each control variable on the basis of such production state information and machine state information (running state) obtained through the process controller 5H, and outputs control instructions in the form of the result of the calculation to the process controller 5H. The process controller 5H controls each control variable in accordance with the control instructions from the control variable calculating section 4H. The control variable calculating section 4H and the process controller 5H carry out matrix control using production-state information and running-state information.

Figure 83:
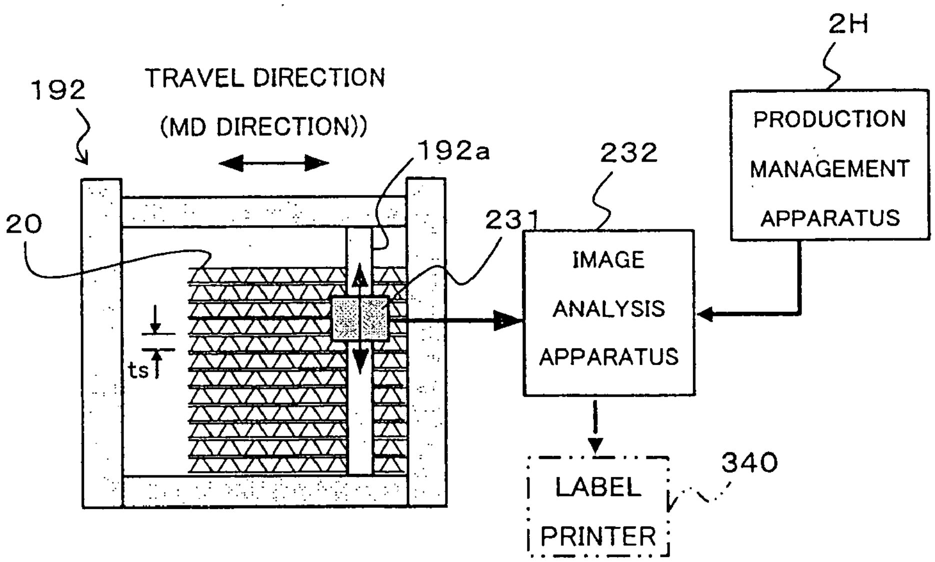
FIG. 83 is a schematic diagram showing a corrugated-board sheet counter that is an enlargement of the Y part of FIG. 15*a* according to the thirty-sixth embodiment.

Here, the corrugated-board sheet counter of this embodiment will now be described with reference to FIG. 83 and FIG. 15*a* previously used as description of the eighth embodiment. FIG. 83 shows a configuration of imaging means of the corrugated-board sheet counter of this embodiment and is a detailed diagram schematically enlarging the Y-part of FIG. 15*a*.

The corrugated-board sheet counter 230 of this embodiment includes a CCD camera (imaging means) 231 disposed in the stacking section 192 of the stacker 19 and an image analysis apparatus 232. The CCD camera 231 is movably attached to a rail 192*a* vertically installed in the stacking section 192 and includes a non-illustrated driving mechanism. Corrugated board sheets 25 that have been cut in the cut-off device 18 are transferred to the stacking section 192 by a plurality of conveyers 191 and then subsequently piled in the stacking section 192. The CCD camera 231 moves on the rail 192*a* and photographs width-direction edges (edges along the travel direction of the corrugated board sheet 20 and a surface exposing flutes of each medium web 21) of such piled corrugated board sheets 20 along the direction in which the corrugated board sheets are piled.

The image data (the image) obtained by the CCD camera 231 is output to the image analysis apparatus 232. Information (flute information) about a flute of a corrugated board sheet 20 being fabricated is input to the image analysis apparatus 232 from the production management machine 2H (or by an operator via a non-illustrated inputting device). The image analysis apparatus 232 analyzes the above image based on the flute information and recognizes the individual corrugated board sheets 20 in the image to count the number of corrugated board sheets one by one.

Specifically, in order to recognize corrugated board sheets 20, for example, the height and the pitch of a flute (a wave) are input as flute information. Then the image analysis apparatus 232 creates an image of a flute shape on the basis of the flute information and if an image obtained by the CCD camera 231 includes a portion identical to the flute shape in the created image, the image analysis apparatus 232 recognizes the identical portion as a corrugated board sheet. Otherwise, the production management machine 2H may previously retain, as flute information, images of various flutes of a width direction edge and the flute information may be output to the image analysis apparatus 232 as required.

The counted number of corrugated board sheets is displayed on a non-illustrated display.

The corrugated-board sheet counter of the thirty-sixth embodiment has the above-described structure and can count the accurate number of corrugated board sheets by analyzing image data obtained by the CCD camera. Advantageously, it is thereby possible to accurately manage production of corrugated board sheets.

A count of corrugated board sheets is performed at the stacking section 192 that is the rearmost part of the corrugated-board fabrication machine. Since, even if one or more defective corrugated board sheets 20 have been removed during the production process, the number of corrugated board sheets except the number of removed corrugated board sheets, i.e., the number of final products, can be accurately counted, it is also possible to accurately manage production of corrugated board sheets.

(I-2) Thirty-Seventh Embodiment

A corrugated-board sheet counter according to a thirty-seventh embodiment will now be described with reference to FIG. 84, which schematically shows the corrugated-board sheet counter of this embodiment and corresponds to FIG. 83.

The corrugated-board sheet counter of this embodiment includes a variation sensor 233 and a calculating apparatus (number calculating means) 234.

The variation sensor 233 is disposed beneath the ceiling surface 192*b* of the stacking section 192 and measures vertical variation (hereinafter also called measured data) X, i.e., distance between the sensor surface 233*a* thereof and the top corrugated board sheet 20 piled in the stacking section 192.

The measured data X obtained by the variation sensor 233 is output to the calculating apparatus 234. The calculating apparatus 234 previously retains the distance H0 between the sensor surface 233*a* and a floor 192*c* of the stacking section 192, and obtains a height H of sheets using the difference between the measured data X and the distance H0 (H=H0−X). The combination of the variation sensor 233 and the calculating apparatus 234 therefore serves as the height measuring means of the present invention.

The calculating apparatus 234 also functions as the calculating means of the present invention. The production management machine 2H inputs a thickness ts per corrugated board sheet 20 currently being fabricated to the calculating apparatus 234 (otherwise, an operator inputs the thickness via a non-illustrated input device) and the calculating apparatus 234 divides the height H by the thickness ts to calculate the number N of corrugated board sheets (N=H/ts).

The corrugated-board sheet counter of the thirty-seventh embodiment has the above-mentioned structure and thereby can guarantee the same advantages as the thirty-sixth embodiment.

(I-3) Thirty-Eighth Embodiment

A corrugated-board sheet counter according to a thirty-eighth embodiment will now be described with reference to FIG. 85, which schematically shows the corrugated-board sheet counter of this embodiment and corresponds to FIG. 83.

The corrugated-board sheet counter of this embodiment includes a variation sensor 233 and a calculating apparatus (number calculating means) 234'. The variation sensor 233 is disposed beneath the ceiling surface 192*b* of the stacking section 192 and measures the distance X between the sensor surface 233*a* thereof and the top corrugated board sheet 20 piled in the stacking section 192 in the same manner as the above thirty-seventh embodiment.

The measured data obtained by the variation sensor 233 is output to the calculating apparatus 234'. The calculating apparatus 234' on/off-detects whether or not the measured data X decreases as compared to the previous detection, in other words, whether or not a height H of the sheets increased. When an increase in sheet height H of the sheets is detected, the calculating apparatus 234' judges that another corrugated board sheet 20 has been piled in the stacker 19 and increases the count number N of corrugated board sheets in increments of one (N=N+1).

Additionally, when the measured distance X is identical to the distance H0 to the floor 192*c* of the stacking section 192, the calculating apparatus 234' judges that no corrugated board sheet 20 is piled in the stacking section 192 and resets the count number N of corrugated board sheets to zero. Whereby, the count number N of corrugated board sheets is automatically reset to zero each time piled corrugated board sheets are taken out of the stacking section 192.

In the above example, the calculating apparatus 234' increases the number N of corrugated board sheets whenever sheet height H in the stacking section 192 increases. Alternatively, the calculating apparatus 234' may increase the corrugated-board sheet number N when a variation scale $\Delta X$ (an absolute value) in measured data X as compared to the previous detection is equal to or larger than a predetermined value $\beta$, so that the corrugated-board sheet number is not unnecessarily increased in response to a variance in height detection. Of course, the predetermined value $\beta$ is smaller than the thickness ts of an individual corrugated board sheet ($\beta$<ts).

Since the corrugated-board sheet counter of the thirty-eighth embodiment has the above-described configuration, the number X of corrugated board sheets is counted up each time a corrugated board sheet 20 being individually transferred is piled in the stacking section 192 and guarantees the same advantages as the foregoing embodiments.

Further, since calculation for the corrugated-board sheet number requires no information about flute specification and flute thickness, it is advantageously possible to simplify the control system as compared to those of the foregoing embodiments.

(I-4) Others

The corrugated-board sheet counter of corrugated-board fabrication machine 1 of this invention should by no means be limited those described in the thirty-sixth to the thirty-eighth embodiments and various changes and modifications can be suggested without departing from the concept of the present invention.

Figure 84:
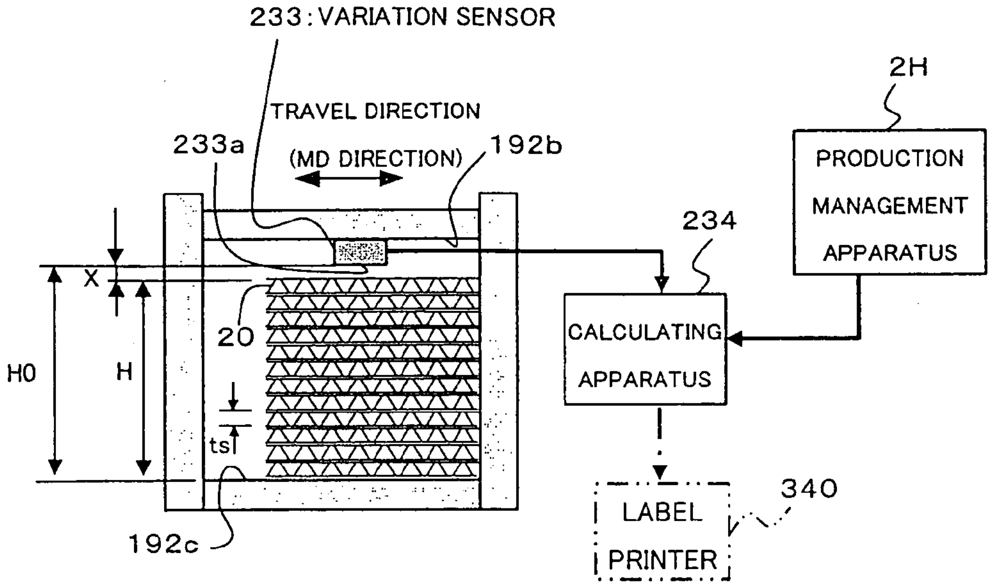
FIG. 84 is a schematic diagram, corresponding to FIG. 83, showing a corrugated-board sheet counter according to a thirty-seventh embodiment of the present invention.
Figure 85:
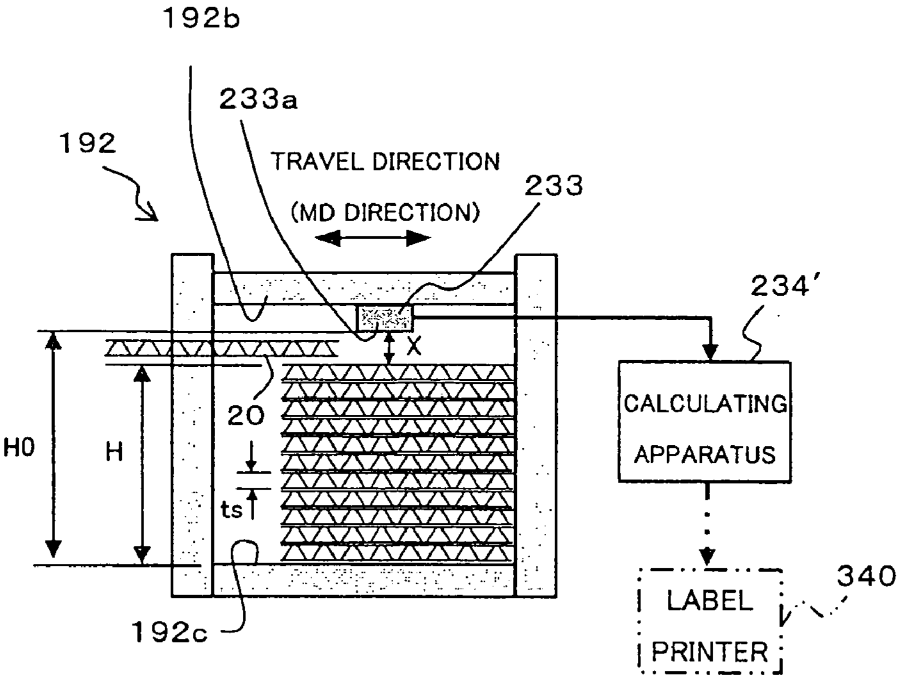
FIG. 85 is a schematic diagram, corresponding to FIG. 83, showing a corrugated-board sheet counter according to a thirty-eighth embodiment of the present invention.
Figure 86:
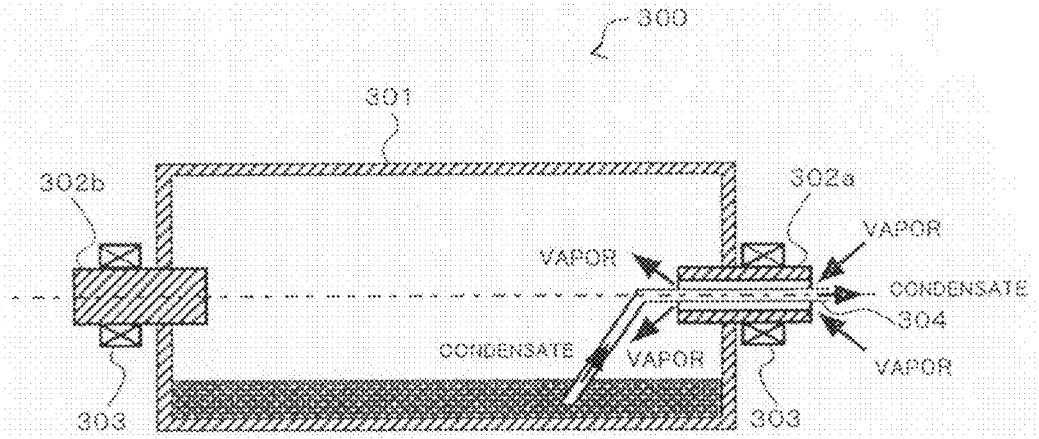
FIG. 86 PRIOR ART
FIG. 86 is a sectional front view schematically showing a conventional preheater (a heating roll).

For example, the corrugated-board sheet counter of each embodiment may additionally comprise a label printer 340 to print the number N of corrugated board sheets together with a production date (the corrugated-board sheet number printing means), as shown by the two-dotted lines in FIGS. 83-85. With this printer, production management can be carried out more easily.

Each of the corrugated-board sheet counters 230 of the thirty-sixth to thirty-eighth embodiment counts the number of double-faced corrugated board sheets. It is possible to apply the corrugated-board sheet counters of the present invention to count single-faced corrugated board sheets.

What is claimed is:

1. A system for correcting warp of a corrugated board sheet fabricated by a corrugated-board fabrication machine (1), comprising:

imaging means (7) for imaging the four corner of the corrugated board sheet fabricated by the corrugated-board fabrication machine (1);

detection means (8B) for detecting twist warp of the corrugated board sheet on the basis of image data obtained by the imaging means;

warp status information obtaining means (6, 6A-6H, 7, 7A, 7B, 8, 8A-8H, 240*a*, 240*b*, 241*a*, 241*b*) for obtaining warp status information concerning status of the twist warp of the corrugated board sheet;

running-state information obtaining means (5, 5A-5H) for obtaining running state information concerning a running state of the corrugated-board fabrication machine (1);

control variable calculating means (4, 4A-4H) for calculating a control variable of a particular control factor that affects the twist warp of the corrugated board sheet and that is one among control factors used to control the corrugated-board fabrication machine (1) based on the warp status information of the corrugated board sheet and the running state information of the corrugated-board fabrication machine (1); and control means (5, 5A-5H) for controlling the particular control factor using the control variable calculated by said control variable calculating means (4, 4A-4H), wherein the particular control factor is a control factor that affects a distribution of tension acts upon a bottom liner (20) or a top liner (23) in the direction of travel of the corrugated board sheet, which distribution concerns a direction across the width of the corrugated board sheet.

2. A system for correcting warp of a corrugated board sheet fabricated by a corrugated-board fabrication machine (1), comprising:

variation amount detecting means (7A, 7B) for detecting vertical variation amounts at points near the four corners of the corrugated board sheet fabricated by the corrugated-board fabrication machine (1);

detection means (8B) for detecting twist warp of the corrugated board sheet on the basis of information of the vertical variation amounts obtained by the variation amount detecting means;

warp status information obtaining means (6, 6A-6H, 7, 7A, 7B, 8, 8A-8H, 240*a*, 240*b*, 241*a*, 241*b*) for obtaining warp status information concerning status of the twist warp of the corrugated board sheet;

running-state information obtaining means (5, 5A-5H) for obtaining running state information concerning a running state of the corrugated-board fabrication machine (1);

control variable calculating means (4, 4A-4H) for calculating a control variable of a particular control factor that affects the twist warp of the corrugated board sheet and that is one among control factors used to control the corrugated-board fabrication machine (1) based on the warp status information of the corrugated board sheet and the running state information of the corrugated-board fabrication machine (1); and control means (5, 5A-5H) for controlling the particular control factor using the control variable calculated by said control variable calculating means (4, 4A-4H), wherein the particular control factor is a control factor that affects a distribution of tension acts upon a bottom liner (20) or a top liner (23) in the direction of travel of the corrugated board sheet, which distribution concerns a direction across the width of the corrugated board sheet.

3. A system for correcting warp of a corrugated board sheet fabricated by a corrugated-board fabrication machine (1), comprising:

imaging means (7) for imaging the four corner of the corrugated board sheet fabricated by the corrugated-board fabrication machine (1);

detection means (8B) for detecting twist warn of the corrugated board sheet on the basis of image data obtained by the imaging means;

warp status information obtaining means (6, 6A-6H, 7, 7A, 7B, 8, 8A-8H, 240*a*, 240*b*, 241*a*, 241*b*) for obtaining warp status information concerning status of the twist warp of the corrugated board sheet;

running-state information obtaining means (5, 5A-5H) for obtaining running state information concerning a running state of the corrugated-board fabrication machine (1);

control variable calculating means (4, 4A-4H) for calculating a control variable of a particular control factor that affects the warp of the corrugated board sheet and that is one among control factors used to control the corrugated-board fabrication machine (1) based on the warp status information of the corrugated board sheet and the running state information of the corrugated-board fabrication machine (1);

control means (5, 5A-5H) for controlling the particular control factor using the control variable calculated by said control variable calculating means (4, 4A-4H); and control factor selecting means (3, 3A-3H, 4, 4A-4H) for selecting at least one particular control factor from a plurality of particular control factors that affect the twist warp of the corrugated board sheet in accordance with the warp status information of the corrugated board sheet and an influence of each of said plurality of particular control factors on the twist warp, said control variable calculating means (4, 4A-4H) calculating a control variable of the particular control factor selected by said control factor selecting means (3, 3A-3H, 4, 4A-4H), said control means (5, 5A-5H) controlling the selected particular control factor using the control variable calculated by said calculating means (4, 4A-4H), wherein the particular control factor is a control factor that affects a distribution of tension which acts upon a bottom liner (20) or a top liner (23) in the direction of travel of the corrugated board sheet, which distribution concerns a direction across the width of the corrugated board sheet.

4. A system for correcting warp of a corrugated board sheet fabricated by a corrugated-board fabrication machine (1), comprising:

variation amount detecting means (7A, 7B) for detecting vertical variation amounts at points near the four corners of the corrugated board sheet fabricated by the corrugated-board fabrication machine (1);

detection means (8B) for detecting twist warp of the corrugated board sheet on the basis of information of the vertical variation amounts obtained by the variation amount detecting means;

warp status information obtaining means (6, 6A-6H, 7, 7A, 7B, 8, 8A-8H, 240*a*, 240*b*, 241*a*, 241*b*) for obtaining warp status information concerning status of the twist warp of the corrugated board sheet;

running-state information obtaining means (5, 5A-5H) for obtaining running state information concerning a running state of the corrugated-board fabrication machine (1);

control variable calculating means (4, 4A-4H) for calculating a control variable of a particular control factor that affects the twist warp of the corrugated board sheet and that is one among control factors used to control the corrugated-board fabrication machine (1) based on the warp status information of the corrugated board sheet and the running state information of the corrugated-board fabrication machine (1);

control means (5, 5A-5H) for controlling the particular control factor using the control variable calculated by said control variable calculating means (4, 4A-4H); and control factor selecting means (3, 3A-3H, 4, 4A-4H) for selecting at least one particular control factor from a plurality of particular control factors that affect the twist warp of the corrugated board sheet in accordance with the warp status information of the corrugated board sheet and an influence of each of said plurality of particular control factors on the twist warp, said control variable calculating means (4, 4A-4H) calculating a control variable of the particular control factor selected by said control factor selecting means (3, 3A-3H, 4, 4A-4H), said control means (5, 5A-5H) controlling the selected particular control factor using the control variable calculated by said calculating means (4, 4A-4H), wherein the particular control factor is a control factor that affects a distribution of tension which acts upon a bottom liner (20) or a top liner (23) in the direction of travel of the corrugated board sheet, which distribution concerns a direction across the width of the corrugated board sheet.

* * * * *